(12) United States Patent
Faris

(10) Patent No.: US 6,312,844 B1
(45) Date of Patent: *Nov. 6, 2001

(54) METAL-AIR FUEL CELL BATTERY SYSTEM HAVING MEANS FOR DISCHARGING AND RECHARGING METAL-FUEL CARDS SUPPLIED FROM A CASSETTE-TYPE STORAGE DEVICE

(75) Inventor: Sadeg M. Faris, Pleasantville, NY (US)

(73) Assignee: Reveo, Inc., Elmsford, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 10 days.

(21) Appl. No.: 09/126,213

(22) Filed: Jul. 30, 1998

Related U.S. Application Data

(63) Continuation of application No. 09/074,337, filed on May 7, 1998, which is a continuation-in-part of application No. 08/944,507, filed on Oct. 6, 1997, which is a continuation-in-part of application No. 09/110,761, filed on Jul. 3, 1998, and a continuation-in-part of application No. 09/110,762, filed on Jul. 3, 1998.

(51) Int. Cl.[7] .................................................. H01M 12/06
(52) U.S. Cl. .................................. 429/27; 429/68; 204/57
(58) Field of Search .............................. 429/27, 68, 127, 429/233; 204/57

(56) References Cited

U.S. PATENT DOCUMENTS

| 3,252,838 | 5/1966 | Huber et al. . |
| 3,260,620 | * 7/1966 | Gruber ................................ 429/127 |
| 3,357,864 | 12/1967 | Huber . |
| 3,432,354 | 3/1969 | Jost . |
| 3,436,270 | 4/1969 | Oswin et al. . |
| 3,454,429 | 7/1969 | Gruber ................................... 136/86 |
| 3,532,548 | 10/1970 | Stachurski . |
| 3,536,535 | * 10/1970 | Lippincott ............................ 429/127 |
| 3,577,281 | * 5/1971 | Pountney et al. ..................... 429/127 |
| 3,663,298 | 5/1972 | McCoy et al. . |
| 3,717,505 | 2/1973 | Unkle et al. . |
| 3,822,149 | 7/1974 | Hale . |
| 3,928,072 | 12/1975 | Gerbler et al. . |
| 3,963,519 | 6/1976 | Louie . |

(List continued on next page.)

FOREIGN PATENT DOCUMENTS 1176488  1/1970  (GB) ............................ H01M/29/02

OTHER PUBLICATIONS

Fabrication of Thin–Film LIMN2O4 Cathodes for Rechargeable Microbateries by F.K. Shokoohi, et. al., Applied Physics Letters, 1991, pp. 1260–1262 (Sep.).

(List continued on next page.)

Primary Examiner—Stephen Kalafut
(74) Attorney, Agent, or Firm—Thomas J. Perkowski, Esq., P.C.

(57) ABSTRACT

Disclosed are metal-air fuel-cell battery (FCB) systems adapted to discharge a supply of (re)charged metal-fuel cards supplied from a cassette-type storage device, wherein each (re)charged metal-fuel card is physically disconnected from each other (re)charged metal-fuel card. Each (re)charged metal-fuel card is automatically loaded from the cassette-type cartridge into the discharging bay of the system, and after discharged, transported back into the cassette-type storage device. In the illustrative embodiments, a metal-air FCB system is disclosed, wherein the system is adapted to one or more discharged metal-fuel cards supplied from the cassette-type storage device. In such a system, each discharged metal-fuel card is automatically loaded from the cassette-type cartridge into the (re)charging bay of the system, and after (re)charging, transported back into the cassette-type storage device. In another illustrative embodiment of the present invention, simultaneous discharging and recharging of metal-fuel cards is enabled in a simple and convenient manner.

15 Claims, 48 Drawing Sheets

U.S. PATENT DOCUMENTS

| | | |
|---|---|---|
| 3,977,901 | 8/1976 | Buzzelli . |
| 4,052,541 | 10/1977 | Krusenstierna . |
| 4,152,489 | 5/1979 | Chottiner . |
| 4,172,924 | 10/1979 | Warszawski . |
| 4,246,324 | 1/1981 | de Nora et al. . |
| 4,331,742 | 5/1982 | Lovelace et al. . |
| 4,341,847 | 7/1982 | Sammells . |
| 4,551,399 | 11/1985 | Despic . |
| 4,560,626 | 12/1985 | Joy . |
| 4,626,482 | 12/1986 | Hamlen et al. . |
| 4,693,946 | 9/1987 | Niksa et al. . |
| 4,714,662 | 12/1987 | Bennett . |
| 4,828,939 | 5/1989 | Turley et al. . |
| 4,913,983 | 4/1990 | Cheiky . |
| 4,916,036 | 4/1990 | Cheiky . |
| 4,950,561 | 8/1990 | Niksa et al. . |
| 4,957,826 | 9/1990 | Cheiky . |
| 4,968,396 | 11/1990 | Harvey . |
| 5,250,370 * | 10/1993 | Faris .................................... 429/68 |
| 5,260,144 | 11/1993 | O'Callaghan . |
| 5,306,579 | 4/1994 | Shepard, Jr. et al. . |
| 5,318,861 | 6/1994 | Harats et al. . |
| 5,328,777 | 7/1994 | Bentz et al. . |
| 5,328,778 | 7/1994 | Woodruff et al. . |
| 5,354,625 | 10/1994 | Bentz et al. . |
| 5,362,577 | 11/1994 | Pedicini . |
| 5,387,477 | 2/1995 | Cheiky . |
| 5,389,456 | 2/1995 | Singh et al. . |
| 5,405,713 | 4/1995 | Pecherer et al. . |
| 5,418,080 | 5/1995 | Korall et al. . |
| 5,439,758 | 8/1995 | Stone et al. . |
| 5,462,816 | 10/1995 | Okamura et al. . |
| 5,486,429 | 1/1996 | Thibault . |
| 5,512,384 * | 4/1996 | Celeste et al. .................... 429/51 |
| 5,525,441 | 6/1996 | Reddy et al. . |
| 5,536,592 | 7/1996 | Celeste et al. . |
| 5,554,452 | 9/1996 | Delmolino et al. . |
| 5,582,931 | 12/1996 | Kawahami . |
| 5,599,637 | 2/1997 | Pecherer et al. . |
| 5,691,074 | 11/1997 | Pedicini . |
| 5,711,648 | 1/1998 | Hammerslag . |
| 5,721,064 | 2/1998 | Pedicini et al. . |
| 5,756,228 | 5/1998 | Roseanou . |

OTHER PUBLICATIONS

Battery Chargers by Mike Allen, Popular Mechanics, 1991, pp. 30–31 (Sep.).

New Age EVs by Herb Schuldner, Popular Mechanics, 1991, pp. 27–29 (Sep.).

Marketing Study for AER Energy Resources, Inc. by Authors not indicated, AER Energy Resources, Inc., 1991, pp. 6–28 (Month unknown).

Electric Car Showdown in Phoenix by Rick Cook, Popular Science, 1991, pp. 64–65,82 (Jul.).

Batteries for Cordless Appliances by Ralph J. Brodd, Ch. 3 of Batteries for Cordless Appliances, 1987, pp. 49–59 (Month N/A).

PCT/US98/21257 Search Report, April 1999.

PCT/US98/21260 Search Report, February 1999.

PCT/US98/21256 International Search Report, February 1999.

* cited by examiner

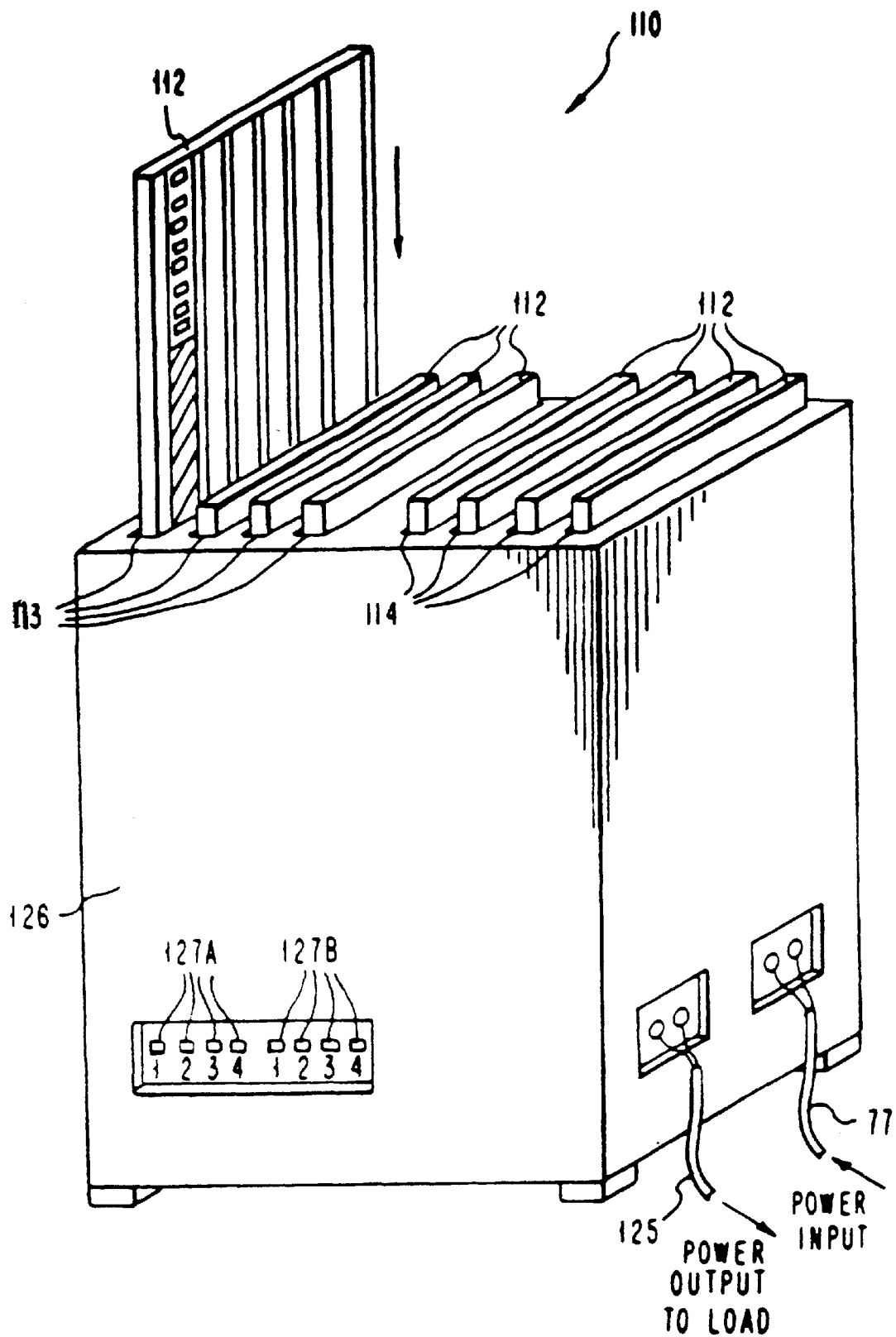

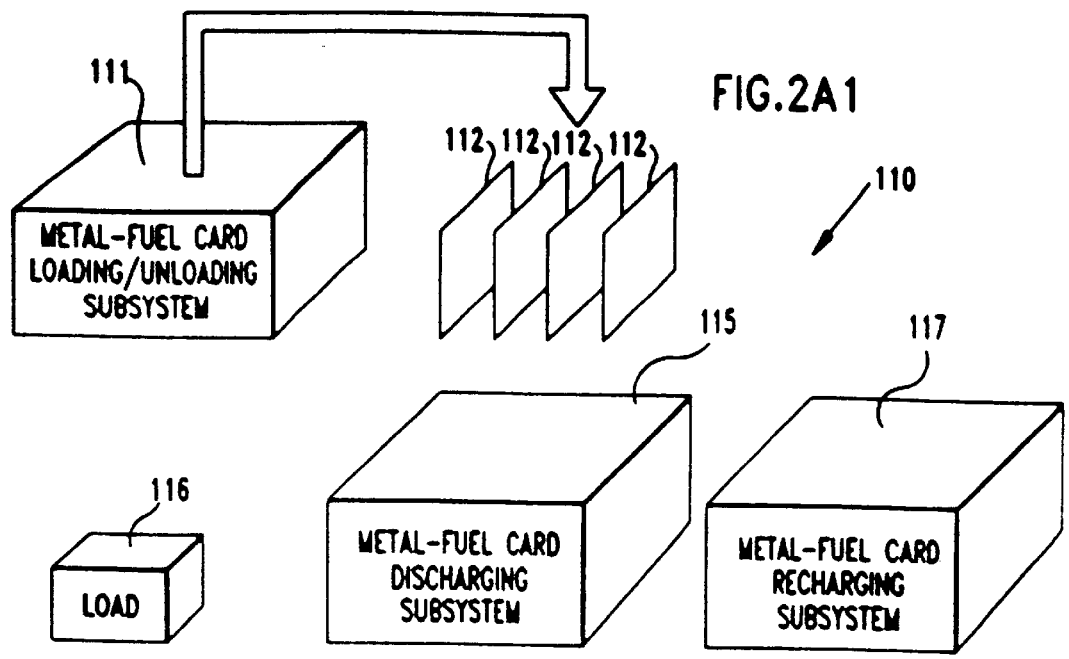
FIG.2A1
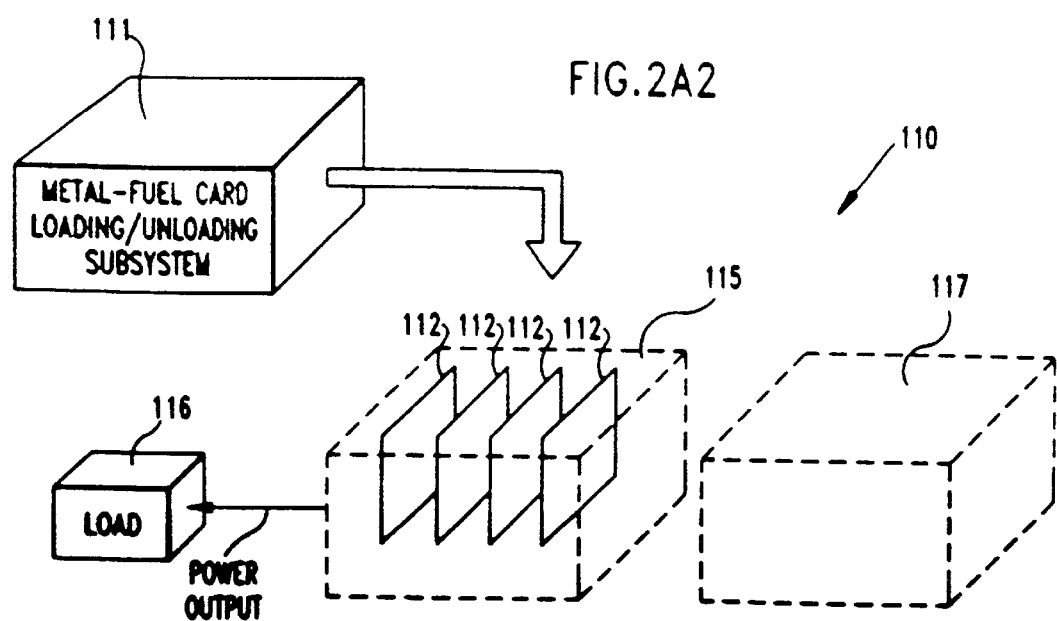
FIG.2A2

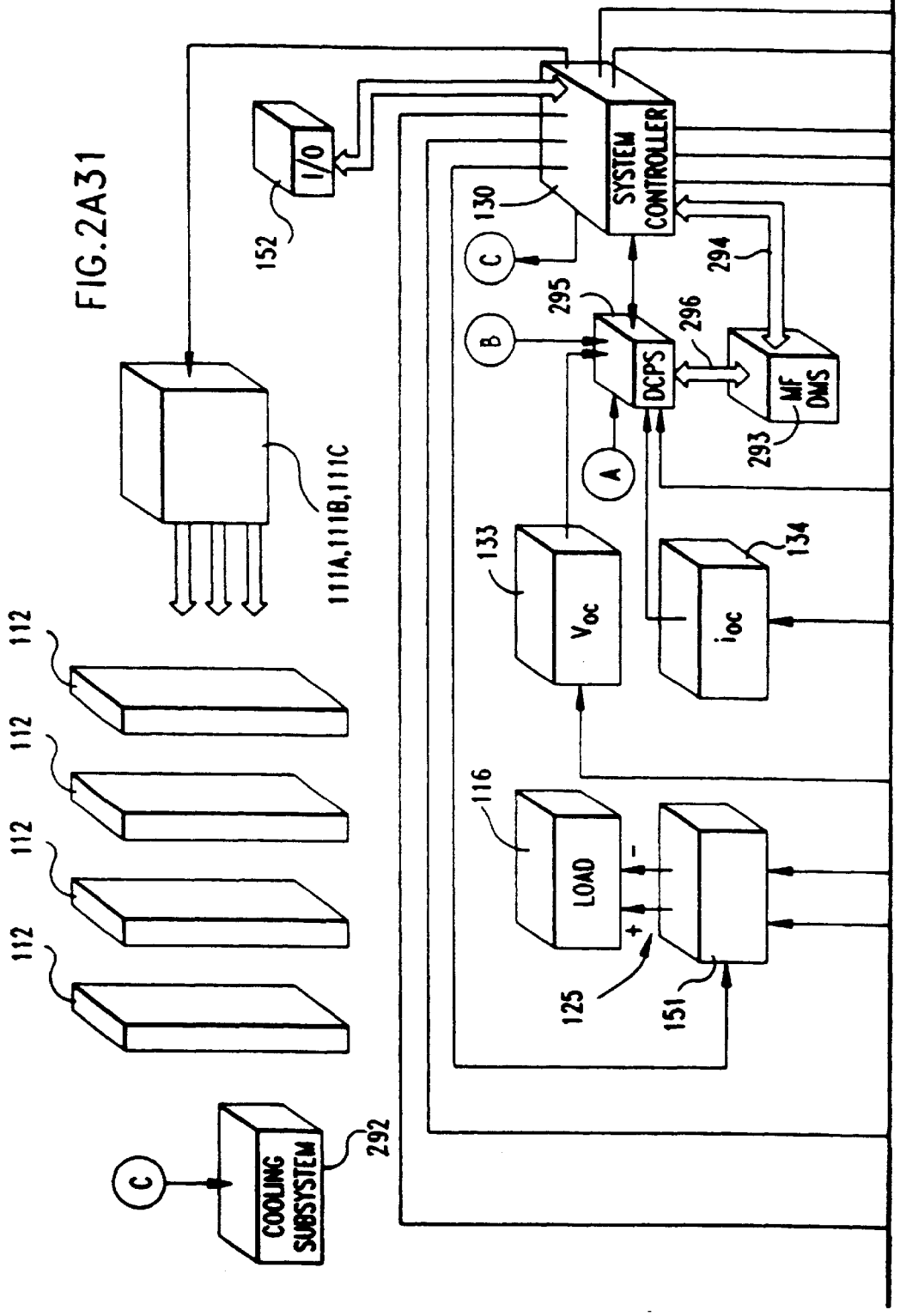
FIG.2A31

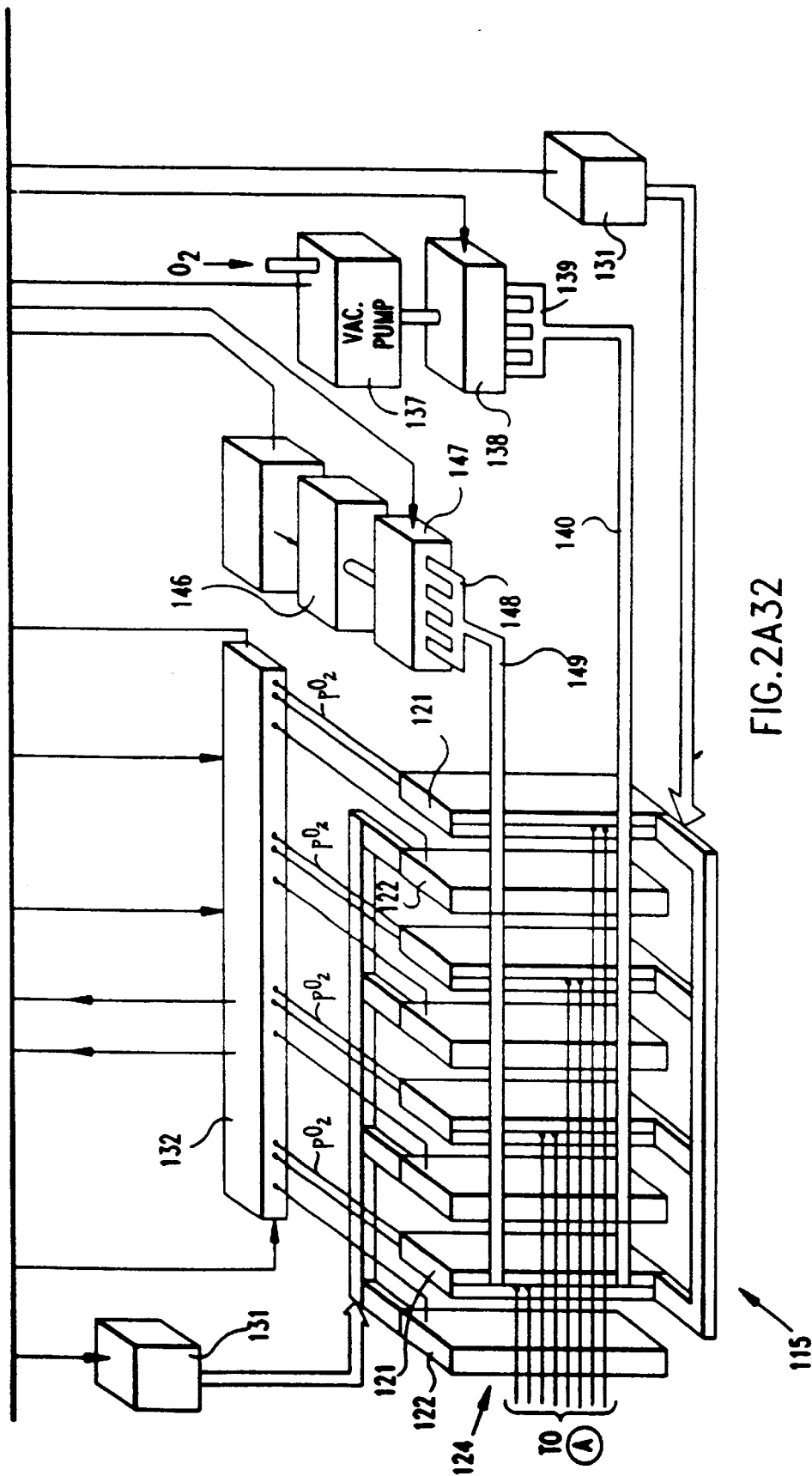

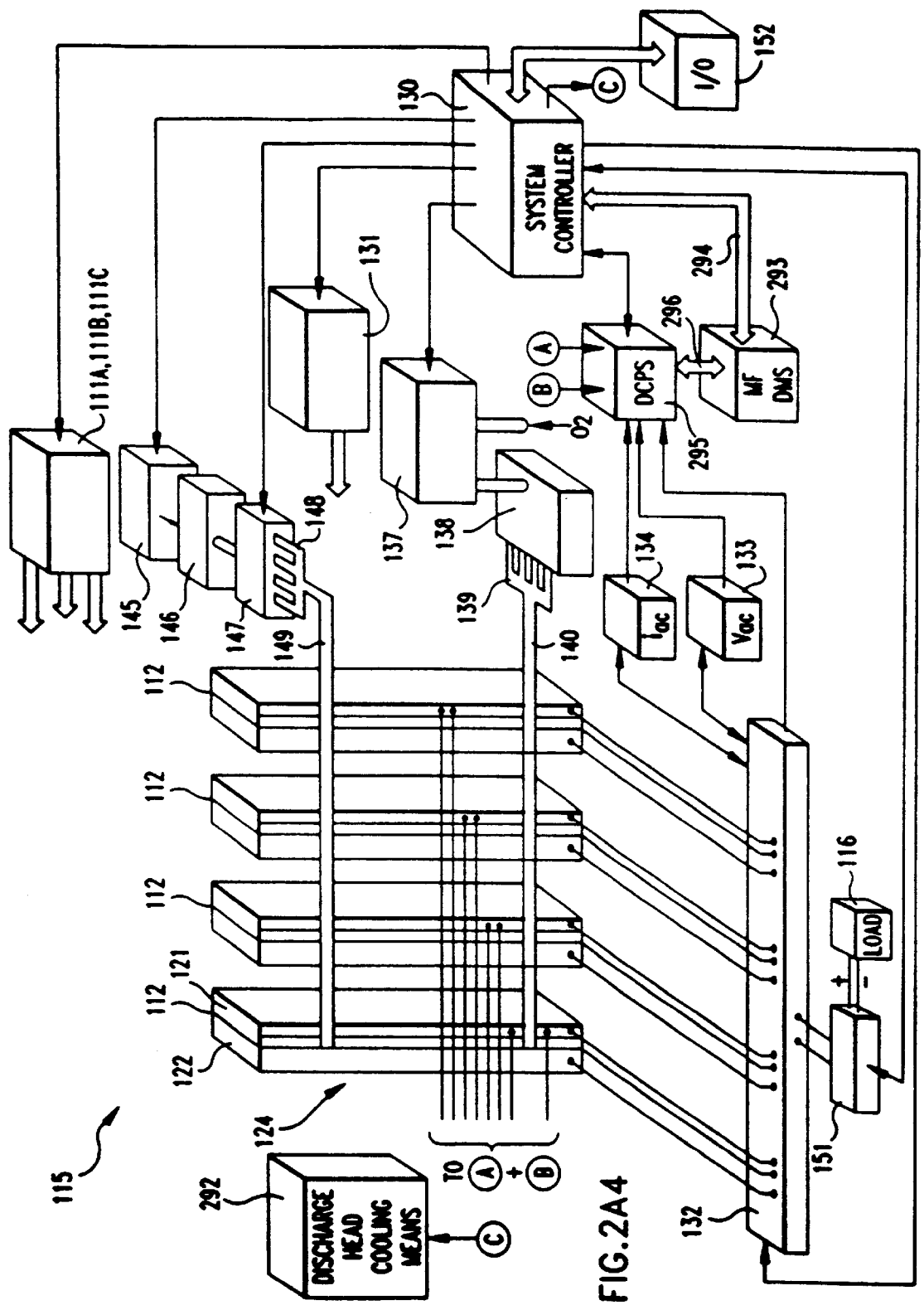

FIG.2A5
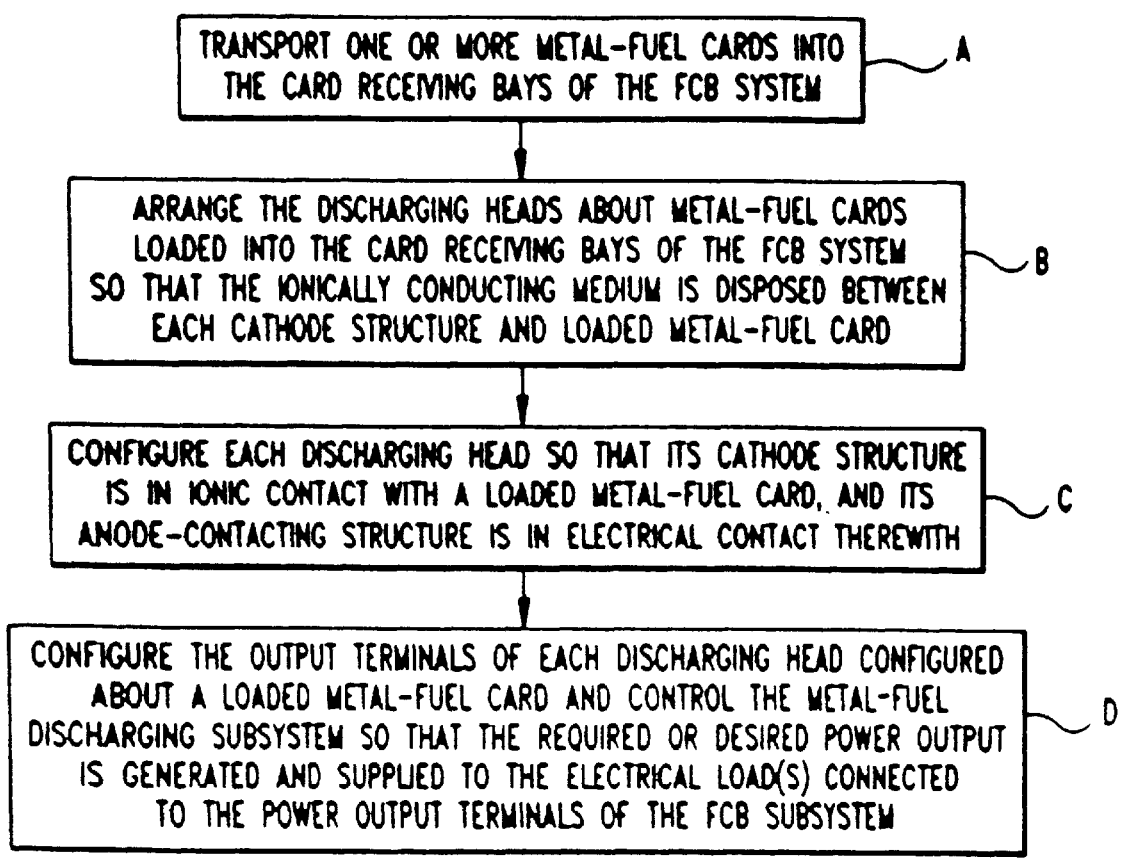

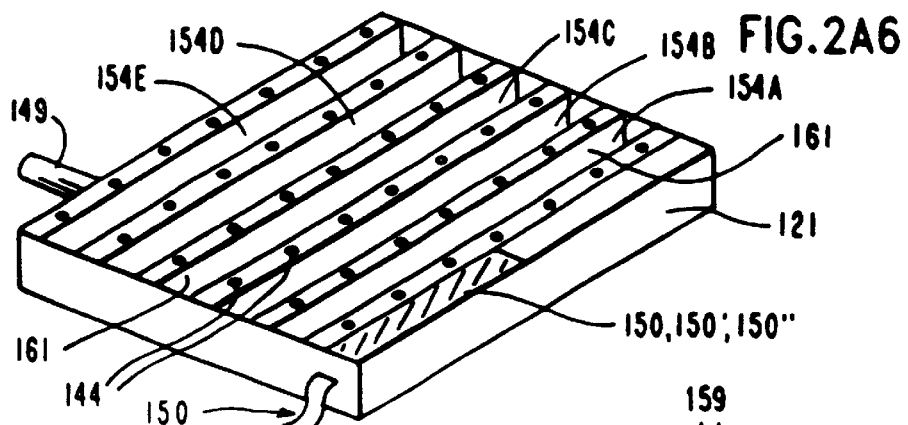
FIG. 2A6
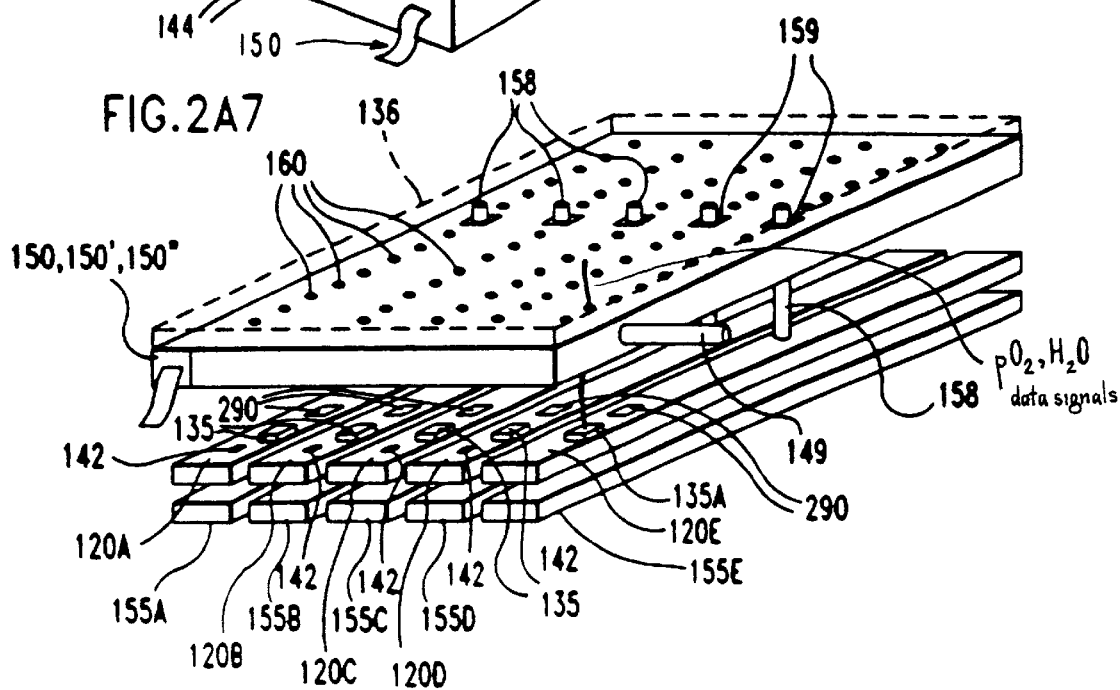
FIG. 2A7
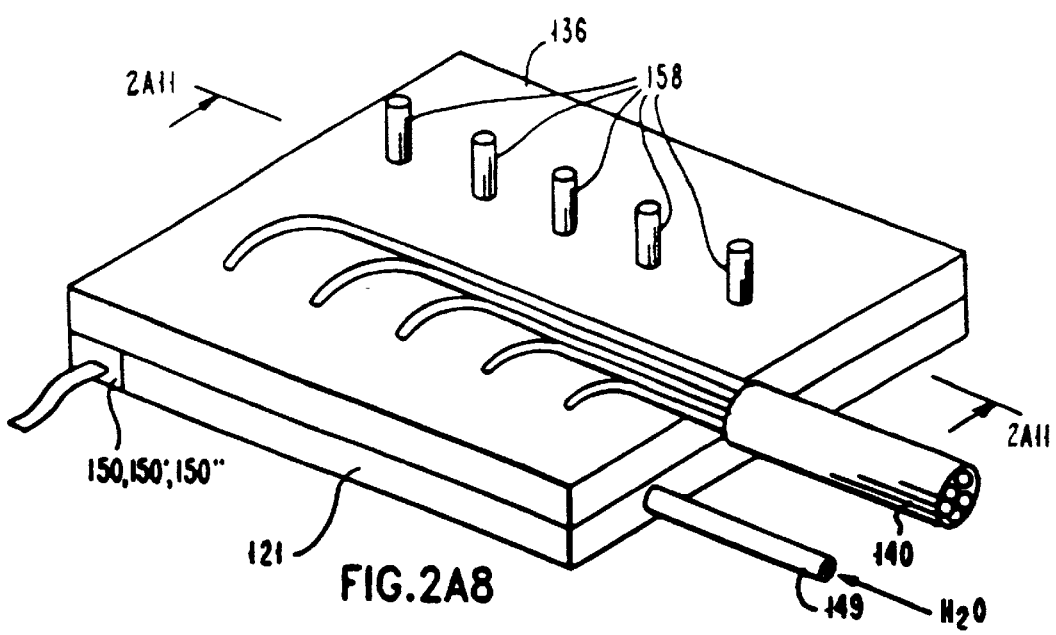
FIG. 2A8

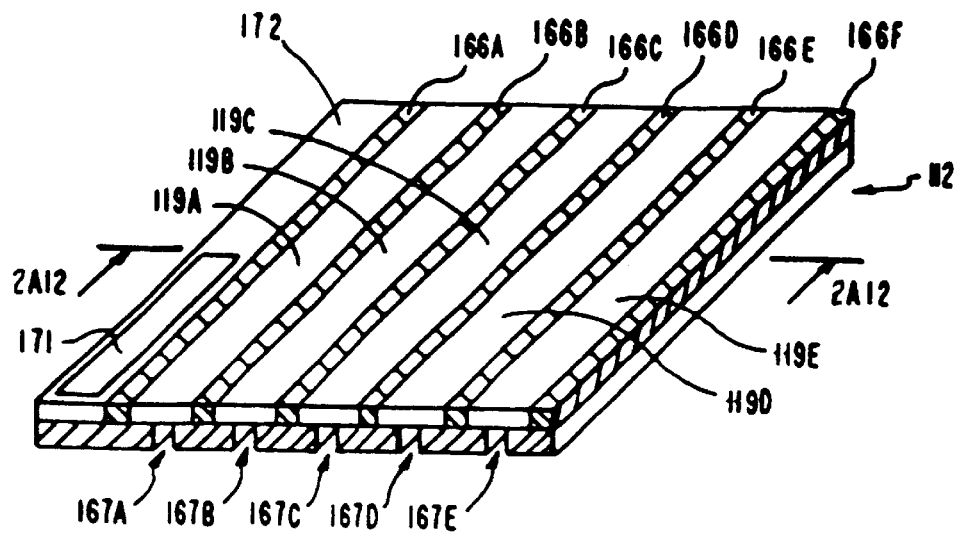
FIG.2A9
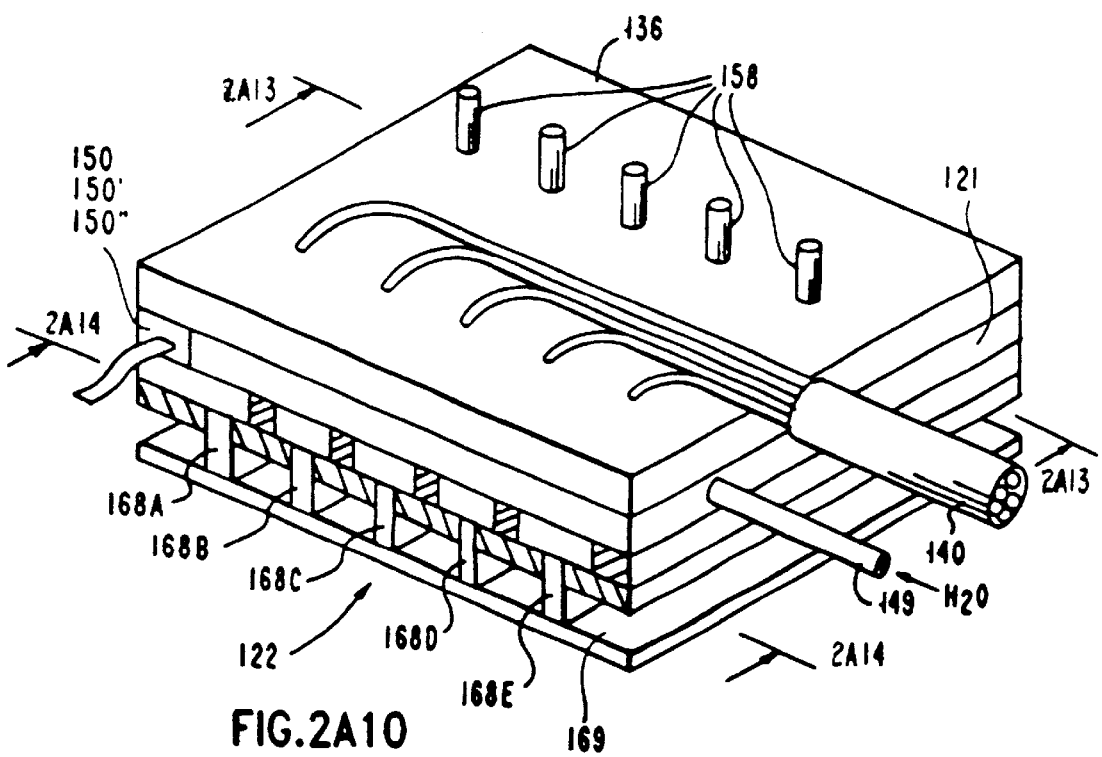
FIG.2A10

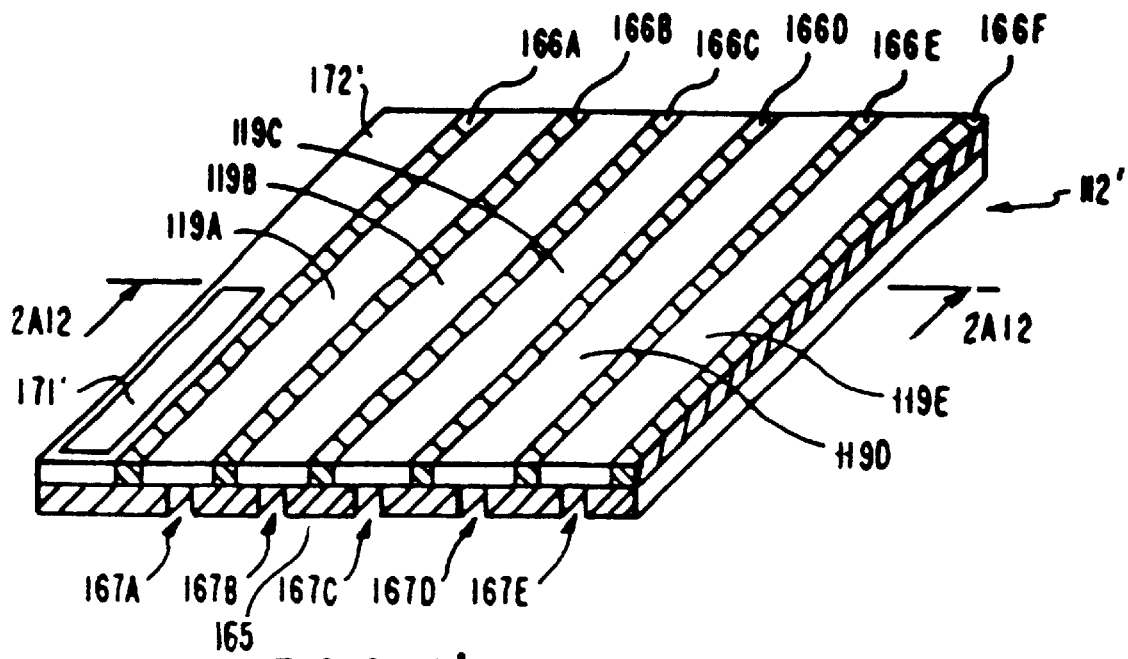
FIG.2A9'
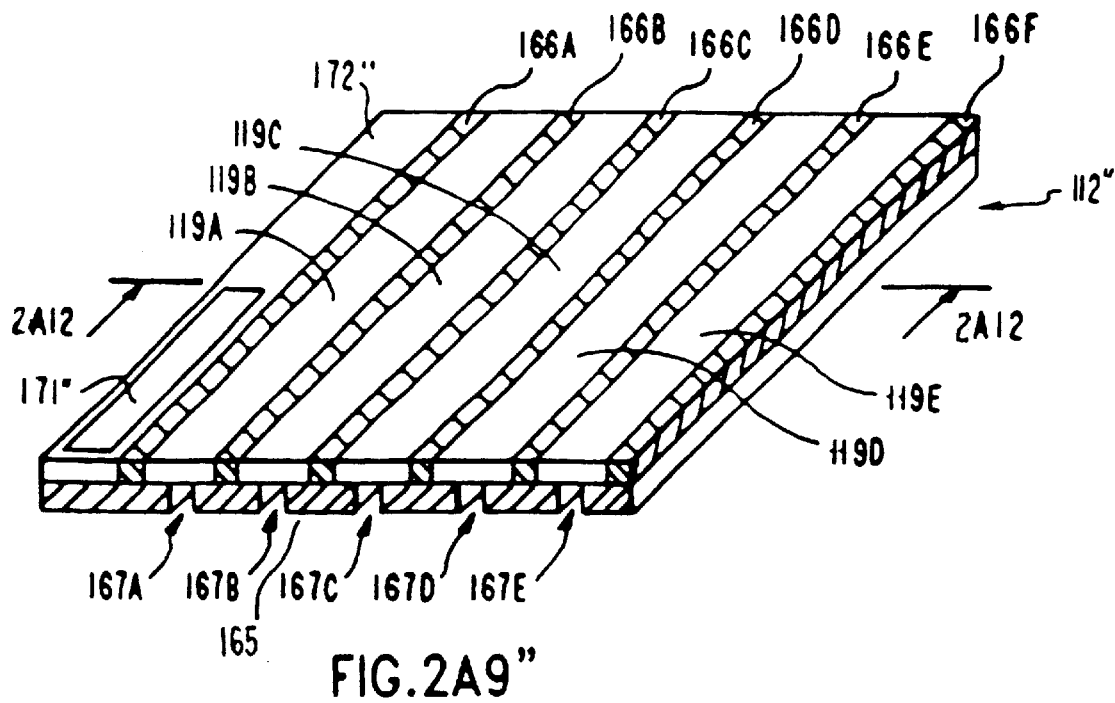
FIG.2A9"

FIG. 2A11
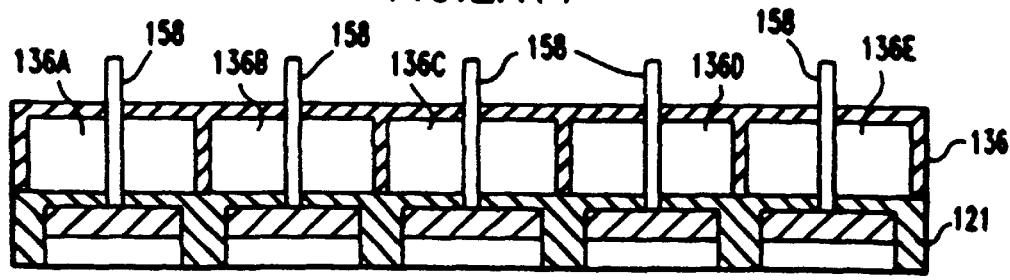
FIG. 2A12
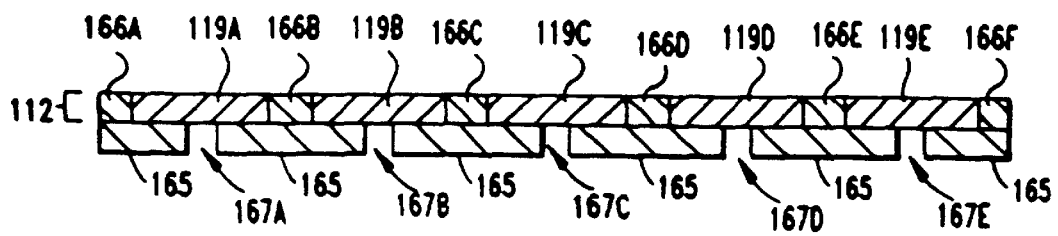
FIG. 2A13
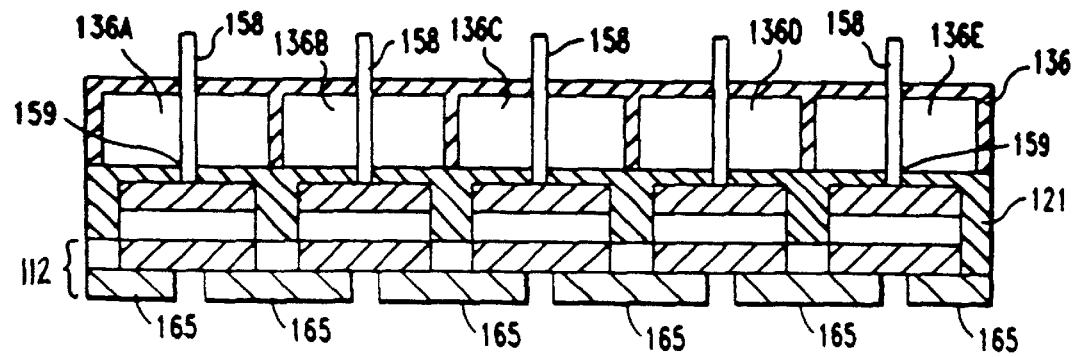
FIG. 2A14
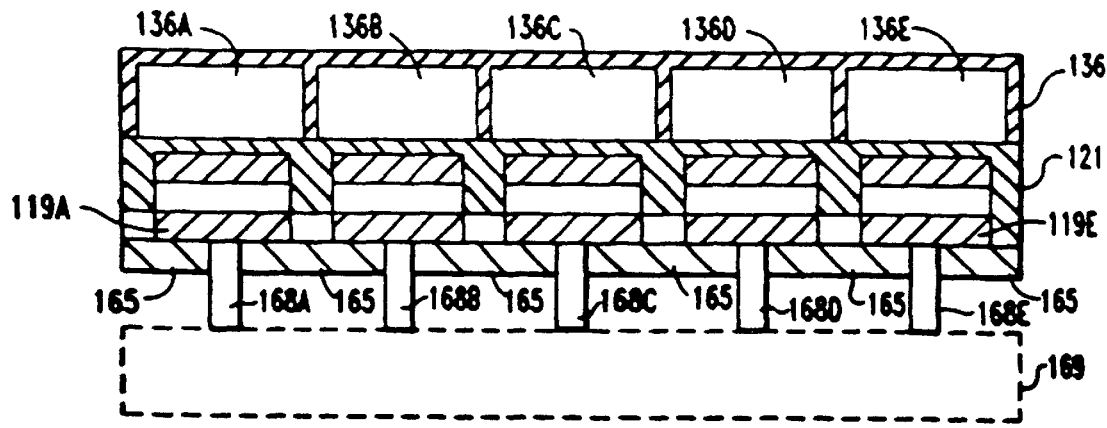

FIG.2A15
DISCHARGE DATA STRUCTURE

| FUEL-TAPE CARD NO. | METAL-FUEL TRACK NO. 1 | METAL-FUEL TRACK NO. 2 | METAL-FUEL TRACK NO. 3 | METAL-FUEL TRACK NO. 4 | METAL-FUEL TRACK NO. 5 |
|---|---|---|---|---|---|
| TIME $t_1$ | $V_{OC}$ / $i_{OC}$ / $PO_2$ / $H_2O\%$ / COMPUTED MEASURES — 301 | | | | |
| TIME $t_2$ | | | | | |
| TIME $t_3$ | | | | | |
| TIME $t_4$ | | | | | |
| TIME $t_5$ | | | | | |
| ⋮ | ⋮ | ⋮ | ⋮ | ⋮ | ⋮ |
| TIME $t_n$ | | | | | |

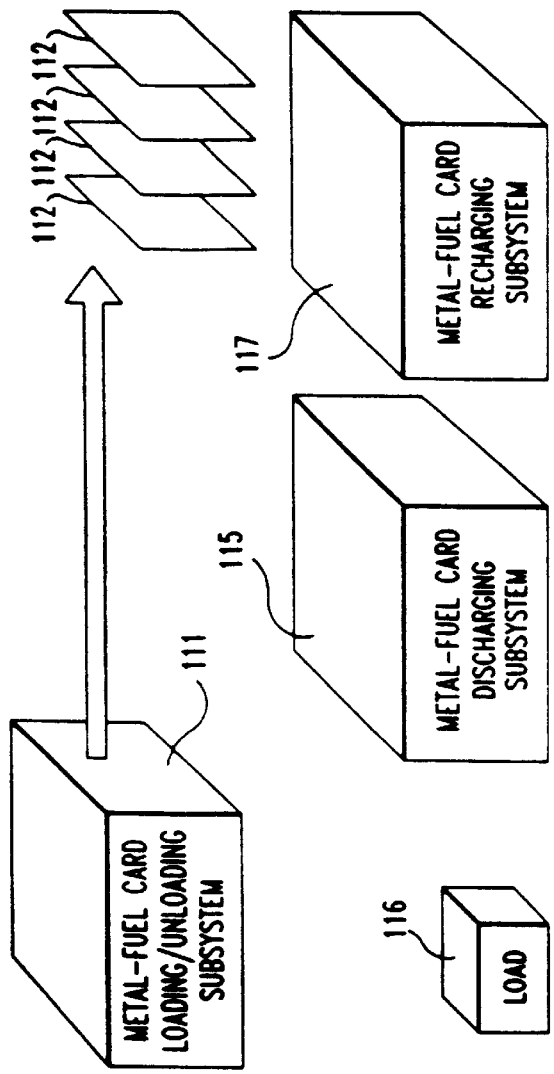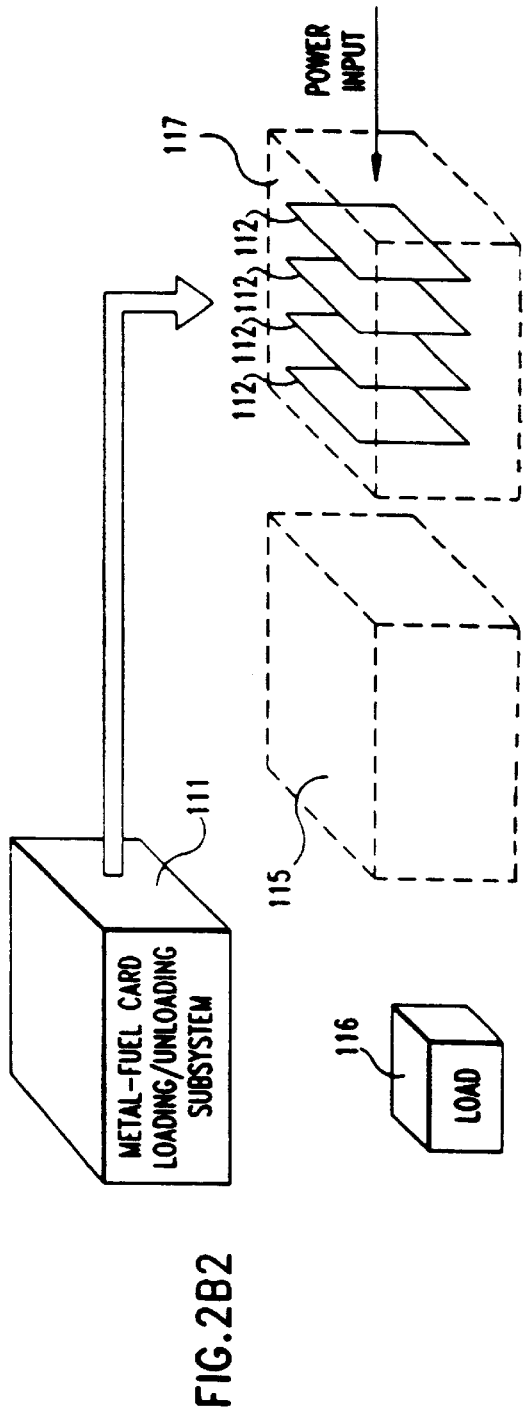
FIG.2B1
FIG.2B2

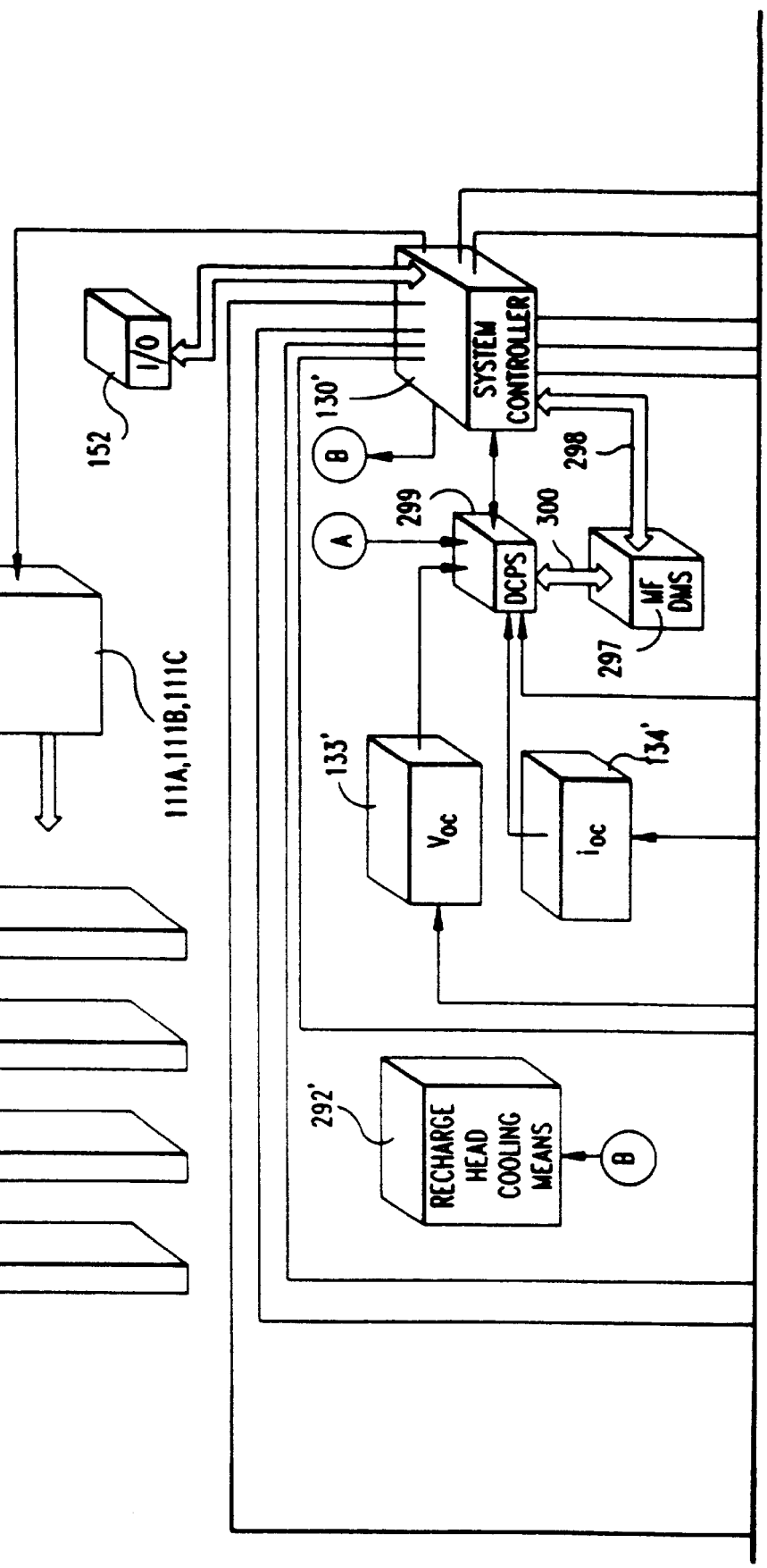

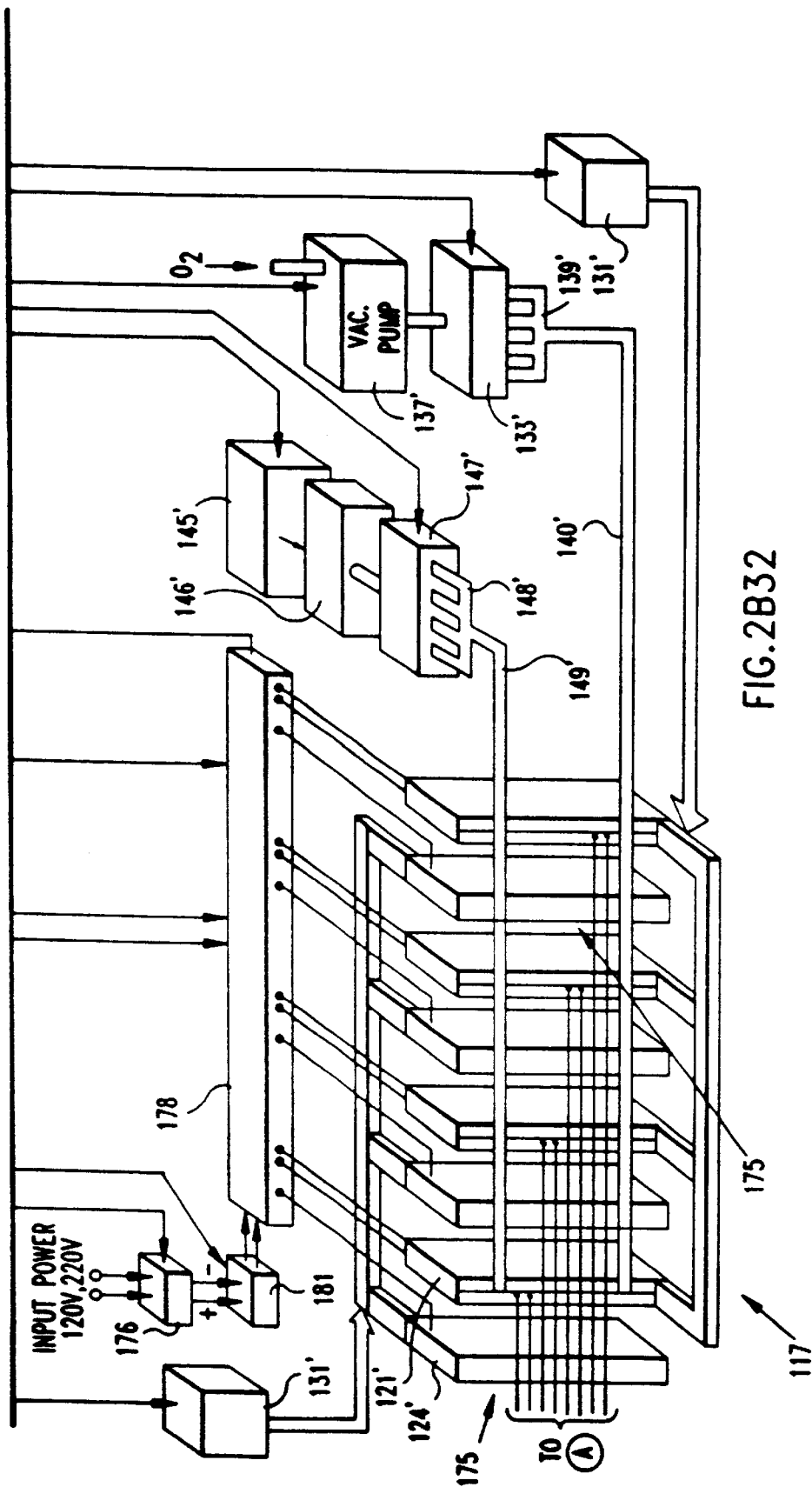
FIG.2B32

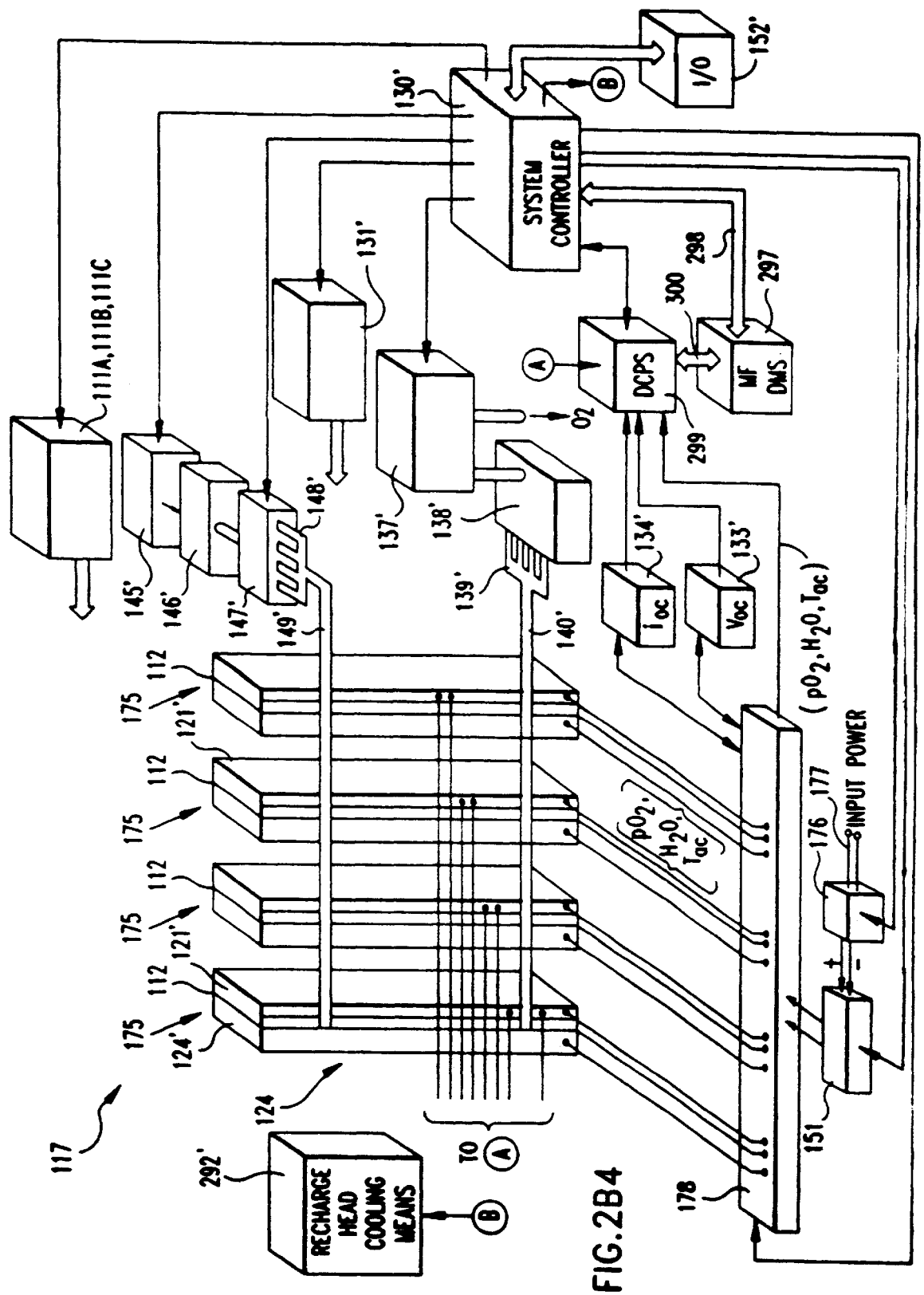
FIG.2B4

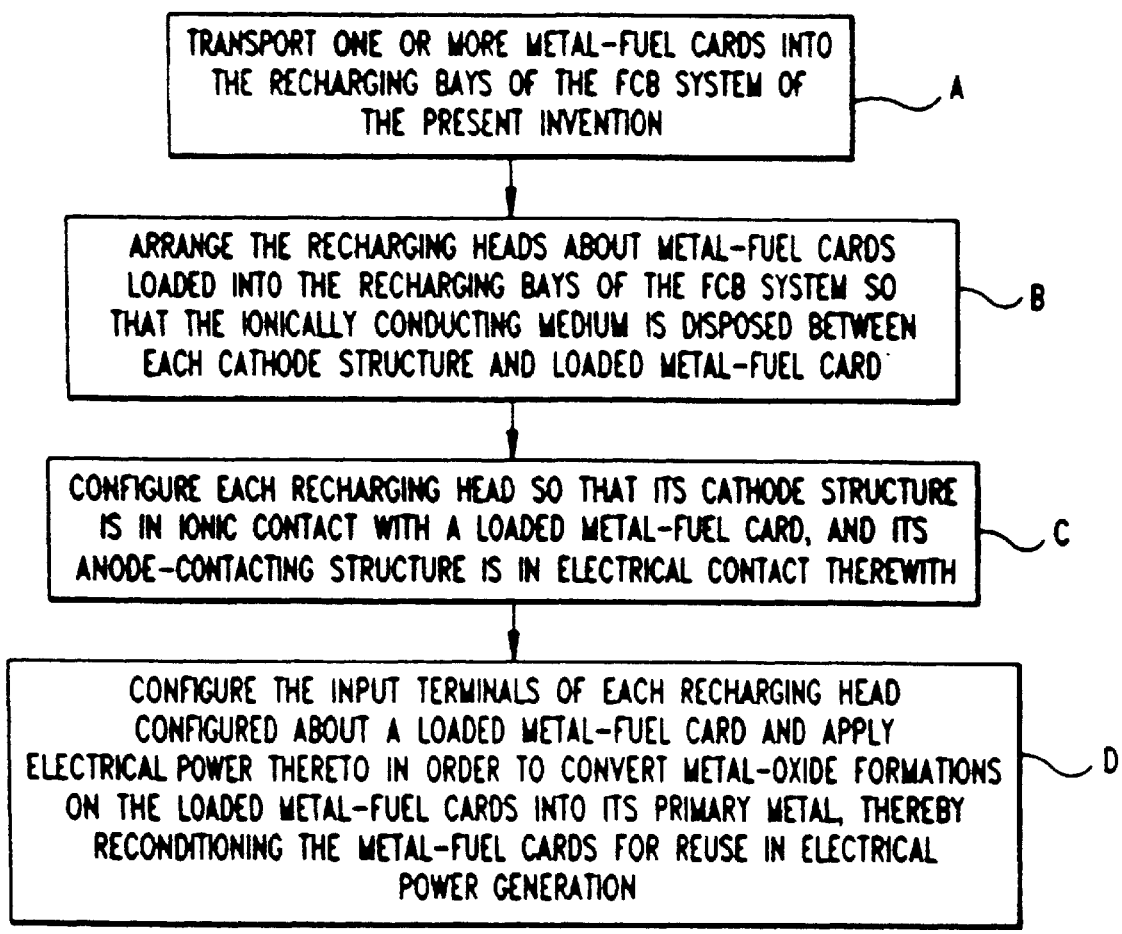
FIG.2B5

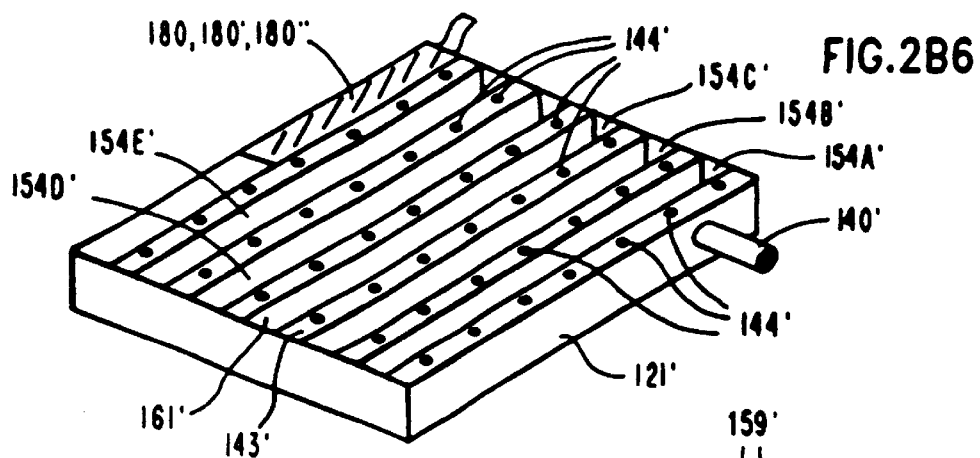
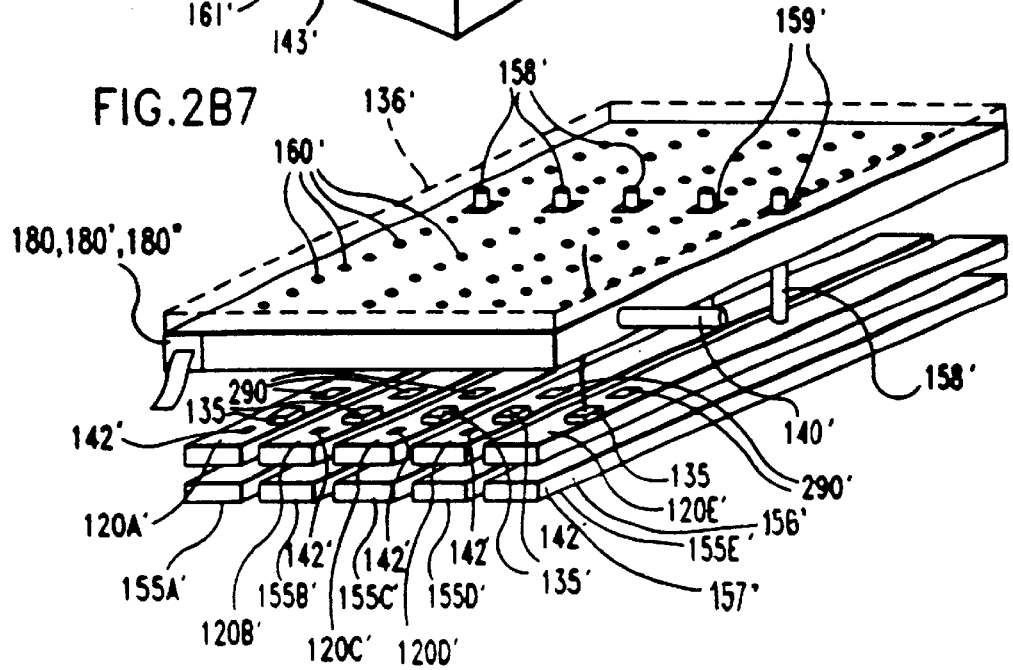
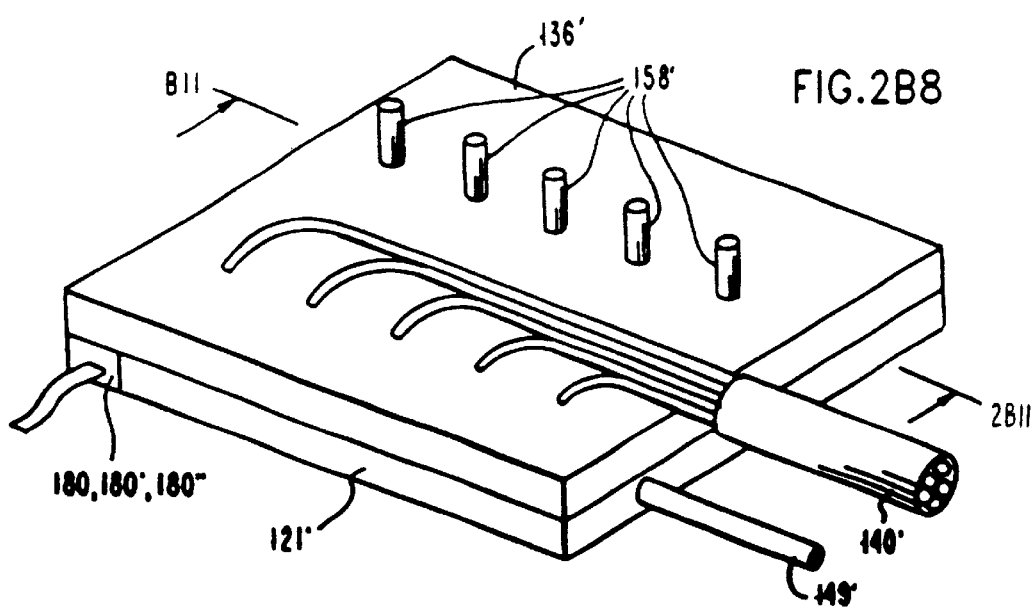

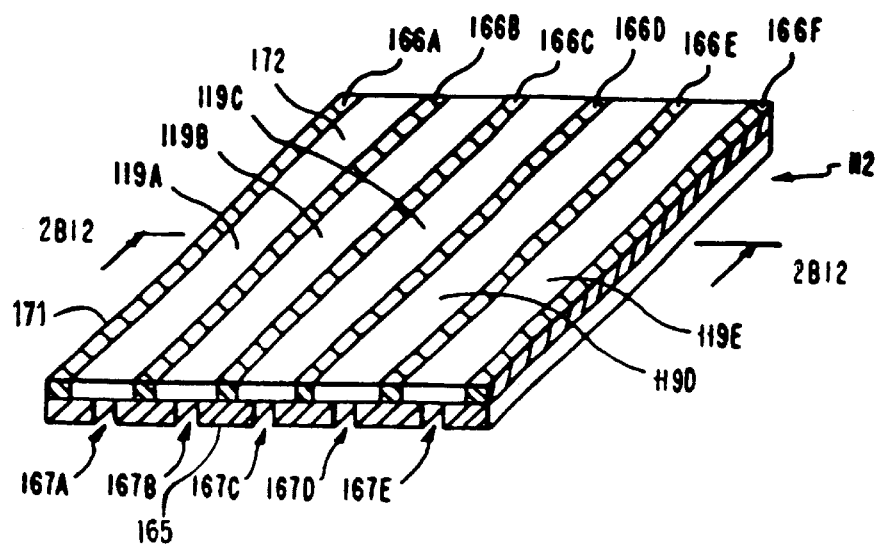
FIG.2B9
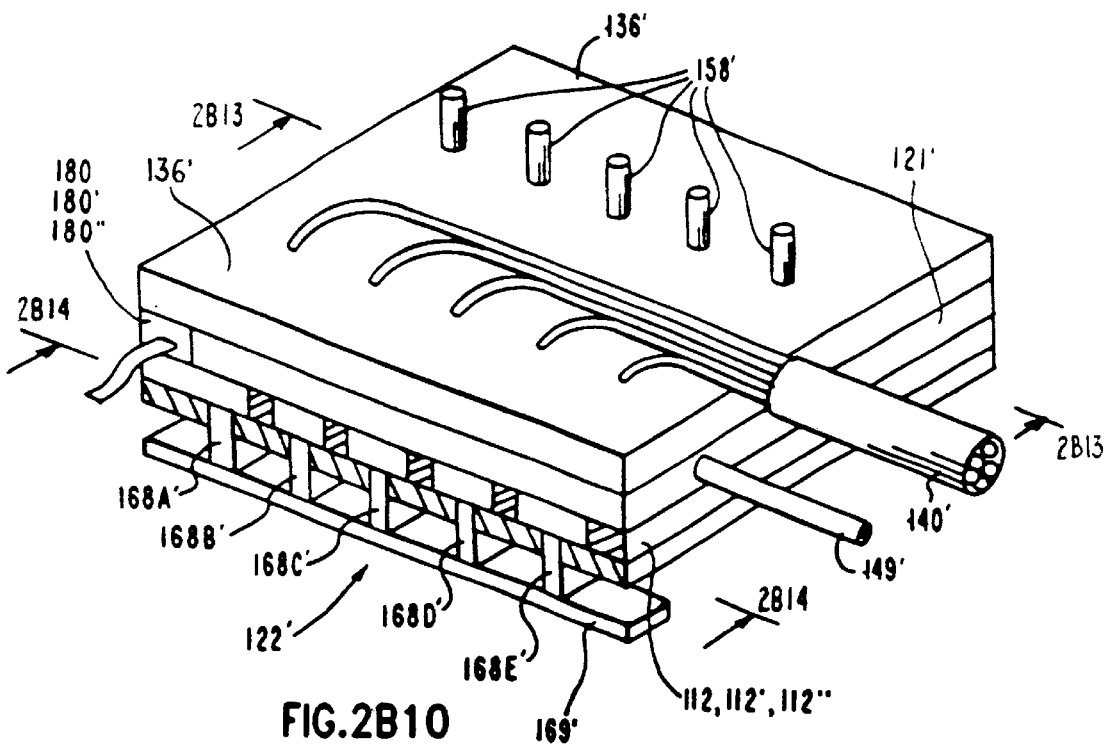
FIG.2B10

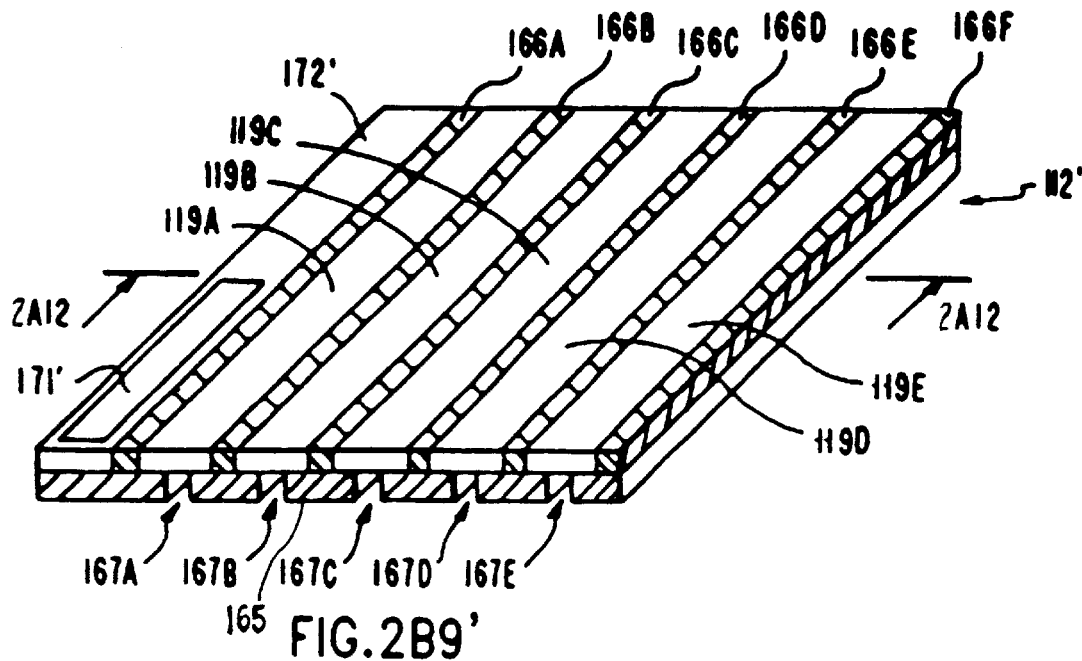
FIG.2B9'
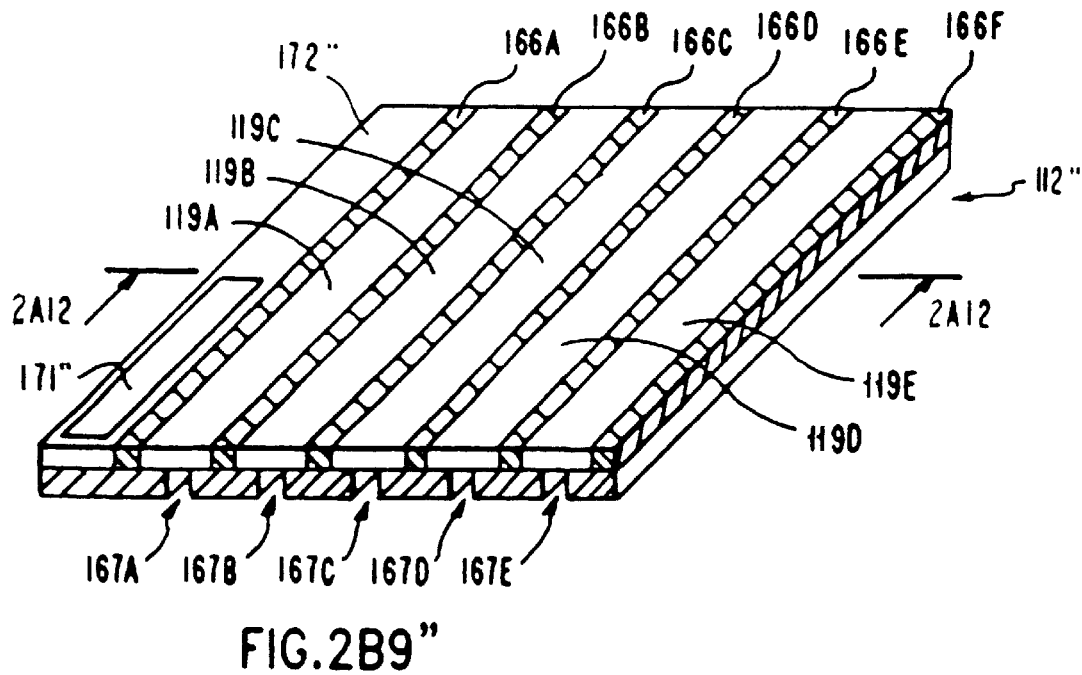
FIG.2B9"

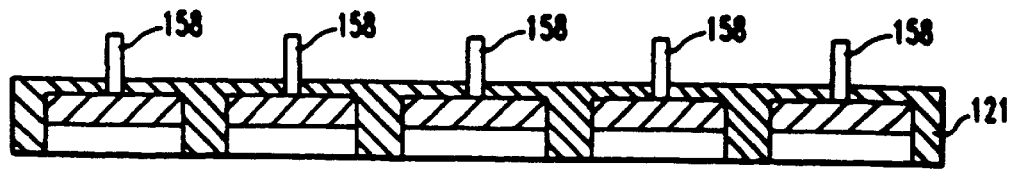
FIG.2B11
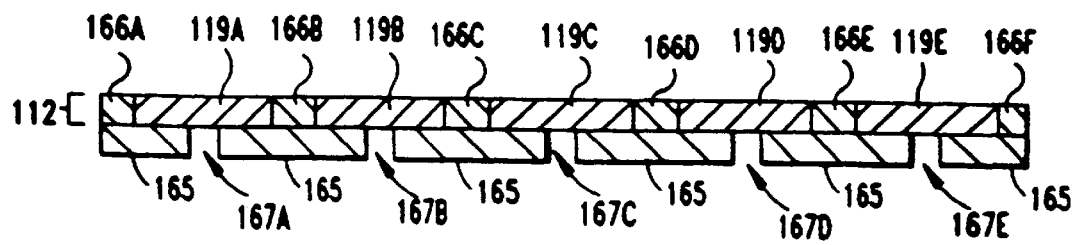
FIG.2B12
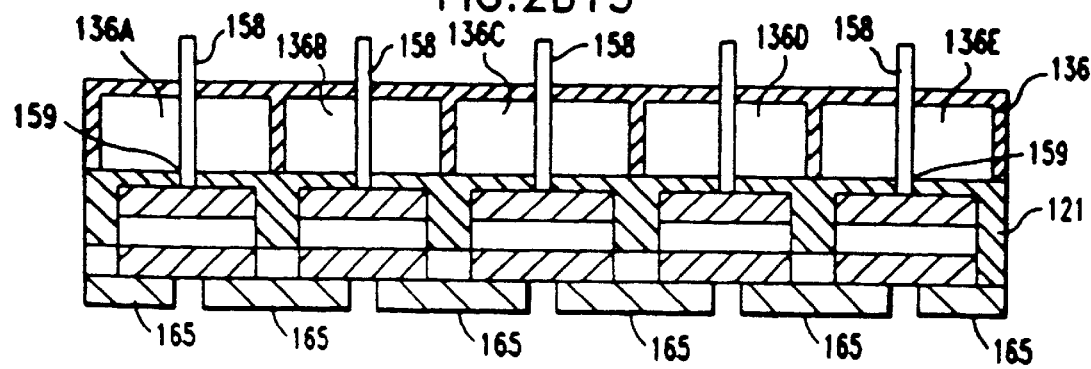
FIG.2B13
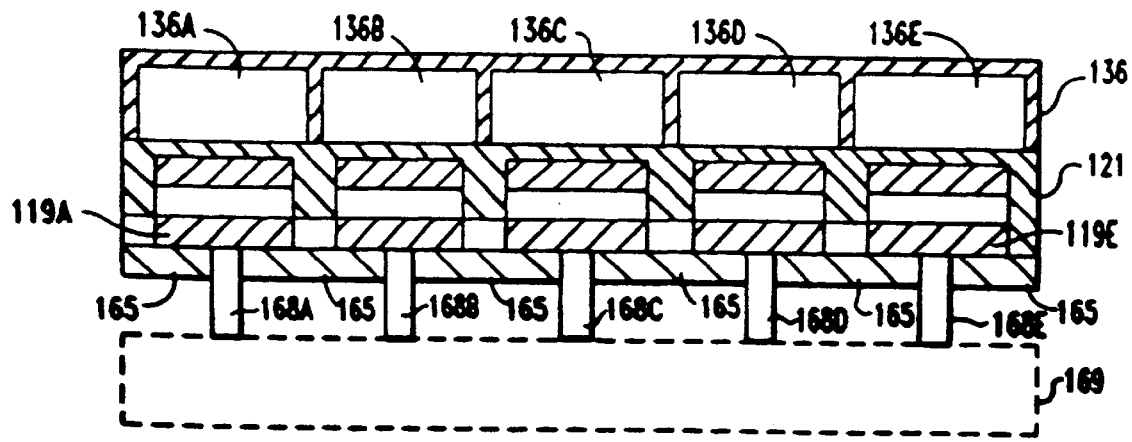
FIG.2B14

FIG.2B15
RECHARGE DATA STRUCTURE

| FUEL-TAPE CARD NO. | METAL-FUEL TRACK NO. 1 | METAL-FUEL TRACK NO. 2 | METAL-FUEL TRACK NO. 3 | METAL-FUEL TRACK NO. 4 | METAL-FUEL TRACK NO. 5 |
|---|---|---|---|---|---|
| TIME $t_1$ | $V_{oc}$ / $I_{oc}$ / $PO_2$ / $H_2O\%$ / COMPUTED MEASURES — 302 | | | | |
| TIME $t_2$ | | | | | |
| TIME $t_3$ | | | | | |
| TIME $t_4$ | | | | | |
| TIME $t_5$ | | | | | |
| ⋮ | ⋮ | ⋮ | ⋮ | ⋮ | ⋮ |
| TIME $t_n$ | | | | | |

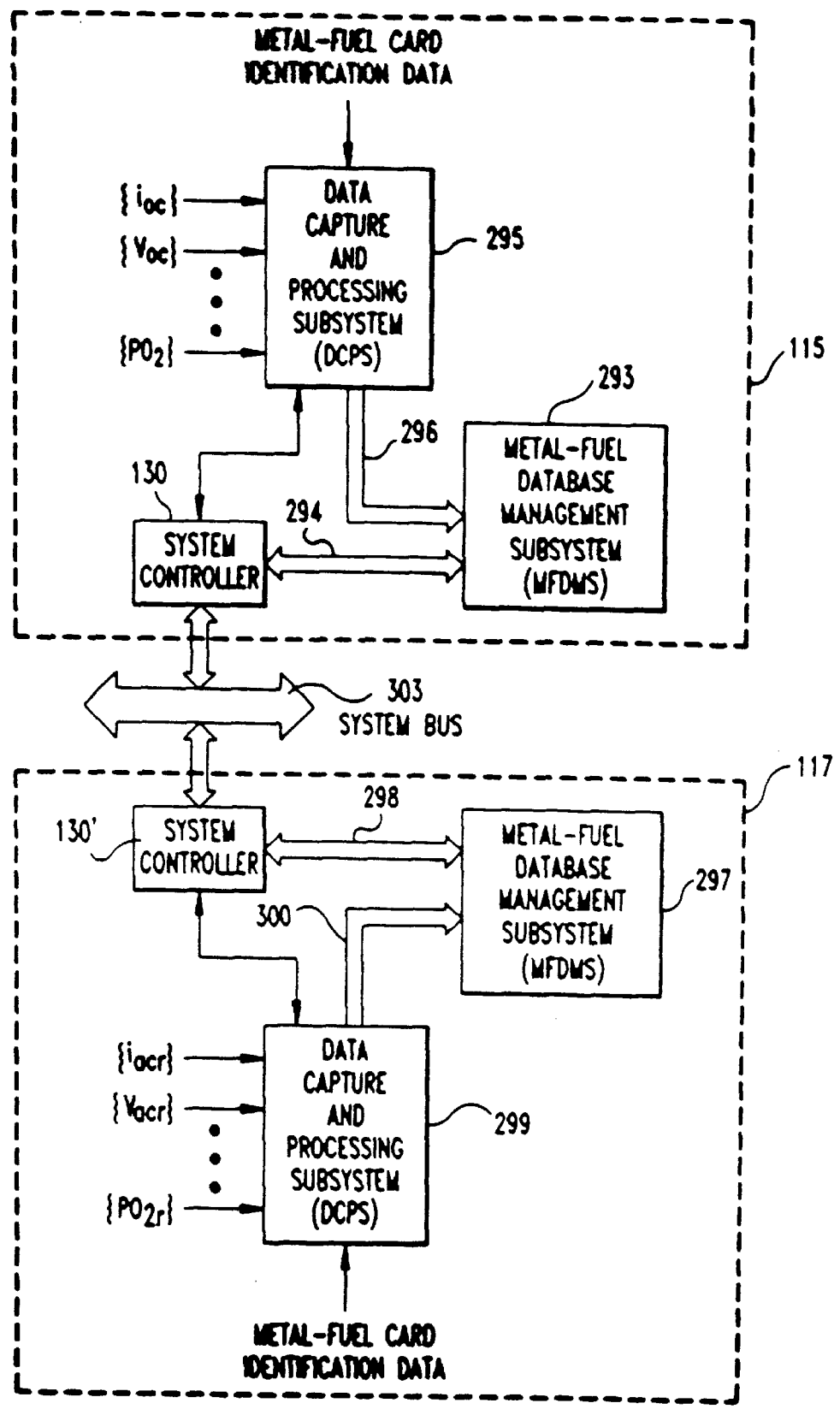
FIG.2B16

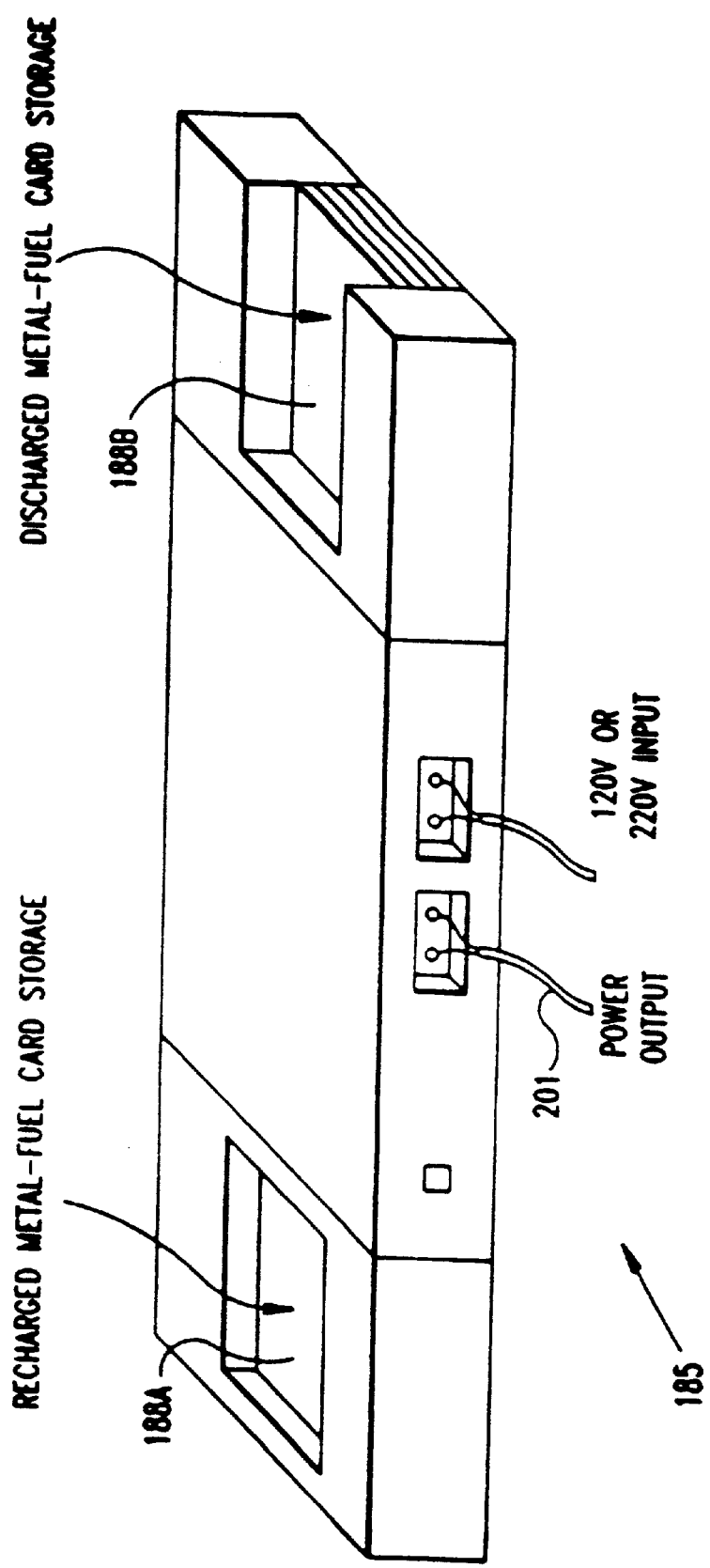

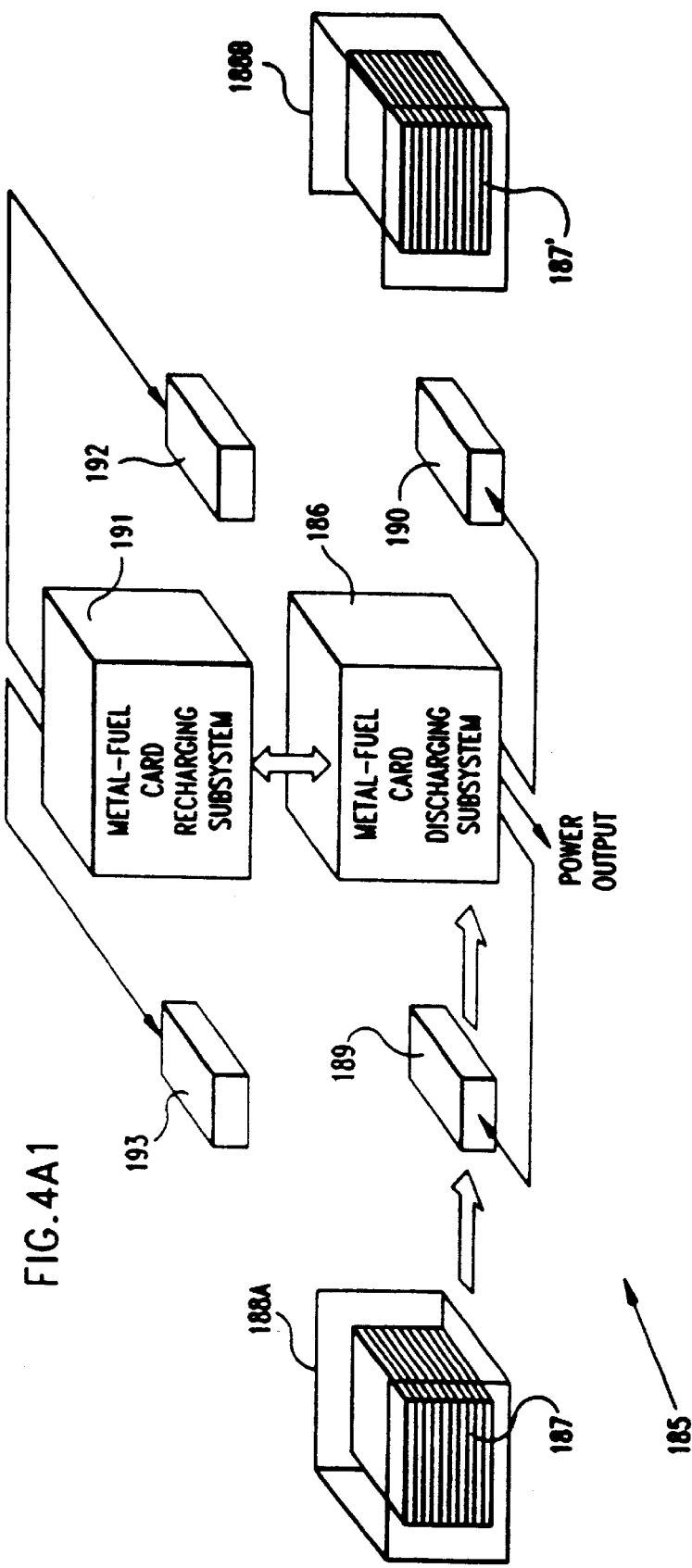

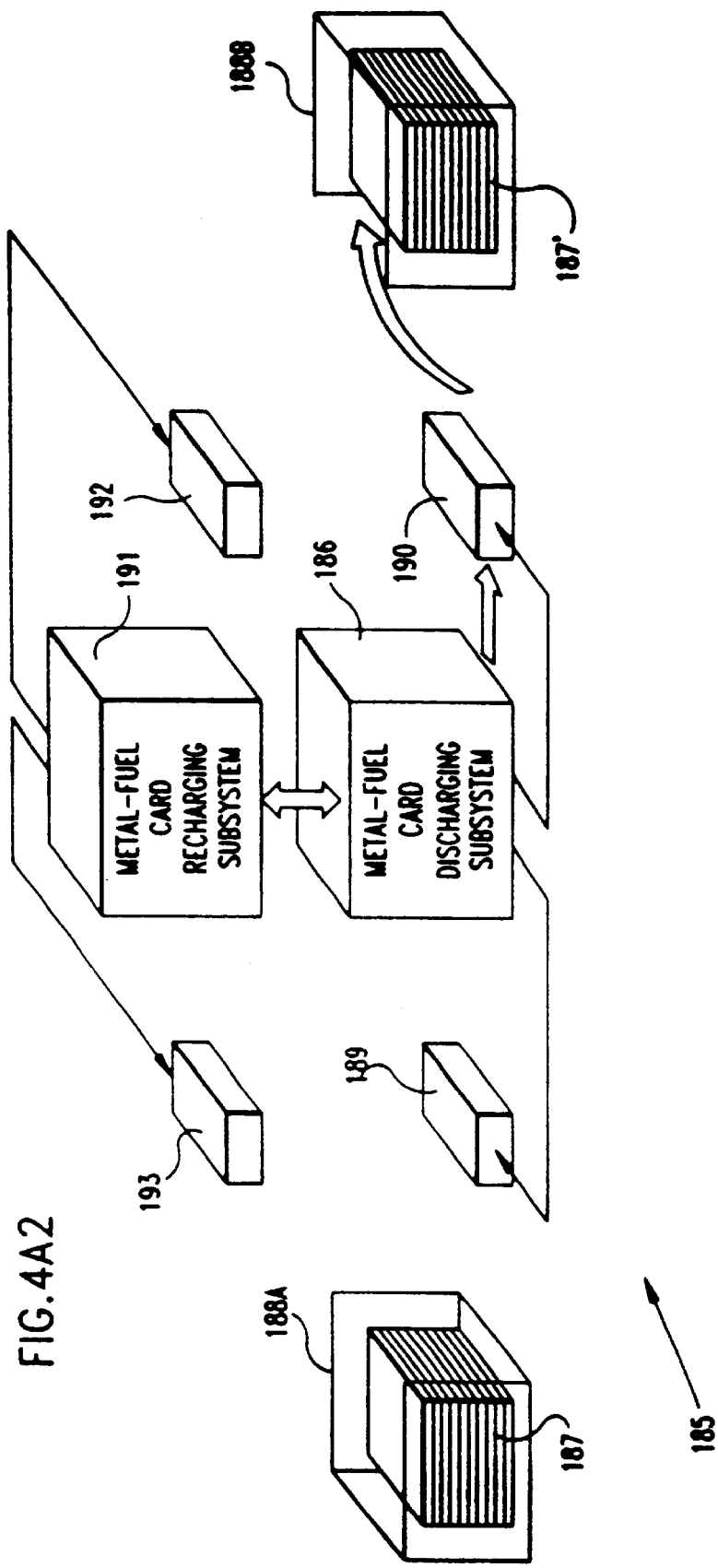
FIG.4A2

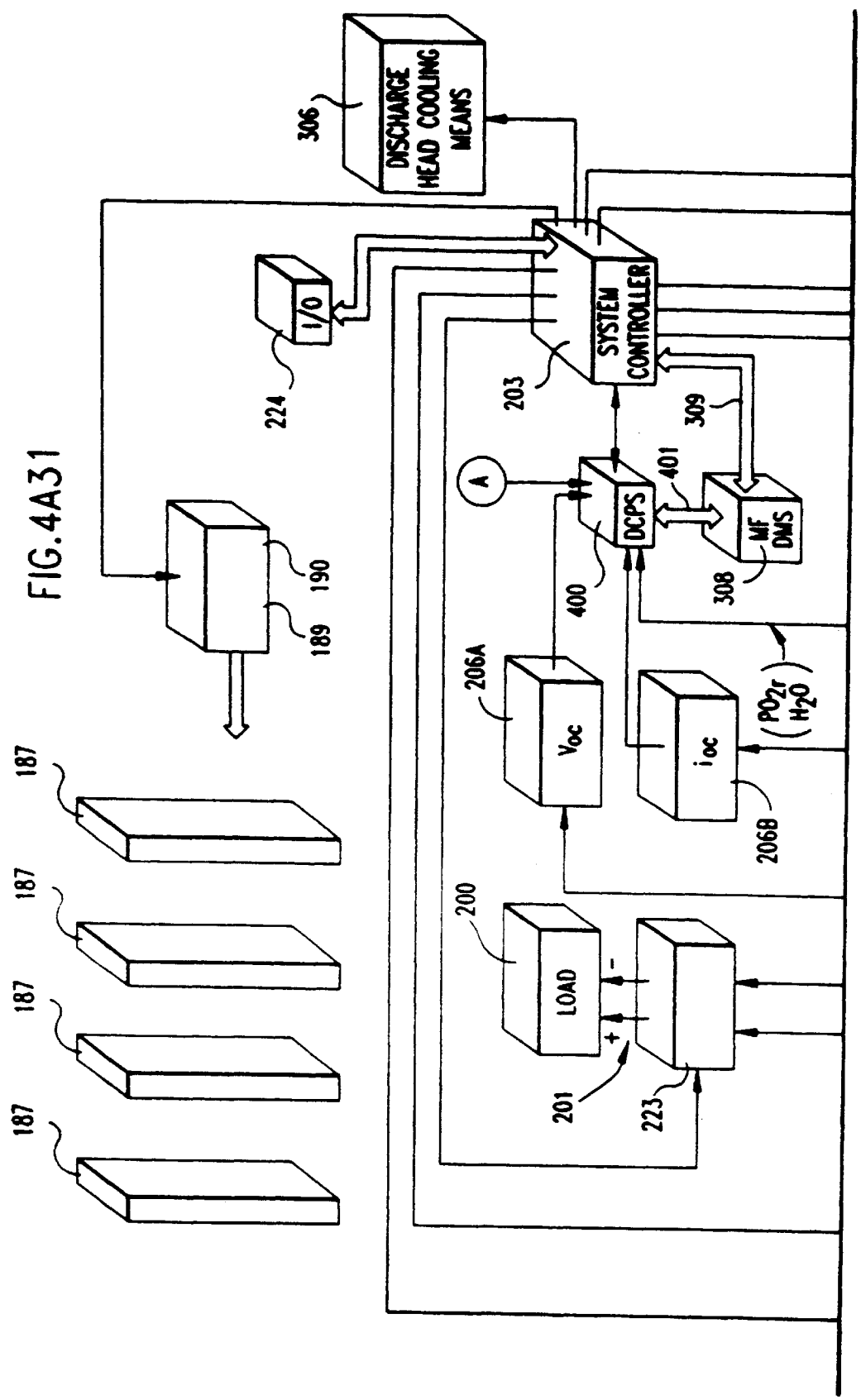
FIG. 4A31

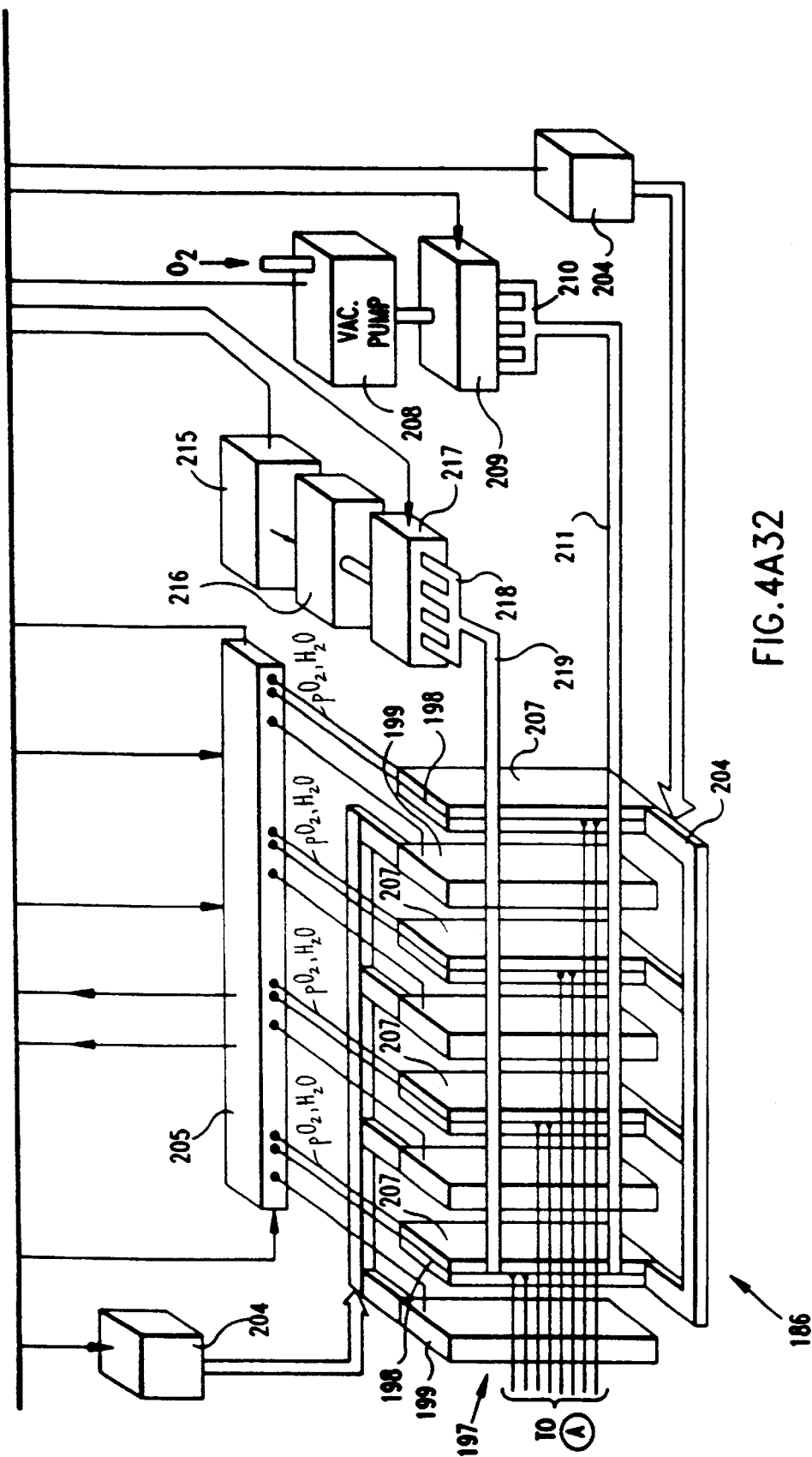
FIG. 4A32

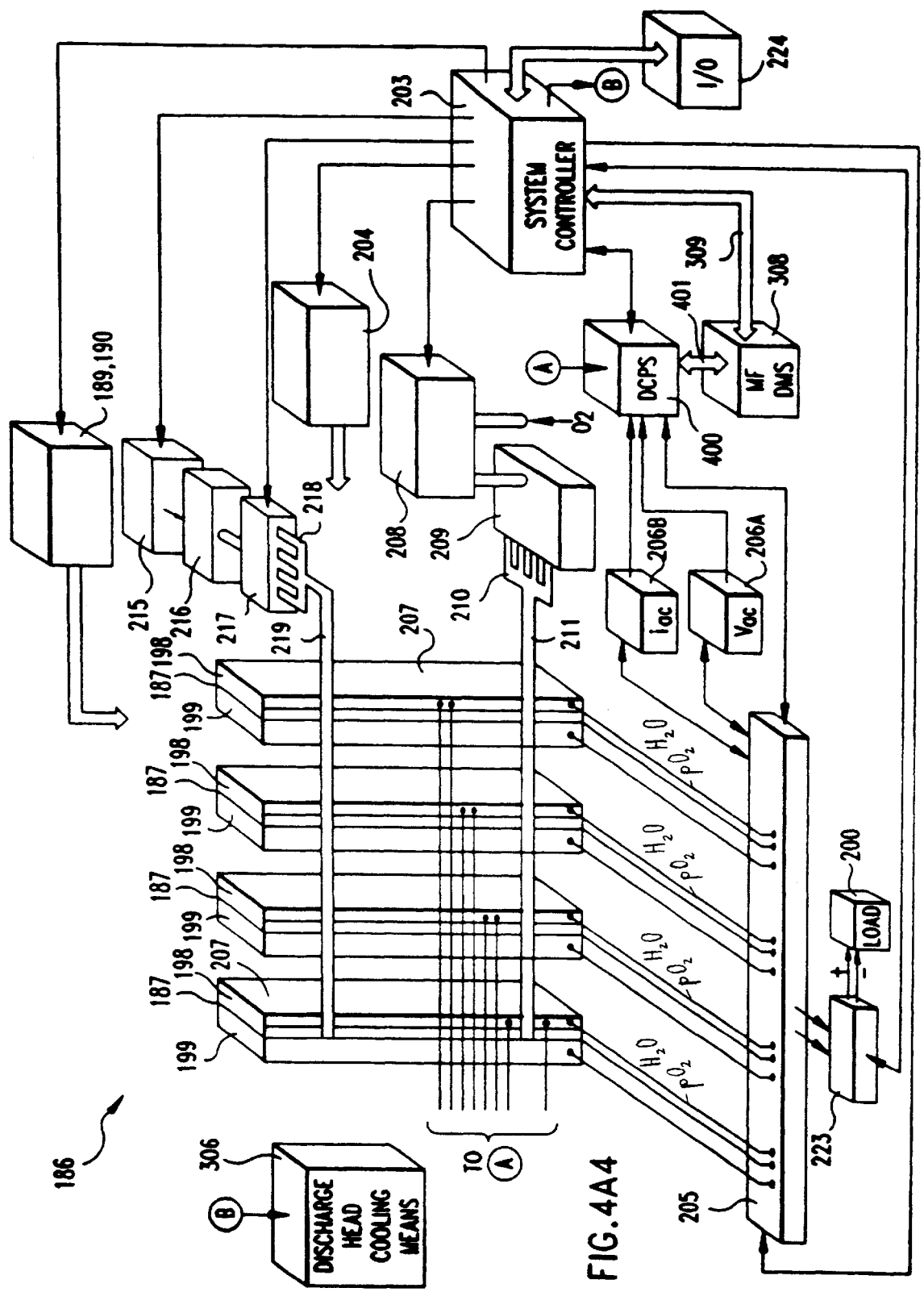
FIG. 4A4

FIG.4A5
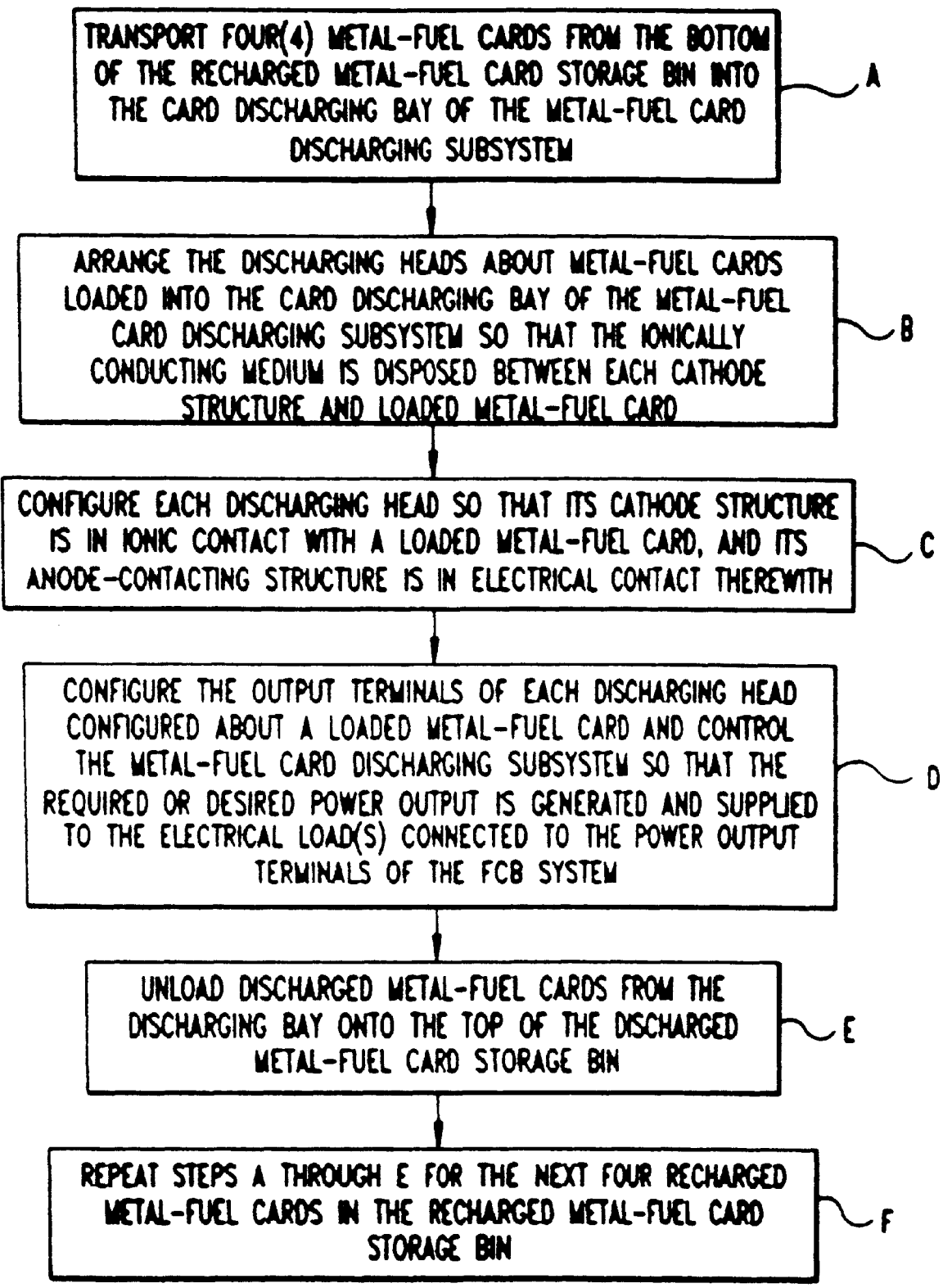

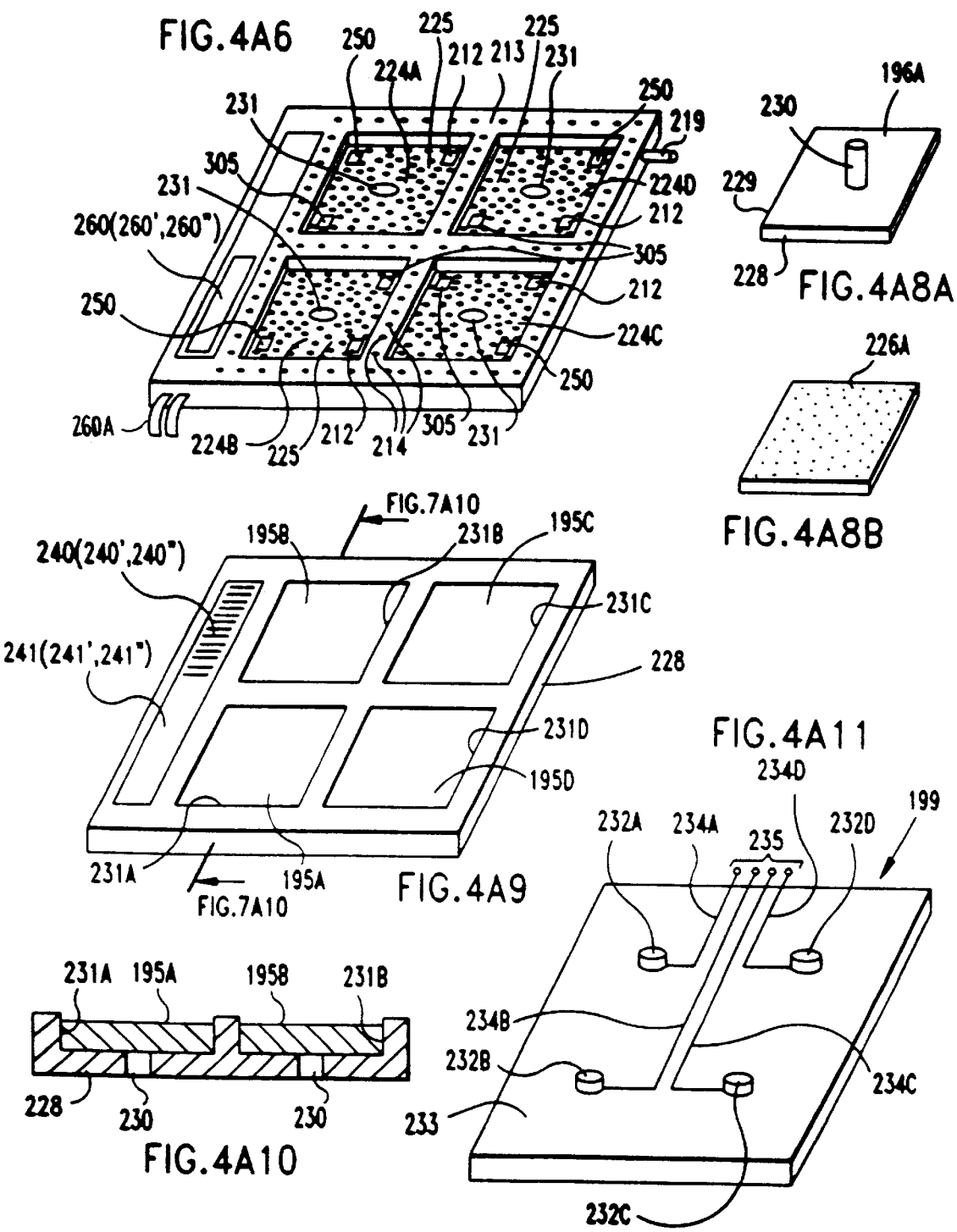

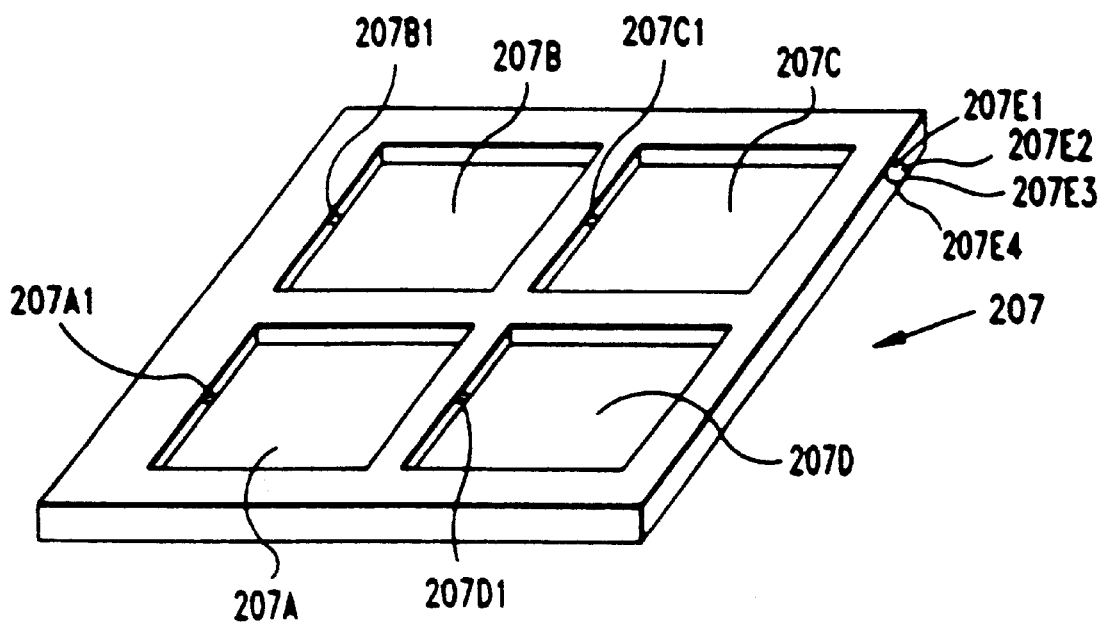
FIG.4A7

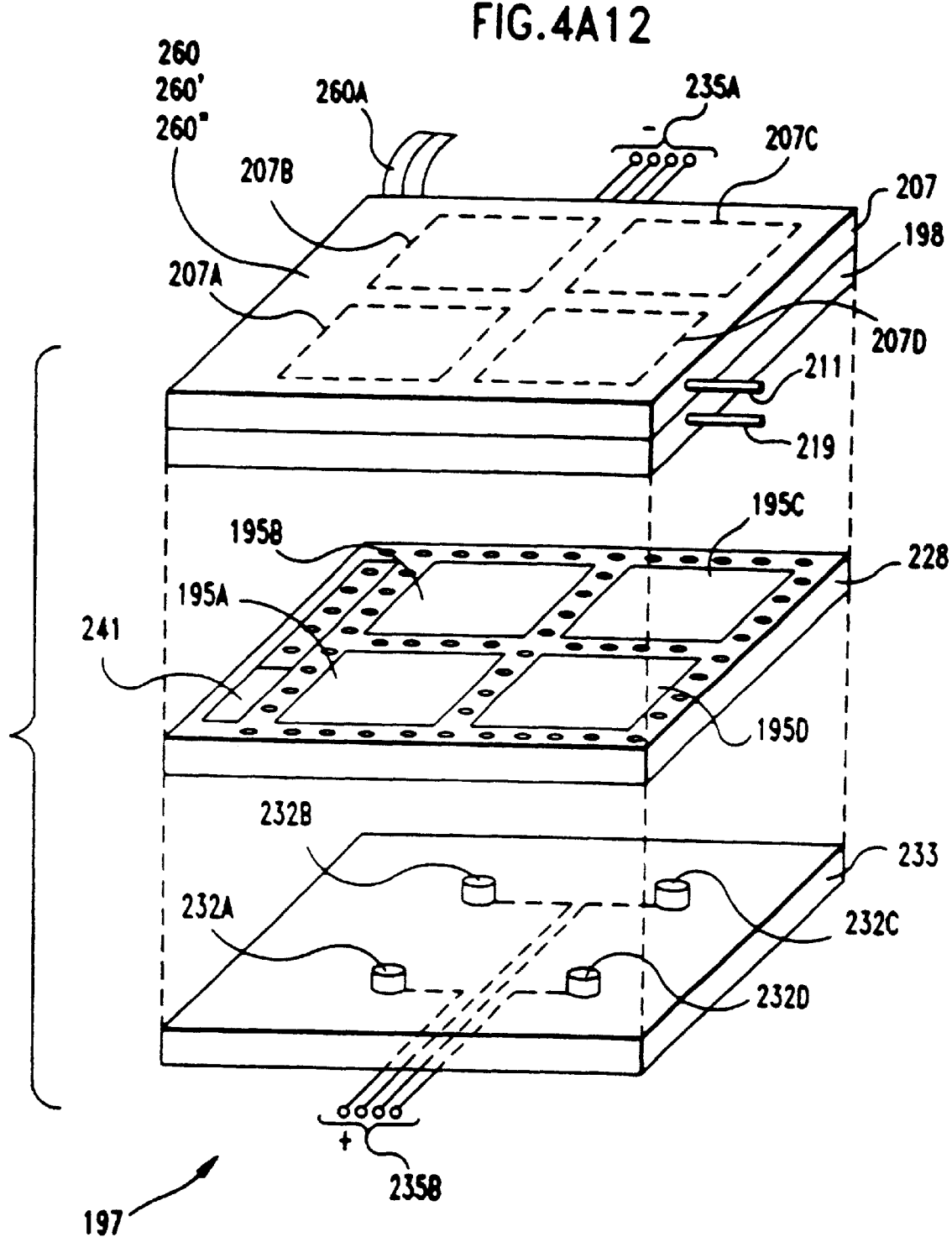

FIG.4A13

DISCHARGE DATA STRUCTURE

| FUEL-TAPE CARD NO. | METAL-FUEL ZONE NO. 1 | METAL-FUEL ZONE NO. 2 | METAL-FUEL ZONE NO. 3 | METAL-FUEL ZONE NO. 4 |
|---|---|---|---|---|
| TIME $t_1$ | $V_{oc}$<br>$i_{oc}$<br>$PO_2$<br>$H_2O$ %<br>$T_{oc}$<br>COMPUTED PARAMETERS — 409 | | | |
| TIME $t_2$ | | | | |
| TIME $t_3$ | | | | |
| TIME $t_4$ | | | | |
| TIME $t_5$ | | | | |
| ⋮ | ⋮ | ⋮ | ⋮ | ⋮ |
| TIME $t_n$ | | | | |

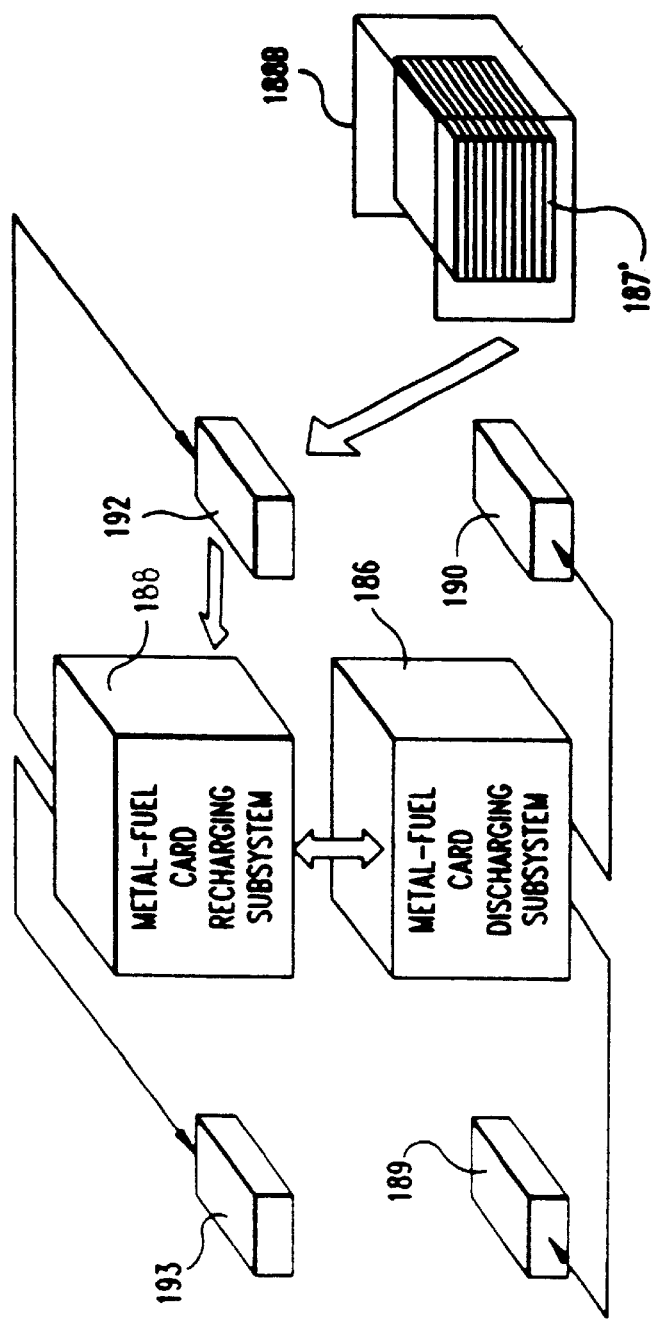
FIG.4B1
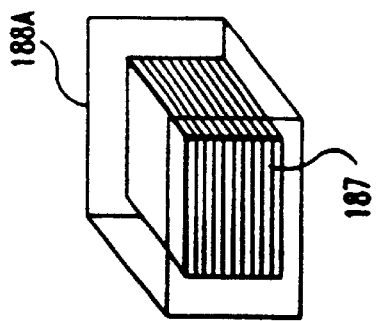

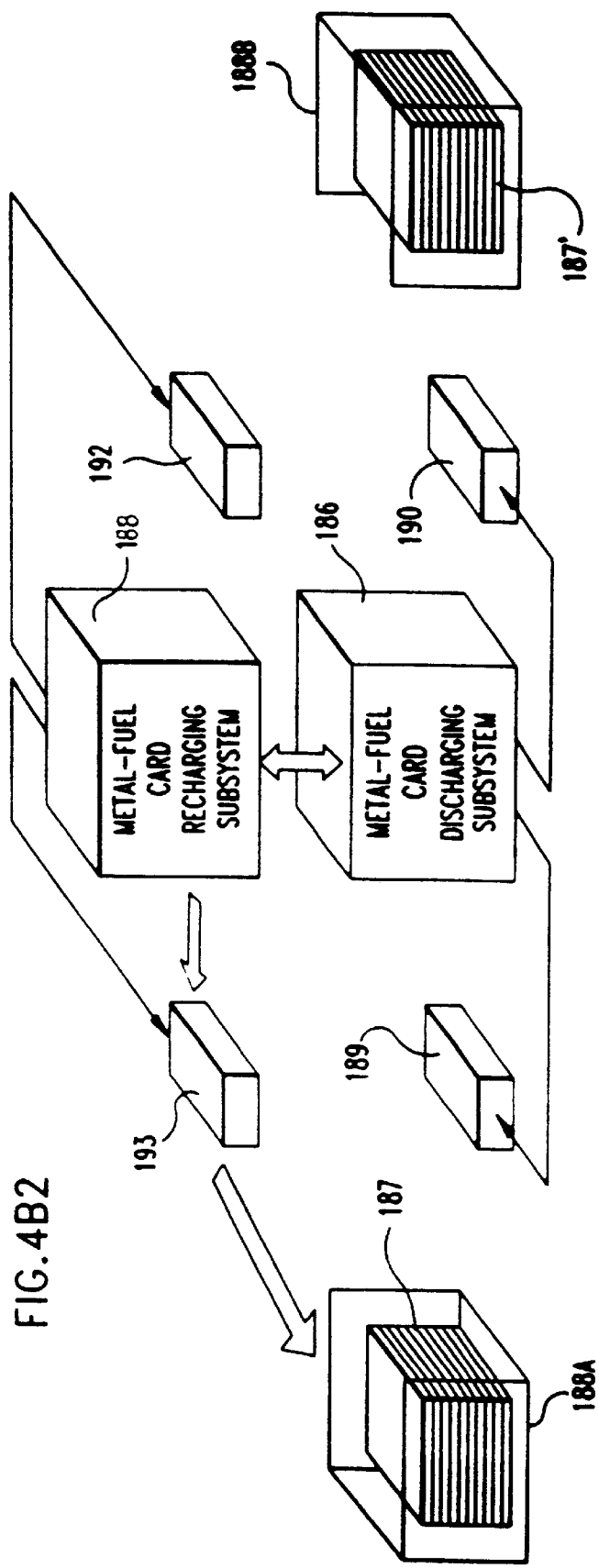
FIG.4B2

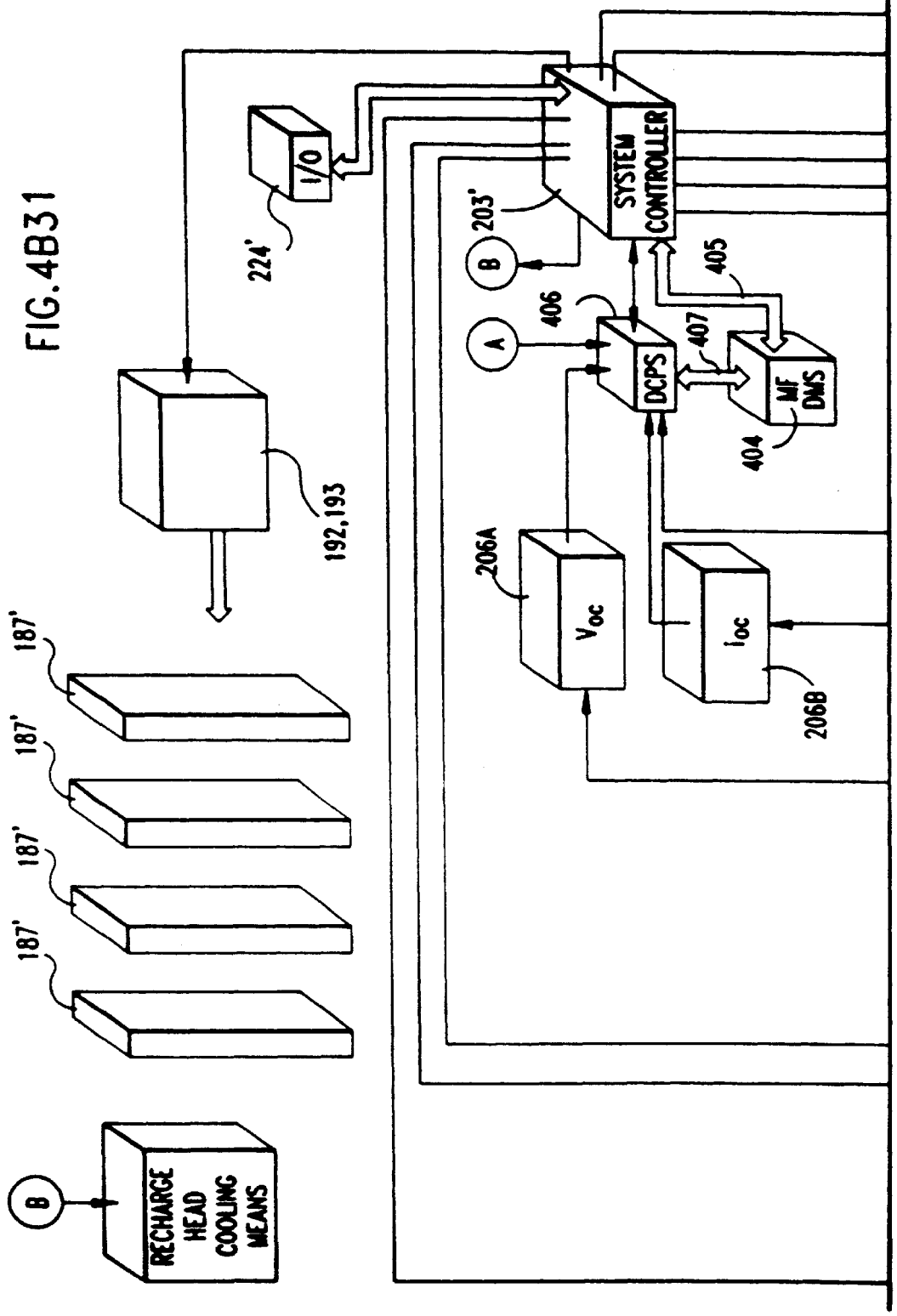

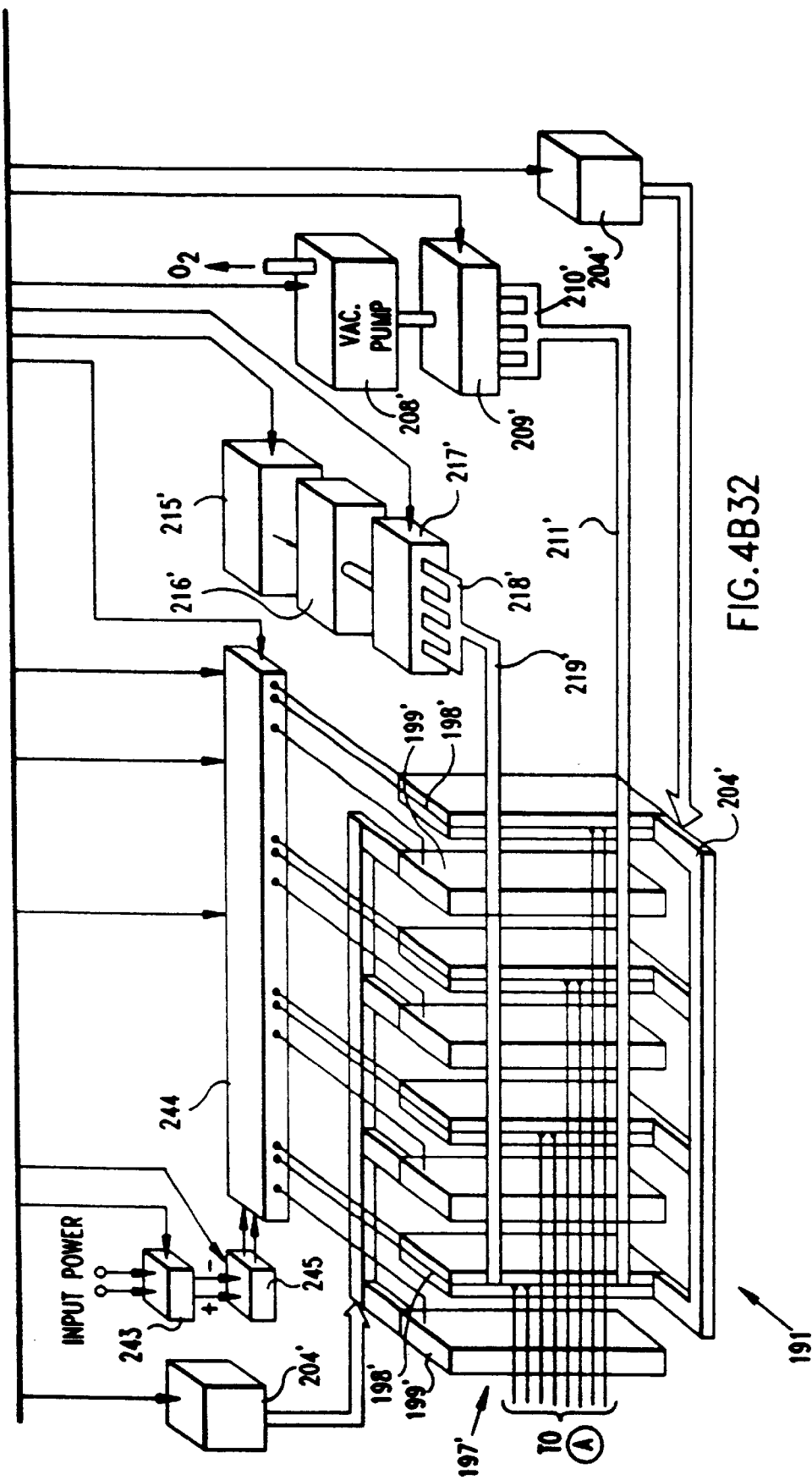
FIG.4B32

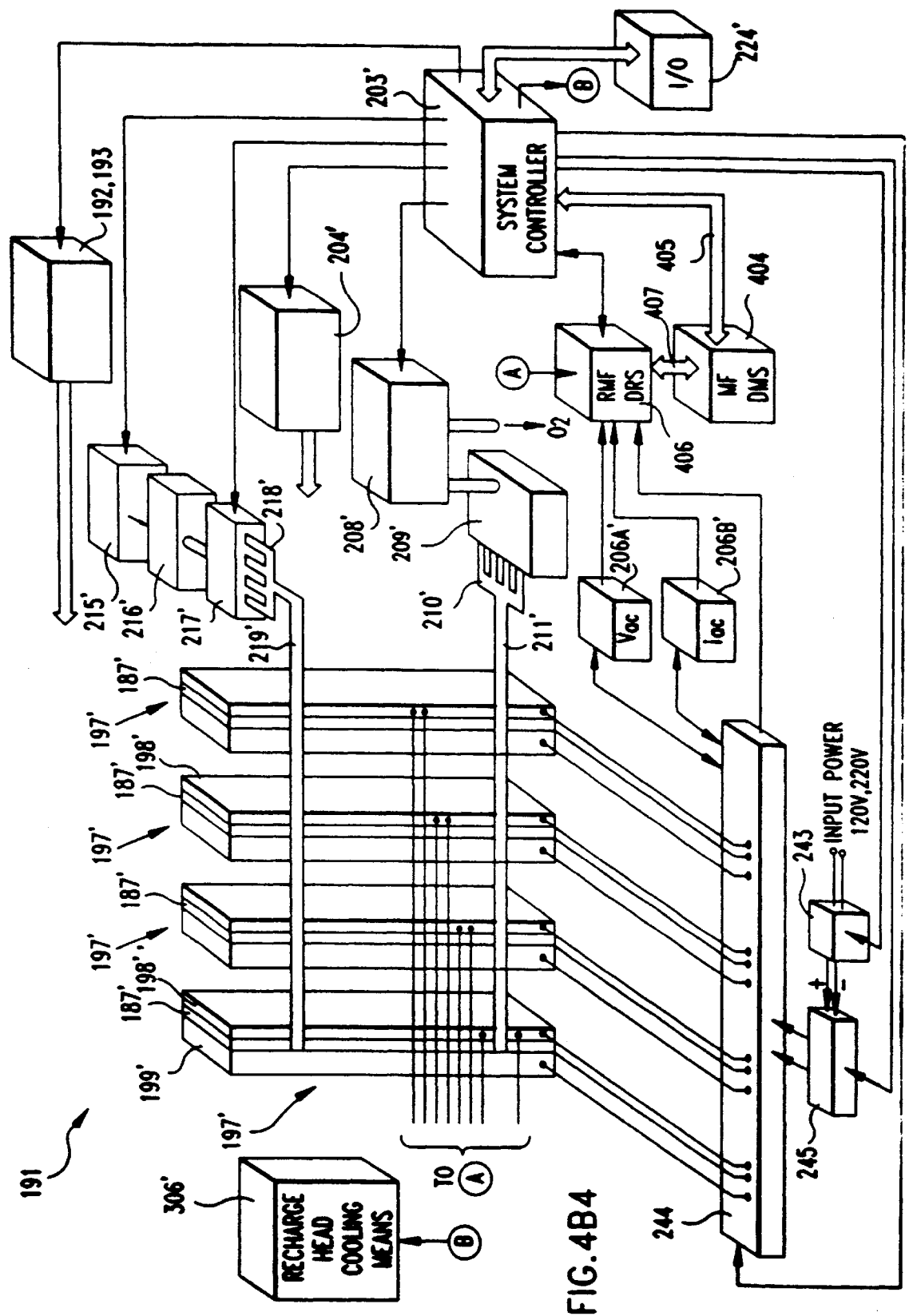
FIG. 4B4

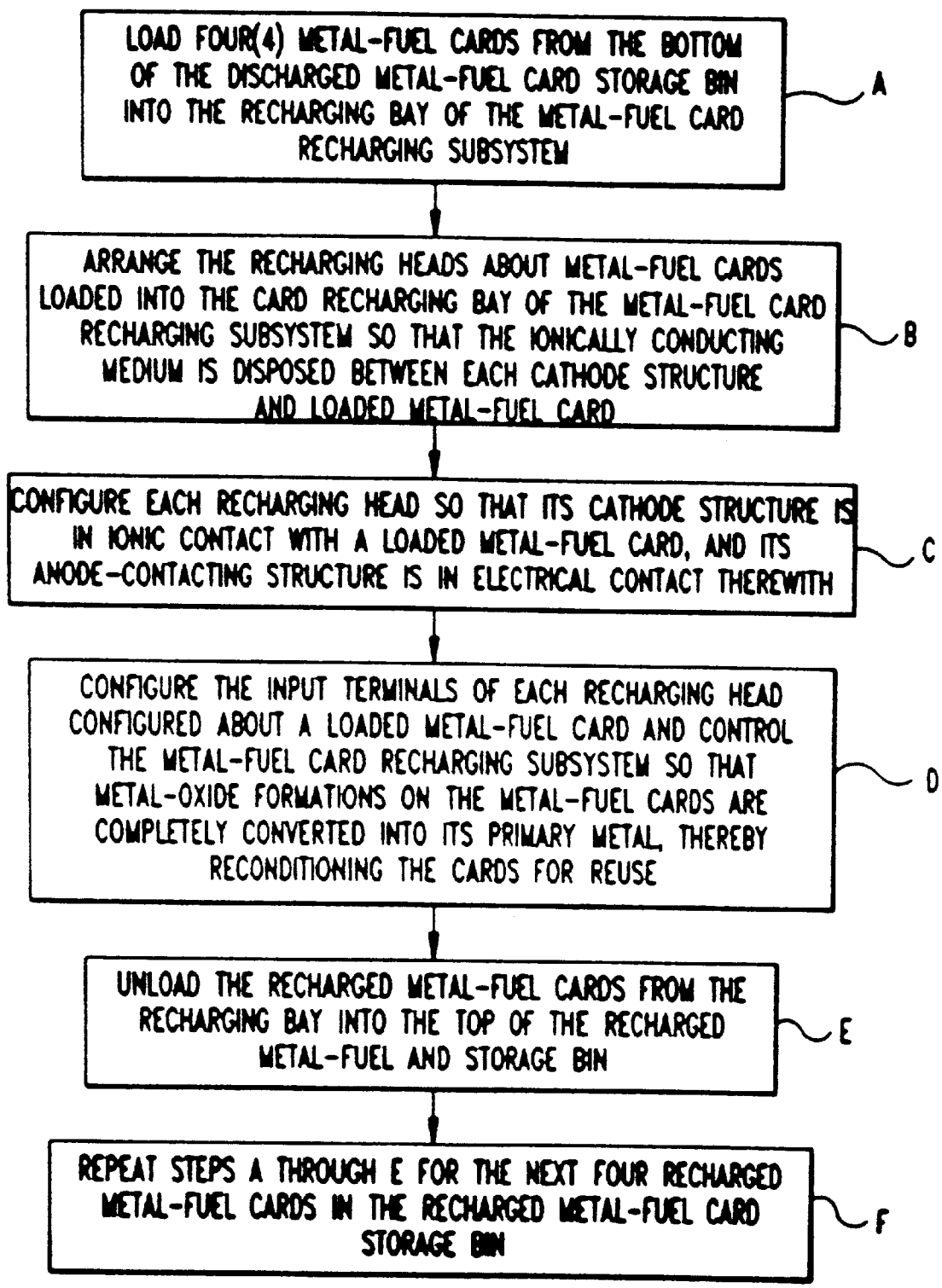
FIG.4B5

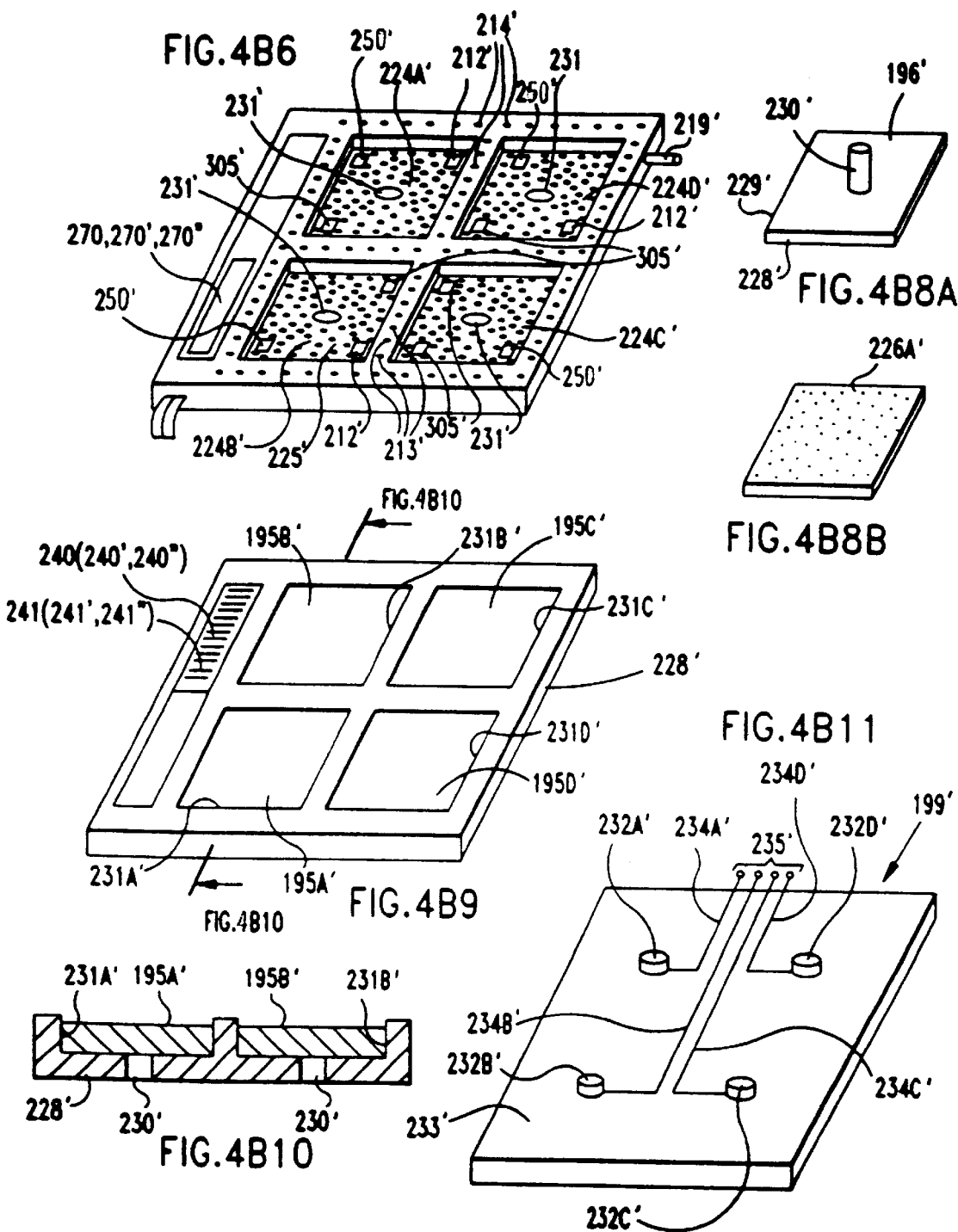

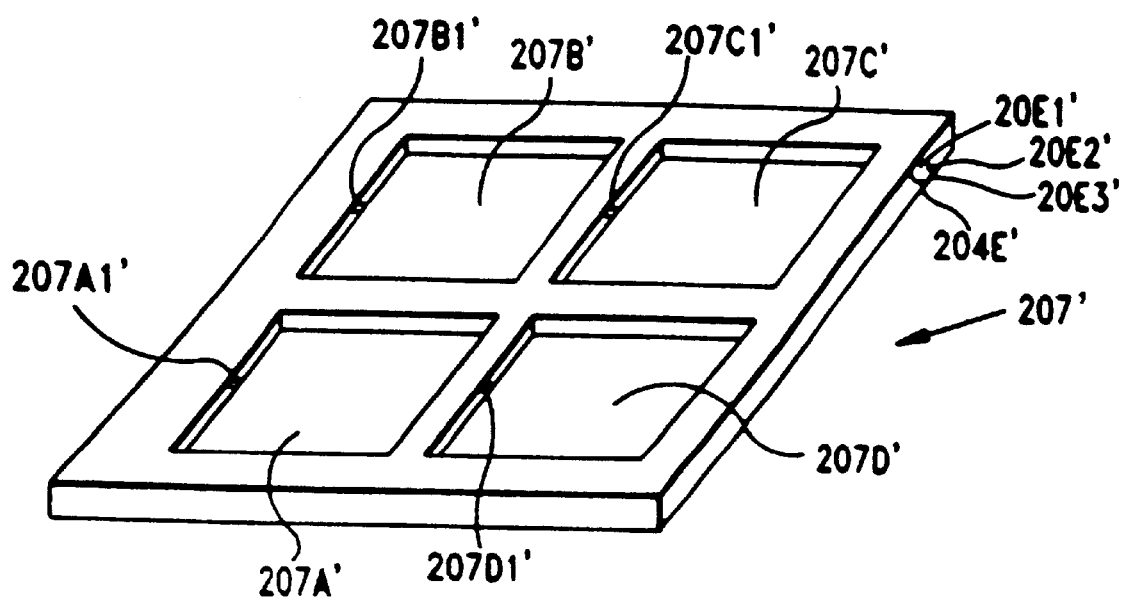
FIG.4B7

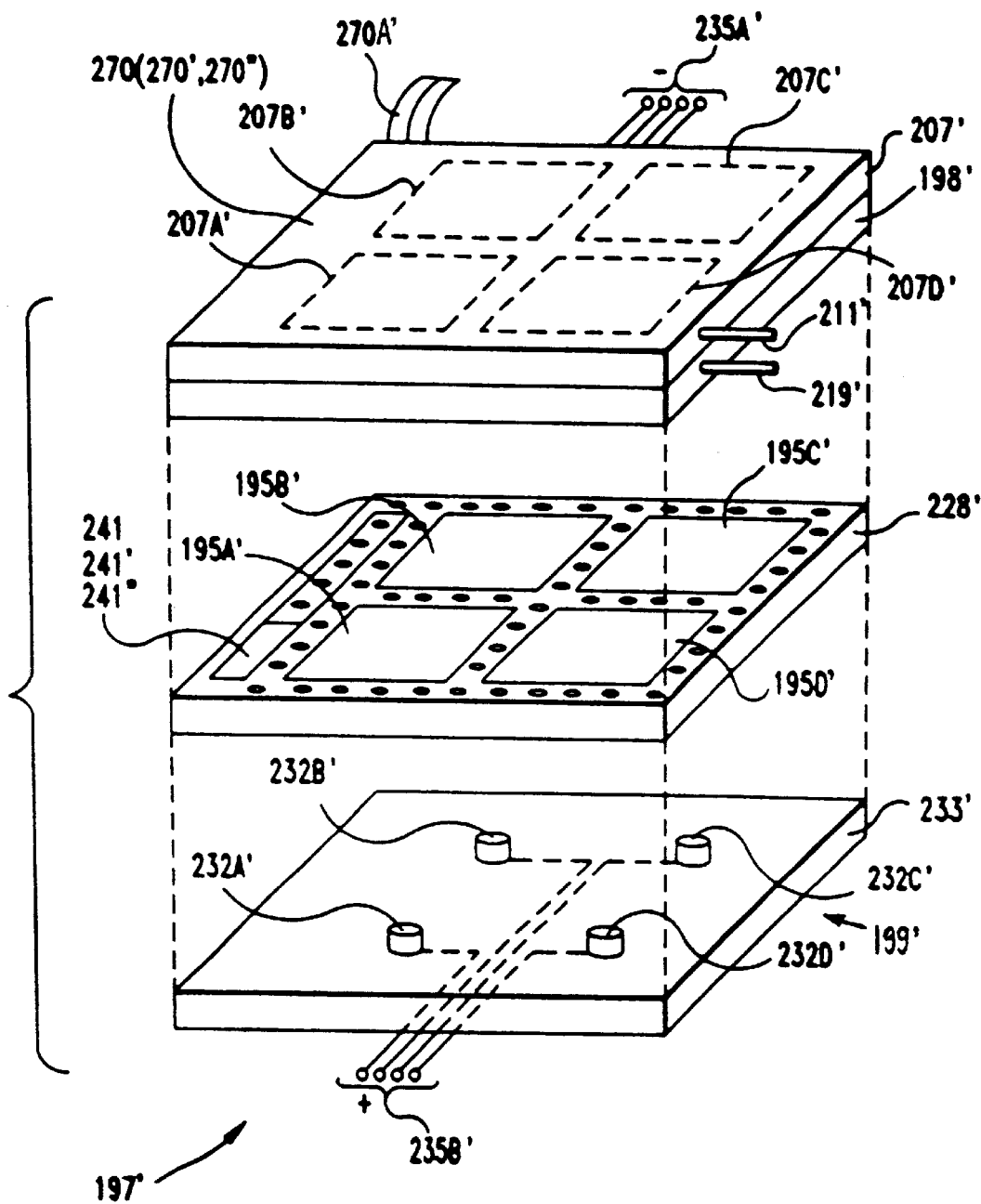
FIG.4B12

FIG.4B13
RECHARGE DATA STRUCTURE

| FUEL-TAPE CARD NO. | METAL-FUEL ZONE NO. 1 | METAL-FUEL ZONE NO. 2 | METAL-FUEL ZONE NO. 3 | METAL-FUEL ZONE NO. 4 |
|---|---|---|---|---|
| TIME $t_1$ | $V_{oc}$<br>$i_{oc}$<br>$PO_2$<br>$H_2O\%$<br>$T_{oc}$<br>COMPUTED PARAMETERS — 410 | | | |
| TIME $t_2$ | | | | |
| TIME $t_3$ | | | | |
| TIME $t_4$ | | | | |
| TIME $t_5$ | | | | |
| ⋮ | ⋮ | ⋮ | ⋮ | ⋮ |
| TIME $t_n$ | | | | |

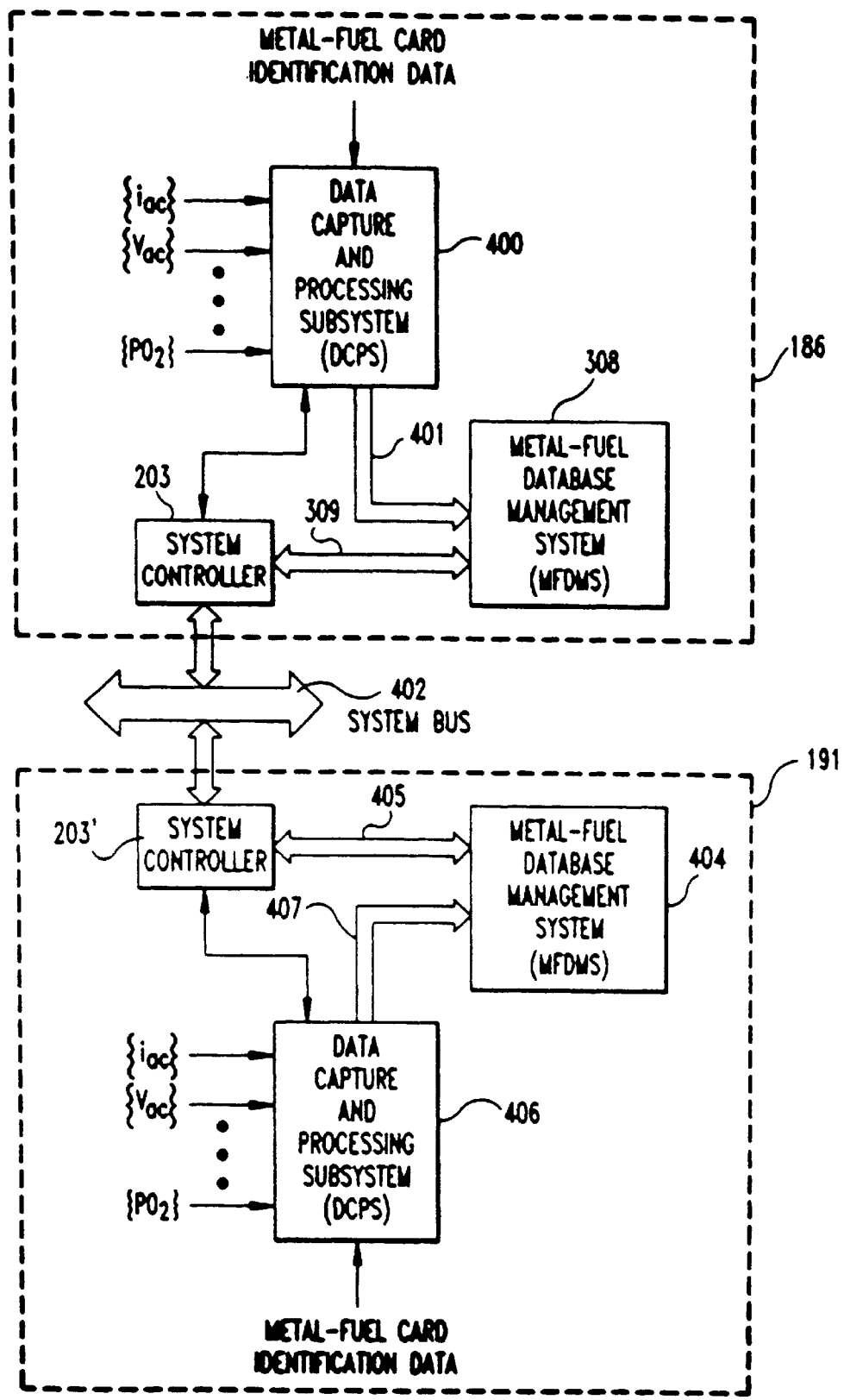
FIG.4B14

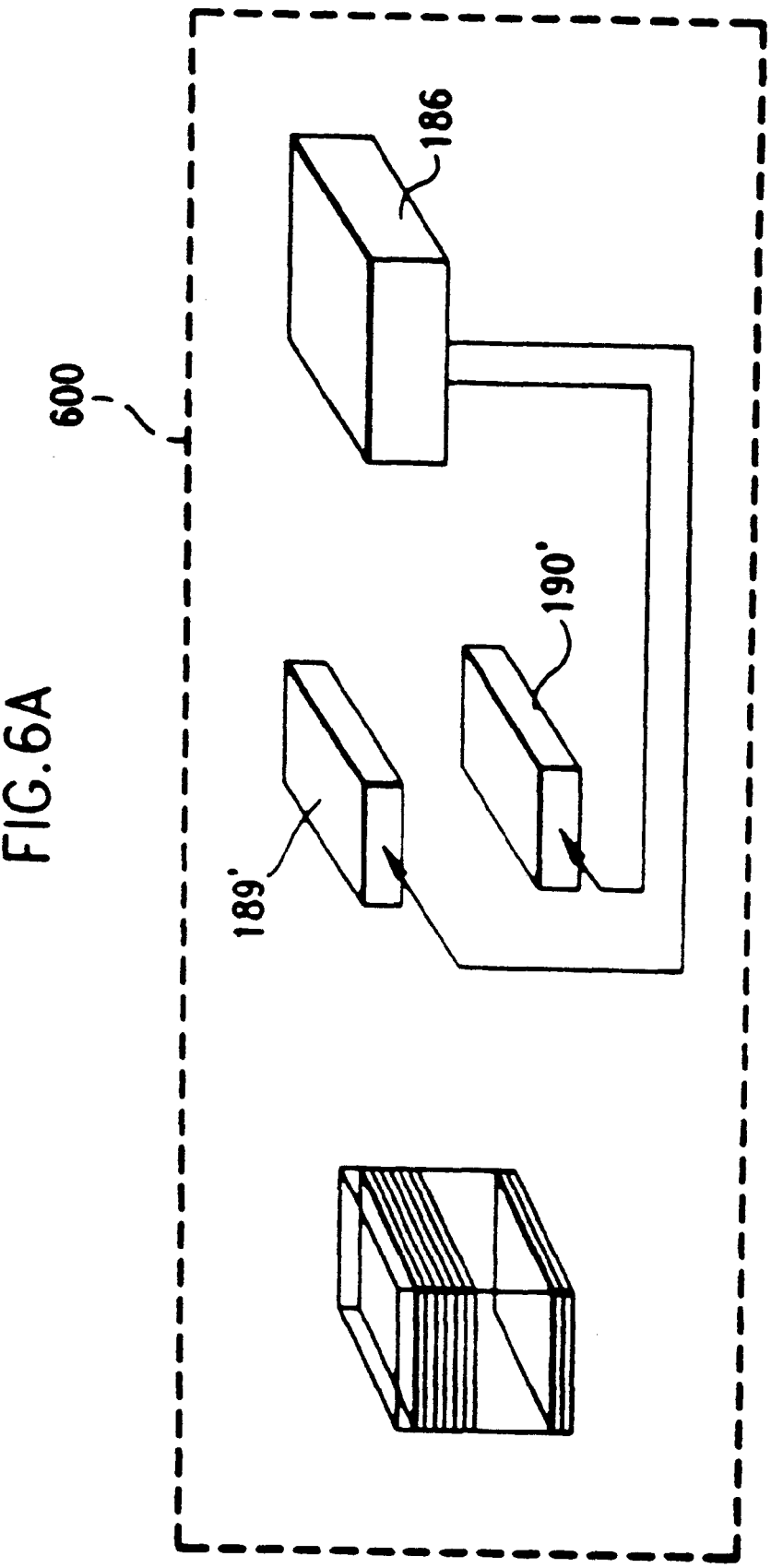

METAL-AIR FUEL CELL BATTERY SYSTEM HAVING MEANS FOR DISCHARGING AND RECHARGING METAL-FUEL CARDS SUPPLIED FROM A CASSETTE-TYPE STORAGE DEVICE

RELATED CASES

This is a Continuation of: copending application Ser. No. 09/074,337 entitled a "METAL-AIR FUEL-CELL BATTERY SYSTEM HAVING MEANS FOR MANAGING AVAILABILITY OF METAL-FUEL THEREWITHIN" filed May 7, 1998 which is a Continuation-in-Part of copending application Ser. No. 08/944,507 entitled HIGH-POWER DENSITY METAL-AIR FUEL CELL BATTERY SYSTEM by Sadeg Faris, et al. filed Oct. 6, 1997; and a Continuation-in-Part of copending application Ser. No. 09/110,761 entitled "METAL-AIR FUEL CELL BATTERY SYSTEM EMPLOYING A PLURALITY OF MOVING CATHODE STRUCTURES FOR IMPROVED VOLUMETRIC POWER DENSITY" filed Jul. 3, 1998 and copending application Ser. No. 09/110,762 entitled "METAL-AIR FUEL CELL BATTERY SYSTEM EMPLOYING METAL-FUEL TAPE AND LOW-FRICTION CATHODE STRUCTURES" filed Jul. 3, 1998; each said application being assigned to Reveo, Inc. and incorporated herein by reference in its entirely pending cases.

BACKGROUND OF THE INVENTION

1. Field of the Invention

The present invention relates to improvements in metal-air fuel cell battery (FCB) systems and devices that provide a convenient way of supplying metal-fuel to such systems and devices during discharging modes of operation, and collecting oxidized metal-fuel for recharging.

2. Description of the Prior Art

In copending U.S. application Ser. No. 08/944,507, Applicant discloses several types of novel metal-air fuel cell battery (FCB) systems. During power generation, metal-fuel tape is transported over a stationary cathode structure in the presence of an ionically-conducting medium, such as an electrolyte-impregnated gel. In accordance with well known principles of electro-chemistry, the transported metal-fuel tape is oxidized as electrical power is produced from the system.

Metal-air FCB systems of the type disclosed in U.S. application Ser. No. 08/944,507 have numerous advantages over prior art electro-chemical discharging devices. For example, one advantage is the generation of electrical power over a range of output voltage levels required by particular electrical load conditions. Another advantage is that oxidized metal-fuel tape can be repeatedly reconditioned (i.e. recharged) during battery recharging cycles carried out during electrical discharging operation, as well as separately therefrom.

In U.S. Pat. No. 5,250,370, Applicant discloses an improved system and method for recharging oxidized metal-fuel tape used in prior art metal-air FCB systems. By integrating a recharging head within a metal-air FCB discharging system, this technological improvement theoretically enables quicker recharging of metal-fuel tape for reuse in FCB discharging operations. In practice, however, there may be particular applications when, for example, use of the tape-format for metal-fuel is less than desirable. In such instances, the requirements of metal-fuel tape transport mechanisms and the like may be difficult or too costly to implement, that realization of the particular metal-fuel tape FCB system is rendered commercially unattractive from the point of view of the manufacturer and/or users of the product into which the FCB system would be incorporated.

Thus there is a great need in the fuel-cell battery art for an alternative way of and means for electrochemically producing electrical power from a metal-air fuel cell battery system, while overcoming the shortcomings and drawbacks of prior art technologies.

OBJECTS AND SUMMARY OF THE INVENTION

Accordingly, a primary object of the present invention is to provide an alternative way and means for electrochemically producing electrical power from a metal-air fuel cell battery system, while overcoming the shortcomings and drawbacks of prior art technologies.

Another object of the present invention is to provide such means in the form of a metal-air FCB system designed to discharge a supply of metal-fuel cards or plates supplied from a cassette-type storage device.

Another object of the present invention is to provide such a system, wherein each (re)charged metal-fuel card or plate is automatically transported from the cassette-type storage device into the discharging bay of the system.

Another object of the present invention is to provide such a system, wherein the cassette-type storage device is designed for storing a plurality of (re)charged metal-fuel cards or plates for automated transport therefrom into the discharging bay of the system, as well as storing a plurality of discharged metal-fuel cards or plates for automated transport from the discharging bay back into the cassette-type storage device.

Another object of the present invention is to provide such a system, wherein each oxidized metal-fuel card or plate is automatically transported from the cassette storage device into the recharging bay of the system, and after recharging (i.e. reducing) is completed, the recharged metal-fuel card is automatically transported back into the cassette storage device, and another oxidized metal-fuel card is automatically transported from the cassette-storage device into the recharging bay for recharging.

Another object of the present invention is to provide such a system, wherein a plurality of (re)charged metal-fuel cards or plates are automatically transported into the system for high-power discharging operations.

Another object of the present invention is to provide a metal-air FCB system, wherein a plurality of metal-fuel cards can be loaded within a metal-fuel card discharging bay of the system, and simultaneously discharged therewithin to supply electrical power to an electrical load.

Another object of the present invention is to provide such a system, wherein a plurality of metal-fuel cards can be loaded within the recharging bay of the system, and simultaneously recharged therewithin to convert metal-oxide along the metal-fuel card into its primary metal fuel for reuse in subsequent discharging operations.

Another object of the present invention is to provide such a system, wherein both the metal-fuel card discharging and recharging subsystems are provided for simultaneous operations under the management of a system controller associated with a resultant system, such as an electrical power management system.

These and other Objects of the present invention will become apparent hereinafter.

BRIEF DESCRIPTION OF THE DRAWINGS

For a more complete understanding of the Objects of the Present Invention, the following detailed Description of the Illustrative Embodiments Of the Present Invention should be read in conjunction with the accompanying Drawings, wherein:

FIG. 1 is a schematic diagram showing a first illustrative embodiment of the metal-air FCB system of the present invention, wherein a first plurality of recharged metal-fuel cards (or sheets) are semi-manually loaded into the discharging bay of its Metal-Fuel Card Discharging Subsystem, while a second plurality of discharged metal-fuel cards (or sheets) are semi-manually loaded into the recharging bay of its Metal-Fuel Card Recharging Subsystem;

FIG. 2A1 is a generalized schematic representation of the metal-air FCB system of FIG. 1, wherein metal-fuel cards are shown about-to-be inserted within the discharging bays of the Metal-Fuel Card Discharging Subsystem, and not within the recharging bays of the Metal-Fuel Card Recharging Subsystem;

FIG. 2A2 is a generalized schematic representation of the metal-air FCB system of FIG. 1, wherein metal-fuel cards of FIG. 1 are shown loaded within the discharging bays of the Metal-Fuel Card Discharging Subsystem;

FIGS. 2A31 and 2A32, taken together, set forth generalized schematic representation of the Metal-Fuel Card Discharging Subsystem shown in FIGS. 2A1 and 2A2, wherein the subcomponents thereof are shown in greater detail, with all metal-fuel cards withdrawn from the discharging head assembly thereof;

FIG. 2A4 is a schematic representation of the Metal-Fuel Card Discharging Subsystem shown in FIGS. 2A1 and 2A2, wherein the subcomponents thereof are shown in greater detail, with the metal-fuel cards inserted between the cathode and anode-contacting structures of each discharging head thereof;

FIG. 2A5 is a high-level flow chart setting forth the basic steps involved during the discharging of metal-fuel cards (i.e. generating electrical power therefrom) when using the Metal-Fuel Card Discharging Subsystem shown in FIGS. 2A31 through 2A4;

FIG. 2A6 is a perspective view of the cathode support structure employed in each discharging head of the Metal-Fuel Card Discharging Subsystem shown in FIGS. 2A31 and 2A4, and comprising five parallel channels within which electrically-conductive cathode strips and ionically conducting electrolyte-impregnated strips are securely supported in its assembled state;

FIG. 2A7 is a perspective, exploded view of cathode and electrolyte impregnated strips and partial oxygen pressure (pO2) sensors installed within the support channels of the cathode support structure shown in FIG. 2A6;

FIG. 2A8 is a perspective view of the cathode structure of the first illustrative embodiment of the present invention, shown in its fully assembled state and adapted for use in the discharging heads shown in FIGS. 2A31, 2A32 and 2A4;

FIG. 2A9 is a perspective view of a section of unoxidized metal-fuel card for use in the Metal-Fuel Card Discharging Subsystem shown in FIGS. 1, 2A31, 2A32 and 2A4, showing (i) its parallel metal-fuel strips spatially registerable with the cathode strips in the cathode structure of the discharging head partially shown in FIG. 2A8, and (ii) a graphically-encoded data track containing code symbols identifying the metal-fuel card, and facilitating, during discharging operations (i) reading (or access), from data storage memory, recharge parameters and/or metal-fuel indicative data correlated to metal-fuel identification data prerecorded during previous recharging and/or discharging operations, and (ii) recording, in data storage memory, sensed discharging parameters and computed metal-oxide indicative data correlated to metal-fuel zone identification data being read during the discharging operation;

FIG. 2A9' is a perspective view of a section of unoxidized metal-fuel card for use in the Metal-Fuel Card Discharging Subsystem shown in FIGS. 1, 2A31 and 2A32, showing (i) its parallel metal-fuel strips spatially registerable with the cathode strips in the cathode structure of the discharging head partially shown in FIG. 2A8, and (ii) a magnetically-encoded data track embodying digital code symbols identifying the metal-fuel card, and facilitating during discharging operations, (i) reading (or accessing) from data storage memory, prerecorded recharge parameters and/or metal-fuel indicative data correlated to the metal-fuel identification data read by the subsystem during discharging operations, and (ii) recording, in data storage memory, sensed discharge parameters correlated to metal-fuel zone identification data being read during the discharging operation;

FIG. 2A9" is a perspective view of a section of unoxidized metal-fuel card for use in the Metal-Fuel Card Discharging Subsystem shown in FIGS. 1, 2A31 and 2A32, showing (i) parallel metal-fuel strips spatially registerable with the cathode strips in the cathode structure of the discharging head partially shown in FIG. 2A8, and (ii) an optically-encoded data track containing light-transmission aperture-type code symbols identifying the metal-fuel card, and facilitating during discharging operations (i) reading (or accessing) from data storage memory, recharge parameters and/or metal-fuel indicative data correlated to metal-fuel identification data prerecorded during previous recharging and/or discharging operations, and (ii) recording, in data storage memory, sensed discharging parameter and computed metal-oxide indicative data correlated to metal-fuel zone identification data being read during the discharging operation;

FIG. 2A10 is a perspective view of a discharging head within the Metal-Fuel Card Discharging Subsystem shown in FIGS. 2A31, 2A32 and 2A4, wherein during the Discharging Mode thereof, metal-fuel card is transported past the air-pervious cathode structure shown in FIG. 2A10, and five anode-contacting elements establish electrical contact with the metal-fuel strips of the transported metal-fuel card;

FIG. 2A11 is a cross-sectional view of the discharging head in the Metal-Fuel Card Discharging Subsystem hereof, taken along line 2A11–2A11 of FIG. 2A8, showing the cathode structure in electrical contact with the metal-fuel card of FIG. 2A9;

FIG. 2A12 is a cross-sectional view of the metal-fuel card shown in FIG. 2A9, taken along line 2A12—2A12 thereof;

FIG. 2A13 is a cross-sectional view of the cathode structure of the discharging head shown in FIG. 2A10, taken along line 2A13—2A13 therein;

FIG. 2A14 is a cross-sectional view of the cathode structure of the discharging head shown in FIG. 2A10, taken along line 2A14—2A14 therein;

FIG. 2A15 is a schematic representation of the information structure maintained within the Metal-Fuel Card Discharging Subsystem of FIG. 1, comprising a set of information fields for use in recording discharge parameters and metal-oxide and metal-fuel indicative data for each metal-fuel track within an identified (i.e. addressed) metal-fuel card during the discharging mode of operation;

FIG. 2B1 is a generalized schematic representation of the metal-air FCB system of FIG. 1, wherein metal-fuel cards are shown about-to-be loaded within the recharging bays of the Metal-Fuel Card Recharging Subsystem thereof;

FIG. 2B2 is a generalized schematic representation of the metal-air FCB system of FIG. 1, wherein metal-fuel cards are shown loaded within the recharging bays of the Metal-Fuel Card Recharging Subsystem;

FIGS. 2B31 and 2B32, taken together, set forth a generalized schematic representation of the Metal-Fuel Card Recharging Subsystem shown in FIGS. 2B1 and 2B2, wherein the subcomponents thereof are shown in greater detail, with the metal-fuel cards withdrawn from the recharging head assembly thereof;

FIG. 2B4 is a schematic representation of the Metal-Fuel Card Recharging Subsystem shown in FIGS. 2B31 and 2B35 wherein the metal-fuel cards are shown loaded between the cathode and anode-contacting structure of the recharging heads thereof;

FIG. 2B5 is a high-level flow chart setting forth the basic steps involved during the recharging of oxidized metal-fuel cards when using the Metal-Fuel Card Recharging Subsystem shown in FIGS. 2B31 through 2B4;

FIG. 2B6 is a perspective view of the cathode support structure employed in each recharging head of the Metal-Fuel Card Recharging Subsystem shown in FIGS. 2B31, 2B32 and 2B4, showing five parallel channels within which electrically-conductive cathode strips and ionically-conducting electrolyte-impregnated strips are securely supported;

FIG. 2B7 is a perspective, exploded view of cathode and electrolyte impregnated strips and oxygen pressure (pO2) sensors being installed within the support channels of the cathode support structure shown in FIG. 2B8;

FIG. 2B8 is a perspective view of the cathode structure and its associated oxygen-evacuation chamber of the first illustrative embodiment of the present invention, shown in its fully assembled state and adapted for use in the recharging heads shown in FIGS. 2B31, 2B32 and 2B4;

FIG. 2B9 is a perspective view of a section of an oxidized metal-fuel card adapted for use in the Metal-Fuel Card Recharging Subsystem shown in FIGS. 1, 2B31, 2B32 and 2B4, showing (i) its parallel metal-fuel strips spatially registerable with the cathode strips in the cathode structure of the recharging head partially shown in FIG. 2B8, and (ii) a graphically-encoded data track containing code symbols for identifying each metal-fuel zone therealong, and facilitating during recharging operations, (i) reading (or accessing), from data storage memory, discharge parameters and/or metal-oxide indicative data correlated to metal-fuel identification data prerecorded during previous discharging and/or recharging operations, and (ii) recording, in data storage memory, sensed recharge parameters and computed metal-fuel indicative data correlated to metal-fuel zone identification data being read during the recharging operation;

FIG. 2B9' is a perspective view of a section of an oxidized metal-fuel card adapted for use in the Metal-Fuel Tape Recharging Subsystem shown in FIGS. 1, 2B31, 2B32 and 2B4, showing (i) its parallel metal-fuel strips spatially registerable with the cathode strips in the cathode structure of the discharging head partially shown in FIG. 2B8, and (ii) a magnetically-encoded data track embodying digital data for identifying each metal-fuel zone therealong, and facilitating during recharging operations, (i) reading (or access), from data storage memory, recharging parameters and/or metal-oxide indicative data correlated to zone identification data prerecorded during previous discharging and/or recharging operations, and (ii) recording in data storage memory, sensed recharge parameters and computed metal-fuel indicative data correlated to metal-fuel zone identification data being read during the recharging operation;

FIG. 2B9" is a perspective view of a section of an oxidized metal-fuel card adapted for use in the Metal-Fuel Tape recharging Subsystem shown in FIGS. 1, 2A31, 2A32 and 2A4, showing (i) parallel metal-fuel strips spatially registerable with the cathode strips in the cathode structure of the discharging head partially shown in FIG. 2B8, and (ii) an optically-encoded data track containing a light-transmission aperture-type code symbols on the metal-fuel card for identifying each metal-fuel card, and facilitating during recharging operations, (i) reading (or accessing) from data storage memory, discharge parameters and/or metal-oxide indicative data correlated to zone identification data prerecorded during previous discharging and/or recharging operations, and (ii) recording, in data storage memory, sensed recharge parameters and computed metal-fuel indicative data correlated to metal-fuel zone identification data being read during the recharging operation;

FIG. 2B10 is a perspective view of a recharging head within the Metal-Fuel Card Recharging Subsystem shown in FIGS. 2B31, 2B32 and 2B4, wherein during the Recharging Mode thereof, metal-fuel card is transported past the air-pervious cathode structure shown in FIG. 2B10, and five anode-contacting elements establish electrical contact with the metal-fuel strips of the transported metal-fuel card;

FIG. 2B11 is a cross-sectional view of each recharging head in the Metal-Fuel Card Recharging Subsystem hereof, taken along line 2B11—2B11 of FIG. 2B8, showing the cathode structure in electrical contact with the metal-fuel card structure of FIG. 2B9;

FIG. 2B12 is a cross-sectional view of the metal-fuel card shown in FIG. 2B9, taken along line 2B12—2B12 thereof;

FIG. 2B13 is a cross-sectional view of the cathode structure of the recharging head shown in FIG. 2B10, taken along line 2B13—2B13 therein;

FIG. 2B14 is a cross-sectional view of the cathode structure of the recharging head shown in FIG. 2B10, taken along line 2B14—2B14 therein;

FIG. 2B15 is a schematic representation of the information structure maintained within the Metal-Fuel Card Recharging Subsystem of FIG. 1, comprising a set of information fields for recording recharge parameters and metal-oxide and metal-fuel indicative data for each metal-fuel track within an identified (i.e. addressed) metal-fuel card during the recharging mode of operation;

FIG. 2B16 is a schematic representation of the FCB system of FIG. 1 showing a number of subsystems which enable, during the recharging mode of operation, (a)(i) reading metal-fuel card identification data from a loaded metal-fuel card, (a)(ii) recording in memory, sensed recharge parameters and computed metal-fuel indicative data derived therefrom, and (a)(iii) reading (accessing) from memory, discharge parameters and computed metal-oxide and metal-fuel indicative data recorded during previous discharging and/or recharging operations through which the identified metal-fuel card has been processed, and during the discharging mode of operation, (b)(i) reading metal-fuel card identification data from a loaded metal-fuel card, (b)(ii) recording in memory, sensed discharge parameters and computed metal-oxide indicative data derived therefrom, and (b)(iii) reading (accessing) from memory, recharge parameters and computed metal-oxide and metal-fuel indicative data recorded during previous discharging and/or recharging operations through which the identified metal-fuel card has been processed;

FIG. 3 is a perspective diagram of a first illustrative embodiment of the metal-air FCB system of the present invention, wherein a first plurality of recharged metal-fuel cards can be automatically transported from its recharged metal-fuel card storage bin into the discharging bay of its Metal-Fuel Card Discharging Subsystem, while a second plurality of oxidized metal-fuel cards are automatically transported from the discharged metal-fuel card storage bin into the recharging bay of its Metal-Fuel Card Recharging Subsystem for use in electrical power generation operations;

FIG. 4A1 is a generalized schematic representation of the metal-air FCB system of FIG. 3, wherein recharged metal-fuel cards are shown being automatically transported from the bottom of the stack of recharged metal-fuel cards in the recharged metal-fuel card storage bin, into the discharging bay of the Metal-Fuel Card Discharging Subsystem;

FIG. 4A2 is a generalized schematic representation of the metal-air FCB system of FIG. 3, wherein discharged metal-fuel cards are shown being automatically transported from the discharging bay of the Metal-Fuel Card Discharging Subsystem onto the top of the stack of discharged metal fuel cards in discharged metal-fuel card storage bin;

FIGS. 4A31 and 4A32 are a generalized schematic representation of the Metal-Fuel Card Discharging Subsystem shown in FIGS. 4A1 and 4A2, wherein the subcomponents thereof are shown in greater detail, with a plurality of recharged metal-fuel cards arranged and ready for insertion between the cathode and anode-contacting structures of the discharging heads thereof;

FIG. 4A4 is a schematic representation of the Metal-Fuel Card Discharging Subsystem shown in 4A31 and 4A32, wherein the plurality of recharged metal-fuel cards are inserted between the cathode and anode-contacting structures of the discharging heads thereof;

FIG. 4A5 sets forth a high-level flow chart setting forth the basic steps involved during the discharging of metal-fuel cards (i.e. generating electrical power therefrom) using the Metal-Fuel Card Discharging Subsystem shown in FIGS. 4A31 through 4A4;

FIG. 4A6 is a perspective view of the cathode support structure employed in each discharging head of the Metal-Fuel Card Discharging Subsystem shown in FIGS. 4A31, 4A32 and 4A4, wherein four cathode element receiving recesses are provided for receiving cathode structures and electrolyte-impregnated pads therein;

FIG. 4A7 is a schematic diagram of the oxygen-injection chamber adapted for use with the cathode support structure shown in FIG. 4A6;

FIG. 4A8A is a schematic diagram of a cathode structure insertable within the lower portion of a cathode receiving recess of the cathode support plate shown in FIG. 4A6;

FIG. 4A8B is a schematic diagram of an electrolyte-impregnated pad for insertion over a cathode structure within the upper portion of a cathode receiving recess of the cathode support plate shown in FIG. 4A6;

FIG. 4A9 is a perspective view of the an unoxidized metal-fuel card designed for discharging within the Metal-Fuel Discharging Subsystem of FIG. 3, and which comprises four spatially-isolated recesses each supporting a metal-fuel strip and permitting electrical contact with an anode-contacting electrode through an aperture formed in the bottom surface of the recess when loaded within the discharging head;

FIG. 4A10 is a cross-sectional view of the metal-fuel support structure of FIG. 4A9, taken along line 4A10—4A10 of FIG. 4A9;

FIG. 4A11 is a perspective view of an electrode support plate supporting a plurality of electrodes which are designed to establish electrical contact with the anodic metal-fuel strips supported within the metal-fuel support plate of FIG. 4A9, during discharging operations carried out by the Metal-Fuel Card Discharging Subsystem of FIG. 3;

FIG. 4A12 is a perspective, exploded view of a discharging head within the Metal-Fuel Card Discharging Subsystem of FIG. 3, showing its cathode support structure, oxygen-injection chamber, metal-fuel support structure, and anode electrode-contacting plate thereof in a disassembled yet registered relationship;

FIG. 4A13 is a schematic representation of the information structure maintained within the Metal-Fuel Card Discharging Subsystem of FIG. 3, comprising a set of information fields for use in recording discharge parameters, and metal-oxide and metal-fuel indicative data for each metal-fuel zone within an identified (i.e. addressed) metal-fuel card during discharging operations;

FIG. 4B1 is a generalized schematic representation of the metal-air FCB system of FIG. 3, wherein a plurality of oxidized metal-fuel cards are shown being automatically transported from the bottom of the stack of discharged metal-fuel cards in the discharged metal-fuel card storage bin into the recharging bay of the Metal-Fuel Card Recharging Subsystem thereof;

FIG. 4B2 is a generalized schematic representation of the metal-air FCB system of FIG. 3, wherein recharged metal-fuel cards are shown being automatically transported from the recharging bay of the Metal-Fuel Card Recharging Subsystem onto the top of the stack of recharged metal fuel cards in recharged metal-fuel card storage bin;

FIGS. 4B31 and 4B32 taken together, set forth a generalized schematic representation of the Metal-Fuel Card Recharging Subsystem shown in FIGS. 4B1 and 4B2, wherein the subcomponents thereof are shown in greater detail, with a plurality of discharged metal-fuel cards ready for insertion between the cathode and anode-contacting structures of the recharging heads thereof;

FIG. 4B4 is a schematic representation of the Metal-Fuel Card Recharging Subsystem shown in FIGS. 4B31 and 4B32, wherein a plurality of discharged metal-fuel cards are shown inserted between the cathode and anode-contacting structures of the metal-oxide recharging heads thereof;

FIG. 4B5 sets forth is a high-level flow chart setting forth the basic steps involved during the recharging of metal-fuel cards (i.e. converting metal-oxide into its primary metal) when using the Metal-Fuel Card Recharging Subsystem shown in FIGS. 4B31 and 4B32 through 4B4;

FIG. 4B6 is a perspective view of the cathode support structure employed in each recharging head of the Metal-Fuel Card Recharging Subsystem shown in FIGS. 4B31, 4B32 and 4B4, wherein four cathode element receiving recesses are provided for receiving cathode structures and electrolyte-impregnated pads therein;

FIG. 4B7 is a schematic diagram of a cathode structure insertable within the lower portion of a cathode receiving recess of the cathode support structure shown in FIG. 4B6;

FIG. 4B8A is a schematic diagram of a cathode structure insertable within the lower portion of a cathode receiving recess in the cathode support plate of FIG. 4B6;

FIG. 4B8B is a schematic diagram of an oxygen-evacuation chamber adapted for use in cathode support plate shown in FIG. 4B6;

FIG. 4B9 is a perspective view of a partially-oxidized metal-fuel card designed for recharging in the Metal-Fuel Recharging Subsystem of FIG. 3, and comprising four spatially-isolated recesses each supporting a metal-fuel strip and permitting electrical contact with an anode-contacting electrode through an aperture formed in the bottom surface of the recess when loaded within a recharging head;

FIG. 4B10 is a cross-sectional view of the metal-fuel support structure of FIG. 4B9, taken along line 4B10—4B10 of FIG. 4B9;

FIG. 4B11 is a perspective view of a metal-fuel support plate for supporting a plurality of electrodes designed to establish electrical contact with the metal-fuel strips supported within the metal-fuel support plate of FIG. 4B10, during recharging operations carried out by the Metal-Fuel Card Recharging Subsystem of FIG. 3;

FIG. 4B12 is a perspective, exploded view of a recharging head within the Metal-Fuel Card Recharging Subsystem of FIG. 3, showing the cathode support structure, the metal-fuel support structure and the anode electrode-contacting plate thereof in a disassembled yet registered relationship;

FIG. 4B13 is a schematic representation of the information structure maintained within the Metal-Fuel Card Discharging Subsystem of FIG. 3, comprising a set of information fields for use in recording recharge parameters, and metal-fuel and metal-oxide indicative data for each metal-fuel track within an identified (i.e. addressed) metal-fuel card during recharging operations;

FIG. 4B14 is a schematic representation of the FCB system of FIG. 3 showing a number of subsystems which enable, during the recharging operations, (a)(i) reading metal-fuel card identification data from a loaded metal-fuel card, (a)(ii) recording in memory, sensed recharge parameters and computed metal-fuel indicative data derived therefrom, and (a)(iii) reading (accessing) from memory, discharge parameters and computed metal-oxide and metal-fuel indicative data recorded during previous discharging and/or recharging operations through which the identified metal-fuel card has been processed;

FIG. 5 is a schematic diagram of the seventh illustrative embodiment of the metal-air FCB system hereof, wherein metal-fuel is provided in the form of metal-fuel cards (or sheets) contained within a cassette cartridge-like device having a partitioned interior volume for storing (re)charged and discharged metal-fuel cards in separate storage compartments formed within the same cassette cartridge-like device;

FIG. 6 is a schematic diagram of the eighth illustrative embodiment of the metal-air FCB system hereof, wherein metal-fuel is provided in the form of metal-fuel cards (or sheets) contained within a cassette cartridge-like device having a partitioned interior volume for storing (re)charged and discharged metal-fuel cards in separate storage compartments formed within the same cassette cartridge-like device and;

FIG. 6A is a generalized schematic representation of the metal-air FCB system of FIG. 6, wherein recharged metal-fuel cards are shown being automatically transported from the bottom of the stack of recharged metal-fuel cards in the recharged metal-fuel card storage compartment, into the discharging bay of the Metal-Fuel Card Discharging Subsystem thereof, whereas discharged metal-fuel cards are shown being automatically transported from the discharging bay of the Metal-Fuel Card Discharging Subsystem onto the top of the stack of discharged metal fuel cards in discharged metal-fuel card storage compartment.

DETAILED DESCRIPTION OF THE ILLUSTRATIVE EMBODIMENTS OF THE PRESENT INVENTION

Figure 5:
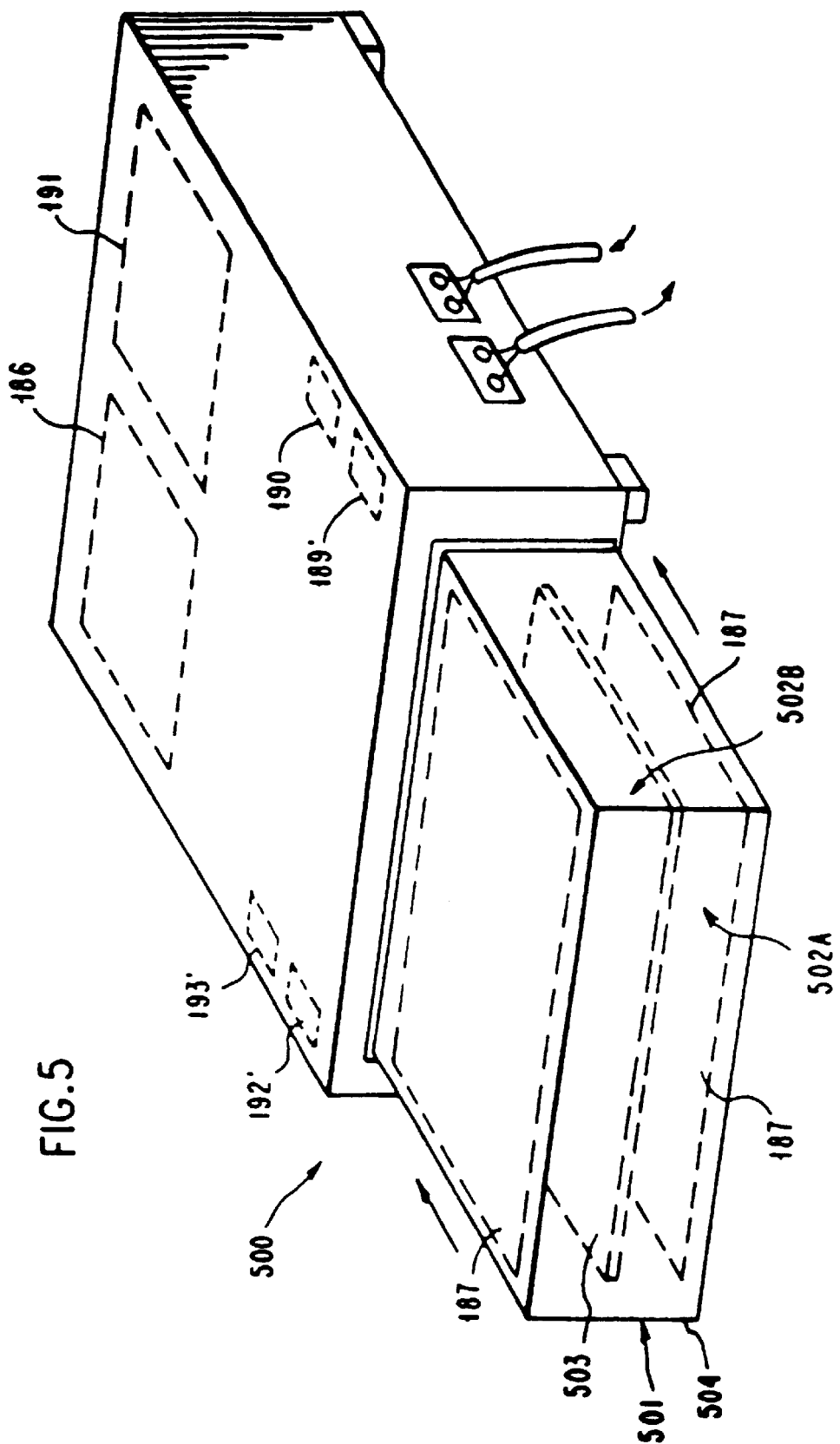

Referring now to the figures in the accompanying Drawings, the illustrative embodiments of the present invention will now be described in great technical detail, wherein like elements are indicated by like reference numbers.

In general, many of the rechargeable metal-air FCB-based systems according to the present invention can be decomposed into a number of subsystems including, for example: a Metal-Fuel Transport Subsystem; a Metal-Fuel Discharging Subsystem; and a Metal-Fuel Recharging Subsystem. The function of the Metal-Fuel Transport Subsystem is to transport metal-fuel material, in the form of tape, cards, sheets, cylinders and the like, to the Metal-Fuel Discharge Subsystem, or the Metal-Fuel Recharge Subsystem, depending on the mode of the system selected. When transported to or through the Metal-Fuel Discharge Subsystem, the metal-fuel is discharged by (i.e. electro-chemically reaction with) one or more discharging heads in order produce electrical power across an electrical load connected to the subsystem while $H_2O$ and $O_2$ are consumed at the cathode-electrolyte interface during the electro-chemical reaction. When transported to or through the Metal-Fuel Recharging Subsystem, discharged metal-fuel is recharged by one or more recharging heads in order to convert the oxidized metal-fuel material into its source metal material suitable for reuse in power discharging operations, while $O_2$ is released at the cathode-electrolyte interface during the electro-chemical reaction. The electrochemistry upon which such discharging and recharging operations are based is described in Applicant's copending application Ser. No. 08/944,507, U.S. Pat. No. 5,250,370, and other applied science publications well known in the art. These applied science principles will be briefly summarized below.

During discharging operations within metal-air FCB systems, metal-fuel such as zinc, aluminum, magnesium or beryllium is employed as an electrically-conductive anode of a particular degree of porosity (e.g. 50%) which is brought in "ionic-contact" with an electrically-conductive oxygen-pervious cathode structure of a particular degree of porosity, by way of an ionically-conductive medium such as an electrolyte gel, KOH, NaOH or ionically-conductive polymer. When the cathode and anode structure are brought into ionic contact, a characteristic open-cell voltage is automatically generated. The value of this open-cell voltage is based on the difference in electro-chemical potential of the anode and cathode materials. When an electrical load is connected across the cathode and anode structures of the metal-air FCB cell, so constructed, electrical power is delivered to the electrical load, as oxygen $O_2$ from the ambient environment is consumed and metal-fuel anode material oxidizes. In the case of a zinc-air FCB system or device, the zinc-oxide (ZnO) is formed on the zinc anode structure during the discharging cycle, while oxygen is consumed at within the region between the adjacent surfaces of the cathode structure and electrolytic medium (hereinafter referred to as the "cathode-electrolyte interface" for purposes of convenience).

During recharging operations, the Metal-Fuel Recharging Subsystem hereof applies an external voltage source (e.g. more than 2 volts for zinc-air systems) across the cathode structure and oxidized metal-fuel anode of the metal-air FCB system. Therewhile, the Metal-Fuel Recharging Subsystem controls the electrical current flowing between the cathode and metal-fuel anode structures, in order to reverse the electro-chemical reaction which occurred during discharging operations. In the case of the zinc-air FCB system or device, the zinc-oxide (ZnO) formed on the zinc anode structure during the discharging cycle is converted into (i.e. reduced back) into zinc, while oxygen $O_2$ is released at the cathode-electrolyte interface to the ambient environment.

Specific ways of and means for optimally carrying out such discharging and recharging processes in metal-air FCB systems and devices will be described in detail below in connection with the various illustrative embodiments of the present invention.

The First Illustrative Embodiment of the Metal-Air FCB System of the Present Invention The first illustrative embodiment of the metal-air FCB system hereof is illustrated in FIGS. 1 through 2B16. As shown in FIGS. 1 through 2A2, this FCB system 110 comprises a number of subsystems, namely: a Metal-Fuel Card Loading/Unloading Subsystem 111 for semi-manually loading one or more metal-fuel cards 112 into the discharging ports 114 of the FCB system, and semi-manually unloading metal-fuel cards therefrom; a Metal-Fuel Card Discharging (i.e. Power Generation) Subsystem 115 for generating electrical power across an electrical load 116 from the metal-fuel cards during the Discharging Mode of operation; and Metal-Fuel Card Recharging Subsystem 117 for electrochemically recharging (i.e. reducing) sections of oxidized metal-fuel cards during the Recharging Mode of operation. Details concerning each of these subsystems and how they cooperate will be described below.

Figure 5A:
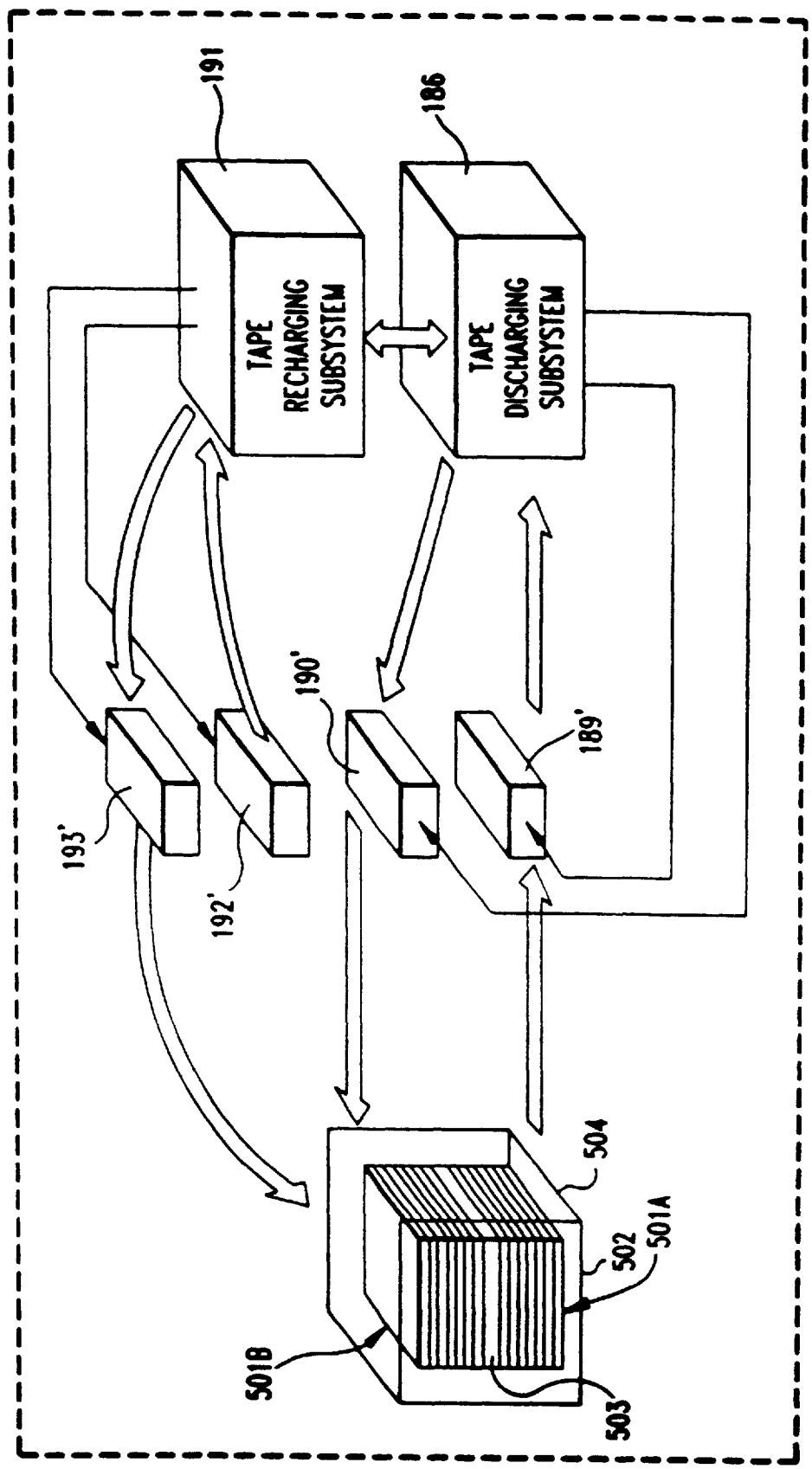
FIG. 5A is a generalized schematic representation of the metal-air FCB system of FIG. 5, wherein recharged metal-fuel cards are shown being automatically transported from the bottom of the stack of recharged metal-fuel cards in the recharged metal-fuel card storage compartment, into the discharging bay of the Metal-Fuel Card Discharging Subsystem thereof, whereas discharged metal-fuel cards are shown being automatically transported from the discharging bay of the Metal-Fuel Card Discharging Subsystem onto the top of the stack of discharged metal fuel cards in discharged metal-fuel card storage compartment.

As shown in FIG. 5A9, the metal-fuel material consumed by this FCB System is provided in the form of metal fuel cards 112 which are manually loaded into the card storage bay of the system. In the illustrative embodiment, the card storage bay is divided into two sections: a discharging bay 113 for loading (re)charged metal-fuel cards for discharge (i.e. power generation); and a recharging bay 114 for loading discharged metal-fuel cards for recharging purposes. As shown in FIGS. 1A, 2A3 and 2A9, each metal-fuel card 112 has a rectangular-shaped structure containing a plurality of electrically isolated metal-fuel strips 119A through 119E adapted to contact the cathode elements 120A through 120E of each "multi-track" discharging head in the Metal-Fuel Tape Discharging Subsystem when the fuel card is moved into properly aligned position between cathode support plate 121 and anode contacting structure 122 during the Discharging Mode, as shown in FIG. 2A4.

In the illustrative embodiment, the fuel card of the present invention is "multi-tracked" in order to enable the simultaneous production of multiple supply voltages (e.g. 1.2 Volts) from the "multi-track" discharging heads employed therein. As will be described in greater detail hereinafter, the purpose of this novel generating head design is to enable the generating and delivery of a wide range of output voltages from the system, suitable to the electrical load connected to the FCB system.

Brief Summary of Modes of Operation of the FCB System of the First Illustrative Embodiment of the Present Invention The FCB system of the first illustrative embodiment has several modes of operation, namely: a Card Loading Mode during which metal-fuel cards are semi-manually loaded within the system; a Discharging Mode during which electrical power is produced from the output terminal of the system and supplied to the electrical loaded connected thereto; a Recharging Mode during which metal-fuel cards are recharged; and a Card Unloading Mode during which metal-fuel cards are semi-manually unloaded from the system. These modes will be described in greater detail hereinafter with reference to FIGS. 2A1 and 2A2 in particular.

During the Card Loading Mode, one or more metal-fuel cards 112 are loaded into the FCB system by the Card Loading/Unloading Subsystem 111. During the Discharging Mode, the charged metal-fuel cards are discharged in order to electro-chemically generate electrical power therefrom for supply to the electrical load 116 connected thereto. During the Recharging Mode, the oxidized metal-fuel cards are electro-chemically reduced in order to convert oxide formations on the metal-fuel cards into its primary metal during recharging operations. During the Card Unloading Mode, the metal-fuel cards are unloaded (e.g. ejected) from the FCB system by the Card Loading/Unloading Subsystem 111.

Multi-Track Metal-Fuel Card used in the FCB System of the First Illustrative Embodiment In the FCB system shown in FIGS. 1, 2A3 and 2A4 each metal-fuel card 112 has multiple fuel-tracks (e.g. five tracks) as taught in copending application Ser. No. 08/944,507, supra. When using such a metal-fuel card design, it is desirable to design each discharging head 124 within the Metal-Fuel Card Discharging Subsystem 115 as a "multi-track" discharging head. Similarly, each recharging head 125 within the Metal-Fuel Card Recharging Subsystem 117 hereof shown in FIGS. 2B31 through 2B4 should be designed as a multi-track recharging head in accordance with the principles of the present invention. As taught in great detail in copending application Ser. No. 08/944,507, the use of "multi-tracked" metal-fuel cards 112 and multi-track discharging heads 124 enables the simultaneous production of multiple output voltages {V1, V2,. . . ,Vn} selectable by the end user. Such output voltages can be used for driving various types of electrical loads 116 connected to the output power terminals 125 of the Metal-Fuel Card Discharging Subsystem. This is achieved by configuring the individual output voltages produced across anode-cathode structures within each discharging head during metal-fuel card discharging operations. This system functionality will be described in greater detail hereinbelow.

In general, multi-track and single-track metal-fuel cards alike can be made using several different techniques. Preferably, the metal-fuel contained with each card-like device 112 is made from zinc as this metal is inexpensive, environmentally safe, and easy to work. Several different techniques will be described below for making zinc-fuel cards according to the present invention.

For example, in accordance with a first fabrication technique, a thin metal layer (e.g. nickel or brass) of about 0.1 to about 5.0 microns thickness is applied to the surface of low-density plastic material (drawn and cut in the form of a card-like structure). The plastic material should be selected so that it is stable in the presence of an electrolyte such as KOH. The function of the thin metal layer is to provide efficient current collection at the anode surface. Thereafter, zinc powder is mixed with a binder material and then applied as a coating (e.g. 1 to about 500 microns thick) upon the surface thin metal layer. The zinc layer should have a uniform porosity of about 50% to allow the ionically-conducting medium (e.g. electrolyte ions) to flow with minimum electrical resistance between the cathode and anode structure. As will be explained in greater detail hereinafter, the resulting structure can be mounted within an electrically insulating casing of thin dimensions to improve the structural integrity of the metal-fuel card, while providing the discharging heads access to the anode structure when the card is loaded within its card storage bay. Optionally, the casing of the metal-fuel card can be provided with slidable panels that enable access to the metal-fuel strips when the card is received in the discharging bay 113 and the discharging head is transported into position for discharging operations, or when the card is received in the recharging bay 114 and the recharging head is transported into position for recharging operations.

In accordance with a second fabrication technique, a thin metal layer (e.g. nickel or brass) of about 0.1 to about 5 microns thickness is applied tot the surface of low-density plastic material (drawn and cut in the form of a card). The plastic material should be selected so that it is stable in the presence of an electrolyte such as KOH. The function of the thin metal layer is to provide efficient current collection at the anode surface. Thereafter zinc is electroplated onto the surface of the thin layer of metal. The zinc layer should have a uniform porosity of about 50% to allow the ions within the ionically-conducting medium (e.g. electrolyte) to flow with minimum electrical resistance between the cathode and anode structures. As will be explained in greater detail hereinafter, the resulting structures can be mounted within an electrically-insulating casing of ultra-thin dimensions to provide a metal-fuel card having suitable structural integrity, while providing the discharging heads access to the anode structure when the card is loaded within its card storage bay. Optionally, the casing of the metal-fuel card can be provided with slidable panels that enable access to the metal-fuel strips when the card is received in the discharging bay 113 and the discharging head is transported into position for discharging operations, or when the card is received in the recharging bay and the recharging head is transported into position for recharging operations.

In accordance with a third fabrication technique, zinc powder is mixed with a low-density plastic material and draw into the form of thin electrically-conductive plastic tape. The low-density plastic material should be selected so that it is stable in the presence of an electrolyte such as KOH. The zinc impregnated tape should have a uniform porosity of about 50% to allow the ions within an ionically-conducting medium (e.g. electrolyte ions) to flow with minimum electrical resistance between the cathode and anode structure. Thereafter, a thin metal layer (e.g. nickel or brass) of about 0.1 to about 5.0 microns thickness is applied to the surface of electrically-conductive tape. The function of the thin metal layer is to provide efficient current collection at the anode surface. As will be explained in greater detail hereinafter, the resulting structure can be mounted within an electrically insulating casing of thin dimensions to improve the structural integrity of the metal-fuel card, while providing the discharging heads access to the anode structure when the card is loaded within its card storage bay.

In any of the above-described embodiments, the card housing can be made from any suitable material designed to withstand heat and corrosion. Preferably, the housing material is electrically non-conducting to provide an added measure of user-safety during card discharging and recharging operations.

Also, each of the above-described manufacturing techniques can be readily modified to produce "double-sided" metal-fuel cards, in which single track or multi-track metal-fuel layers are provided on both sides of the flexible base (i.e. substrate) material employed therein. Such embodiments of metal-fuel tape will be useful in applications where discharging heads are to be arranged on both sides of a metal-fuel card loaded within the FCB system. When making double-sided metal-fuel cards, it will be necessary in most embodiments to form a current collecting layer (of thin metal material) on both sides of the plastic substrate so that current can be collected from both sides of the metal-fuel card, associated with different cathode structures. When making double-sided multi-tracked fuel cards, it may be desirable or necessary to laminate together two multi-track metal-fuel sheets, as described hereinabove, with the substrates of each sheet in physical contact. Adaptation of the above-described methods to produce double-sided metal-fuel cards will be readily apparent to those skilled in the art having had the benefit of the present disclosure. In such illustrative embodiments of the present invention, the anode-contacting structures will be modified so that electrical contact is established with each electrically-isolated current collecting layer formed within the metal-fuel card structure being employed therein.

Card Loading/Unloading Subsystem for the First Illustrative Embodiment of the Metal-Air FCB System of the Present Invention As schematically illustrated in FIGS. 1, 2A1 through 2A4, and shown in detail in copending U.S. application Ser. No. 08/944,507, the Card Loading/Unloading Transport Subsystem 111 in the FCB system of FIG. 1 comprises a number of cooperating mechanisms, namely: a card receiving mechanism 111A for automatically (i) receiving the metal-fuel card 112 at a card insertion port formed in the front or top panel of the system housing 126, and (ii) withdrawing the metal-fuel card into the card discharge bay provided therewithin; optionally, an automatic door opening mechanism 111B for opening the (optional) door formed in the card (for metal-fuel card access) when the metal-fuel card is received within the card discharge bay of the FCB system; and an automatic card ejection mechanism 111C for ejecting the metal-fuel card from the card discharge bay through the card insertion port in response to a predetermined condition. Such predetermined conditions may include, for example, the depression of an "ejection" button provided on the front panel of the system housing 126, automatic sensing of the end of the metal-fuel card, etc.).

In the illustrative embodiment of FIG. 1, the card receiving mechanism 111A can be realized as a platform-like carriage structure that surrounds the exterior of the housing of each card received in its discharging bay. The platform-like carriage structure can be supported on a pair of parallel rails, by way of rollers, and translatable therealong by way of an electric motor and cam mechanism, operably connected to system controller 130. The function of the cam mechanism is to convert rotational movement of the motor shaft into a rectilinear motion necessary for translating the platform-like carriage structure along the rails when a card is inserted within the platform-like carriage structure. A proximity sensor, mounted within the system housing, can be used to detect the presence of a metal-fuel card being inserted through the insertion port in the system housing and placed within the platform-like carriage structure. The signal produced from the proximity sensor can be provided to the system controller in order to initiate the card withdrawal process in an automated manner.

With the system housing, the automatic door opening mechanism 111B can be realized by any suitable mechanism that can slide the card door into its open position when the metal-fuel card is completely withdrawn into the card discharge bay. In the illustrative embodiment, the automatic card ejection mechanism 111C employs the same basic structures and functionalities of the card receiving mechanism described above. The primary difference is the automatic card ejection mechanism responds to the depression of an "ejection" button 127A or 127B provided on the front panel of the system housing, or functionally equivalent triggering condition or event. When the button is depressed, the discharging heads are automatically transported away from the metal-fuel card, the metal-fuel card is automatically ejected from the card discharge bay, through the card insertion port.

Notably, the control functions required by the Card Loading/Unloading Subsystem 111, as well as all other subsystems within the FCB system of the first illustrative embodiment, are carried out by the system controller 130, shown in FIGS. 2A31, 2A32 and 2A4 In the illustrative embodiments hereof, the system controller 130 is realized by a programmed microcontroller (i.e. microcomputer) having program storage memory (ROM), data storage memory (RAM) and the like operably connected by one or more system buses well known in the microcomputing and control arts. The additional functions performed by the system controller of the Metal-Fuel Card Discharging Subsystem will be described in greater detail hereinafter.

The Metal-Fuel Card Discharging Subsystem for the First Illustrative Embodiment of the Metal-Air FCB System of the Present Invention As shown in FIGS. 2A31, 2A32 and 2A4, the metal-fuel card discharging subsystem 115 of the first illustrative embodiment comprises a number of subsystems, namely: an assembly of multi-track discharging (i.e. discharging) heads 124, each having multi-element cathode structures 121 and anode-contacting structures 122 with electrically-conductive output terminals connectable in a manner to be described hereinbelow; a discharging head transport subsystem 131 for transporting the subcomponents of the discharging head assembly 124 to and from the metal-fuel cards loaded into the subsystem; a cathode-anode output terminal configuration subsystem 132 for configuring the output terminals of the cathode and anode-contacting structures of the discharging heads under the control of the system controller 130 so as to maintain the output voltage required by a particular electrical load 116 connected to the Metal-Fuel Card Discharging Subsystem 115; a cathode-anode voltage monitoring subsystem 133, connected to the cathode-anode output terminal configuration subsystem 132 for monitoring (i.e. sampling) voltages produced across cathode and anode structures of each discharging head, and producing (digital) data representative of the sensed voltage level; a cathode-anode current monitoring subsystem 134, connected to the cathode-anode output terminal configuration subsystem 132, for monitoring (e.g. sampling) the electrical current flowing across the cathode-electrolyte interface of each discharging head during the Discharging Mode, and producing a digital data signal representative of the sensed current levels; a cathode oxygen pressure control subsystem comprising the system controller 130, solid-state $pO_2$ sensors 135, vacuum chamber (structure) 136 shown in FIGS. 2A7 and 2A8, air-compressor or oxygen supply means (e.g. $O_2$ tank or cartridge) 137, airflow control device 138, manifold structure 139, and multi-lumen tubing 140 shown in FIGS. 5A3 and 5A4, arranged together for sensing and controlling the pO2 level within the cathode structure of each discharging head 124; an ion transport control subsystem comprising the system controller 130, solid-state moisture sensor (hydrometer) 142, moisturizing (e.g. micro-sprinkling) element 143 realized as a micro-sprinkler embodied within the walls structures of the cathode support plate 121 (having water expressing holes 144 disposed along each wall surface as shown in FIG. A6), a water pump 145, a water reservoir 146, a water flow control valve 147, a manifold structure 148 and conduits 149 extending into moisture delivery structure 143, arranged together as shown for sensing and modifying conditions within the FCB system (e.g. the moisture or humidity level at the cathode-electrolyte interface of the discharging heads) so that the ion-concentration at the cathode-electrolyte interface is maintained within an optimal range during the Discharge Mode of operation; discharge head temperature control subsystem comprising the system controller 130, solid-state temperature sensors (e.g. thermistors) 290 embedded within each channel of the multi-cathode support structure 121 hereof, and a discharge head cooling device 291, responsive to control signals produced by the system controller 130, for lowering the temperature of each discharging channel to within an optimal temperature range during discharging operations; a relational-type Metal-Fuel Database Management Subsystem (MFDMS) 293 operably connected to system controller 130 by way of local bus 299, and designed for receiving particular types of information derived from the output of various subsystems within the Metal-Fuel Tape Discharging Subsystem 115; a Data Capture and Processing Subsystem (DCPS) 295, comprising data reading head 150 (150', 150") embedded within or mounted closely to the cathode support structure of each discharging head 124, and a programmed microprocessor-based data processor adapted to receive data signals produced from cathode-anode voltage monitoring subsystem 133, cathode-anode current monitoring subsystem 134, the cathode oxygen pressure control subsystem and the ion-concentration control subsystem hereof, and enabling (i) the reading of metal-fuel card identification data from the loaded metal-fuel card, (ii) the recording of sensed discharge parameters and computed metal-oxide indicative data derived therefrom in the Metal-Fuel Database Management Subsystem 293 using local system bus 296, and (iii) the reading of prerecorded recharge parameters and prerecorded metal-fuel indicative data stored in the Metal-Fuel Database Management Subsystem 293 using local system bus 294; a discharging (i.e. output) power regulation subsystem 151 connected between the output terminals of the cathode-anode output terminal configuration subsystem 132 and the input terminals of the electrical load 116 connected to the Metal-Fuel Card Discharging Subsystem 115, for regulating the output power delivered across the electrical load (and regulate the voltage and/or current characteristics as required by the Discharge Control Method carried out by the system controller 130); an input/output control subsystem 152, interfaced with the system controller 130, for controlling all functionalities of the FCB system by way of a remote system or resultant system, within which the FCB system is embedded; and system controller 130 for managing the operation of the above mentioned subsystems during the various modes of system operation. These subsystems will be described in greater technical detail below.

Multi-Track Discharging Head Assembly within the Metal-Fuel Card Discharging Subsystem The function of the assembly of multi-track discharging heads 124 is to generate electrical power across the electrical load as each metal-fuel card is discharged during the Discharging Mode of operation. In the illustrative embodiment, each discharging (i.e. discharging) head 124 comprises: a cathode element support plate 121 having a plurality of isolated channels 155A through 155E permitting the free passage of oxygen ($O_2$) through the bottom portion of each such channel; plurality of electrically-conductive cathode elements (e.g. strips) 120A through 120E for insertion within the lower portion of these channels, respectively; a plurality of electrolyte-impregnated strips 155A through 155E for placement over the cathode strips, and support within the channels 154A through 154E, respectively, as shown in FIG. 2A9; and an oxygen-injection chamber 136 mounted over the upper (back) surface of the cathode element support plate 121, in a sealed manner.

As shown in FIGS. 2A7, 2A8 and 2A14, each oxygen-injection chamber 136 has a plurality of subchambers 136A through 136E, physically associated within channels 154A through 154E, respectively. Together, each vacuum subchamber is isolated from all other subchambers and is in fluid communication within one channel supporting a cathode element and electrolyte impregnated element. As shown, each subchamber is arranged in fluid communication with air compressor (or $O_2$ supply) 137 via one lumen of multi-lumen tubing 140, one channel of manifold assembly 139 and one channel of air-flow switch 138, each of whose operation is controlled by system controller 130. This arrangement enables the system controller 130 to independently control the $pO_2$ level in each oxygen-injection subchambers 136A through 136E within an optimal range during discharging operations by selectively pumping pressurized air through the corresponding air flow channel in the manifold assembly 139. The optimal range for the pO2 level can be empirically determined through experimentation using techniques known in the art.

In the illustrative embodiment, electrolyte-impregnated strips are realized by impregnating an electrolyte-absorbing carrier medium with a gel-type electrolyte. Preferably, the electrolyte-absorbing carrier strip is realized as a strip of low-density, open-cell foam material made from PET plastic. The gel-electrolyte for each discharging cell is made from a formula consisting of an alkali solution (e.g. KOH), a gelatin material, water, and additives known in the art.

In the illustrative embodiment, each cathode strip 120A through 120E is made from a sheet of nickel wire mesh 156 coated with porous carbon material and granulated platinum or other catalysts 157 shown in FIG. 2A7 to form a cathode suitable for use in the discharging heads in the metal-air FCB system. Details of cathode construction are disclosed in U.S. Pat. Nos. 4,894,296 and 4,129,633, incorporated herein by reference. To form a current collection pathway, an electrical conductor 40 is soldered to the underlying wire mesh sheet of each cathode strip. As shown in FIG. 2A7, each electrical conductor 158 is passed through a hole 159 formed in the bottom surface of each channel 154 of the cathode support plate, and is connected to the input terminals of the cathode-anode output terminal configuration subsystem 132. As shown, each cathode strip is pressed into the lower portion of its channel 154 in the cathode support plate 121 to secure the same therein. As shown in FIG. 2A7, the bottom surface of each channel has numerous perforations 160 formed therein to allow the free passage of oxygen to the cathode strip during the Discharge Mode. In the illustrative embodiment, electrolyte-impregnated strips 155A through 155E are placed over cathode strips 120A through 120E respectively, and is secured within the upper portions of the corresponding cathode supporting channels.

As best shown in FIGS. 2A8, 2A13 and 2A14, when the cathode strips and thin electrolyte strip are mounted in their respective channels in the cathode support plate 121, the outer surface of each electrolyte-impregnated strip is disposed flush with the upper surface of the plate defining the channels.

Hydrophobic agents are added to the carbon material constituting the oxygen-pervious cathode elements to ensure the expulsion of water therefrom. Also, the interior surfaces of the cathode support channels are coated with a hydrophobic film (e.g. Teflon) 161 to repel water from penetrating electrolyte-impregnated strips 155A through 155E and thus achieve optimum oxygen transport across the cathode strips during the Discharging Mode. Preferably, the cathode support plate is made from an electrically non-conductive material, such as polyvinyl chloride (PVC) plastic material well known in the art. The cathode support plate and oxygen-injection chamber can be fabricated using injection molding technology also well known in the art.

In order to sense the partial oxygen pressure $pO_2$ within the cathode structure during the Discharging Mode, for use in effective control of electrical power generated from discharging heads, solid-state pO2 sensor 135 is embedded within each channel of the cathode support plate 121, as illustrated in FIG. 2A7, and operably connected to the system controller 130 as an information input device thereto. In the illustrative embodiment, the $pO_2$ sensor can be realized using well-known $pO_2$ sensing technology employed to measure (in vivo) $pO_2$ levels in the blood of humans. Such prior art sensors employ miniature diodes which emit electro-magnetic radiation at two or more different wavelengths that are absorbed at different levels in the presence of oxygen in the blood, and such information can be processed and analyzed to produce a computed measure of $pO_2$ in a reliable manner, as taught in U.S. Pat. No. 5,190,038 and references cited therein, each being incorporated herein by reference. In the present invention, the characteristic wavelengths of the light emitting diodes can be selected so that similar sensing functions can be carried out within the structure of the cathode in each discharging head, in a straightforward manner.

The multi-tracked fuel card of FIG. 1 is shown in greater structural detail in FIG. 2B9. As shown, the metal-fuel card 112 comprises: an electrically non-conductive base layer 165 of flexible construction (i.e. made from a plastic material stable in the presence of the electrolyte); plurality of parallel extending, spatially separated strips of metal (e.g. zinc) 119A through 119E disposed upon the ultra-thin metallic current-collecting layer (not shown) itself disposed upon the base layer 165; a plurality of electrically non-conductive strips 166A through 166E disposed upon the base layer 165, between pairs of fuel strips 119A through 119E; and a plurality of parallel extending channels (e.g. grooves) 167A through 167E formed in the underside of the base layer, opposite the metal fuel strips thereabove, for allowing electrical contact with the metal-fuel tracks 119A through 119E through the grooved base layer. Notably, the spacing and width of each metal fuel strip is designed so that it is spatially registered with a corresponding cathode strip in the discharging head of the Metal-Fuel Card Discharging Subsystem in which the metal-fuel card 112 is intended to be used. The metal fuel card described above can be made by applying zinc strips to a layer of base plastic material in the form of a card, using any of the fabrication techniques described hereinabove. The metal strips can be physically spaced apart, or separated by Teflon, in order to ensure electrical isolation therebetween. Then, the gaps between the metal strips can be filled in by applying a coating of electrically insulating material, and thereafter, the base layer can be machined, laser etched or otherwise treated to form fine channels therein for allowing electrical contact with the individual metal fuel strips through the base layer. Finally, the upper surface of the multi-tracked fuel card can be polished to remove any electrical insulation material from the surface of the metal fuel strips which are to come in contact with the cathode structures during discharging.

In FIG. 2A10, an exemplary metal-fuel (anode) contacting structure 122 is disclosed for use with the multi-tracked cathode structure shown in FIGS. 2A7 and 2A8. As shown, a plurality of electrically conductive elements 168A through 168E are supported from an platform 169 disposed adjacent the travel of the fuel card within the card. Each conductive element 168A through 168E has a smooth surface adapted for slidable engagement with one track of metal-fuel through the fine groove formed in the base layer of the metal-fuel card. Each conductive element is connected to an electrical conductor which is connected to the cathode-anode output terminal configuration subsystem 132 under the management of the system controller 130. The platform 169 is operably associated with the discharging head transport subsystem 131 and can be designed to be moved into position with the fuel card 112 during the Discharging Mode of the system, under the control of the system controller 130.

Notably, the use of multiple discharging heads, as in the illustrative embodiments hereof, rather than a single discharging head, allows more power to be produced from the discharging head assembly 124 for delivery to the electrical load while minimizing heat build-up across the individual discharging heads. This feature of the Metal-Fuel Card Discharging Subsystem 115 extends the service life of the cathodes employed within the discharging heads thereof.

Discharging Head Transport Subsystem within the Metal-Fuel Card Discharging Subsystem The primary function of the discharging head transport subsystem 131 is to transport the assembly of discharging heads 124 about the metal-fuel cards 112 that have been loaded into the FCB system, as shown in FIGS. 2A31 and 2A32. When properly transported, the cathode and anode-contacting structures of the discharging heads are brought into "ionically-conductive" and "electrically-conductive" contact with the metal-fuel tracks of loaded metal-fuel cards during the Discharging Mode of operation.

Discharging head transport subsystem 131 can be realized using any one of a variety of electro-mechanical mechanisms capable of transporting the cathode supporting structure 121 and anode-contacting structure 122 of each discharging head away from the metal-fuel card 112, as shown in FIGS. 2A31 and 2A32 and about the metal-fuel card as shown in FIG. 2A4. As shown, these transport mechanisms are operably connected to system controller 130 and controlled by the same in accordance with the system control program carried out thereby.

Cathode-Anode Output Terminal Configuration Subsystem within the Metal-Fuel Card Discharging Subsystem As shown in FIGS. 2A31, 2A32 and 2A4 the cathode-anode output terminal configuration subsystem 132 is connected between the input terminals cf the discharging power regulation subsystem 151 and the output terminals of the cathode-anode pairs within the assembly of discharging heads 124. The system controller 130 is operably connected to cathode-anode output terminal configuration subsystem 132 in order to supply control signals for carrying out its functions during the Discharging Mode of operation.

The function of the cathode-anode output terminal configuration subsystem 132 is to automatically configure (in series or parallel) the output terminals of selected cathode-anode pairs within the discharging heads of the Metal-Fuel Card Discharging Subsystem 115 so that the required output voltage level is produced across the electrical load connected to the FCB system during card discharging operations. In the illustrative embodiment of the present invention, the cathode-anode output terminal configuration mechanism 132 can be realized as one or more electrically-programmable power switching circuits using transistor-controlled technology, wherein the cathode and anode-contacting elements within the discharging heads 124 are connected to the input terminals of the output power regulating subsystem 151. Such switching operations are carried out under the control of the system controller 130 so that the required output voltage is produced across the electrical load connected to the discharging power regulating subsystem 151 of the FCB system.

Cathode-Anode Voltage Monitoring Subsystem within the Metal-Fuel Card Discharging Subsystem As shown in FIGS. 2A31, 2A32 and 2A4, the cathode-anode voltage monitoring subsystem 133 is operably connected to the cathode-anode output terminal configuration subsystem 132 for sensing voltage levels and the like therewithin. This subsystem is also operably connected to the system controller for receiving control signals required to carry out its functions. In the first illustrative embodiment, the cathode-anode voltage monitoring subsystem 133 has two primary functions: to automatically sense the instantaneous voltage level produced across the cathode-anode structures associated with each metal-fuel track being transported through each discharging head during the Discharging Mode; and to produce a (digital) data signal indicative of the sensed voltages for detection, analysis and response by Data Capture and Processing Subsystem 295.

In the first illustrative embodiment of the present invention, the Cathode-Anode Voltage Monitoring Subsystem 133 can be realized using electronic circuitry adapted for sensing voltage levels produced across the cathode-anode structures associated with each metal-fuel track disposed within each discharging heading the Metal-Fuel Card Discharging Subsystem 115. In response to such detected voltage levels, the electronic circuitry can be designed to produce a digital data signals indicative of the sensed voltage levels for detection and analysis by Data Capture and Processing Subsystem 295.

Cathode-Anode Current Monitoring Subsystem within the Metal-Fuel Carol Discharging Subsystem As shown in FIGS. 2A31, 2A32 and 2A4 the cathode-anode current monitoring subsystem 134 is operably connected to the cathode-anode output terminal configuration subsystem 132. The cathode-anode current monitoring subsystem 134 has two primary functions: to automatically sense the magnitude of electrical currents flowing through the cathode-anode pair of each metal-fuel track along each discharging head assembly within the Metal-Fuel Card Discharging Subsystem 115 during the Discharging Mode; and to produce a digital data signal indicative of the sensed current for detection and analysis by Data Capture and Processing Subsystem 295. In the first illustrative embodiment of the present invention, the cathode-anode current monitoring subsystem 134 can be realized using current sensing circuitry for sensing electrical currents flowing through the cathode-anode pairs of each metal-fuel track along each discharging head assembly, and producing digital data signals indicative of the sensed currents. As will be explained in greater detail hereinafter, these detected current levels are used by the system controller in carrying out its discharging power regulation method, and well as creating a "discharging condition history" and metal-fuel availability records for each zone or subsection of discharged metal-fuel card.

Cathode Oxygen Pressure Control Subsystem within the Metal-Fuel Card Discharging Subsystem The function of the cathode oxygen pressure control subsystem is to sense the oxygen pressure ($pO_2$) within each channel of the cathode structure of the discharging heads 124, and in response thereto, control (i.e. increase or decrease) the same by regulating the air ($O_2$) pressure within such cathode structures. In accordance with the present invention, partial oxygen pressure ($pO_2$) within each channel of the cathode structure of each discharging head is maintained at an optimal level in order to allow optimal oxygen consumption within the discharging heads during the Discharging Mode. By maintaining the pO2 level within the cathode structure, power output produced from the discharging heads can be increased in a controllable manner. Also, by monitoring changes in $pO_2$ and producing digital data signals representative thereof for detection and analysis by the system controller, the system controller is provided with a controllable variable for use in regulating the electrical power supplied to the electrical load during the Discharging Mode.

Ion-Concentration Control Subsystem within the Metal-Fuel Card Discharging Subsystem In order to achieve high-energy efficiency during the Discharging Mode, it is necessary to maintain an optimal concentration of (charge-carrying) ions at the cathode-electrolyte interface of each discharging head within the Metal-Fuel card Discharging Subsystem 115. Thus it is the primary function of the ion-concentration control subsystem to sense and modify conditions within the FCB system so that the ion-concentration at the cathode-electrolyte interface within the discharging head is maintained within an optimal range during the Discharge Mode of operation.

In the case where the ionically-conducting medium between the cathode and anode of each track in the discharging head is an electrolyte containing potassium hydroxide (KOH), it will be desirable to maintain its concentration at 6N (~6M) during the Discharging Mode of operation. As the moisture level or relative humidity (RH %) within the cathode structure can significantly affect the concentration of KOH in the electrolyte, it is desirable to regulate the relative humidity at the cathode-electrolyte-anode interface within each discharging head. In the illustrative embodiment, ion-concentration control is achieved in a variety of ways by embedding a miniature solid-state humidity (or moisture) sensor 142 within the cathode support structure (or as close as possible to the anode-cathode interfaces) in order to sense moisture conditions and produce a digital data signal indicative thereof. This digital data signal is supplied to the Data Capture and Processing Subsystem 295 for detection and analysis. In the event that the moisture level drops below the predetermined threshold value set in memory (ROM) within the system controller 130, the system controller automatically generates a control signal supplied to a moisturizing element 143 realizable as a micro-sprinkler structure 143 embodied within the walls of the cathode support structure 121. In the illustrative embodiment, the walls function as water carrying conduits which express water droplets out of holes 144 adjacent the particular cathode elements when water-flow valve 147 and pump 145 are activated by the system controller 130. Under such conditions, water is pumped from reservoir 146 through manifold 148 along conduit 149 and is expressed from holes 144 adjacent the cathode element requiring an increase in moisture level, as sensed by moisture sensor 142. Such moisture-level sensing and control operations ensure that the concentration of KOH within the electrolyte within electrolyte-impregnated strips 155A through 155E is optimally maintained for ion transport and thus power generation.

Discharge Head Temperature Control Subsystem within the Metal-Fuel Card Discharging Subsystem As shown in FIGS. 2A31, 2A32, 2A4 and 2A7 the discharge head temperature control subsystem incorporated within the Metal-Fuel Card Discharging Subsystem 115 of the second illustrative embodiment comprises a number of subcomponents, namely: the system controller 130; solid-state temperature sensors (e.g. thermistors) 290 embedded within each channel of the multi-cathode support structure hereof, as shown in FIG. 2A7; and discharge head cooling device 291, responsive to control signals produced by the system controller 130, for lowering the temperature of each discharging channel to within an optimal temperature range during discharging operations. The discharge head cooling device 291 can be realized using a wide variety of heat-exchanging techniques, including forced-air cooling, water-cooling, and/or refrigerant cooling, each well known in the heat exchanging art. In some embodiments of the present invention, where high levels of electrical power are being generated, it may be desirable to provide a jacket-like structure about each discharge head in order to circulate air, water or refrigerant for temperature control purposes.

Data Capture and Processing Subsystem within the Metal-Fuel Tape Discharging Subsystem In the illustrative embodiment of FIG. 1, Data Capture And Processing Subsystem (DCPS) 295 shown in FIGS. 2A31, 2A32 and 2A4 carries out a number of functions, including, for example: (1) identifying each metal-fuel card immediately before it is loaded within a particular discharging head within the discharging head assembly and producing metal-fuel card identification data representative thereof; (2) sensing (i.e. detecting) various "discharge parameters" within the Metal-Fuel Card Discharging Subsystem existing during the time period that the identified metal-fuel card is loaded within the discharging head assembly thereof; (3) computing one or more parameters, estimates or measures indicative of the amount of metal-oxide produced during card discharging operations, and producing "metal-oxide indicative data" representative of such computed parameters, estimates and/or measures; and (4) recording in the Metal-Fuel Database Management Subsystem 293 (accessible by system controller 130), sensed discharge parameter data as well as computed metal-oxide indicative data both correlated to its respective metal-fuel track/card identified during the Discharging Mode of operation. As will become apparent hereinafter, such recorded information maintained within the Metal-Fuel Database Management Subsystem 293 by Data Capture and Processing Subsystem 295 can be used by the system controller 130 in various ways including, for example: optimally discharging (i.e. producing electrical power from) partially or completely oxidized metal-fuel cards in an efficient manner during the Discharging Mode of operation; and optimally recharging partially or completely oxidized metal-fuel cards in a rapid manner during the Recharging Mode of operation.

During discharging operations, the Data Capture and Processing Subsystem 295 automatically samples (or captures) data signals representative of "discharge parameters" associated with the various subsystems constituting the Metal-Fuel Card Discharging Subsystem 115 described above. These sampled values are encoded as information within the data signals produced by such subsystems during the Discharging Mode. In accordance with the principles of the present invention, card-type "discharge parameters" shall include, but are not limited to: the voltages produced across the cathode and anode structures along particular metal-fuel tracks monitored, for example, by the cathode-anode voltage monitoring subsystem 133; the electrical currents flowing across the cathode and anode structures along particular metal-fuel tracks monitored, for example, by the cathode-anode current monitoring subsystem 134; the oxygen saturation level ($pO_2$) within the cathode structure of each discharging head 124, monitored by the cathode oxygen pressure control subsystem (130, 135, 136, 137, 138, 140); the moisture ($H_2O$) level (or relative humidity) level across or near the cathode-electrolyte interface along particular metal-fuel tracks in particular discharging heads monitored, for example, by the ion-concentration control subsystem (130,142, 145, 146, 147, 148, 149); the temperature (T) of the discharging heads during card discharging operations; and the time duration ($\Delta T$) of the state of any of the above-identified discharge parameters.

In general, there are a number of different ways in which the Data Capture and Processing Subsystem can record card-type "discharge parameters" during the Discharging Mode of operation. These different methods will be detailed hereinbelow.

According to a first method of data recording shown in FIG. 2A9, a unique card identifying code or indicia 171 (e.g. miniature bar code symbol encoded with zone intensifying information) is graphically printed on an "optical" data track 172 realized, for example, as a strip or transparent or reflective film material affixed or otherwise attached along the edge of the metal-fuel card, as shown in FIG. 2A9. This optical data track 172, with its card identifying code recorded therein by printing or photographic techniques, can be formed at the time of manufacture of the multi-track metal-fuel card hereof. The metal-fuel card identifying indicia 171 along the edge of the card is then read by an optical data reader 150 realized using optical techniques (e.g. laser scanning bar code symbol readers, or optical decoders). In the illustrative embodiment, information representative of these unique card identifying codes is encoded within data signals provided to the Data Capture and Processing Subsystem 295, and subsequently recorded within the Metal-Fuel Database Management Subsystem 293 during discharging operations.

According to a second method of data recording shown in FIG. 2A9', a unique digital "card identifying" code 171' is magnetically recorded in a magnetic data track 172' disposed along the edge of the metal-fuel card 112'. This magnetic data track, with card identifying code recorded therein, can be formed at the time of manufacture of the multi-track metal-fuel card hereof. The card identifying indicia along the edge of the card is then read by a magnetic reading head 150' realized using magnetic information reading techniques well known in the art. In the illustrative embodiment, the digital data representative of these unique card identifying codes is encoded within data signals provided to the Data Capture and Processing Subsystem 295, and subsequently recorded within the Metal-Fuel Database Management Subsystem 293 during discharging operations.

According to a third method of data recording shown in FIG. 2A9", a unique digital "card identifying" code is recorded as a sequence of light transmission apertures 171" formed in an optically opaque data track 172" disposed along the edge the metal-fuel card 112". In this aperturing technique, information is encoded in the form of light transmission apertures whose relative spacing and/or width is the means by which information encoding is achieved. This optical data track, with card identifying codes recorded therein, can be formed at the time of manufacture of the multi-track metal-fuel card hereof. The zone identifying indicia 171" along the edge of the card is then read by an optical sensing head 150" realized using optical sensing techniques well known in the art. In the illustrative embodiment, the digital data representative of these unique zone identifying codes is encoded within data signals provided to the Data Capture and Processing Subsystem 295, and subsequently recorded within the Metal-Fuel Database Management Subsystem 293 during discharging operations.

According to a fourth alternative method of data recording, both unique digital "card identifying" code and set of discharge parameters for each track on the identified metal-fuel card are recorded in a magnetic, optical, or apertured data track, realized as a strip attached to the surface of the metal-fuel card of the present invention. The block of information pertaining to a particular metal-fuel card can be recorded in the data track physically adjacent to the related metal-fuel zone facilitating easy access of such recorded information during the Recharging Mode of operation. Typically, the block of information will include the metal-fuel card identification number and a set of discharge parameters, as schematically indicated in FIG. 2A15, which are automatically detected by the Data Capture and Processing Subsystem 295 as the metal-fuel card is loaded within the discharging head assembly 124.

The first and second data recording methods described above have several advantages over the third method described above. In particular, when using the first and second methods, the data track provided along the metal-fuel card can have a very low information capacity. This is because very little information needs to be recorded to tag each metal-fuel card with a unique identifier (i.e. address number or card identification number), to which sensed discharge parameters are recorded in the Metal-Fuel Database Management Subsystem 293. Also, formation of a data track in accordance with the first and second methods should be very inexpensive, as well as providing apparatus for reading card identifying information recorded along such data tracks.

Discharging Power Regulation Subsystem within the Metal-Fuel Card Discharging Subsystem As shown in FIGS. 2A31, 2A32 and 2A4, the input port of the discharging power regulation subsystem 151 is operably connected to the output port, of the cathode-anode output terminal configuration subsystem 132, whereas the output port of the discharging power regulation subsystem 151 is operably connected to the input port of the electrical load 116. While the primary function of the discharging power regulation subsystem is to regulate the electrical power delivered the electrical load during its Discharging Mode of operation (i.e. produced from discharged metal-fuel cards loaded within the discharging heads hereof), the discharging power regulation subsystem 151 has a mode of programmed operation, wherein the output voltage across the electrical load as well as the electrical current flowing across the cathode-electrolyte interface are regulated during discharging operations. Such control functions are managed by the system controller 130 and can be programmably selected in a variety of ways in order to achieve optimal discharging of multi-tracked and single-tracked metal-fuel cards according to the present invention while satisfying dynamic loading requirements.

The discharging power regulating subsystem 151 of the third illustrative embodiment can be realized using solid-state power, voltage and current control circuitry well known in the power, voltage and current control arts. Such circuitry can include electrically-programmable power switching circuits using transistor-controlled technology, in which a current-controlled source is connectable in electrical series with electrical load 116 in order to control the electrical current therethrough in response to control signals produced by the system controller 130 carrying out a particular Discharging Power Control Method. Such electrically-programmable power switching circuits can also include transistor-controlled technology, in which a voltage-controlled source is connectable in electrical parallel with the electrical load in order to control the output voltage therethrough in response to control signals produced by the system controller 130. Such circuitry can be combined and controlled by the system controller 130 in order to provide constant power control across the electrical load.

In the illustrative embodiments of the present invention, the primary function of the discharging power regulation subsystem 151 is to carry out real-time power regulation to the electrical load using any one of the following Discharge Power Control Methods, namely: (1) a Constant Output Voltage/Variable Output Current Method, wherein the output voltage across the electrical load is maintained constant while the current is permitted to vary in response to loading conditions; (2) a Constant Output Current/Variable Output Voltage Method, wherein the current into the electrical load is maintained constant while the output voltage thereacross is permitted to vary in response to loading conditions; (3) a Constant Output Voltage/Constant Output Current Method, wherein the voltage across and current into the load are both maintained constant in response to loading conditions; (4) a Constant Output Power Method, wherein the output power across the electrical load is maintained constant in response to loading conditions; (5) a Pulsed Output Power Method, wherein the output power across the electrical load is pulsed with the duty cycle of each power pulse being maintained in accordance with preset conditions; (6) a Constant Output Voltage/Pulsed Output Current Method, wherein the output current into the electrical load is maintained constant while the current into the load is pulsed with a particular duty cycle; and (7) a Pulsed Output Voltage/Constant Output Current Method, wherein the output power into the load is pulsed while the current thereinto is maintained constant.

In the preferred embodiment of the present invention, each of the seven (7) Discharging Power Regulation Methods are preprogrammed into ROM associated with the system controller 130. Such power regulation methods can be selected in a variety of different ways, including, for example, by manual activation of a switch or button on the system housing, or automatic detection of a physical, electrical, magnetic or optical condition established or detected at the interface between the electrical load and the Metal-Fuel Card Discharging Subsystem 115.

Input/Output Control Subsystem within the Metal-Fuel Card Discharging Subsystem

In some applications, it may be desirable or necessary to combine two or more FCB systems or their Metal-Fuel Card Discharging Subsystems 115 in order to form a resultant system with functionalities not provided by the such subsystems operating alone. Contemplating such applications, the Metal-Fuel Card Discharging Subsystem 115 hereof includes Input/Output Control Subsystem 152 which allows an external system (e.g. microcomputer or microcontroller) to override and control aspects of the Metal-Fuel Card Discharging Subsystem as if its system controller were carrying out such control functions. In the illustrative embodiment, the Input/Output Control Subsystem 152 is realized as a standard IEEE I/O bus architecture which provides an external or remote computer system with a way and means of directly interfacing with the system controller 130 of the Metal-Fuel Card Discharging Subsystem 115 and managing various aspects of system and subsystem operation in a straightforward manner.

System Controller within the Metal-Fuel Card Discharging Subsystem

As illustrated in the detailed description set forth above, the system controller 130 performs numerous operations in order to carry out the diverse functions of the FCB system within its Discharging Mode. In the preferred embodiment of the FCB system of FIG. 1, the system controller 130 is realized using a programmed microcontroller having program and data storage memory (e.g. ROM, EPROM, RAM and the like) and a system bus structure well known in the microcomputing and control arts. In any particular embodiment of the present invention, it is understood that two or more microcontrollers may be combined in order to carry out the diverse set of functions performed by the FCB system hereof. All such embodiments are contemplated embodiments of the system of the present invention.

Discharging Metal-Fuel Cards Within The Metal-Fuel Card Discharging Subsystem

FIG. 2A5 sets forth a high-level flow chart describing the basic steps of discharging metal-fuel cards (i.e. generating electrical power therefrom) using the Metal-Fuel Card Discharging Subsystem shown in FIGS. 2A31 through 2A4.

As indicated at Block A, the Card Loading/Unloading Subsystem 111 transports up to four metal-fuel cards 112 from the card receiving port of the system housing into the card discharging bay of the Metal-Fuel Card Discharging Subsystem. This card transport process is schematically illustrated in FIGS. 2A1 and 2A2. FIG. 2A4 illustrates the state of the subsystem when the metal-fuel cards are loaded within the discharging bay thereof.

As indicated at Block B, the Discharge Head Transport Subsystem 131 arranges the discharging heads about the metal-fuel cards loaded into the discharging bay of the Metal-Fuel Card Discharging Subsystem so that the ionically-conducting medium is disposed between each cathode structure and loaded metal-fuel card.

As indicated at Block C, the Discharge Head Transport Subsystem 131 then configures each discharging head so that its cathode structure is in ionic contact with a loaded metal-fuel card and its anode contacting structure is in electrical contact therewith, as indicated in FIG. 2A4

As indicated at Block D, the cathode-anode output terminal configuration subsystem 132 automatically configures the output terminals of each discharging head arranged about a loaded metal-fuel card, and then the system controller controls the Metal-Fuel Card Discharging Subsystem so that electrical power is generated and supplied to the electrical load 116 at the required output voltage and current levels. When one or more of the loaded metal-fuel cards are discharged, then the Card Loading/Unloading Subsystem 111 automatically ejects the discharged metal-fuel cards out through the discharging bay for replacement with recharged metal-fuel cards.

Figure 6:
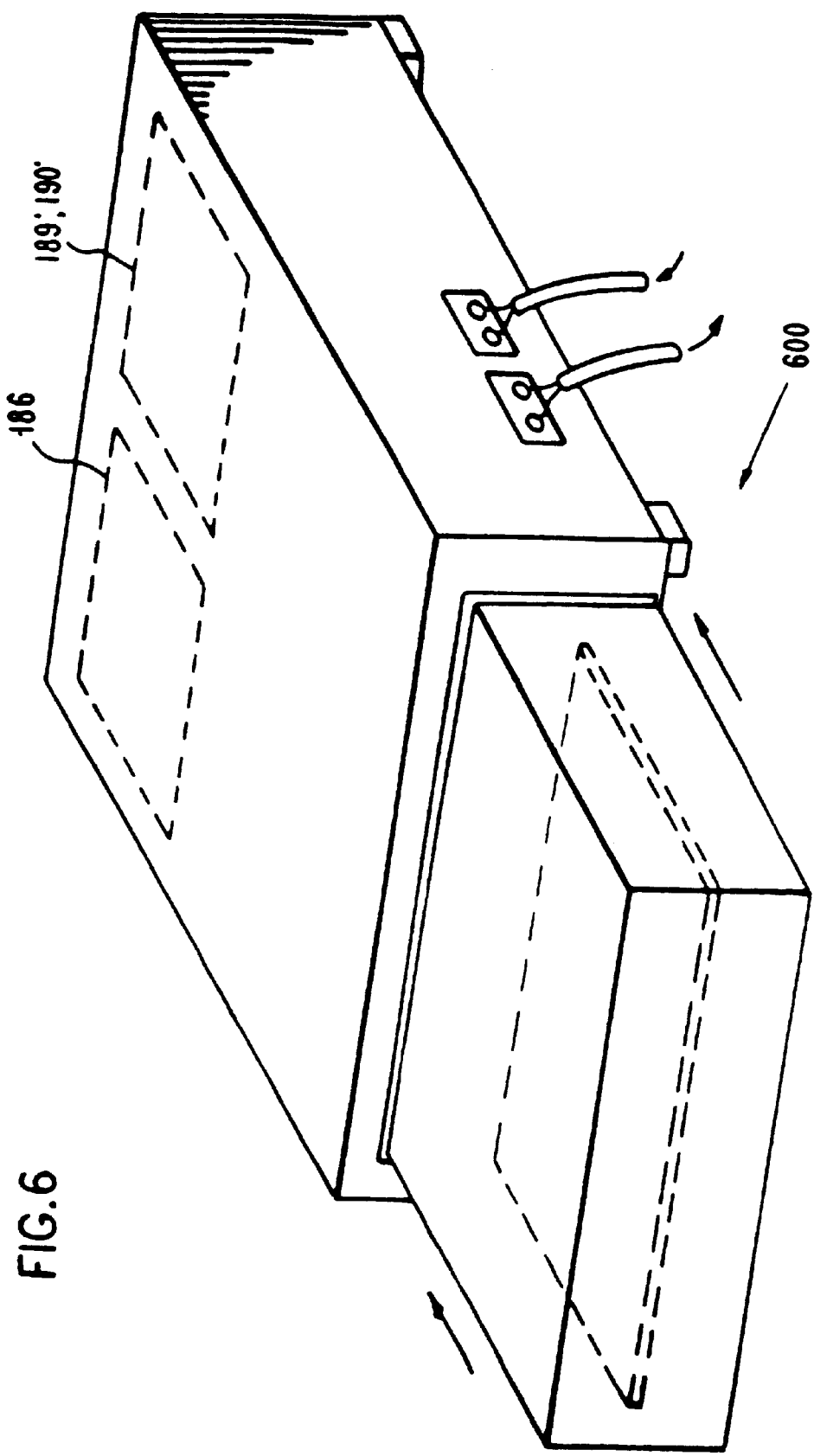

Metal-Fuel Card Recharging Subsystem for the First Illustrative Embodiment of the Metal-Air FCB System of the Present Invention As shown in FIGS. 2B31, 2B32 and 2B4, the Metal-Fuel Card Recharging Subsystem 117 of the first illustrative embodiment comprises a number of subsystems, namely: an assembly of multi-zoned metal-oxide reducing (i.e. recharging) heads 175, each having multi-element cathode structures 121' and anode-contacting structures 124' with electrically-conductive input terminals connectable in a manner to be described hereinbelow; a recharging head transport subsystem 131' for transporting the subcomponents of the recharging head assembly 175 to and from loaded metal-fuel cards; an input power supply subsystem 176 for converting externally supplied AC power signals applied to its input terminal 177 into DC power supply signals having voltages suitable for recharging metal-fuel cards arranged about the recharging heads of the Metal-Fuel Card Recharging Subsystem; a cathode-anode input terminal configuration subsystem 178, for connecting the output terminals (port) of the input power supply subsystem to the input terminals (port) of the cathode and anode-contacting structures of the recharging heads 175, under the control of the system controller 130' so as to supply input voltages thereto for electro-chemically converting metal-oxide formations into its primary metal during the Recharging Mode; a cathode-anode voltage monitoring subsystem 133', connected to the cathode-anode input terminal configuration subsystem 178, for monitoring (i.e. sampling) the voltage applied across cathode and anode of each recharging head 175, and producing (digital) data representative of the sensed voltage level; a cathode-anode current monitoring subsystem 134', connected to the cathode-anode input terminal configuration subsystem 178, for monitoring (e.g. sampling) the current flowing across the cathode-electrolyte interface of each recharging head during the Recharging Mode, and producing digital data representative of the sensed current level; a cathode oxygen pressure control subsystem comprising the system controller 130', solid-state $pO_2$ sensors 135', vacuum chamber (structure) 136' shown in FIGS. 2B7 and 2B8, vacuum pump 137', airflow control device 138', manifold structure 139', and multi-lumen tubing 140' shown in FIGS. 5B3 and 5B4, arranged together as shown for sensing and controlling the pO2 level within the cathode structure of each recharging head; an ion-concentration control subsystem comprising system controller 130', solid-state moisture sensor (hydrometer) 142', moisturizing (e.g. micro-sprinklering element) 143' realized as a micro-sprinkler embodied within the walls structures of the cathode support plate 121' (having water expressing holes 144' disposed along each wall surface as shown in FIG. 2B6), a water pump 145', a water reservoir 146', an electronically-controlled water flow control valve 147', a manifold structure 148' and conduits 149' extending into moisture delivery structure 143', arranged together as shown for sensing and modifying conditions within the FCB system (e.g. the relative humidity at the cathode-electrolyte interface of the recharging heads) so that the ion-concentration at the cathode-electrolyte interface is maintained within an optimal range during the Recharge Mode of operation; recharge head temperature control subsystem comprising the system controller 130', solid-state temperature sensors (e.g. thermistors) 290' embedded within each channel of the multi-cathode support structure 121' hereof, and a recharge head cooling device 291', responsive to control signals produced by the system controller 130', for lowering the temperature of each recharging channel to within an optimal temperature range during recharging operations; a relational-type Metal-. Fuel Database Management Subsystem (MFDMS) 297 operably connected to system controller 130' by way of local system bus 298, and designed for receiving particular types of information devised from the output of various subsystems within the Metal-Fuel Tape Recharging Subsystem 115; a Data Capture and Processing Subsystem (DCPS) 299 , comprising data reading head 180 (180', 180") embedded within or mounted closely to the cathode support structure of each recharging head 175, and a programmed microprocessor-based data processor adapted to receive data signals produced from cathode-anode voltage monitoring subsystem 133', cathode-anode current monitoring subsystem 134', the cathode oxygen pressure control subsystem, the recharge head temperature control subsystem and the ion-concentration control subsystem hereof, and enable (i) the reading metal-fuel card identification data from the loaded metal-fuel card, (ii) the recording sensed recharge parameters and computed metal-fuel indicative data derived therefrom in the Metal-Fuel Database Management Subsystem (MFDMS) 297 using local system bus 300, and (iii) the reading prerecorded discharge parameters and prerecorded metal-oxide indicative data stored in the Metal-Fuel Database Management Subsystem (MFDMS) 297 using local system bus 298; an input (i.e. recharging) power regulation subsystem 181 connected between the output terminals (i.e. port) of the input power supply subsystem 176 and the input terminal (i.e. port) of the cathode-anode input terminal configuration subsystem 178, for regulating the input power (and voltage and/or current characteristics) delivered across the cathode and anode structures of each metal-fuel track being recharged during the Recharging Mode; an input/output control subsystem 152', interfaced with the system controller 130', for controlling all functionalities of the FCB system by way of a remote system or resultant system, within which the FCB system is embedded; and system controller 130', interfaced with system controller 130' within the Metal-Fuel Card Recharging Subsystem 117 by way of a global system bus 303 as shown in FIG. 2B16, and having various means for managing the operation of the above mentioned subsystems during the various modes of system operation. These subsystems will be described in greater technical detail below.

Multi-Track Recharging Head Assembly within the Metal-Fuel Card Recharging Subsystem The function of the assembly of multi-track recharging heads 175 is to electro-chemically reduce metal-oxide formations on the tracks of metal-fuel cards loaded into the recharging bay of the system during the Recharging Mode of operation. In the illustrative embodiment shown in FIGS. 2B7 and 2B8, each recharging head 175 comprises: a cathode element support plate 121' having a plurality of isolated channels 154A' through 154E' permitting the free passage of oxygen (O2) through the bottom portion of each such channel; a plurality of electrically-conductive cathode elements (e.g. strips) 120A' through 120E' for insertion within the lower portion of these channels, respectively; a plurality of electrolyte-impregnated strips 155A' through 155E' for placement over the cathode strips 36, and support within the channels 154A' through 154E', respectively, as shown in FIG. 2B6 and an oxygen-evacuation chamber 136' mounted over the upper (back) surface of the cathode element support plate 121', in a sealed manner, as shown in FIG. 2B7.

As shown in FIGS. 2B31, 2B32, 2B4 and 2B14, each oxygen-evacuation chamber 136' has a plurality of sub-chambers 136A' through 136E' being physically associated with channels 154A' through 154E', respectively. Together, each vacuum subchamber is isolated from all other sub-chambers and is in fluid communication with one channel supporting a cathode element and electrolyte-impregnated element therein. As shown in FIGS. 2B31, 2B32, 2B4 and 2B8, each subchamber is arranged in fluid communication with vacuum pump 137' via one lumen of multi-lumen tubing 140', one channel of manifold assembly 139' and one channel of air-flow switch 138', each of whose operation is controlled by system controller 130'. This arrangement enables the system controller 130' to independently control the pO2 level in each of the oxygen-evacuation subchambers 136A' through 136E' within an optimal range during recharging operations within the recharging head assembly. This operation is carried out by selectively evacuating air from the subchambers through the corresponding air flow channels in the manifold assembly 139'. This arrangement allows the system controller 130' to maintain the $pO_2$ level within an optimal range during recharging operations.

In the illustrative embodiment, electrolyte-impregnated strips 155A' within the discharging head assembly through 155E' are realized by impregnating an electrolyte-absorbing carrier medium with a gel-type electrolyte. Preferably, the electrolyte-absorbing carrier strip is realized as a strip of low-density, open-cell foam material made from PET plastic. The gel-electrolyte for each discharging cell is made from a formula consisting of an alkali solution (e.g. KOH), a gelatin material, water, and additives known in the art.

In the illustrative embodiment, each cathode strip is made from a sheet of nickel wire mesh 156' coated with porous carbon material and granulated platinum or other catalysts 157' to form a cathode suitable for use in the recharging heads in metal-air FCB system. Details of cathode construction are disclosed in U.S. Pat. Nos. 4,894,296 and 4,129,633, incorporated herein by reference. To form a current collection pathway, an electrical conductor 158' is soldered to the underlying wire mesh sheet 156' of each cathode strip. As shown in FIG. 2B7, each electrical conductor 158' is passed through a hole 159' formed in the bottom surface of each channel 154A1 through 154E' of the cathode support plate 121', and is connected to the input terminals of the cathode-anode input terminal configuration subsystem 178. As shown, the cathode strip is pressed into the lower portion of the channel to secure the same therein. As shown in FIG. 2B7, the bottom surface of each channel has numerous perforations 160' formed therein to allow the evacuation of oxygen away from the cathode-electrolyte interface, and out towards the vacuum pump 137' during recharging operations. In the illustrative embodiment, electrolyte-impregnated strips 155A' through 155E' are placed over cathode strips 120A' through 120E', respectively, and are secured within the upper portions of the corresponding cathode supporting channels. As best shown in FIGS. 2B13 and 2B14 when the cathode strips and thin electrolyte strips are mounted in their respective channels in the cathode support plate 121', the outer surface of each electrolyte-impregnated strip is disposed flush with the upper surface of the plate defining the channels.

Hydrophobic agents are added to the carbon material constituting the oxygen-pervious cathode elements in order to repel water therefrom. Also, the interior surfaces of the cathode support channels are coated with a hydrophobic film (e.g. Teflon) 161 to ensure the expulsion of water within electrolyte-impregnated strips 155A' through 155E' and thus achieve optimum oxygen transport across the cathode strips during the Recharging Mode. Preferably, the cathode support plate 121' is made from an electrically non-conductive material, such as polyvinyl chloride (PVC) plastic material well known in the art. The cathode support plate 121' and evacuation chamber 136' can be fabricated using injection molding technology also well known in the art.

In order to sense the partial oxygen pressure ($pO_2$) within the cathode structure during the Recharging Mode, for use in effective control of metal-oxide reduction within the recharging heads, a solid-state $pO_2$ sensor 135' is embedded within each channel of the cathode support plate 121', as illustrated in FIG. 2B7, and operably connected to the system controller as an information input devices thereto. In the illustrative embodiment, each $pO_2$ sensor can be realized using well-known $pO_2$ sensing technology employed to measure (in vivo) $pO_2$ levels in the blood of humans. Such prior art sensors employ miniature diodes which emit electro-magnetic radiation at different wavelengths that are absorbed at different levels in the presence of oxygen in the blood, and such information can be processed and analyzed to produce a computed measure of pO2 in a reliable manner, as taught in U.S. Pat. No. 5,190,038 and references cited therein, each being incorporated hereinby reference. In the present invention, the characteristic wavelengths of the light emitting diodes can be selected so that similar sensing functions are carried out within the structure of the cathode in each recharging head, in a straightforward manner.

FIG. 2B9 shows a section of multi-tracked fuel card 112 which has undergone partial discharge and thus has metal-oxide formations along the metal-fuel tracks thereof. Notably, this partially-discharged metal-fuel card shown in FIG. 2A9 and described above requires recharging within the Metal-Fuel Card Recharging Subsystem 117 of the FCB system of FIG. 1.

In FIG. 2B10, an exemplary metal-fuel (anode) contacting structure 122' is disclosed for use with the cathode structure shown in FIGS. 2B7 and 2B8. As shown, a plurality of electrically conductive elements 168A' through 168E' are supported from an platform 169' disposed adjacent the travel of the fuel card within the card. Each conductive element 168A' through 168E' has a smooth surface adapted for slidable engagement with one track of metal-fuel through the fine grooves formed in the base layer of the fuel card. Each conductive element is connected to an electrical conductor which is connected to the output port of the cathode-anode input terminal configuration subsystem 178. The platform 169' is operably associated with the recharging head transport subsystem 131' and can be designed to be moved into position with the metal-fuel card during the Recharging Mode of the system, under the control of the system controller 130'.

Notably, the use of multiple recharging heads 175, as shown in the illustrative embodiments hereof, rather than a single recharging head, allows discharged metal-fuel cards to be recharged more quickly using lower recharging currents, thereby minimizing heat build-up across the individual recharging heads. This feature of the Metal-Fuel Card Recharging Subsystem 117 extends the service life of the cathodes employed within the recharging heads thereof.

Recharging Head Transport Subsystem within the Metal-Fuel Card Recharging Subsystem The primary function of the recharging head transport subsystem 131' is to transport the assembly of recharging heads 175 to and from the metal-fuel cards. 112 loaded into the recharging bay of the subsystem as shown in FIGS. 2B31, 2B32 and 2B4. When properly transported, the cathode and anode-contacting structures of the recharging heads are brought into "ionically-conductive" and "electrically-conductive" contact with the metal-fuel tracks of loaded metal-fuel card during the Recharging Mode.

The recharging head transport subsystem 131' can be realized using any one of a variety of electro-mechanical mechanisms capable of transporting the cathode supporting structure 121' and anode-contacting structure 124' of each recharging head away from the metal-fuel card 112, as shown in FIGS. 2B31 and 2B32, and about the metal-fuel card as shown in FIG. 2B4. As shown, these transport mechanisms are operably connected to system controller 130' and controlled by the same in accordance with the system control program carried out thereby.

Input Power Supply Subsystem within the Metal-Fuel Card Recharging Subsystem

In the illustrative embodiment, the primary function of the Input Power Supply Subsystem 176 is to receive as input, standard alternating current (AC) electrical power (e.g. at 120 or 220 Volts) through an insulated power cord, and to convert such electrical power into regulated direct current (DC) electrical power at a regulated voltage required at the recharging heads 175 of the Metal-Fuel Card Recharging Subsystem 117 during the recharging mode of operation. For zinc anodes and carbon cathodes, the required "open-cell" voltage $v_{acr}$ across each anode-cathode structure during recharging is about 2.2–2.3 Volts in order to sustain electrochemical reduction. This subsystem can be realized in various ways using power conversion and regulation circuitry well known in the art.

Cathode-Anode Input Terminal Configuration Subsystem within the Metal-Fuel Card Recharging Subsystem As shown in FIGS. 5B31, 5B32 and 5B4, the cathode-anode input terminal configuration subsystem 178 is connected between the output terminals of the recharging power regulation subsystem 181 and the input terminals of the cathode-anode pairs associated with multiple tracks of the recharging heads 175. The system controller 130' is operably connected to cathode-anode input terminal configuration subsystem 178 in order to supply control signals thereto for carrying out its functions during the Recharge Mode of operation.

The function of the cathode-anode input terminal configuration subsystem 178 is to automatically configure (in series or parallel) the input terminals of selected cathode-anode pairs within the recharging heads of the Metal-Fuel Card Recharging Subsystem 117 so that the required input (recharging) voltage level is applied across cathode-anode structures of metal-fuel tracks requiring recharging. In the illustrative embodiment of the present invention, the cathode-electrolyte input terminal configuration mechanism 178 can be realized as one or more electrically-programmable power switching circuits using transistor-controlled technology, wherein the cathode and anode-contacting elements within the recharging heads 175 are connected to the output terminals of the input power regulating subsystem 181. Such switching operations are carried out under the control of the system controller 130' so that the required output voltage produced by the input power regulating subsystem 181 is applied across the cathode-anode structures of metal-fuel tracks requiring recharging.

Cathode-Anode Voltage Monitoring Subsystem within the Metal-Fuel Card Recharging Subsystem As shown in FIGS. 2B31, 2B32 and 2B4, the cathode-anode voltage monitoring subsystem 133' is operably connected to the cathode-anode input terminal configuration subsystem 178 for sensing voltage levels across the cathode and anode structures connected thereto. This subsystem is also operably connected to the system controller 130' for receiving control signals therefrom required to carry out its functions. In the first illustrative embodiment, the cathode-anode voltage monitoring subsystem 133' has two primary functions: to automatically sense the instantaneous voltage levels applied across the cathode-anode structures associated with each metal-fuel track being transported through each recharging head during the Recharging Mode; and to produce (digital) data signals indicative of the sensed voltages for detection and analysis by the Data Capture and Processing Subsystem 299.

In the first illustrative embodiment of the present invention, the cathode-anode voltage monitoring subsystem 133' can be realized using electronic circuitry adapted for sensing voltage levels applied across the cathode-anode structures associated with each metal-fuel track transported through each recharging head within the Metal-Fuel Card Recharging Subsystem 117. In response to such detected voltage levels, the electronic circuitry can be designed to produce a digital data signals indicative of the sensed voltage levels for detection and analysis by the Data Capture and Processing Subsystem 299. As will be described in greater detail hereinafter, such data signals can be used by the system controller to carry out its recharging power regulation method during the Recharging Mode of operation.

Cathode-Anode Current Monitoring Subsystem within the Metal-Fuel Card Recharging Subsystem As shown in FIGS. 2B31, 2B32 and 5B4, the cathode-electrolyte current monitoring subsystem 134' is operably connected to the cathode-anode input terminal configuration subsystem 178. The cathode-anode current monitoring subsystem 134' has two primary functions: to automatically sense the magnitude of electrical current flowing through the cathode-anode pair of each metal-fuel track along each recharging head assembly within the Metal-Fuel Card Recharging Subsystem 117 during the discharging mode; and to produce digital data signal indicative of the sensed currents for detection and analysis by Data Capture and Processing Subsystem 299.

In the first illustrative embodiment of the present invention, the cathode-anode current monitoring subsystem 134' can be realized using current sensing circuitry for sensing the electrical current passed through the cathode-anode pair of each metal-fuel track (i.e. strip) along each recharging head assembly, and producing digital data signals indicative of the sensed current levels. As will be explained in greater detail hereinafter, these detected current levels can be used by the system controller in carrying out its recharging power regulation method, and well as creating a "recharging condition history" information file for each zone or subsection of recharged metal-fuel card.

Cathode Oxygen Pressure Control Subsystem within the Metal-Fuel Card Recharging Subsystem The function of the cathode oxygen pressure ($pO_2$) control subsystem is to sense the oxygen pressure ($pO_2$) within each subchannel of the cathode structure of the recharging heads 175, and in response thereto, control (i.e. increase or decrease) the same by regulating the air ($O_2$) pressure within the subchannels of such cathode structures. In accordance with the present invention, partial oxygen pressure ($pO_2$) within each subchannel of the cathode structure of each recharging head is maintained at an optimal level in order to allow optimal oxygen evacuation from the recharging heads during the Recharging Mode. By lowering the $pO_2$ level within each channel of the cathode structure (by evacuation), metal-oxide along metal-fuel cards can be completely recovered with optimal use of input power supplied to the recharging heads during the Recharging Mode. Also, by monitoring changes in $pO_2$ and producing digital data signals representative thereof for detection and analysis by Data Capture and Processing Subsystem 299 and ultimate response the system controller 130'. Thus the system controller 130' is provided with a controllable variable for use in regulating the electrical power supplied to the discharged fuel tracks during the Recharging Mode.

Ion-Concentration Control Subsystem within the Metal-Fuel Card Recharging Subsystem To achieve high-energy efficiency during the Recharging Mode, it is necessary to maintain an optimal concentration of (charge-carrying) ions at the cathode-electrolyte interface of each recharging head 175 within the Metal-Fuel Card Recharging Subsystem 117 Also, the optimal ion-concentration within the Metal-Fuel Card Recharging Subsystem 117 may be different than that required within the Metal-Fuel Card Discharging Subsystem 115. For this reason, in particular applications of the FCB system hereof, it may be desirable and/or necessary to provide a separate ion-concentration control subsystem within the Metal-Fuel Card Recharging Subsystem 117. The primary function of such an ion-concentration control subsystem within the Metal-Fuel Card Recharging Subsystem 117 would be to sense and modify conditions therewithin so that the ion-concentration at the cathode-electrolyte interface of the recharging heads is maintained within an optimal range during the Recharging Mode of operation.

In the illustrative embodiment of such a subsystem, ion-concentration control is achieved by embedding a miniature solid-state humidity (or moisture) sensor 142' within the cathode support structure 121' as shown in FIG. 2B7 (or as close as possible to the anode-cathode interfaces) in order to sense moisture or humidity conditions therein and produce a digital data signal indicative thereof. This digital data signal is supplied to the Data Capture and Processing Subsystem 299 for detection and analysis. In the event that the moisture level or relative humidity drops below the predetermined threshold value set in memory (ROM) within the system controller, the system controller 130', monitoring information in the Metal-Fuel Database Management Subsystem 297 automatically generates a control signal supplied to a moisturizing element, realizable as a micro-sprinkling structure 143' embodied within the walls of the cathode support structure 121'. In the illustrative embodiment, the walls function as water carrying conduits which express fine water droplets out of micro-sized holes 144 in a manner similar to that carried out in the cathode support structure 121 in the discharge heads. Thus the function of the pump 145', reservoir 146', flow-control valve 147', manifold 148' and multi-lumen tubing 149' is similar to pump 145, reservoir 146, flow-control valve 147, manifold 148 and multi-lumen tubing 149, respectively.

Such operations will increase the moisture level or relative humidity within the interior of the cathode support structure channels and thus ensure that the concentration of KOH within the electrolyte within electrolyte-impregnated strips supported therewithin is optimally maintained for ion transport and thus metal-oxide reduction during card recharging operations.

Data Capture and Processing Subsystem within the Metal-Fuel Tape Recharging Subsystem In the illustrative embodiment of FIG. 1, Data Capture And Processing Subsystem (DCPS) 299 shown in FIGS. 2B31, 2B32, and 2B4 carries out a number of functions, including, for example: (1) identifying each metal-fuel card immediately before it is loaded within a particular recharging head within the recharging head assembly and producing metal-fuel card identification data representative thereof; (2) sensing (i.e. detecting) various "recharge parameters" within the Metal-Fuel Card Recharging Subsystem existing during the time period that the identified metal-fuel card is loaded within the recharging head assembly thereof; (3) computing one or more parameters, estimates or measures indicative of the amount of metal-fuel produced during card recharging operations, and producing "metal-fuel indicative data" representative of such computed parameters, estimates and/or measures; and (4) recording in the Metal-Fuel Database Management Subsystem 297 (accessible by system controller 130'), sensed recharge parameter data as well as computed metal-fuel indicative data both correlated to its respective metal-fuel track/card identified during the Recharging Mode of operation. As will become apparent hereinafter, such recorded information maintained within the Metal-Fuel Database Management Subsystem 297 by Data Capture and Processing Subsystem 299 can be used by the system controller 130' in various ways including, for example: optimally recharging partially or completely oxidized metal-fuel cards in a rapid manner during the Recharging Mode of operation.

During recharging operations, the Data Capture and Processing Subsystem 299 automatically samples (or captures) data signals representative of "recharge parameters" associated with the various subsystems constituting the Metal-Fuel Card Recharging Subsystem 117 described above. These sampled values are encoded as information within the data signals produced by such subsystems during the Recharging Mode. In accordance with the principles of the present invention, card type "recharge parameters" shall include, but are not limited to: the voltages produced across the cathode and anode structures along particular metal-fuel tracks monitored, for example, by the cathode-anode voltage monitoring subsystem 133'; the electrical currents flowing through the cathode and anode structures along particular metal-fuel tracks monitored, for example, by the cathode-anode current monitoring subsystem 134'; the oxygen saturation level ($pO_2$) within the cathode structure of each recharging head 175, monitored by the cathode oxygen pressure control subsystem (130', 135', 136', 137', 138', 140'); the moisture ($H_2O$) level (or relative humidity) level across or near the cathode-electrolyte interface along particular metal-fuel tracks in particular recharging heads monitored, for example, by the ion-concentration control subsystem (130',142', 145', 146', 147', 148', 149'); the temperature ($T_r$) of the recharging heads during card recharging operations; and the time duration ($\Delta T_r$) of the state of any of the above-identified recharge parameters.

In general, there a number of different ways in which the Data Capture and Processing Subsystem 299 can record card-type "recharge parameters" during the Recharging Mode of operation. These different methods will be detailed hereinbelow.

According to a first method of data recording shown in FIG. 2B9, card identifying code or indicia (e.g. miniature bar code symbol encoded with zone intensifying information) 171 graphically printed on "optical" data track 172, can be read by optical data reader 180 realized using optical techniques (e.g. laser scanning bar code symbol readers, or optical decoders) well known in the art. In the illustrative embodiment, information representative of these unique card identifying codes is encoded within data signals provided to the Data Capture and Processing Subsystem 299, and subsequent recorded within the Metal-Fuel Database Management Subsystem 297 during recharging operations.

According to a second method of data recording shown in FIG. 2B9', digital "card identifying" code 171' magnetically recorded in a magnetic data track 172', can be read by magnetic reading head 180' realized using magnetic information reading techniques well known in the art. In the illustrative embodiment, the digital data representative of these unique card identifying codes is encoded within data signals provided to the Data Capture and Processing Subsystem 299, and subsequent recorded within the Metal-Fuel Database Management Subsystem 297 during recharging operations.

According to a third method of data recording shown in FIG. 2A9", digital "card identifying" code 171" (recorded as a sequence of light transmission apertures in an optically opaque data track 172"), can be read by an optical sensing head 180" realized using optical sensing techniques well known in the art. In the illustrative embodiment, the digital data representative of these unique zone identifying codes is encoded within data signals provided to the Data Capture and Processing Subsystem 299, and subsequent recorded within the Metal-Fuel Database Management Subsystem 297 during recharging operations.

According to a fourth alternative method of data recording, both the unique digital "card identifying" code and set of recharge parameters for each track on the identified metal-fuel card are recorded in a magnetic, optical, or apertured data track, realized as a strip attached to the surface of the metal-fuel card of the present invention. The block of information pertaining to a particular metal-fuel card can be recorded in the data track physically adjacent the related metal-fuel zone facilitating easily access of such recorded information during the Recharging Mode of operation. Typically, the block of information will include the metal-fuel card identification number and a set of recharge parameters, as schematically indicated in FIG. 2B16, which are automatically detected by the Data Capture and Processing Subsystem 299 as the metal-fuel card is loaded within the recharging head assembly 175.

The first and second data recording methods described above have several advantages over the third method described above. In particular, when using the first and second methods, the data track provided along the metal-fuel card can have a very low information capacity. This is because very little information needs to be recorded to tag each metal-fuel card with a unique identifier (i.e. address number or card identification number), to which sensed recharge parameters are recorded in the Metal-Fuel Database Management Subsystem 297. Also, formation of a data track in accordance with the first and second methods should be very inexpensive, as well as providing apparatus for reading card identifying information recorded along such data tracks.

Input/Output Control Subsystem within the Metal-Fuel Card Recharging Subsystem

In some applications, it may be desirable or necessary to combine two or more FCB systems or their Metal-Fuel Card Recharging Subsystems in order to form a resultant system with functionalities not provided by the such subsystems operating alone. Contemplating such applications, the Metal-Fuel Card Recharging Subsystem 117 hereof includes an Input/Output Control Subsystem 117 which allows an external system (e.g. microcomputer or microcontroller) to override and control aspects of the Metal-Fuel Card Recharging Subsystem as if its system controller 130' were carrying out such control functions. In the illustrative embodiment, the Input/Output Control Subsystem 152' is realized as a standard IEEE I/O bus architecture which provides an external or remote computer system with a way and means of directly interfacing with the system controller 130' of the Metal-Fuel Card Recharging Subsystem 117 and managing various aspects of system and subsystem operation in a straightforward manner.

Recharging Power Regulation Subsystem within the Metal-Fuel Card Recharging Subsystem As shown in FIGS. 2B31, 2B32 and 2B4, the output port of the recharging power regulation subsystem 181 is operably connected to the input port of the cathode-anode input terminal configuration subsystem 178, whereas the input port of the recharging power regulation subsystem 181 is operably connected to the output port of the input power supply 176. While the primary function of the recharging power regulation subsystem 181 is to regulate the electrical power supplied the to metal-fuel card during the Recharging Mode of operation, the recharging power regulation subsystem 181 can also regulate the voltage applied across the cathode-anode structures of the metal-fuel tracks, as well as the electrical currents flowing through the cathode-electrolyte interfaces thereof during recharging operations. Such control functions are managed by the system controller 130' and can be programmably selected in a variety of ways in order to achieve optimal recharging of multi-tracked and single-tracked metal-fuel cards according to the present invention.

The recharging power regulating subsystem 181 can be realized using solid-state power, voltage and current control circuitry well known in the power, voltage and current control arts. Such circuitry can include electrically-programmable power switching circuits using transistor-controlled technology, in which one or more current-controlled sources are connectable in electrical series with the cathode and anode structures in order to control the electrical currents therethrough in response to control signals produced by the system controller carrying out a particular Recharging Power Control Method. Such electrically-programmable power switching circuits can also include transistor-controlled technology, in which one or more voltage-controlled sources are connectable in electrical parallel with the cathode and anode structures in order to control the voltage thereacross in response to control signals produced by the system controller. Such circuitry can be combined and controlled by the system controller 130' in order to provide constant power (and/or voltage and/or current) control across the cathode-anode structures of the metal-fuel card 112.

In the illustrative embodiments of the present invention, the primary function of the recharging power regulation subsystem 181 is to carry out real-time power regulation to the cathode/anode structures of metal-fuel card using any one of the following Recharge Power Control Methods, namely: (1) a Constant Input Voltage/Variable Input Current Method, wherein the input voltage applied across each cathode-anode structure is maintained constant while the current therethrough is permitted to vary; (2) a Constant Input Current/Variable Input Voltage Method, wherein the current into each cathode-anode structure is maintained constant while the output voltage thereacross is permitted to vary; (3) a Constant Input Voltage/Constant Input Current Method, wherein the voltage applied across and current into each cathode-anode structure during recharging are both maintained constant; (4) a Constant Input Power Method, wherein the input power applied across each cathode-anode structure during recharging is maintained constant; (5) a Pulsed Input Power Method, wherein the input power applied across each cathode-anode during recharging pulsed with the duty cycle of each power pulse being maintained in accordance with preset or dynamic conditions; (6) a Constant Input Voltage/Pulsed Input Current Method, wherein the input current into each cathode-anode structure during recharging is maintained constant while the current into the cathode-anode structure is pulsed with a particular duty cycle; and (7) a Pulsed Input Voltage/Constant Input Current Method, wherein the input power supplied to each cathode-anode structure during recharging is pulsed while the current thereinto is maintained constant.

In the preferred embodiment of the present invention, each of the seven (7) Recharging Power Regulation Methods are preprogrammed into ROM associated with the system controller 130'. Such power regulation methods can be selected in a variety of different ways, including, for example, by manually activating a switch or button on the system housing, or by automatic detection of a physical, electrical, magnetic and/or optical condition established or detected at the interface between the metal-fuel card device and the Metal-Fuel Card Recharging Subsystem 117.

System Controller within the Metal-Fuel Card Recharging Subsystem

As illustrated in the detailed description set forth above, the system controller 130' performs numerous operations in order to carry out the diverse functions of the FCB system within its Recharging Mode. In the preferred embodiment of the FCB system of FIG. 1, the subsystem used to realize the system controller 130' in the Metal-Fuel Card Recharging Subsystem 117 is the same subsystem used to realize the system controller 130 in the Metal-Fuel Card Discharging Subsystem 115. It is understood, however, the system controllers employed in the Discharging and Recharging Subsystems can be realized as separate subsystems, each employing one or more programmed microcontrollers in order to carry out the diverse set of functions performed by the FCB system hereof. In either case, the input/output control subsystem of one of these subsystems can be designed to be the primary input/output control subsystem, within which one or more external subsystems (e.g. a management subsystem) can be interfaced to enable external and/or remote management of the functions carried out within FCB system hereof.

Recharging Metal-Fuel Cards within the Metal-Fuel Card Recharging Subsystem

FIG. 2B5 sets forth a high-level flow chart describing the basic steps of recharging metal-fuel cards within the Metal-Fuel Card Recharging Subsystem 117 shown in FIGS. 2B31, 2B32 through 2B4.

As indicated at Block A, the Card Loading/Unloading Subsystem 111' transports four metal-fuel cards into the card recharging bays of the Metal-Fuel Card Recharging Subsystem 117.

As indicated at Block B, the Recharge Head Transport Subsystem 131' arranges the recharging heads about the metal-fuel cards loaded into the recharging bay of the Metal-Fuel Card Recharging Subsystem 117 so that the ionically-conducting medium is disposed between each cathode structure and loaded metal-fuel card.

As indicated at Block C, the Recharge Head Transport Subsystem 131' then configures each recharging head 175 so that its cathode structure is in ionic contact with a loaded metal-fuel card 112 and its anode contacting structure is in electrical contact therewith.

As indicated at Block D, the cathode-anode input terminal configuration subsystem 178 automatically configures the input terminals of each recharging head arranged about a loaded metal-fuel card, and then the system controller controls the Metal-Fuel Card Recharging Subsystem 117 so that electrical power is supplied to the cathode-anode structures of the recharging heads loaded with metal-fuel cards, at the required recharging voltages and currents. When one or more of the loaded metal-fuel cards are recharged, then the Card Loading/Unloading Subsystem 111 automatically ejects the recharged metal-fuel cards out through the recharging bay for replacement with discharged metal-fuel cards.

Managing Metal-Fuel Availability and Metal-Oxide Presence within the First Illustrative Embodiment of the Metal-Air FCB System of the Present Invention During the Discharging Mode:

In the FCB system of the first illustrative embodiment shown in FIG. 1, means are provided for automatically managing the metal-fuel availability within the Metal-Fuel Card Discharging Subsystem 115 during discharging operations. Such system capabilities will be described in greater detail hereinbelow.

As shown in FIG. 2B16, data signals representative of discharge parameters (e.g., $i_{acd}$, $v_{acd}$, ..., $pO_{2d}$, $H_2O_d$, $T_{acd}$, $v_{acr}/i_{acr}$) are automatically provided as input to the Data Capture and Processing Subsystem 295 within the Metal-Fuel Card Discharging Subsystem 115. After sampling and capturing, these data signals are processed and converted into corresponding data elements and then written into an information structure 301 as shown, for example, in FIG. 2A15. Each information structure 301 comprises a set of data elements which are "time-stamped" and related (i.e. linked) to a unique metal-fuel card identifier 171 (171', 171"), associated with a particular metal-fuel card. The unique metal-fuel card identifier is determined by data reading head 150 (150', 150") shown in FIG. 2A6. Each time-stamped information structure is then recorded within the Metal-Fuel Database Management Subsystem 293 within the Metal-Fuel Card Discharging Subsystem 115, for maintenance, subsequent processing and/or access during future recharging and/or discharging operations.

As mentioned hereinabove, various types of information are sampled and collected by the Data Capture and Processing Subsystem 295 during the discharging mode. Such information types include, for example: (1) the amount of electrical current ($i_{acd}$) discharged across particular cathode-anode structures within particular discharge heads; (2) the voltage generated across each such cathode-anode structure; (3) the oxygen concentration ($pO_{2d}$) level in each subchamber within each discharging head; (4) the moisture level ($H_2O_d$) near each cathode-electrolyte interface within each discharging head; and (5) the temperature ($T_{acd}$) within each channel of each discharging head. From such collected information, the Data Capture and Processing Subsystem 295 can readily compute (i) the time ($\Delta T_d$) duration that electrical current was discharged across a particular cathode-anode structure within a particular discharge head.

The information structures produced by the Data Capture and Processing Subsystem 295 are stored within the Metal-Fuel Database Management Subsystem 293 on a real-time basis and can be used in a variety of ways during discharging operations. For example, the above-described current ($i_{acd}$) and time ($\Delta T_d$) information is conventionally measured in Amperes and Hours, respectively. The product of these measures, denoted by "AH", provides an approximate measure of the electrical charge (−Q) that has been "discharged" from the metal-air fuel cell battery structures along the metal-fuel card. Thus the computed "AH" product provides an accurate amount of metal-oxide that one can expect to have been formed on a particular track of an identified (i.e. labelled) metal-fuel card at a particular instant in time, during discharging operations.

When used with historical information about metal oxidation and reduction processes, the Metal-Fuel Database Management Subsystems 293 and 297 within the Metal- Fuel Card Discharging and Recharging Subsystems 115 and 117, respectively, can account for or determine how much metal-fuel (e.g. zinc) should be available for discharging (i.e. producing electrical power) from a particular zinc-fuel card, or how much metal-oxide is present for reducing therealong. Thus such information can be very useful in carrying out metal-fuel management functions including, for example, determination of metal-fuel amounts available along a particular metal-fuel zone.

In the illustrative embodiment, metal-fuel availability is managed within the Metal-Fuel Card Discharging Subsystem 115, using the method of metal-fuel availability management described hereinbelow.

Preferred Method of Metal-Fuel Availability Management During Discharging Operations In accordance with the principles of the present invention, the data reading head 150 (150', 150') automatically identifies each metal-fuel card as it is loaded within the discharging assembly and produces card identification data indicative thereof which is supplied to the Data Capture and Processing Subsystem within the Metal-Fuel Card Discharging Subsystem 115. Upon receiving card identification data on the loaded metal-fuel card, the Data Capture and Processing Subsystem automatically creates an information structure (i.e. data file) on the card, for storage within the Metal-Fuel Database Management Subsystem 293. The function of the information structure is to record current (up-to-date) information, on sensed discharging parameters, the metal-fuel availability state, metal-oxide presence state, and the like, as shown in FIG. 2A15. In the event that an information storage structure has been previously created for this particular metal-fuel card within the Metal-Fuel Database Management Subsystem, this information file is accessed from Database Subsystem 293 for updating. As shown in FIG. 2A15 for each identified metal-fuel card, an information structure 285 is maintained for each metal-fuel track ($MFT_j$), at each sampled instant of time $t_i$.

Once an information structure has been created (or found) for a particular metal-fuel card, the initial state or condition of each metal-fuel track thereon must be determined and entered within the information structure maintained within the Metal-Fuel Database Management Subsystem 293. Typically, the metal-fuel card loaded within the discharging head assembly will be partially or fully charged, and thus containing a particular amount of metal-fuel along its tracks. For accurate metal-fuel management, these initial metal-fuel amounts in the loaded card must be determined and then information representative stored within the Metal-Fuel Database Management Subsystems of the Discharging and Recharging Subsystems 115 and 117, respectively. In general, initial states of information can be acquired in a number of different ways, including for example: by encoding such initialization information on the metal-fuel card prior to completing a discharging operation on a different FCB system; by prerecording such initialization information within the Metal-Fuel Database Management Subsystem 293 during the most recent discharging operation carried out in the same FCB system; by recording within the Metal-Fuel Database Management Subsystem 293 (at the factory), the actual (known) amount of metal-fuel present on each track of a particular type metal-fuel card, and automatically initializing such information within a particular information structure upon reading a code on the metal-fuel card using data reading head 150 (150', 150"); by actually measuring the initial amount of metal-fuel on each metal-fuel track using the metal-oxide sensing assembly described above in conjunction with the cathode-anode output terminal configuration subsystem 132; or by any other suitable technique.

Prior to conducting discharging operations on the loaded fuel card, the actual measurement technique mentioned above can be carried out by configuring metal-oxide sensing drive circuitry with the cathode-anode output terminal configuration subsystem 132 and Data Capture and Processing Subsystem 295 within the Discharging Subsystem 115. Using this arrangement, the metal-oxide sensing heads can automatically acquire information on the "initial" state of each metal-fuel track on each identified metal-fuel card loaded within the discharging head assembly. Such information would include the initial amount of metal-oxide and metal-fuel present on each track at the time of loading, denoted by "$t_0$".

In a manner similar to that described in connection with the FCB system of FIG. 1, such metal-fuel/metal-oxide measurements are carried out on each metal-fuel track of the loaded card by automatically applying a test voltage across a particular track of metal fuel, and detecting the electrical which flows across the section of metal-fuel track in response the applied test voltage. The data signals representative of the applied voltage ($v_{applied}$) and response current ($i_{response}$) at a particular sampling period are automatically detected by the Data Capture and Processing Subsystem 295 and processed to produce a data element representative of the ratio of the applied test voltage to response current with appropriate numerical scaling. This data element is proportional to $v_{applied}/i_{response}$ automatically recorded within the information structure (i.e. file) linked to the identified metal-fuel card maintained in the Metal-Fuel Data Management Subsystem, 293. As this data element (v/i) provides a direct measure of electrical resistance across the metal-fuel track under measurement, it can be accurately correlated to a measured amount of metal-oxide present on the identified metal-fuel track.

Data Capture and Processing Subsystem 295 then quantifies the measured initial metal-oxide amount (available at initial time instant $t_0$), and designates it as $MOA_0$ for recording within the information structure (shown in FIG. 2A15). Then using a priori information about the maximum metal-fuel available on each track when fully (re)charged, the Data Capture and Processing Subsystem 295 computes an accurate measure of metal-fuel available on each track at time "$t_0$", for each fuel track, designates each measures as $MFA_0$ and records these initial metal-fuel measures $\{MFA_0\}$ for the identified fuel card within the Metal-Fuel Database Management Subsystems 293 and 297 of both the Metal-Fuel Card Discharging and Recharging Subsystems. While this initialization procedure is simple to carry out, it is understood that in some applications it may be more desirable to empirically determine these initial metal-fuel measures using theoretically-based computations premised on the metal-fuel cards having been subjected to a known course of treatment, for example: (1) momentarily subjecting the loaded fuel card to electrical-shorting conditions at the power output terminals of the FCB system; (2) automatically detecting the response characteristics thereof; and (3) correlating such detected response characteristics within a known initial state of oxidation stored in a Table as a function of shorting current; while maintaining all other (re)charging parameters constant (hereinafter referred to as the "Short-Circuit Resistance Test").

After the initialization procedure is completed, the Metal-Fuel Card Discharging Subsystem 115 is ready to carry out its metal-fuel management functions along the lines to be described hereinbelow. In the illustrative embodiment, this method involves two basic steps that are carried out in a cyclical manner during discharging operations.

The first step of the procedure involves subtracting from the initial metal-fuel amount $MFA_0$, the computed metal-oxide estimate $MOE_{0-1}$ which corresponds to the amount of metal-oxide produced during discharging operations conducted between time interval $t_0$–$t_1$. Then during the discharging operation, metal-oxide estimate $MOE_{0-1}$ is computed using the following discharging parameters collected—electrical discharge-current $i_{acd}$, and time duration $\Delta T_d$.

The second step of the procedure involves adding to the computed measure ($MFA_0$–$MOE_{0-1}$), the metal-fuel estimate $MFE_{0-1}$ which corresponds to the amount of metal-fuel produced during any recharging operations that may have been conducted between time interval $t_0$–$t_1$. Notably, metal-fuel estimate $MFE_{0-1}$ is computed using: electrical recharge current $i_{acr}$; and the time duration thereof $\Delta T_d$ during the discharging operation. Notably, this metal-fuel measure $MFE_{0-1}$ will have been previously computed and recorded within the Metal-Fuel Database Management Subsystem 293 within the Metal-Fuel Card Recharging Subsystem 115 during the immediately previous recharging operation (if one such operation was carried out). Thus, in the illustrative embodiment, it will be necessary to read this prerecorded information element from the Database Subsystem 297 within the Recharging Subsystem 117 during current discharging operations.

The computed result of the above-described accounting procedure (i.e. $MFA_0$–$MOE_{0-1}$+$MFE_{0-1}$) is then posted within the Metal-Fuel Database Management Subsystem 293 within Metal-Fuel Card Discharging Subsystem 115 as the new current metal-fuel amount ($MFA_1$) which will be used in the next metal-fuel availability update procedure. During discharging operations, the above-described update procedure is carried out every $t_1$–$t_{i+1}$ seconds for each metal-fuel track that is being discharged.

Such information maintained on each metal-fuel track can be used in a variety of ways, for example: managing the availability of metal-fuel to meet the electrical power demands of the electrical load connected to the FCB system; as well as setting the discharging parameters in an optimal manner during discharging operations. The details pertaining to this metal-fuel management techniques will be described in greater detail hereinbelow.

Uses for Metal-Fuel Availability Management during the Discharging Mode of Operation During discharging operations, the computed estimates of metal-fuel present over any particular metal-fuel track at time $t_2$ (i.e. $MFT_{t1-t2}$), determined at the J-th discharging head, can be used to compute the availability of metal-fuel at the (j+1)th, (j+2)th, or (j+n)th discharging head downstream from the j-th discharging head. Using such computed measures, the system controller 130 within the Metal-Fuel Card Discharging Subsystem 115 can determine (i.e. anticipate) in real-time, which metal-fuel track along a metal-fuel card contains metal-fuel (e.g. zinc) in quantities sufficient to satisfy instantaneous electrical-loading conditions imposed upon the Metal-Fuel Card Discharging Subsystem 115 during the discharging operations, and selectively "switch-in" the metal-fuel track(s) along which metal-fuel is known to exist. Such track switching operations may involve the system controller 130 temporarily connecting the output terminals of the cathode-anode structures thereof to the input terminals of the cathode-anode output terminal configuration subsystem 132 so that tracks supporting metal-fuel content (e.g. deposits) are made readily available for producing electrical power required by the electrical load 116.

Another advantage derived from such metal-fuel management capabilities is that the system controller 130 within the Metal-Fuel Card Discharging Subsystem 115 can control discharge parameters during discharging operations using information collected and recorded within the Metal-Fuel Database Management Subsystems 293 and 297 during the immediately prior recharging and discharging operations.

Means for Controlling Discharging Parameters during the Discharging Mode using Information Recorded during the Prior Modes of Operation In the FCB system of the second illustrative embodiment, the system controller 130 within the Metal-Fuel Card Discharging Subsystem 115 can automatically control discharge parameters using information collected during prior recharging and discharging operations and recorded within the Metal-Fuel Database Management Subsystems 293 and 297 of the FCB system of FIG. 1.

As shown in FIG. 2B16, the subsystem architecture and buses provided within and between the Discharging and Recharging Subsystems 115 and 117 enable system controller 130 within the Metal-Fuel Card Discharging Subsystem 115 to access and use information recorded within the Metal-Fuel Database Management Subsystem 297 within the Metal-Fuel Card Recharging Subsystem 117. Similarly, the subsystem architecture and buses provided within and between the Discharging and Recharging Subsystems 115 and 117 enable system controller 130' within the Metal-Fuel Card Recharging Subsystem 117 to access and use information recorded within the Metal-Fuel Database Management Subsystem 293 within the Metal-Fuel Card Discharging Subsystem 115. The advantages of such information file and sub-file sharing capabilities will be explained hereinbelow.

During the discharging operations, the system controller 130 can access various types of information stored within the Metal-Fuel Database Management Subsystems within the Discharging and Recharging Subsystems 115 and 117. One important information element will relate to the amount of metal-fuel currently available at each metal-fuel track along at a particular instant of time (i.e. $MFE_t$). Using this information, the system controller 130 can determine if there will be sufficient metal-fuel along a particular track to satisfy electrical power demands of the connected load 116. The metal-fuel along one or more or all of the fuel tracks along a metal-fuel card may be substantially consumed as a result of prior discharging operations, and not having been recharged since the last discharging operation. The system controller 130 can anticipate such metal-fuel conditions within the discharging heads. Depending on the metal-fuel condition of "upstream" fuel cards, the system controller 130 may respond as follows: (i) connect the cathode-anode structures of metal-fuel "rich" tracks into the discharge power regulation subsystem 151 when high electrical loading conditions are detected at load 116, and connect cathode-anode structures of metal-fuel "depleted" tracks into this subsystem when low loading conditions are detected at electrical load 116; (ii) increase the rate of oxygen being injected within the corresponding cathode support structures (i.e. by increasing the air pressure therewithin) when the metal-fuel is thinly present on identified metal-fuel tracks, and decrease the rate of oxygen being injected within the corresponding cathode support structures (i.e. by decreasing the air pressure therewithin) when the metal-fuel is thickly present on identified metal-fuel zones, in order to maintain power produced from the discharging heads; (iii) control the temperature of the discharging heads when the sensed temperature thereof exceeds predetermined thresholds; etc. It is understood that in alternative embodiments of the present invention, the system controller 130 may operate in different ways in response to the detected condition of particular tracks on an identified metal-fuel card.

During the Recharging Mode

In the FCB system of the second illustrative embodiment shown in FIG. 1, means are provided for automatically managing the metal-oxide presence within the Metal-Fuel Card Recharging Subsystem 117 during recharging operations. Such system capabilities will be described in greater detail hereinbelow.

As shown in FIG. 2B16, data signals representative of recharge parameters (e.g., $i_{acr}$, $v_{acr}$, ..., $pO_{2r}$, $\{H_2O\}_r$, $T_r$, $V_{acr}/i_{acr}$) are automatically provided as input to the Data Capture and Processing Subsystem 299 within the Metal-Fuel Card Recharging Subsystem 117. After sampling and capturing, these data signals are processed and converted into corresponding data elements and then written into an information structure 302 as shown, for example, in FIG. 2B15. As in the case of discharge parameter collection, each information structure 302 for recharging parameters comprises a set of data elements which are "time-stamped" and related (i.e. linked) to a unique metal-fuel card identifier 171 (171', 171"), associated with the metal-fuel card being recharged. The unique metal-fuel card identifier is determined by data reading head 180 (180', 180") shown in FIG. 2B6. Each time-stamped information structure is then recorded within the Metal-Fuel Database Management Subsystem 297 of the Metal-Fuel Card Recharging Subsystem 117, shown in FIG. 2B16, for maintenance, subsequent processing and/or access during future recharging and/or discharging operations.

As mentioned hereinabove, various types of information are sampled and collected by the Data Capture and Processing Subsystem 299 during the recharging mode. Such information types include, for example: (1) the recharging voltage applied across each such cathode-anode structure within each recharging head; (2) the amount of electrical current ($i_{acr}$) supplied across each cathode-anode structures within each recharge head; (3) the oxygen concentration ($pO_{2r}$) level in each subchamber within each recharging head; (4) the moisture level ($\{H_2O\}_r$) near each cathode-electrolyte interface within each recharging head; and (5) the temperature ($T_{acr}$) within each channel of each recharging head. From such collected information, the Data Capture and Processing Subsystem 299 can readily compute various parameters of the system including, for example, the time duration ($\Delta t_r$) that electrical current ($i_r$) was supplied to a particular cathode-anode structure within a particular recharging head.

The information structures produced and stored within the Metal-Fuel Database Management Subsystem 297 of the Metal-Fuel Card Recharging Subsystem 117 on a real-time basis can be used in a variety of ways during recharging operations.

For example, the above-described current ($i_{acr}$) and time duration ($\Delta T_r$) information acquired during the recharging mode is conventionally measured in Amperes and Hours, respectively. The product of these measures (AH) provides an accurate measure of the electrical charge (−Q) supplied to the metal-air fuel cell battery structures along the metal-fuel and during recharging operations. Thus the computed "AH" product provides an accurate amount of metal-fuel that one can expect to have been produced on the identified track of metal-fuel, at a particular instant in time, during recharging operations.

When used with historical information about metal oxidation and reduction processes, the Metal-Fuel Database Management Subsystems 293 and 297 within the Metal-Fuel Card Discharging and Recharging Subsystems 115 and 117 respectively can be used to account for or determine how much metal-oxide (e.g. zinc-oxide) should be present for recharging (i.e. conversion back into zinc from zinc-oxide) along the zinc-fuel card. Thus such information can be very useful in carrying out metal-fuel management functions including, for example, determination of metal-oxide amounts present along each metal-fuel track during recharging operations.

In the illustrative embodiment, metal-oxide presence may be managed within the Metal-Fuel Card Recharging Subsystem 7 using the method described hereinbelow.

Preferred Method of Metal-Oxide Presence Management During Recharging Operations In accordance with the principles of the present invention, the data reading head 180 (180', 180') automatically identifies each metal-fuel card as it is loaded within the recharging assembly 175 and produces card identification data indicative thereof which is supplied to the Data Capture and Processing Subsystem 299 within the Metal-Fuel Card Discharging Subsystem 117. Upon receiving card identification data on the loaded metal-fuel card, the Data Capture and Processing Subsystem 299 automatically creates an information structure (i.e. data file) on the card, for storage within the Metal-Fuel Database Management Subsystem 297. The function of the information structure is to record current (up-to-date) information on sensed recharging parameters, the metal-fuel availability state, metal-oxide presence state, and the like, as shown in FIG. 2B15. In the event that an information storage structure has been previously created for this particular metal-fuel card within the Metal-Fuel Database Management Subsystem, this information file is accessed from Database Management Subsystem 297 for updating. As shown in FIG. 2B15, for each identified metal-fuel card, an information structure 302 is maintained for each metal-fuel track ($MFT_j$), at each sampled instant of time $t_i$.

Once an information structure has been created (or found) for a particular metal-fuel card, the initial state or condition of each metal-fuel track thereon must be determined and entered within the information structure maintained within the Metal-Fuel Database Management Subsystem 297. Typically, the metal-fuel card loaded within the recharging head assembly 175 will be partially or fully discharged, and thus containing a particular amount of metal-oxide along its tracks for conversion back into its primary metal. For accurate metal-fuel management, these initial metal-oxide amounts in the loaded card(s) must be determined and then information representative stored with the Metal-Fuel Database Management Subsystems 293 and 297 of the Discharging and Recharging Subsystems 115 and 117, respectively. In general, initial states of information can be acquired in a number of different ways, including for example: by encoding such initialization information on the metal-fuel card prior to completing a discharging operation on a different FCB system; by prerecording such initialization information within the Metal-Fuel Database Management Subsystem 297 during the most recent recharging operation carried out in the same FCB system; by recording within the Metal-Fuel Database Management Subsystem 297 (at the factory), the amount of metal-oxide normally expected on each track of a particular type metal-fuel card, and automatically initializing such information within a particular information structure upon reading a code on the metal-fuel card using data reading head 180 (180', 180"); by actually measuring the initial amount of metal-oxide on each metal-fuel track using the metal-oxide sensing assembly described above in conjunction with the cathode-anode input terminal configuration subsystem 178; or by any other suitable technique.

Prior to conducting recharging operations on the loaded fuel card(s), the "actual" measurement technique mentioned above can be carried out by configuring metal-oxide sensing ($v_{applied}/i_{response}$) drive circuitry (shown in FIG. 2A15) with the cathode-anode input terminal configuration subsystem 178 and Data Capture and Processing Subsystem 299 within the Recharging Subsystem 117. Using this arrangement, the metal-oxide sensing heads can automatically acquire information on the "initial" state of each metal-fuel track on each identified metal-fuel card loaded within the recharging head assembly. Such information would include the initial amount of metal-oxide and metal-fuel present on each track at the time of loading, denoted by "$t_0$".

In a manner similar to that described in connection with the FCB system of FIG. 1, such metal-fuel/metal-oxide measurements are carried out on each metal-fuel track of the loaded card by automatically applying a test voltage across a particular track of metal fuel, and detecting the electrical which flows across the section of metal-fuel track in response to the applied test voltage. The data signals representative of the applied voltage ($v_{applied}$) and response current ($i_{response}$) at a particular sampling period are automatically detected by the Data Capture and Processing Subsystem 299 and processed to produce a data element representative of the ratio of the applied voltage to response current ($v_{applied}/i_{response}$) with appropriate numerical scaling. This data element is automatically recorded within an information structure linked to the identified metal-fuel card maintained in the Metal-Fuel Data Management Subsystem 297. As this data element (v/i) provides a direct measure of electrical resistance across the metal-fuel track under measurement, it can be accurately correlated to a measured "initial" amount of metal-oxide present on the identified metal-fuel track.

Data Capture and Processing Subsystem 299 then quantifies the measured initial metal-oxide amount (available at initial time instant $t_0$), and designates it as $MOA_0$ for recording in the information structures maintained within the Metal-Fuel Database Management Subsystems of both the Metal-Fuel Card Discharging and Recharging Subsystems 115 and 117. While this initialization procedure is simple to carry out, it is understood that in some applications it may be more desirable to empirically determine these initial metal-oxide measures using theoretically-based computations premised on the metal-fuel cards having been subjected to a known course of treatment (e.g. the Short-Circuit Resistance Test described hereinabove).

After completing the initialization procedure, the Metal-Fuel Card Recharging Subsystem 117 is ready to carry out its metal-fuel management functions along the lines to be described hereinbelow. In the illustrative embodiment, this method involves two basic steps that are carried out in a cyclical manner during recharging operations.

The first step of the procedure involves subtracting from the initial metal-oxide amount $MOA_0$, the computed metal-fuel estimate $MFE_{0-1\ 1}$ which corresponds to the amount of metal-fuel produced during recharging operations conducted between time interval $t_0$–$t_1$. During the recharging operation, metal-fuel estimate $MFE_{0-1}$ is computed using the following recharging parameters collected—electrical recharge current $i_{acr}$ and the time duration $\Delta T_R$ thereof.

The second step of the procedure involves adding to the computed measure ($MOA_0$–$MFE_{0-1}$), the metal-oxide estimate $MOE_{0-1}$ which corresponds to the amount of metal-oxide produced during any discharging operations that may have been conducted between time interval $t_0$–$t_1$. Notably, the metal-oxide estimate $MOE_{0-1}$ is computed using the following discharging parameters collected—electrical recharge current $i_{acd}$ and time duration $\Delta T_{0-1}$, during the discharging operation. Notably, metal-oxide measure $MOE_{0-1}$ will have been previously computed and recorded within the Metal-Fuel Database Management Subsystem within the Metal-Fuel Card Recharging Subsystem 115 during the immediately previous discharging operation (if one such operation carried out since $t_0$). Thus, in the illustrative embodiment, it will be necessary to read this prerecorded information element from the Database Management Subsystem 293 within the Discharging Subsystem 115 during the current recharging operations.

The computed result of the above-described procedure (i.e. $MOA_0$–$MFE_{0-1}$+$MOE_{0-1}$) is then posted within the Metal-Fuel Database Management Subsystem 297 within Metal-Fuel Card Recharging Subsystem 117 as the new "current" metal-fuel amount ($MFE_1$) which will be used in the next metal-oxide presence update procedure. During recharging operations, the above-described update procedure is carried out every $t_1$–$t_{i+1}$ seconds for each metal-fuel track that is being recharged.

Such information maintained on each metal-fuel track can be used in a variety of ways, for example: managing the presence of metal-oxide formations along the track of metal-fuel cards; as well as setting the recharging parameters in an optimal manner during recharging operations. The details pertaining to such metal-oxide presence management techniques will be described in greater detail hereinbelow.

Uses for Metal-Oxide Presence Management during the Recharging Mode of Operation During recharging operations, the computed amounts of metal-oxide present along any particular metal-fuel track (i.e. MFT), determined at the i-th recharging head, can be used to compute the presence of metal-oxide at the (i+1)th, (i+2)th, or (i+n)th recharging head downstream from the i-th recharging head. Using such computed measures, the system controller 130' within the Metal-Fuel Card Recharging Subsystem 117 can determine (i.e. anticipate) in real-time, which metal-fuel tracks along a metal-fuel card contain metal-oxide (e.g. zinc-oxide) requiring recharging, and which contain significant amounts of metal-fuel and not requiring recharging. For those metal-fuel tracks requiring recharging, the system controller 130' can electronically switch-in the cathode-anode structures of those metal-fuel tracks having significant metal-oxide content (e.g. deposits) for conversion into metal-fuel within the recharging head assembly 175.

Another advantage derived from such metal-oxide management capabilities is that the system controller 130' within the Metal-Fuel Card Recharging Subsystem 117 can control recharge parameters during recharging operations using information collected and recorded within the Metal-Fuel Database Management Subsystems 293 and 297 during the immediately prior recharging and discharging operations.

During Recharging operations, information collected can be used to compute an accurate measure of the amount of metal-oxide that exists along each metal-fuel track at any instant in time. Such information, stored within information storage structures maintained within the Metal-Fuel Database Subsystem 297, can be accessed and used by the system controller 130' within the Metal-Fuel Card Discharging Subsystem 117 to control the amount of electrical current supplied across the cathode-electrolyte structures of each recharging head 175. Ideally, the magnitude of electrical current will be selected to ensure complete conversion of the estimated amount of metal-oxide (e.g. zinc-oxide) along each such track, into its primary source metal (e.g. Zinc) without destroying the structural integrity and porosity characteristics of the metal-fuel tape.

Means for Controlling Recharging Parameters during the Recharging Mode using Information Recorded during Prior Modes of Operation In the FCB system of the first illustrative embodiment, the system controller 130' within the Metal-Fuel Card Recharging Subsystem 117 can automatically control recharge parameters using information collected during prior discharging and recharging operations and recorded within the Metal-Fuel Database Management Subsystems 293 and 297 of the FCB system of FIG. 1.

During the recharging operations, the system controller 130' within the Metal-Fuel Card Recharging Subsystem 117 can access various types of information stored within the Metal-Fuel Database Management Subsystem 297. One important information element stored therein will relate to the amount of metal-oxide currently present along each metal-fuel track at a particular instant of time (i.e. $MOA_t$). Using this information, the system controller 130' can determine on which tracks metal-oxide deposits are present, and thus can connect the input terminal of the corresponding cathode-anode structures (within the recharging heads) to the recharging power control subsystem 181 by way of the cathode-anode input terminal configuration subsystem 178, to efficiently and quickly carry out recharging operations therealong. The system controller 130' can anticipate such metal-oxide conditions prior to conducting recharging operations. Depending on the metal-oxide condition of "upstream" fuel cards loaded within the discharging head assembly, the system controller 130' of the illustrative embodiment may respond as follows: (i) connect cathode-anode structures of metal-oxide "rich" tracks into the recharging power regulation subsystem 181 for long recharging durations, and connect cathode-anode structures of metal-oxide "depleted" tracks from this subsystem for relatively shorter recharging operations; (ii) increase rate of oxygen evacuation from about the cathode support structures corresponding to tracks having thickly formed metal-oxide formations therealong during recharging operations, and decrease the rare of oxygen evacuation from about the cathode support structures corresponding to tracks having thinly formed metal-oxide formations therealong during recharging operations; (iii) control the temperature of the recharging heads when the sensed temperature thereof exceeds predetermined thresholds; etc. It is understood that in alternative embodiments, the system controller 130' may operate in different ways in response to the detected condition of particular track on identified fuel card.

The Second Illustrative Embodiment of the Air-Metal FCB System of the Present Invention The second illustrative embodiment of the metal-air FCB system hereof is illustrated in FIGS. 3 through 4B14. As shown in FIGS. 3, 4A1 and 4A2 this FCB system 185 comprises a number of subsystems, namely: a Metal-Fuel Card Discharging (i.e. Power Generation) Subsystem 186 for generating electrical power from the recharged metal-fuel cards 187 during the Discharging Mode of operation; Metal-Fuel Card Recharging Subsystem 191 for electro-chemically recharging (i.e. reducing) sections of oxidized metal-fuel cards 187 during the Recharging Mode of operation; a Recharged Card Loading Subsystem 189 for automatically loading one or more metal-fuel cards 187 from recharged storage bin 188A into the discharging bay of the FCB system; a Discharged Card Unloading Subsystem 192 for automatically unloading one or more discharged metal-fuel cards 187 from the discharging bay of the FCB system into the discharged metal-fuel card storage bin 188B; Discharged Card Loading Subsystem 192 for automatically loading one or more discharged metal-fuel cards from the discharged metal-fuel card storage bin 188B, into the recharging bay of the Metal-Fuel Card Recharging Subsystem 191; and a Recharged Card Unloading Subsystem 193 for automatically unloading recharged metal-fuel cards from the recharging bay of the Recharging Subsystem into the recharged metal-fuel card storage bin 188A. Details concerning each of these subsystems and how they cooperate will be described below.

As shown in FIG. 3, the metal fuel consumed by this FCB System is provided in the form of metal fuel cards 187, slightly different in construction from the card 112 used in the system of FIG. 1. As shown in FIGS. 3 and 4A12, each metal-fuel card 178 has a rectangular-shaped housing containing a plurality of electrically isolated metal-fuel elements (e.g. squares) 195A through 195D. As will be illustrated in greater detail hereinafter, these elements are adapted to contact the cathode elements 196A through 196D of the "multi-zoned" discharging head 197 in the Metal-Fuel Card Discharging Subsystem 186 when the metal-fuel card 178 is moved into properly aligned position between cathode support plate 198 and anode contacting structure 199 thereof during the Discharging Mode, as shown in FIG. 4A4, and also contact the cathode elements 196A' through 196D' of the recharging head 197' in the Metal-Fuel Card Recharging Subsystem 191 when the fuel card is moved into properly aligned position between the cathode support plate 198' and the anode contacting support structure 199' during the recharging mode as shown in FIG. 4B4.

In the illustrative embodiment, the fuel card of the present invention is "multi-zoned" in order to enable the simultaneous production of multiple supply voltages (e.g. 1.2 Volts) from the "multi-zone" discharging head 197. As described in connection with the other embodiments of the present invention, this enables the generation and delivery of a wide range of output voltages from the system, suitable to the requirements of the particular electrical load connected to the FCB system.

Brief Summary of Modes of Operation of the FCB System of the Second Illustrative Embodiment of the Present Invention The FCB system of the second illustrative embodiment has several modes of operation, namely: a Recharge Card Loading Mode during which one or more metal-fuel cards are automatically loaded from the recharged metal-fuel card storage bin 188A into the discharging bay of the Metal-Fuel Card Discharging Subsystem 186, Discharged Card Loading Mode during which one or more metal-fuel cards are automatically loaded from the discharged metal-fuel card storage bin into the recharging bay of the Metal-Fuel Card Recharging Subsystem 191; a Discharging Mode during which electrical power is produced from metal-fuel cards 187 loaded into the Metal-Fuel Card Discharging Subsystem 186 by electro-chemical oxidation, and supplied to the electrical load connected to the output of the subsystem; a Recharging Mode during which metal-fuel cards loaded into the Metal-Fuel Card Recharging Subsystem 191 are recharged by electrochemical reduction; and a Discharged Card Unloading Mode during which one or more metal-fuel cards are automatically unloaded from the discharging bay of the system into the discharged metal-fuel card storage bin 188B thereof; and a Recharged Card Unloading Mode, during which one or more recharged metal-fuel cards are automatically unloaded from the recharging bay of the Metal-Fuel Card Recharging Subsystem 191 into the recharged metal-fuel card storage bin 188A. These modes will be described in greater detail hereinafter.

Multi-Zone Metal-Fuel Card used in the FCB System of the Second Illustrative Embodiment In the FCB system of FIG. 3, each metal-fuel card 187 has multiple fuel-tracks (e.g. four zones) as taught in copending application Ser. No. 08/944,507, supra. When using such a metal-fuel card design, it is desirable to design each discharging head 197 within the Metal-Fuel Card Discharging Subsystem 186 as a "multi-zoned" discharging head. Similarly, each recharging head 197' within the Metal-Fuel Card Recharging Subsystem 191 hereof should be designed as a multi-zoned recharging head in accordance with the principles of the present invention. As taught in great detail in copending application Ser. No. 08/944,507, the use of "multi-zoned" metal-fuel cards 187 and multi-zoned discharging heads 197 enables the simultaneous production of multiple output voltages $\{V1, V2, \ldots, Vn\}$ selectable by the end user. Such output voltages can be used for driving various types of electrical loads 200 connected to the output power terminals 201 of the Metal-Fuel Card Discharging Subsystem. This is achieved by selectively configuring the individual output voltages produced across each anode-cathode structure within the discharging heads during card discharging operations. This system functionality will be described in greater detail hereinbelow.

In general, multi-zone and single-zone metal-fuel cards 187 alike can be made using several different techniques. Preferably, the metal-fuel elements contained within each card-like device 187 is made from zinc as this metal is inexpensive, environmentally safe, and easy to work. Several different techniques will be described below for making zinc-fuel elements according to this embodiment of the present invention.

For example, in accordance with a first fabrication technique, a thin metal layer (e.g. nickel or brass) of about 0.1 to about 5 microns thickness is applied to the surface of low-density plastic material (drawn and cut in the form of a card-like structure). The plastic material should be selected so that it is stable in the presence of an electrolyte such as KOH. The function of the thin metal layer is to provide efficient current collection the anode surface. Thereafter, zinc powder is mixed with a binder material and then applied as a coating (e.g. 1–500 microns thick) upon the surface of the thin metal layer. The zinc layer should have a uniform porosity of about 50% to allow the ions within the ionically-conducting medium (e.g. electrolyte ions) to flow with minimum electrical resistance between the cathode and anode structures. As will be explained in greater detail hereinafter, the resulting metal-fuel structure can be mounted within an electrically insulating casing of thin dimensions to improve the structured integrity of the metal-fuel card 187, while providing the discharging heads access to the anode structure when the card is loaded within its card storage bay. The casing of the metal-fuel card can be provided with a slidable panel that enables access to the metal-fuel strips when the card is received in the storage bay and the discharging head is transported into position for discharging operations.

In accordance with a second fabrication technique, a thin metal layer (e.g. nickel or brass) of about 0.1 to about 5 microns thickness is applied to the surface of low-density plastic material (drawn and cut in the form of card). The plastic material should be selected so that it is stable in the presence of an electrolyte such as KOH. The function of the thin metal layer is to provide efficient current collection at the anode surface. Thereafter zinc is electroplated onto the surface of the thin layer of metal. The zinc layer should have a uniform porosity of about 50% to allow ions within the ionically-conducting medium (e.g. electrolyte) to flow with minimum electrical resistance between the cathode and anode structures. As will be explained in greater detail hereinafter, the resulting metal-fuel structures can be mounted within an electrically insulating casing of thin dimensions to provide a metal-fuel card having suitable structural integrity, while providing the discharging heads access to the anode structure when the card is loaded within its card storage bay. The casing of the metal-fuel card can be provided with slidable panels that enable access to the metal-fuel strips when the card is received in the storage bay and the discharging head is transported into position for discharging operations.

In accordance with a third fabrication technique, zinc power is mixed with a low-density plastic base material and drawn into electrically-conductive sheets. The low-density plastic material should be selected so that it is stable in the presence of an electrolyte such as KOH. Each electrically-conductive sheet should have a uniform porosity of about 50% to allow ions within the ionically-conducting medium (e.g. electrolyte) to flow with minimum electrical resistance between the current collecting elements of the cathode and anode structures. Then a thin metal layer (e.g. nickel or brass) of about 1 to 10 microns thickness is applied to the surface of the electrically-conductive sheet. The function of the thin metal layer is to provide efficient current collection at the anode surface. As will be explained in greater detail hereinafter, the resulting metal-fuel structures can be mounted within an electrically insulating casing of thin dimensions to provide a metal-fuel card having suitable structural integrity, while providing the discharging heads access to the anode structure when the card is loaded within its card storage bay. The card housing can be made from any suitable material designed to withstand heat and corrosion. Preferably, the housing material is electrically non-conducting to provide an added measure of user-safety during card discharging and recharging operations.

Each of the above-described techniques for manufacturing metal-fuel elements can be readily modified to produce "double-sided" metal-fuel cards, in which single track or multi-track metal-fuel layers are provided on both sides of the base (i.e. substrate) material. Such embodiments of metal-fuel cards will be useful in applications where discharging heads are to be arranged on both sides of metal-fuel tape loaded within the FCB system. When making double-sided metal-fuel cards, it will be necessary in most embodiments to form a current collecting layer (of thin metal material) on both sides of the plastic substrate so that current can be collected from both sides of the metal-fuel tape, associated with different cathode structures. When making double-sided multi-tracked fuel cards, it may be desirable or necessary to laminate together two metal-fuel sheets together, as described hereinabove, with the substrates of each sheet in physical contact. Adaptation of the above-described methods to produce double-sided metal-fuel cards will be readily apparent to those skilled in the art having had the benefit of the present disclosure. In such illustrative embodiments of the present invention, the anode-contacting structures within the each discharging head will be modified so that electrical contact is established with each electrically-isolated current collecting layer formed within the metal-fuel card structure being employed therewith.

Card Loading/Unloading Subsystem for the Second Illustrative Embodiment of the Metal-Air FCB System of the Present Invention As schematically illustrated in FIG. 4A1, the function of the Recharge Card Loading Subsystem 189 is to automatically transport a plurality of recharged metal-fuel cards from the bottom of the stack of recharged metal-fuel cards 187 in the recharged metal-fuel card storage bin 188A into the discharging bay of the Metal-Fuel Card Discharging Subsystem 182. As shown in FIG. 4A2, the function of the Discharged Card Unloading Subsystem 190 is to automatically transport a plurality of oxidized metal-fuel cards 187' from the discharging bay of the Metal-Fuel Card Discharging Subsystem 186, to the top of the stack of discharged metal-fuel cards in the discharged metal-fuel card storage bin 188B. As shown in FIG. 4B1, the function of the Discharged Card Loading Subsystem 192 is to automatically transport a plurality of oxidized metal-fuel cards from the bottom of the stack of discharged metal-fuel cards 187' in the discharged metal-fuel card storage bin 191 into the recharging bay of the Metal-Fuel Card Recharging Subsystem 191. As shown in FIG. 4B2, the function of the Recharged Card Unloading Subsystem 193 is to automatically transport a plurality of recharged metal-fuel cards 197 from the recharging bay of the Metal-Fuel Card Recharging Subsystem 191, to the top of the stack of recharged metal-fuel cards in the recharged metal-fuel card storage bin 188A.

As shown in FIG. 4A1, the Recharged Card Loading Subsystem 189 can be realized by any electro-mechanism comprising, for example, an electric motor, rollers, guides and other components arranged in such a manner as to enable the sequential transport of a recharged metal-fuel card from the bottom of the stack of recharged metal-fuel cards in the recharged metal-fuel card storage bin 188A, into the discharging bay of the Metal-Fuel Card Discharging Subsystem, where the cathode and anode structures of the discharging heads 197 are arranged. This electro-mechanical card transport mechanism is operably connected to the system controller 203.

As shown in FIG. 4A2, the Discharged Card Unloading Subsystem 190 can be realized by any electro-mechanism comprising, for example, an electric motor, rollers, guides and other components arranged in such a manner as to enable the sequential transport of discharged metal-fuel cards from the discharging bay of the Metal-Fuel Card Discharging Subsystem to the top of the stack of discharged metal-fuel cards in the discharged metal-fuel card storage bin 188B, where the cathode and anode structures of the discharging heads 197 are arranged. This electro-mechanical card transport mechanism is operably connected to the system controller 203.

As shown in FIG. 4B1, the Discharged Card Loading Subsystem 190 can be realized by any electro-mechanism comprising, for example, an electric motor, rollers, guides and other components arranged in such a manner as to enable the sequential transport of discharged metal-fuel cards from the bottom of the stack of discharged metal-fuel cards in the discharged metal-fuel card storage bin 188B, into the recharging bay of the Metal-Fuel Card Recharging Subsystem, where the cathode and anode structures of the discharging heads are arranged. This electro-mechanical card transport mechanism is operably connected to the system controller 203.

As shown in FIG. 4B2, the Recharged Card Unloading Subsystem 193 can be realized by any electro-mechanism comprising, for example, an electric motor, rollers, guides and other components arranged in such a manner as to enable the sequential transport of recharged metal-fuel cards from the recharging bay of the Metal-Fuel Card Recharging Subsystem, to the top of the stack of recharged metal-fuel cards in the recharged metal-fuel card storage bin 188A, where the cathode and anode structures of the discharging heads are arranged. This electro-mechanical card transport mechanism is operably connected to the system controller 203.

The Metal-Fuel Card Discharging Subsystem for the Second Illustrative Embodiment of the Metal-Air FCB System of the Present Invention As shown in FIGS. 4A31, and 4A32, the metal-fuel card discharging subsystem 186 of the second illustrative embodiment of the present invention comprises a number of subsystems, namely: an assembly of multi-track discharging (i.e. discharging) heads 197, each having multi-element cathode structures 198 and anode-contacting structures 199 with electrically-conductive output terminals connectable in a manner to be described hereinbelow; a discharging head transport subsystem 204 for transporting the subcomponents of the discharging head assembly 197 to and from metal-fuel cards 197 loaded within the system; a cathode-anode output terminal configuration subsystem 205 for configuring the output terminals of the cathode and anode-contacting structures of the discharging heads under the control of system controller 203 so as to maintain the output voltage required by a particular electrical load connected to the Metal-Fuel Card Discharging Subsystem 186; a cathode-anode voltage monitoring subsystem 206A, connected to the cathode-anode output terminal configuration subsystem 205 for monitoring (i.e. sampling) the voltages produced across cathode and anode structures of each discharging head, and producing (digital) data representative of the sensed voltage levels; a cathode-anode current monitoring subsystem 206B, connected to the cathode-anode output terminal configuration subsystem 205, for monitoring (e.g. sampling) the currents flowing through the cathode-electrolyte interfaces of each discharging head during the Discharging Mode, and producing digital data representative of the sensed current levels; a cathode oxygen pressure control subsystem comprising the system controller 203, solid-state $pO_2$ sensors 250, vacuum chamber (structure) 207 shown in FIGS. 4A31, 4A32, and 4A6, vacuum pump 208, electronically-controlled airflow control device 209, manifold structure 210, and multi-lumen tubing 211 shown in FIGS. 4A31, 4A32, and 4A4, arranged together as shown for sensing and controlling the pO2 level within the cathode structure of each discharging head 197; an ion transport control subsystem comprising the system controller 203, solid-state moisture sensor (hydrometer) 212, moisturizing (e.g. micro-sprinklering element) 213 realized as a micro-sprinkler embodied within the walls structures of the cathode support plate 198 (having water expressing holes 214 disposed along each wall surface as shown in FIG. 4A6), a water pump 215, a water reservoir 216, an electronically-controlled water-flow control valve 217, a manifold structure 28 and multi-lumen conduits 219 extending into moisture delivery structure 213, arranged together as shown for sensing and modifying conditions within the FCB system (e.g. the moisture level or relative humidity level at the cathode-electrolyte interface of the discharging heads) so that the ion-concentration at the cathode-electrolyte interface is maintained within an optimal range during the Discharging Mode of operation; discharge head temperature control subsystem comprising the system controller 203, solid-state temperature sensors (e.g. thermistors) 305 embedded within each channel of the multi-cathode support plate 198 hereof, and a discharge head cooling device 306, responsive to control signals produced by the system controller 203, for lowering the temperature of each discharging channel to within an optimal temperature range during discharging operations; a relational-type Metal-Fuel Database Management Subsystem (MFDMS) 308 operably connected to system controller 203 by way of local system bus 309, and designed for receiving particular types of information derived from the output of various subsystems within the Metal-Fuel Card Discharging Subsystem 186; a Data Capture and Processing Subsystem (DCPS) 400, comprising data reading head 260 (260', 260") embedded within or mounted closely to the cathode support structure of each discharging head 197, and a programmed microprocessor-based data processor adapted to receive data signals produced from cathode-anode voltage monitoring subsystem 206A, cathode-anode current monitoring subsystem 206B, the cathode oxygen pressure control subsystem and the ion-concentration control subsystem hereof, and enable (i) the reading of metal-fuel card identification data from the loaded metal-fuel card, (ii) the recording sensed discharge parameters and computed metal-oxide indicative data derived therefrom in the Metal-Fuel Database Management Subsystem 308 using local system bus 401, and (iii) the reading of prerecorded recharge parameters and prerecorded metal-fuel indicative data stored in the Metal-Fuel Database Management Subsystem (MFDMS) 308 using local system bus 309; a discharging (i.e. output) power regulation subsystem 223 connected between the output terminals of the cathode-anode output terminal configuration subsystem 205 and the input terminals of the electrical load 200 connected to the Metal-Fuel Card Discharging Subsystem 186, for regulating the output power delivered across the electrical load (and regulate the voltage and/or current characteristics as required by the Discharge Power Control Method carried out by the system controller 203); an input/output control subsystem 224, interfaced with the system controller 203, interfaced with system controller 203' within the Metal-Fuel Card Recharging Subsystem 117 by way of global system bus 402 as shown in FIG. 4B14, and having various means for controlling all functionalities of the FCB system by way of a remote system or resultant system, within which the FCB system is embedded; and system controller 203 for managing the operation of the above mentioned subsystems during the various modes of system operation. These subsystems will be described in greater technical detail below.

Multi-Zone Discharging Head Assembly within the Metal-Fuel Card Discharging Subsystem The function of the assembly of multi-zone discharging heads 197 is to generate electrical power across the electrical load 200 as one or more metal-fuel cards 187 are discharged during the Discharging Mode of operation. In the illustrative embodiment, each discharging (i.e. discharging) head 197 comprises: a cathode element support plate 34 having a plurality of isolated recesses 224A through 224D permitting the free flow of oxygen (O₂) through perforations 225 formed in the bottom portion thereof; a plurality of electrically-conductive cathode elements (e.g. strips) 196A through 196D for insertion within the lower portion of these recesses 224A through 224D, respectively; a plurality of electrolyte-impregnated strips 226A through 226D for placement over the cathode strips 196A through 196D, and support within the recesses 225A through 225D, respectively, as shown in FIG. 4A12; and oxygen-injection chamber 207 shown in FIG. 4A7 mounted over the upper (back) surface of the cathode element support plate 198, in a sealed manner as shown in FIG. 4A12.

As shown in FIGS. 4A31, 4A32, and 4A7, each oxygen-injection chamber 207 has a plurality of subchambers 207A through 207D, being physically associated with recesses 224A through 224D, respectively. Each vacuum subchamber is isolated from all other subchambers and is in fluid communication with one channel supporting a cathode element and electrolyte-impregnated element. As shown, each subchamber is arranged in fluid communication with vacuum pump 208 via one lumen of multi-lumen tubing 211, one channel of manifold assembly 210 and one channel of air-flow switch 209, each of whose operation is managed by system controller 203. This arrangement enables the system controller 203 to independently control the pO2 level in each oxygen-injection subchamber 207A through 207D by selectively pumping pressurized air through the corresponding air flow channel in the manifold assembly 210.

As shown in FIG. 4A8A, each electrolyte-impregnated strip 226A through 226D is realized by impregnating an electrolyte-absorbing carrier strip with a gel-type electrolyte. Preferably, the electrolyte-absorbing carrier strip is realized as a strip of low-density, open-cell foam material made from PET plastic. The gel-electrolyte for the discharging cell is made from a formula consisting of alkali solution, a gelatin material, water, and additives well known in the art.

As shown in FIG. 4A8A, each cathode strip 196A through 196D is made from a sheet of nickel wire mesh 228 coated with porous carbon material and granulated platinum or other catalysts 229 to form a cathode element that is suitable for use in metal-air FCB systems. Details of cathode construction for use in air-metal FCB systems are disclosed in U.S. Pat. Nos. 4,894,296 and 4,129,633, incorporated herein by reference. To form a current collection pathway, an electrical conductor (nickel) 230 is soldered to the underlying wire mesh sheet 228 of each cathode strip. As shown in FIG. 4A12, each electrical conductor 230, attached to its cathode strip is passed through a hole 231 formed in the bottom surface of a recess of the cathode support plate 198, and is connected to an electrical conductor (e.g. wire) which extends out from its respective subchamber and terminates at a conventional conductor 235A. During assembly, the cathode strip pressed into the lower portion of the recess to secure the same therein.

As shown in FIG. 4A6, the bottom surface of each recess 224A through 224D has numerous perforations 225 formed therein to allow the free passage of air and oxygen therethrough to the cathode strip 196A through 196D (at atmospheric temperature and pressure). In the illustrative embodiment, electrolyte-impregnated strips 226A through 226D are placed over cathode strips 196A through 196D, respectively, and secured within the upper portion of the cathode supporting recess by adhesive, retaining structures or the like. As shown in FIG. 4A12, when the cathode strips and thin electrolyte strips are mounted in their respective recesses in the cathode support plate 198, the outer surface of each electrolyte-impregnated strip is disposed flush with the upper surface of the plate defining the recesses.

The interior surfaces of the cathode support recesses 224A through 224D are coated with a hydrophobic material (e.g. Teflon) to ensure the expulsion of water within electrolyte-impregnated strips 226A through 226D and thus optimum oxygen transport across the cathode strips. Hydrophobic agents are added to the carbon material constituting the oxygen-pervious cathode elements in order to repel water therefrom. Preferably, the cathode support plate is made from an electrically non-conductive material, such as polyvinyl chloride (PVC) plastic material well known in the art. The cathode support plate can be fabricated using injection molding technology also well known in the art.

In FIG. 4A7, the oxygen-injection chamber 207 is shown realized as EL plate-like structure having dimensions similar to that of the cathode support plate 198. As shown in FIG. 4A7, the oxygen-injection chamber has four (4) recesses 207A through 207D which spatially correspond to and are in spatial registration with cathode recesses 224A through 224D, respectively, when oxygen-injection chamber 207 is mounted upon the top surface of the cathode support plate 198, as shown in FIG. 4A12. Four small conduits are formed within the recessed plate 207, namely: between inlet opening 207E1 and outlet opening 207A1; between inlet opening 207E2 and outlet opening 207B1; between inlet opening 207E3 and outlet opening 207C1; and between inlet opening 207E4 and outlet opening 207D1. When recessed plate 207 is mounted upon the cathode support plate 198, subchambers 207A through 207D are formed between recesses 207A through 207D and the back portion of the perforated cathode support plate 198. Each lumen of the multi-lumen conduit 211 is connected to one of the four inlet openings 207E1 through 207E4, and thereby arranges the subchambers 207A through 207D in fluid communication with the four controlled $O_2$-flow channels within the $pO_2$ control subsystem in the Discharging Subsystem 186.

The structure of the multi-tracked fuel card 187 loaded into the FCB system of FIG. 3 is illustrated in FIGS. 4A9 and 4A10. As shown, the metal fuel card comprises: electrically non-conductive anode support plate 228 of rigid construction, having a plurality of recesses 231A through 231D formed therein and a central hole 230 formed through the bottom surface of each recess; and the plurality of strips of metal (e.g. zinc fuel) 195A through 195D, each being disposed within a recess within the anode support plate 228. Notably, the spacing and width of each metal fuel strip is designed so that it is spatially registered with a corresponding cathode strip in the discharging head of the system in which the fuel card is intended to be used. The metal-fuel card described above can be made by forming zinc strips in the shape of recesses in the anode support plate, and then inserting a metal fuel strip into each of the recesses. When inserted within its respective recess in the anode support plate 228, each metal fuel strip is electrically isolated from all other metal fuel strips.

In FIG. 4A11, an exemplary metal-fuel (anode) contacting structure (assembly) 199 is disclosed for use with the multi-tracked fuel card 187 having anode support structure 228 shown in FIG. 4A9. As shown in FIG. 4A11, a plurality of electrically conductive elements 232A through 232D in the form of conductive posts are supported from a metal-fuel contacting support platform 233. The position of these electrically conductive posts spatially coincide with the holes 230 formed in the bottom surfaces of recesses 229A through 229D in the anode support plate 228. As shown, electrical conductors 234A through 234D are electrically connected to conductive posts 232A through 232D respectively, and anchored along the surface of the anode support plate (e.g. within a recessed groove) and terminated in a conventional connector 235B similar to conductors terminating at electrical connector 235A. This connector is electrically connected to the output cathode-anode terminal configuration subsystem 205 as shown in FIGS. 4A31, 4A32, and 4A4. The width and length dimensions of the anode-contacting support plate 233 are substantially similar to the width and length dimensions of the cathode support plate 198 as well as the anode (metal-fuel) support plate 228.

FIG. 4A12 illustrates the spatial relationship between the anode contacting support plate 199, cathode support plate 198, oxygen-injection chamber plate 207, and anode (metal-fuel) support plate (i.e. fuel card) 228 when the fuel card 187 is loaded therebetween. In this loaded configuration, each cathode element 196A through 196D along the cathode support plate establishes ionic contact with the front exposed surface of the corresponding metal fuel strip (i.e. zone) 195A through 195D by way of the electrolyte-impregnated pad 226A through 226D disposed therebetween Also, in this loaded configuration, each anode-contacting element (e.g. conductive post) 232A through 232D projects from the anode contacting support plate 233 through the central hole 230 in the bottom panel of each recess formed in the anode contacting support plate 199 and establishes electrical contact with the corresponding metal fuel strip 195A through 195D mounted therein, completing an electrical circuit through a single air-metal fuel cell of the present invention.

Discharging Head Transport Subsystem within the Metal-Fuel Card Discharging Subsystem The primary function of the discharging head transport subsystem 204 is to transport the assembly of discharging heads 197 about the metal-fuel cards 187 that have been loaded into the FCB system, as shown in FIGS. 4A31 and 4A32. When properly transported, the cathode and anode-contacting structures of the discharging heads are brought into "ionically-conductive" and "electrically-conductive" contact with the metal-fuel tracks (i.e. zones) of loaded metal-fuel cards loaded within the system during the Discharging Mode of operation.

Discharging head transport subsystem 204 can be realized using any one of a variety of electro-mechanical mechanisms capable of transporting the cathode supporting and anode-contacting structures of each discharging head 197 away from the metal-fuel card 112, as shown in FIGS. 4A31 and 4A32 about the metal-fuel card 187 as shown in FIG. 4A4. As shown, these transport mechanisms are operably connected to system controller 203 and controlled by the same in accordance with the system control program carried out thereby.

Cathode-Anode Output Terminal Configuration Subsystem within the Metal-Fuel Card Discharging Subsystem As shown in FIGS. 4A31, 4A32 and 4A4 the cathode-electrolyte output terminal configuration subsystem 205 is connected between the input terminals of the discharging power regulation subsystem 233 and the output terminals of the cathode-anode pairs within the assembly of discharging heads 197. The system controller 203 is operably connected to cathode-anode output terminal configuration subsystem 205 in order to supply control signals for carrying out its functions during the Dicharging Mode of operation.

The function of the cathode-anode output terminal configuration subsystem 205 is to automatically configure (in series or parallel) the output terminals of selected cathode-anode pairs within the discharging heads 197 of the Metal-Fuel Card Discharging Subsystem 186 so that the required output voltage level is produced across the electrical load 200 connected to the FCB system during card discharging operations. In the illustrative embodiment of the present invention, the cathode-anode output terminal configuration mechanism 205 can be realized as one or more electrically-programmable power switching circuits using transistor-controlled technology, wherein the cathode and anode-contacting elements within the discharging heads 197 are connected to the input terminals of the discharging power regulating subsystem 223. Such switching operations are carried out under the control of the system controller 203 so that the required output voltage is produced across the electrical load connected to the discharging power regulating subsystem 151 of the FCB system.

Cathode-Anode Voltage Monitoring Subsystem within the Metal-Fuel Card Discharging Subsystem As shown in FIGS. 4A31, 4A32 and 484, the cathode-anode voltage monitoring subsystem 206A is operably connected to the cathode-anode output terminal configuration subsystem 205 for sensing voltage levels and the like therewithin. This subsystem is also operably connected to the system controller for receiving control signals required to carry out its functions. In the first illustrative embodiment, the cathode-anode voltage monitoring subsystem 206A has two primary functions: to automatically sense the instantaneous voltage level produced across the cathode-anode structures associated with each metal-fuel zone within each discharging head 197 during the Discharging Mode; and to produce a (digital) data signal indicative of the sensed voltages for detection, analysis and response by Data Capture and Processing Subsystem 400.

In the first illustrative embodiment of the present invention, the Cathode-Anode Voltage Monitoring Subsystem 206A can be realized using electronic circuitry adapted for sensing voltage levels produced across the cathode-anode structures associated with each metal-fuel zone disposed within each discharging head 197 in the Metal-Fuel Card Discharging Subsystem 186. In response to such detected voltage levels, the electronic circuitry can be designed to produce a digital data signals indicative of the sensed voltage levels for detection and analysis by Data Capture and Processing Subsystem 400.

Cathode-Anode Current Monitoring Subsystem within the Metal-Fuel Card Discharging Subsystem As shown in FIGS. 4A31, 4A32, and 4A4, the cathode-anode current monitoring subsystem 206B is operably connected to the cathode-anode output terminal configuration subsystem 205. The cathode-anode current monitoring subsystem 206B has two primary functions to automatically sense the magnitude of electrical currents flowing through the cathode-anode pair of each metal-fuel zone within each discharging head 197 in the Metal-Fuel Card Discharging Subsystem 186 during the Discharging Mode; and to produce digital data signals indicative of the sensed currents for detection and analysis by Data Capture and Processing Subsystem 400. In the first illustrative embodiment of the present invention, the cathode-anode current monitoring subsystem 206B can be realized using current sensing circuitry for sensing electrical currents flowing through the cathode-anode pairs of each metal-fuel zone within each discharging head 197, and producing digital data signals indicative of the sensed currents. As will be explained in greater detail hereinafter, these detected current levels are used by the system controller 203 in carrying out its discharging power regulation method, and well as creating a "discharging condition history" and metal-fuel availability records for each fuel zone on the discharged metal-fuel card.

Cathode Oxygen Pressure Control Subsystem within the Metal-Fuel Card Discharging Subsystem The function of the cathode oxygen pressure control subsystem is to sense the oxygen pressure ($pO_2$) within each channel of the cathode structure of each discharging head 197, and in response thereto, control (i.e. increase or decrease) the same by regulating the air ($O_2$) pressure within the chambers of such cathode structures. In accordance with the present invention, partial oxygen pressure ($pO_2$) within each ca of the cathode structure of each discharging head is maintained at an optimal level in order to allow optimal oxygen consumption within the discharging heads during the Discharging Mode. By maintaining the pO2 level within the cathode structure, power output produced from the discharging heads can be increased in a controllable manner. Also, by monitoring changes in $pO^2$ and producing digital data signals representative thereof for detection and analysis by the Data Capture and Processing Subsystem 400, the system controller 203 is provided with a controllable variable for use in regulating the electrical power supplied to the electrical load 200 during the Discharging Mode.

Ion-Concentration Control Subsystem within the Metal-Fuel Card Discharging Subsystem In order to achieve high-energy efficiency during the Discharging Mode, it is necessary to maintain an optimal concentration of (charge-carrying) ions at the cathode-electrolyte interface of each discharging head 197 within the Metal-Fuel card Discharging Subsystem 186. Thus it is the primary function of the ion-concentration control subsystem to sense and modify conditions within the FCB system so that the ion-concentration at. the cathode-electrolyte interface within the discharging head is maintained within an optimal range during the Discharge Mode of operation.

In the illustrative embodiment, ion-concentration control is achieved in a variety of ways by embedding a miniature solid-state humidity (or moisture) sensor 212 within each recess of the cathode support structure 198 (or as close as possible to the anode-cathode interfaces) in order to sense moisture conditions and produce a digital data signal indicative thereof. This digital data signal is supplied to the Data Capture and Processing Subsystem 400 for detection and analysis. In the event that the moisture level drops below the predetermined threshold value set in memory (ROM) within the system controller 203, the system controller automatically generates a control signal supplied to a moisturizing element 213 realizable as a micro-sprinkler structure 143 embodied within the walls of the cathode support structure 198. In the illustrative embodiment, the walls of the cathode support structure 198 function as water carrying conduits which express water droplets out of holes 214 adjacent the particular cathode elements when water-flow valve 217 and pump 215 are activated by the system controller 203. Under such conditions, water is pumped from reservoir 216 through manifold 218 along multi-lumen conduit 219 and is expressed from holes 214 adjacent the cathode element requiring an increase in moisture level, as sensed by moisture sensor 212. Such moisture-level sensing and control operations, ensure that the concentration of KOH within the electrolyte within electrolyte-impregnated strips 226A through 226E is optimally maintained for ion transport and thus power generation.

Discharge Head Temperature Control Subsystem within the Metal-Fuel Card Discharging Subsystem As shown in FIGS. 4A31, 4A32, 4A4 and 4A7, the discharge head temperature control subsystem incorporated within the Metal-Fuel Card, Discharging Subsystem 186 of the first illustrative embodiment comprises a number of subcomponents, namely: the system controller 203; solid-state temperature sensors (e.g. thermistors) 305 embedded within each channel of the multi-cathode support structure hereof 198, as shown in FIG. 4A6; and a discharge head cooling device 306, responsive to control signals produced by the system controller 203, for lowering the temperature of each discharging channel to within an optimal temperature range during discharging operations. The discharge head cooling device 306 can be realized using a wide variety of heat-exchanging techniques, including forced-air cooling, water-cooling, and/or refrigerant cooling, each well known in the heat exchanging art. In some embodiments of the present invention, where high levels of electrical power are being generated, it may be desirable to provide a jacket-like structure about each discharge head in order to circulate air, water or refrigerant for temperature control purposes.

Data Capture and Processing Subsystem within the Metal-Fuel Tape Discharging Subsystem In the illustrative embodiment of FIG. 3, Data Capture And Processing Subsystem (DCPS) 400 shown in FIGS. 4A31, 4A32 and 4A4 carries out a number of functions, including, for example: (1) identifying each metal-fuel card immediately before it is loaded within a particular discharging head 197 within the discharging head assembly and producing metal-fuel card identification data representative thereof; (2) sensing (i.e. detecting) various "discharge parameters" within the Metal-Fuel Card Discharging Subsystem 186 existing during the time period that the identified metal-fuel card is loaded within the discharging head assembly thereof; (3) computing one or more parameters, estimates or measures indicative of the amount of metal-oxide produced during card discharging operations, and producing "metal-oxide indicative data" representative of such computed parameters, estimates and/or measures; and (4) recording in the Metal-Fuel Database Management Subsystem 400 (accessible by system controllers 203 and 203'), sensed discharge parameter data as well as computed metal-fuel indicative data both correlated to its respective metal-fuel zone/card identified during the Discharging Mode of operation. As will become apparent hereinafter, such recorded information maintained within the Metal-Fuel Database Management Subsystem 308 by Data Capture and Processing Subsystem 400 can be used by the system controller 203 in various ways including, for example: optimally discharging (i.e. producing electrical power from) partially or completely oxidized metal-fuel cards in an efficient manner during the Discharging Mode of operation; and optimally recharging partially or completely oxidized metal-fuel cards in a rapid manner during the Recharging Mode of operation.

During discharging operations, the Data Capture and Processing Subsystem 400 automatically samples (or captures) data signals representative of "discharge parameters" associated with the various subsystems constituting the Metal-Fuel Card Discharging Subsystem 186 described above. These sampled values are encoded as information within the data signals produced by such subsystems during the Discharging Mode. In accordance with the principles of the present invention, card-type "discharge parameters" shall include, but are not limited to: the discharging voltages produced across the cathode and anode structures along particular metal-fuel tracks monitored, for example, by the cathode-anode voltage monitoring subsystem 206A; the electrical (discharging) currents flowing across the cathode and anode structures along particular metal-fuel tracks monitored, for example, by the cathode-anode current monitoring subsystem 206B; the oxygen saturation level ($pO_{2d}$) within the cathode structure of each discharging head 197, monitored by the cathode oxygen pressure control subsystem (203, 270, 207, 208, 209, 210, 211); the moisture ($H_2O_d$) level (or relative humidity) level across or near the cathode-electrolyte interface along particular metal-fuel tracks in particular discharging heads monitored, for example, by the ion-concentration control subsystem (203, 212, 213, 214, 215, 216, 217, 218 and 219); the temperature ($T_r$) of the discharging heads during card discharging operations; and the time duration ($\Delta T_d$) of the state of any of the above-identified discharge parameters.

In general, there are a number of different ways in which the Data Capture and Processing Subsystem 400 can record card-type "discharge parameters" during the Recharging Mode of operation. These different methods will be detailed hereinbelow.

According to a first method of data recording shown in FIG. 4B9, card identifying code or indicia (e.g. miniature bar code symbol encoded with zone identifying information) 240 can be graphically printed on "optical" data track 241 during card manufacture, and can be read by an optical data reader 260 embodied within or adjacent each to discharging head. The optical data reading head 260 can be realized using optical scanning/decoding techniques (e.g. laser scanning bar code symbol readers, or optical decoders) well known in the art. In the illustrative embodiment, information representative of these unique card identifying codes is encoded within data signals provided to the Data Capture and Processing Subsystem 400, and subsequent recorded within the Metal-Fuel Database Management Subsystem 308 during discharging operations.

According to a second method of data recording illustrated in FIG. 4B9, a digital "card identifying" code 240' is magnetically recorded in magnetic data track 241' during card manufacture, and can be read during discharging operations using a magnetic reading head 270' embodied within or supported adjacent each discharging head. Each magnetic reading head 260' can be realized using magnetic information reading techniques (e.g. magstripe reading apparatus) well known in the art. In the illustrative embodiment, the digital data representative of these unique card identifying codes is encoded within data signals provided to the Data Capture and Processing Subsystem 400, and subsequent recorded within the Metal-Fuel Database Management Subsystem 308 during discharging operations.

According to a third method of data recording shown in FIG. 4B9, a unique digital "card identifying" code 240" is recorded as a sequence of light transmission apertures formed in an optically opaque data track 241" during card manufacture, and can be read during discharging operations by an optical sensing head 260" realized using optical sensing techniques well known in the art. In the illustrative embodiment, the digital data representative of these unique zone identifying codes is encoded within data signals provided to the Data Capture and Processing Subsystem 400, and subsequent recorded within the Metal-Fuel Database Management Subsystem 308 during discharging operations.

According to a fourth alternative method of data recording, both unique digital "card identifying" code and set of discharge parameters for each track on the identified metal-fuel card are recorded in a magnetic, optical, or apertured data track, realized as a strip attached to the surface of the metal-fuel card of the present invention. The block of information pertaining to a particular metal-fuel card can be recorded in the data track physically adjacent the related metal-fuel zone facilating easily access of such recorded information during the Discharging Mode of operation. Typically, the block of information will include the metal-fuel card identification number and a set of discharge parameters, as schematically indicated in FIG. 4A13, which are automatically detected by the Data Capture and Processing Subsystem 400 as the metal-fuel card is loaded within the discharging head assembly 197.

The first and second data recording methods described above have several advantages over the third method described above. In particular, when using the first and second methods, the data track provided along the metal-fuel card can have a very low information capacity. This is because very little information needs to be recorded to tag each metal-fuel card with a unique identifier (i.e. address number or card identification number), to which sensed discharge parameters are recorded in the Metal-Fuel Database Management Subsystem 308. Also, formation of a data track in accordance with the first and second methods should be very inexpensive, as well as providing apparatus for reading card identifying information recorded along such data tracks.

Discharging Power Regulation Subsystem within the Metal-Fuel Card Discharging Subsystem As shown in FIGS. 4A31, 4A32, and 4A4, the input port of the recharging power regulation subsystem 223 is operably connected to the output port of the cathode-anode input terminal configuration subsystem 205, whereas the output port of the recharging power regulation subsystem 223 is operably connected to the input port of the electrical load 200. While the primary function of the discharging power regulation subsystem 223 is to regulate the electrical power delivered the electrical load 200 during its Discharging Mode of operation (i.e. produced from discharged metal-fuel cards loaded within the discharging heads hereof), the discharging power regulation subsystem 223 has a mode of programmed operation, wherein the output voltage across the electrical load as well as the electrical current flowing across the cathode-electrolyte interface are regulated during discharging operations. Such control functions are managed by the system controller 203 and can be programmably selected in a variety of ways in order to achieve optimal regulation to the electrical load 200 as multi-tracked and single-tracked metal-fuel cards are discharged in accordance with the principles of the present invention.

The discharging power regulating subsystem 223 can be realized using solid-state power, voltage and current control circuitry well known in the power, voltage and current control arts. Such circuitry can include electrically-programmable power switching circuits using transistor-controlled technology, in which one or more current-controlled sources are connectable in electrical series with the cathode and anode structures in order to control the electrical currents therethrough in response to control signals produced by the system controller 203 carrying out a particular Discharging Power Control Method. Such electrically-programmable power switching circuits can also include transistor-controlled technology, in which one or more voltage-controlled sources are connectable in electrical parallel with the cathode and anode structures in order to control the voltage thereacross in response to control signals produced by the system, controller. Such circuitry can be combined and controlled by the system controller 203 in order to provide constant power (and/or voltage and/or current) control across the electrical load 200.

In the illustrative embodiments of the present invention, the primary function of the discharging power regulation subsystem 223 is to carry out real-time power regulation to the electrical load 200 using any one of the following Discharge Power Control Methods, namely: (1) a Constant Output Voltage/Variable Output Current Method, wherein the output voltage across the electrical load is maintained constant while the current is permitted to vary in response to loading conditions; (2) a Constant Output Current/Variable Output Voltage Method, wherein the current into the electrical load is maintained constant while the output voltage thereacross is permitted to vary in response to loading conditions; (3) a Constant Output Voltage/Constant Output Current Method, wherein the voltage across and current into the load are both maintained constant in response to loading conditions; (4) a Constant Output Power Method, wherein the output power across the electrical load is maintained constant in response to loading conditions; (5) a Pulsed Output Power Method, wherein the output power across the electrical load is pulsed with the duty cycle of each power pulse being maintained in accordance with preset conditions; (6) a Constant Output Voltage/Pulsed Output Current Method, wherein the output current into the electrical load is maintained constant while the current into the load is pulsed with a particular duty cycle; and (7) a Pulsed Output Voltage/Constant Output Current Method, wherein the output power into the load is pulsed while the current thereinto is maintained constant.

In the preferred embodiment of the present invention, each of the seven (7) Discharging Power Regulation Methods are preprogrammed into ROM associated with the system controller 203. Such power regulation methods can be selected in a variety of different ways, including, for example, by manually activating a switch or button on the system housing, or or by automatic detection of a physical, electrical, magnetic or optical condition established or detected at the interface between the electrical load and the Metal-Fuel Card Discharging Subsystem 186.

Input/Output Control Subsystem within the Metal-Fuel Card Discharging Subsystem

In some applications, it may be desirable or necessary to combine two or more FCB systems or their Metal-Fuel Card Discharging Subsystems 186 in order to form a resultant system with functionalities not provided by such subsystems operating alone. Contemplating such applications, the Metal-Fuel Card Discharging Subsystem 186 hereof includes Input/Output Control Subsystem 224 which allows an external system (e.g. microcomputer or microcontroller) to override and control aspects of the Metal-Fuel Card Discharging Subsystem 186 as if its system controller were carrying out such control functions. In the illustrative embodiment, the Input/Output Control Subsystem 224 is realized as a standard IEEE I/O bus architecture which provides an external or remote computer system with a way of and means for directly interfacing with the system controller 203 of the Metal-Fuel Card Discharging Subsystem 186 and managing various aspects of system and subsystem operation in a straightforward manner.

System Controller within the Metal-Fuel Card Discharging Subsystem

As illustrated in the detailed description set forth above, the system controller 203 performs numerous operations in order to carry out the diverse functions of the FCB system within its Discharging Mode. In the preferred embodiment of the FCB system of FIG. 3, the system controller 203 is realized using a programmed microcontroller having program and data storage memory (e.g. ROM, EPROM, RAM and the like) and a system bus structure well known in the microcomputing and control arts. In any particular embodiment of the present invention, it is understood that two or more microcontrollers may be combined in order to carry out the diverse set of functions performed by the FCB system hereof. All such embodiments are contemplated embodiments of the system of the present invention.

Discharging Metal-Fuel Cards using the Metal-Fuel Card Discharging Subsystem

FIG. 4A5 forth a high-level flow chart describing the basic steps of discharging metal-fuel cards using the Metal-Fuel Card Discharging Subsystem shown in FIGS. 4A31, 4A32 and 4A4.

As indicated at Block A of FIG. 4A5, the Recharged Card Loading Subsystem 189 transports four recharged metal-fuel cards 187 from the bottom of the recharged metal-fuel card storage bin 188A into the card discharging bay of the Metal-Fuel Card Discharging Subsystem 186, as illustrated in FIG. 4A1.

As indicated at Block B, the Discharge Head Transport Subsystem 204 arranges the recharging heads 197 about the metal-fuel cards loaded into the discharging bay of the Metal-Fuel Card Discharging Subsystem 186 so that the ionically-conducting medium is disposed between each cathode structure and loaded metal-fuel card, as shown in FIG. 4A2.

As indicated at Block C, the Discharge Head Transport Subsystem 204 then configures each discharging head so that its cathode structure is in ionic contact with a loaded metal-fuel card and its anode contacting structure is in electrical contact therewith.

As indicated at Block D in FIG. 4A5, the cathode-anode input terminal configuration subsystem 205 automatically configures the output terminals of each discharging head 197 arranged about a loaded metal-fuel card, and then the system controller 203 controls the Metal-Fuel Card Discharging Subsystem 186 so that electrical power is generated and supplied to the electrical load 200 at the required output voltage and current levels.

As indicated at Block E in FIG. 4A5, when one or more of the metal-fuel cards are discharged, then the Discharged Card Unloading Subsystem 190 transports the discharged metal-fuel cards to the top of the discharged metal-fuel cards in the discharged metal-fuel card storage bin 188B. Thereafter, as indicated at Block F, the operations recited at Blocks A through E are repeated in order to load additional recharged metal-fuel cards into the discharge bay for discharging.

Metal-Fuel Card Recharging Subsystem for the Second Illustrative Embodiment of the Metal-Air FCB System of the Present Invention As shown in FIGS. 4B31, 4B32, and 4B4, the Metal-Fuel Card Recharging Subsystem 191 of the second illustrative embodiment comprises a number of subsystems, namely: an assembly of multi-track metal-oxide reducing (i.e. recharging) heads 197', each having multi-element cathode structures 198' and anode-contacting structures 199' with electrically-conductive input terminals connectable in a manner to be described hereinbelow; a recharging head transport subsystem 204' for transporting the subcomponents of the recharging head assembly 197'; an input power supply subsystem 243 for converting externally supplied AC power signals into DC power supply signals having voltages suitable for recharging metal-fuel tracks along fuel cards loaded within the recharging heads of the Metal-Fuel Card Recharging Subsystem 191; a cathode-anode input terminal configuration subsystem 244, for connecting the output terminals (port) of the input power supply subsystem 243 to the input terminals (port) of the cathode and anode-contacting structures of the recharging heads 197', under the control of the system controller 203' so as to supply input voltages thereto for electro-chemically converting metal-oxide formations into its primary metal during the Recharging Mode; a cathode-anode voltage monitoring subsystem 206A', connected to the cathode-anode input terminal configuration subsystem 244, for monitoring (i.e. sampling) the voltage applied across the cathode and anode structure of each track in each recharging head, and producing (digital) data representative of the sensed voltage levels; a cathode-anode current monitoring subsystem 206B', connected to the cathode-anode input terminal configuration subsystem 244, for monitoring (i.e. sampling) the electrical currents flowing through the cathode and anode structure of each track in each recharging head, and producing (digital) data representative of the sensed current levels; a cathode oxygen pressure control subsystem comprising the system controller 203', solid-state $pO_2$ sensors 250', a vacuum chamber (structure) 207' as shown in FIGS. 4B31, 4B32, 4B4 and 4B6, a vacuum pump 208', an electronically-controlled airflow control device 209', a manifold structure 210', and multi-lumen tubing 211' shown in FIGS. 4B31, 4B32 and 4B4, arranged together as shown for sensing and controlling the $pO_2$ level within each channel of the cathode support structure of each recharging head 197'; an ion-concentration control subsystem comprising system controller 203', solid-state moisture sensors (hydrometer) 212', a moisturizing (e.g. micro-sprinklering element) 213' realized as a micro-sprinkler embodied within the walls structures of the cathode support plate 198' (having water expressing holes 214" disposed along each wall surface as shown in FIG. 4B6), a water pump 215', a water reservoir 216', a water flow control valve 217', a manifold structure 218' and multi-lumen conduits 219' extending into moisture delivery structure 213', arranged together as shown for sensing and modifying conditions within the FCB system (e.g. the moisture level or relative humidity at the cathode-electrolyte interface of the recharging heads 197') so that the ion-concentration at the cathode-electrolyte interfaces thereof is maintained within an optimal range during the Recharge Mode of operation to facilitate optimal ion transport thereacross; recharge head temperature control subsystem comprising the system controller 203', solid-state temperature sensors (e.g. thermistors) 305' embedded within each channel of the multi-cathode support structure 198'hereof, and a recharge head cooling device 306', responsive to control signals produced by the system controller 203', for lowering the temperature of each recharging channel to within an optimal temperature range during recharging operations; a relational-type metal-fuel database management subsystem (MFDMS) 404 operably connected to system controller 203' by way of local system bus 405, and designed for receiving particular types of information devised from the output of various subsystems within the Metal-Fuel Card Recharging Subsystem 191; a Data Capture and Processing Subsystem (DCPS) 406, comprising data reading head 270 (270', 270") embedded within or mounted closely to the cathode support structure of each recharging head 197', and a programmed microprocessor-based data processor adapted to receive data signals produced from cathode-anode voltage monitoring subsystem 206A', cathode-anode current monitoring subsystem 206B', the cathode oxygen pressure control subsystem, the recharge head temperature control subsystem and the ion-concentration control subsystem hereof, and enable (i) the reading of metal-fuel card identification data from the loaded metal-fuel card, (ii) the recording of sensed recharge parameters and computed metal-fuel indicative data derived therefrom in the Metal-Fuel Database Management Subsystem 404 using local system bus 407, and (iii) the reading of prerecorded discharge parameters and prerecorded metal-oxide indicative data stored in the Metal-Fuel Database Management Subsystem 404 using local system bus 405; an input/output control subsystem 224', interfaced with the system controller 203', for controlling all functionalities of the FCB system by way of a remote system or resultant system, within which the FCB system is embedded; and system controller 203' for managing the operation of the above mentioned subsystems during the various modes of system operation. These subsystems will be described in greater technical detail below.

Multi-Zone Recharging Head Assembly within the Metal-Fuel Card Recharging Subsystem The function of the assembly of multi-zone recharging heads 197' is to electro-chemically reduce metal-oxide formations along the zones of metal-fuel cards loaded within the recharging head assembly during the Recharging Mode of operation. In the illustrative embodiment, each recharging head 197' comprises: a cathode element support plate 198' having a plurality of isolated recesses 231A' through 231D' with perforated bottom panels permitting the free flow of oxygen ($O_2$) therethrough; a plurality of electrically-conductive cathode elements (e.g. strips) 196A' through 196D' for insertion within the lower portion of these recesses 231A' through 231D', respectively; a plurality of electrolyte-impregnated strips 226A' through 226D' for placement over the cathode strips 196A' through 196D', and support within the recesses, respectively, as shown in FIG. 4B6; and oxygen-evacuation chamber 207' mounted over the upper (back) surface of the cathode element support plate 198', in a sealed manner, as shown in FIG. 4B12.

As shown in FIGS. 4B31, 4B32, and 4B7, the oxygen-evacuation chamber 207' has a plurality of subchambers 207A' through 207D' physically associated with recesses 231A' through 231D', respectively. Each vacuum subchamber 207A' through 207D' is isolated from all other subchambers and is in fluid communication with one channel supporting a cathode element and an electrolyte-impregnated element. As shown, each with vacuum pump 208' via one lumen of multi-lumen tubing 211', one channel of manifold assembly 210' and one channel of air-flow switch 209', each of whose operation is controlled by system controller 203'. This arrangement enables the system controller 203' to independently control the $pO_2$ level in each oxygen-evacuation subchamber 207A' through 207D' by selectively evacuating air from the chamber through the corresponding air flow channel in the manifold assembly 210.

As shown in FIG. 4B8B, electrolyte-impregnated strips 226A' through 226D' are realized by impregnating an electrolyte-absorbing carrier strip with a gel-type electrolyte. Preferably, the electrolyte-absorbing carrier strip is realized as a strip of low-density, open-cell foam material made from PET plastic. The gel-electrolyte for the discharging cell is made from a formula consisting of alkali solution, a gelatin material, water, and additives well known in the art.

As shown in FIG. 4B8A, each cathode strip 196A' through 196D' is made from a sheet of nickel wire mesh 228' coated with porous carbon material and granulated platinum or other catalysts 229' to form a cathode element that is suitable for use in metal-air FCB systems. Details of cathode construction for use in air-metal FCB systems are disclosed in U.S. Pat. Nos. 4,894,296 and 4,129,633, incorporated herein by reference. To form a current collection pathway, an electrical conductor (nickel) 230' is soldered to the underlying wire mesh sheet 228' of each cathode strip. As shown in FIG. 4B6, each electrical conductor 230 attached to its cathode strip is passed through a hole 231' formed in the bottom surface of a recess of the cathode support plate, and is connected to the cathode-electrolyte input terminal configuration subsystem 244' shown in FIGS. 4B31, 4B32, and 4B4. During assembly, the cathode strip pressed into the lower portion of the recess to secure the same therein.

As shown in FIG. 4B6, the bottom surface of each recess 224A' through 224D' has numerous perforations 225' formed therein to allow the a free passage of air and oxygen therethrough to the cathode strip 196A' through 196D', respectively, (at atmospheric temperature and pressure). In the illustrative embodiment, electrolyte-impregnated strips 226A' through 226D' are placed over cathode strips 196A' through 196D', respectively, and are secured within the upper portion of the cathode supporting recesses by adhesive, retaining structures or the like. As shown in FIG. 4B12, when the cathode strips and thin electrolyte strips are mounted in their respective recesses in the cathode support plate 198', the outer surface of each electrolyte-impregnated strip is disposed flush with the upper surface of the cathode support plate 198'.

The interior surfaces of the cathode support recesses 224A' through 224D' are coated with a hydrophobic material (e.g. Teflon) 45" to ensure the expulsion of water within electrolyte-impregnated strips 226A' through 226D' and thus optimum oxygen transport across the cathode strips. Hydrophobic agents are added to the carbon material constituting the oxygen-pervious cathode elements in order to repel water therefrom. Preferably, the cathode support plate is made from an electrically non-conductive material, such as polyvinyl chloride (PVC) plastic material well known in the art. The cathode support plate can be fabricated using injection molding technology also well known in the art.

In FIG. 4B7, the oxygen-injection chamber 207' is shown realized as a plate-like structure having dimensions similar to that of the cathode support plate 198'. As shown, the oxygen-injection chamber has four (4) recesses 207A' through 207D' which spatially correspond to and are in spatial registration with cathode recesses 224A' through 224D', respectively, when oxygen-injection chamber 207' is mounted upon the top surface of the cathode support plate 198', as shown in FIG. 4B12. Four small conduits are formed within the recessed plate 207', namely: between inlet opening 207E1' and outlet opening 207A1'; between inlet opening 207E2' and outlet opening 207B1'; between inlet opening 207E3' and outlet opening 207C1'; and between inlet opening 207E4' and outlet opening 207D1'. When recessed plate 207' is mounted upon the cathode support plate 198', subchambers 207A' through 207D' are formed between recesses 207A' through 207D' and the back portion of the perforated cathode support plate 198'. Each lumen of the multi-lumen conduit 211' is connected to one of the four inlet openings 207E1' through 207E4', and thereby arranges the subchambers 207A' through 207D' in fluid communication with the four controlled $O_2$-flow channels within the $pO_2$ control subsystem in the Recharging Subsystem 191.

The structure of an assembled multi-tracked fuel card 187 partially oxidized is illustrated in FIG. 4B9. While not shown, metal-oxide patterns are formed along each anode fuel strip 195A' through 195D' in response to electrical loading conditions during discharging operations.

In FIG. 4B11, an exemplary metal-fuel (anode) contacting structure (assembly) 199' is disclosed for use with the multi-tracked fuel card 187 having anode support structure 228' shown in FIG. 4B6. As shown, a plurality of electrically conductive elements 232A' through 232D' in the form of conductive posts are supported from a metal-fuel contacting support platform 233'. The position of these electrically conductive posts spatially coincide with the holes 230' formed in the bottom surfaces of recesses 229A' through 229D' in the anode supporting plate 228'. As shown, electrical conductors 234A' through 234D' are electrically connected to conductive posts 232A' through 232D', respectively, and anchored along the surface of the anode support plate (e.g. within a recessed groove) and terminated in a conventional connector 235B, similar to conductor terminations at electrical connector 235A'. This connector is electrically connected to the cathode-anode input terminal configuration subsystem 244 as shown in FIGS. 4B31, 4B32 and 4B4. The width and length dimensions of the anode contacting support plate 233 are substantially similar to the width and length dimensions of the cathode support plate 198' as well as the anode (metal-fuel) support plate 228'.

FIG. 4B12 illustrates the spatial relationship between the anode contacting support plate 233', cathode support plate 198', oxygen-injection chamber plate 207', and anode (metal-fuel) support plate (i.e. fuel card) 228 when the fuel card is loaded therebetween. In this loaded configuration, each cathode element 196A' through 196D' along the cathode support plate establishes ionic contact with the front exposed surface of the corresponding metal fuel strip (i.e. zone) 195A' through 195D' by way of the electrolyte-impregnated pad 226A' through 226D' disposed therebetween Also, in this loaded configuration, each anode-contacting element (e.g. conductive post) 232A'–232D' projects from the anode contacting support plate 233' through the central hole 230' in the bottom panel of a recess formed in the anode contacting support plate 199' and establishes electrical contact with the corresponding metal fuel strip mounted therein, completing an electrical circuit through a single air-metal fuel cell of the present invention.

Recharging Head Transport Subsystem within the Metal-Fuel Card Recharging Subsystem The primary function of the recharging head transport subsystem 204' is to transport the assembly of recharging heads 197' about the metal-fuel cards that have been loaded into the recharging bay of the subsystem as shown in FIGS. 4B31, 4B32, and 4B4. When properly transported, the cathode and anode-contacting structures of the recharging heads are brought into "ionically-conductive" and "electrically-conductive" contact with the metal-fuel zones of loaded metal-fuel cards during the Recharging Mode.

The recharging head transport subsystem 204' can be realized using any one of a variety of electro-mechanical mechanisms capable of transporting the cathode supporting and anode-contacting structures of each recharging head 197' away from the metal-fuel card 187, as shown in FIGS. 4B31 and 4B32, and about the metal-fuel card as shown in FIG. 4B4. As shown, these transport mechanisms are operably connected to system controller 203' and controlled by the same in accordance with the system control program carried out thereby.

Input Power Supply Subsystem within the Metal-Fuel Card Recharging Subsystem

In the illustrative embodiment, the primary function of the Input Power Supply Subsystem 243 is to receive as input, standard alternating current (AC) electrical power (e.g. at 120 or 220 Volts) through an insulated power cord, and to convert such electrical power into regulated direct current (DC) electrical power at a regulated voltage required at the recharging heads 197' of the Metal-Fuel Card Recharging Subsystem 191 during the recharging mode of operation. For zinc anodes and carbon cathodes, the required "open-cell" voltage $v_{acr}$ across each anode-cathode structure during recharging is about 2.2–2.3 Volts in order to sustain electrochemical reduction. This subsystem can be realized in various ways using power conversion and regulation circuitry well known in the art.

Cathode-Anode Input Terminal Configuration Subsystem within the Metal-Fuel Card Recharging Subsystem As shown in FIGS. 4B31, 4B32 and 4B4, the cathode-anode input terminal configuration subsystem 244 is connected between the input terminals of the recharging power regulation subsystem 245 and the input terminals of the cathode-anode pairs associated with multiple tracks of the recharging heads 197'. The system controller 203' is operably connected to cathode-anode input terminal configuration subsystem 244 in order to supply control signals thereto for carrying out its functions during the Recharge Mode of operation.

The function of the cathode-anode input terminal configuration subsystem 244 is to automatically configure (in series or parallel) the input terminals of selected cathode-anode pairs within the recharging heads of the Metal-Fuel Card Recharging Subsystem 191 so that the required input (recharging) voltage level is applied across cathode-anode structures of metal-fuel tracks requiring recharging. In the illustrative embodiment of the present invention, the cathode-anode input terminal configuration mechanism 244 can be realized as one or more electrically-programmable power switching circuits using transistor-controlled technology, wherein the cathode and anode-contacting elements within the recharging heads 197' are connected to the output terminals of the input power regulating subsystem 245. Such switching operations are carried out under the control of the system controller 203' so that the required output voltage produced by the recharging power regulating subsystem 245 is applied across the cathode-anode structures of metal-fuel tracks requiring recharging.

Cathode-Anode Voltage Monitoring Subsystem within the Metal-Fuel Card Recharging Subsystem As shown in FIGS. 4B31, 4B32 and 4B4, the cathode-anode voltage monitoring subsystem 206A' is operably connected to the cathode-anode input terminal configuration subsystem 244 for sensing voltage levels across the cathode and anode structures connected thereto. This subsystem is also operably connected to the system controller 203' for receiving control signals therefrom required to carry out its functions. In the first illustrative embodiment, the cathode-anode voltage monitoring subsystem 206A' has two primary functions: to automatically sense the instantaneous voltage levels applied across the cathode-anode structures associated with each metal-fuel zone loaded within each recharging head during the Recharging Mode; and to produce (digital) data signals indicative of the sensed voltages for detection and analysis by the Data Capture and Processing Subsystem 406 within the Metal-Fuel Card Recharging Subsystem 191.

In the first illustrative embodiment of the present invention, the cathode-anode voltage monitoring subsystem 206A' can be realized using electronic circuitry adapted for sensing voltage levels applied across the cathode-anode structures associated with each metal-fuel zone within each recharging head within the Metal-Fuel Card Recharging Subsystem 191. In response to such detected voltage levels, the electronic circuitry can be designed to produce a digital data signal indicative of the sensed voltage levels for detection and analysis by the Data Capture and Processing Subsystem 406. As will be described in greater detail hereinafter, such data signals can be used by the system controller 203' to carry out its Recharging Power Regulation Method during the Recharging Mode of operation.

Cathode-Anode Current Monitoring Subsystem within the Metal-Fuel Card Recharging Subsystem As shown in FIGS. 4B31, 4B32 and 4B4, the cathode-anode current monitoring subsystem 206B' is operably connected to the cathode-anode input terminal configuration subsystem 244. The cathode-anode current monitoring subsystem 206B' has two primary functions: to automatically sense the magnitude of electrical current flowing through the cathode-anode pair of each metal-fuel track along each recharging head assembly within the Metal-Fuel Card Recharging Subsystem 191 during the discharging mode; and to produce digital data signal indicative of the sensed currents for detection and analysis by Data Capture and Processing Subsystem 406 within the Metal-Fuel Card Recharging Subsystem 191.

In the second illustrative embodiment of the present invention, the cathode-electrolyte current monitoring subsystem 206B' can be realized using current sensing circuitry for sensing the electrical current passed through the cathode-anode pair of each metal-fuel track (i.e. strip) along each recharging head assembly, and producing digital data signals indicative of the sensed current levels. As will be explained in greater detail hereinafter, these detected current levels can be used by the system controller in carrying out its recharging power regulation method, and well as creating a "recharging condition history" information file for each zone or subsection of recharged metal-fuel card.

Cathode Oxygen Pressure Control Subsystem within the Metal-Fuel Card Recharging Subsystem The function of the cathode oxygen pressure control subsystem is to sense the oxygen pressure ($pO_2$) within each subchannel of the cathode structure of the recharging heads 175, and in response thereto, control (i.e. increase or decrease) the same by regulating the air ($O_2$) pressure within the subchannels of such cathode structures within each recharging head 197'. In accordance with the present invention, partial oxygen pressure ($pO_2$) within each subchannel of the cathode structure of each recharging head is maintained at an optimal level in order to allow optimal oxygen evacuation from the recharging heads during the Recharging Mode. By lowering the $pO_2$ level within each channel of the cathode structure (by evacuation), metal-oxide along metal-fuel cards can be completely recovered with optimal use of input power supplied to the recharging heads during the Recharging Mode. Also, by monitoring changes in $pO_2$ and producing digital data signals representative thereof for detection and analysis by Data Capture and Processing Subsystem 406 and ultimate response the system controller 203'. Thus the system controller 203' is provided with a controllable variable for use in regulating the electrical power supplied to the discharged fuel tracks during the Recharging Mode.

Ion-Concentration Control Subsystem within the Metal-Fuel Card Recharging Subsystem In the illustrative embodiment of FIG. 3, ion-concentration control within each recharging head 197' is achieved by embedding a miniature solid-state humidity (or moisture) sensor 212' within the cathode support structure 121' as shown in FIG. 4B6 (or as close as possible to the anode-cathode interfaces) in order to sense moisture or humidity conditions therein and produce a digital data signal indicative thereof. This digital data signal is supplied to the Data Capture and Processing Subsystem 406 for detection and analysis. In the event that the moisture level or relative humidity drops below the predetermined threshold value set in memory (ROM) within the system controller, the system controller 203', monitoring information in the Metal-Fuel Database Management Subsystem 404 automatically generates a control signal supplied to a moisturizing element 213', realizable as a micro-sprinkling structure embodied within the walls of the cathode support structure 198'. In the illustrative embodiment, the walls function as water-carrying conduits which express fine water droplets out of micro-sized holes 214' in a manner similar to that carried out in the cathode support structure 198 in the discharge heads 197. Thus the function of the water pump 215', water reservoir 216', water flow-control valve 217', manifold assembly 218' and multi-lumen tubing 219' is similar to water pump 215, water reservoir 216, water flow-control valve 217, manifold assembly 218 and multi-lumen tubing 219, respectively.

Such operations will increase (or decrease) the moisture level or relative humidity within the interior of the cathode support structure channels and thus ensure that the concentration of KOH within the electrolyte within electrolyte-impregnated strips supported therewithin is optimally maintained for ion transport and thus metal-oxide reduction during card recharging operations.

Data Capture and Processing Subsystem within the Metal-Fuel Card Recharging Subsystem In the illustrative embodiment of FIG. 3, Data Capture And Processing Subsystem (DCPS) 406 shown in FIGS. 4B31, 4B32 and 4B4 carries out a number of functions, including, for example: (1) identifying each metal-fuel card immediately before it is loaded within a particular recharging head within the recharging head assembly 197' and producing metal-fuel card identification data representative thereof; (2) sensing (i.e. detecting) various "recharge parameters" within the Metal-Fuel Card Recharging Subsystem 191 existing during the time period that the identified metal-fuel card is loaded within the recharging head assembly thereof; (3) computing one or more parameters, estimates or measures indicative of the amount of metal-fuel produced during card recharging operations, and producing "metal-fuel indicative data" representative of such computed parameters, estimates and/or measures; and (4) recording in the Metal-Fuel Database Management Subsystem 404 (accessible by system controller 203'), sensed recharge parameter data as well as computed metal-fuel indicative data both correlated to its respective metal-fuel track/card identified during the Recharging Mode of operation. As will become apparent hereinafter, such recorded information maintained within the Metal-Fuel Database Management Subsystem 404 by Data Capture and Processing Subsystem 406 can be used by the system controller 203' in various ways including, for example: optimally recharging partially or completely oxidized metal-fuel cards in a rapid manner during the Recharging Mode of operation.

During recharging operations, the Data Capture and Processing Subsystem 406 automatically samples (or captures) data signals representative of "recharge parameters" associated with the various subsystems constituting the Metal-Fuel Card Recharging Subsystem 191 described above. These sampled values are encoded as information within the data signals produced by such subsystems during the Recharging Mode. In accordance with the principles of the present invention, card-type "recharge parameters" shall include, but are not limited to: the voltages produced across the cathode and anode structures along particular metal-fuel zones monitored, for example, by the cathode-anode voltage monitoring subsystem 206A'; the electrical currents flowing through the cathode and anode structures along particular metal-fuel tracks monitored, for example, by the cathode-anode current monitoring subsystem 206B'; the oxygen saturation level ($pO_2$) within the cathode structure of each recharging head 197', monitored by the cathode oxygen pressure control subsystem (203', 250', 208', 209', 210', 211'); the moisture ($H_2O$) level (or relative humidity) level across or near the cathode-electrolyte interface along particular metal-fuel tracks in particular recharging heads monitored, for example, by the ion-concentration control subsystem (203', 212', 214', 215', 216', 217', 218', 219'); the temperature ($T_r$) of the recharging heads 197' during card recharging operations; and the time duration ($\Delta T_r$) of the state of any of the above-identified recharge parameters.

In general, there are a number of different ways in which the Data Capture and Processing Subsystem can record card-type "recharge parameters" during the Recharging Mode of operation. These different methods will be detailed hereinbelow.

According to a first method of data recording shown in FIG. 4B9, card identifying code or indicia (e.g. miniature bar code symbol encoded with zone identifying information) 240 graphically printed on an "optical" data track 241, can be read by optical data reader 270 realized using optical techniques (e.g. laser scanning bar code symbol readers, or optical decoders). In the illustrative embodiment, information representative of these unique card identifying codes is encoded within data signals provided to the Data Capture and Processing Subsystem 406, and subsequently recorded within the Metal-Fuel Database Management Subsystem 404 during recharging operations.

According to a second method of data recording shown in FIG. 4B9, digital "card identifying" code 240' magnetically recorded in a magnetic data track 241', can be read by magnetic reading head 270' realized using magnetic information reading techniques well known in the art. In the illustrative embodiment, the digital data representative of these unique card identifying codes is encoded within data signals provided to the Data Capture and Processing Subsystem 406, and subsequent recorded within the Metal-Fuel Database Management Subsystem 404 during recharging operations.

According to a third method of data recording shown in FIG. 4B9, digital "card identifying" code recorded as a sequence of light transmission apertures 240" in an optically opaque data track 241", can be read by optical sensing head 270" realized using optical sensing techniques well known in the art. In the illustrative embodiment, the digital data representative of these unique zone identifying codes is encoded within data signals provided to the Data Capture and Processing Subsystem 406, and subsequently recorded within the Metal-Fuel Database Management Subsystem 404 during recharging operations.

According to a fourth alternative method of data recording, both unique digital "card identifying" code and set of recharge parameters for each track on the identified metal-fuel card are recorded in a magnetic, optical, or apertured data track, realized as a strip attached to the surface of the metal-fuel card of the present invention. The block of information pertaining to a particular metal-fuel card can be recorded in the data track physically adjacent to the related metal-fuel zone facilating easy access of such recorded information during the Recharging Mode of operation. Typically, the block of information will include the metal-fuel card identification number and a set of recharge parameters, as schematically indicated in FIG. 4B13, which are automatically detected by the Data Capture and Processing Subsystem 406 as the metal-fuel card is loaded within the recharging head assembly 197'.

The first and second data recording methods described above have several advantages over the third method described above. In particular, when using the first and second methods, the data track provided along the metal-fuel card can have a very low information capacity. This is because very little information needs to be recorded to tag each metal-fuel card with a unique identifier (i.e. address number or card identification number), to which sensed recharge parameters are recorded in the Metal-Fuel Database Management Subsystem 404. Also, formation of a data track in accordance with the first and second methods should be very inexpensive to fabricate, and easy to read using disclosed apparatus for reading card identifying information recorded along such data tracks.

Input/Output Control Subsystem within the Metal-Fuel Card Recharging Subsystem

In some applications, it may be desirable or necessary to combine two or more FCB systems or their Metal-Fuel Card Recharging Subsystems 191 in order to form a resultant system with functionalities not provided by such subsystems operating alone. Contemplating such applications, the Metal-Fuel Card Recharging Subsystem 191 hereof includes an Input/Output Control Subsystem 224' which allows an external system (e.g. microcomputer or microcontroller) to override and control aspects of the Metal-Fuel Card Recharging Subsystem as if its system controller 203' were carrying out such control functions. In the illustrative embodiment, the Input/Output Control Subsystem 224' is realized as a standard IEEE I/O bus architecture which provides an external or remote computer system with a way and means of directly interfacing with the system controller 203' of the Metal-Fuel Card Recharging Subsystem 191 and managing various aspects of system and subsystem operation in a straightforward manner.

Recharging Power Regulation Subsystem within the Metal-Fuel Card Recharging Subsystem As shown in FIGS. 4B31, 4B32 and 4B4, the output port of the recharging power regulation subsystem 244 is operably connected to the input port of the cathode-anode input terminal configuration subsystem 244, whereas the input port of the recharging power regulation subsystem 245 is operably connected to the output port of the input power supply 243. While the primary function of the recharging power regulation subsystem 245 is to regulate the electrical power supplied to the metal-fuel card during the Recharging Mode of operation, the recharging power regulation subsystem 245 can also regulate the voltage applied across the cathode-anode structures of the metal-fuel tracks, as well as the electrical currents flowing through the cathode-electrolyte interfaces thereof during recharging operations. Such control functions are managed by the system controller 203' and can be programmably selected in a variety of ways in order to achieve optimal recharging of multi-tracked and single-tracked metal-fuel card according to the present invention.

The input power regulating subsystem 245 can be realized using solid-state power, voltage and current control circuitry well known in the power, voltage and current control arts. Such circuitry can include electrically-programmable power switching circuits using transistor-controlled technology, in which one or more current-controlled sources are connectable in electrical series with the cathode and anode structures in order to control the electrical currents therethrough in response to control signals produced by the system controller carrying out a particular Recharging Power Control Method. Such electrically-programmable power switching circuits can also include transistor-controlled technology, in which one or more voltage-controlled sources are connectable in electrical parallel with the cathode and anode structures in order to control the voltage thereacross in response to control signals produced by the system controller. Such circuitry can be combined and controlled by the system controller 203' in order to provide constant power (and/or voltage and/or current) control across the cathode-anode structures of the metal-fuel card 187.

In the illustrative embodiments of the present invention, the primary function of the recharging power regulation subsystem 245 is to carry out real-time power regulation to the cathode/anode structures of metal-fuel card 187 using any one of the following methods, namely: (1) a Constant Input Voltage/Variable Input Current Method, wherein the input voltage applied across each cathode-anode structure is maintained constant while the current therethrough is permitted to vary during recharging operation; (2) a Constant Input Current/Variable Input Voltage Method, wherein the current into each cathode-anode structure is maintained constant while the output voltage thereacross is permitted to vary during recharging operation; (3) a Constant Input Voltage/Constant Input Current Method, wherein the voltage applied across and current into each cathode-anode structure during recharging are both maintained constant; (4) a Constant Input Power Method, wherein the input power applied across each cathode-anode structure during recharging is maintained constant; (5) a Pulsed Input Power Method, wherein the input power applied across each cathode-anode structure during recharging pulsed with the duty cycle of each power pulse being maintained in accordance with preset or dynamic conditions; (6) a Constant Input Voltage/Pulsed Input Current Method, wherein the input current into each cathode-anode structure during recharging is maintained constant while the current into the cathode-anode structure is pulsed with a particular duty cycle; and (7) a Pulsed Input Voltage/Constant Input Current Method, wherein the input power supplied to each cathode-anode structure during recharging is pulsed while the current thereinto is maintained constant.

In the preferred embodiment of the present invention, each of the seven (7) Recharging Power Regulation Methods are preprogrammed into ROM associated with the system controller 203'. Such power regulation methods can be selected in a variety of different ways, including, for example, by manually activating a switch or button on the system housing, or by automatically detecting a physical, electrical, magnetic an/or optical condition established or detected at the interface between the metal-fuel card device and the Metal-Fuel Card Recharging Subsystem 191.

System Controller within the Metal-Fuel Card Recharging Subsystem

As illustrated in the detailed description set forth above, the system controller 203' performs numerous operations in order to carry out the diverse functions of the FCB system within its Recharging Mode. In the preferred embodiment of the FCB system of FIG. 3, the subsystem used to realize the system controller 203' in the Metal-Fuel Card Recharging Subsystem 191 is the same subsystem used to realize the system controller 203 in the Metal-Fuel Card Discharging Subsystem 186. It is understood, however, the system controllers employed in the Discharging and Recharging Subsystems 186 and 191 can be realized as separate subsystems, each employing one or more programmed microcontrollers in order to carry out the diverse set of functions performed by the FCB system hereof. In either case, the input/output control subsystem of one of these subsystems can be designed to be the primary input/output control subsystem, with which one or more external subsystems (e.g. a management subsystem) can be interfaced to enable external or remote management of the functions carried out within FCB system hereof.

Recharging Metal-Fuel Cards using the Metal-Fuel Card Recharging Subsystem

FIG. 4B5 sets forth a high-level flow chart describing the basic steps of recharging metal-fuel cards using the Metal-Fuel Card Recharging Subsystem 191 shown in FIGS. 4B31, 4B32 through 4B4.

As indicated at Block A in FIG. 4B5, the Discharge Card Loading Subsystem 192 transports four discharged metal-fuel cards 187 from the bottom of the discharged metal-fuel card storage bin 188B into the card recharging bay of the Metal-Fuel Card Recharging Subsystem 191, as illustrated in FIG. 4B1.

As indicated at Block B, the Recharge Head Transport Subsystem 204' arranges the recharging heads 197' about the metal-fuel cards loaded into the recharging bay of the Metal-Fuel Card Recharging Subsystem 191 so that the ionically-conducting medium is disposed between each cathode structure and loaded metal-fuel card.

As indicated at Block C, the Recharge Head Transport Subsystem 204' then configures each recharging head 197' so that its cathode structure is in ionic contact with a loaded metal-fuel card and its anode contacting structure is in electrical contact therewith.

As indicated at Block D in FIG. 4B5, the cathode-anode input terminal configuration subsystem 244 automatically configures the input terminals of each recharging head 197' arranged about a loaded metal-fuel card, and then the system controller 203' controls the Metal-Fuel Card Recharging Subsystem 191 so that electrical power is supplied to the metal fuel zones of the metal-fuel cards at the voltage and current level required for optimal recharging.

As indicated at Block E in FIG. 4B5, when one or more of the metal-fuel cards are recharged, then the Recharge Card Unloading Subsystem 193 transports the recharged metal-fuel card(s) to the top of the recharged metal-fuel cards in the recharged metal-fuel card storage bin 188B, as shown in FIG. 4B2. Thereafter, as indicated at Block F, the operations recited at Blocks A through E are repeated in order to load additional discharged metal-fuel cards into the recharge bay for recharging.

Managing Metal-Fuel Availability and Metal-Oxide Presence within the Second Illustrative Embodiment of the Metal-Air FCB System of the Present Invention
During the Discharging Mode:

In the FCB system of the second illustrative embodiment shown in FIG. 6, means are provided for automatically managing the metal-fuel availability within the Metal-Fuel Card Discharging Subsystem 186 during discharging operations. Such system capabilities will be described in greater detail hereinbelow.

As shown in FIG. 4B14, data signals representative of discharge parameters (e.g. $i_{acd}$, $v_{acd}$, ..., $pO_{2d}$, $H_2O_d$, $T_{acd}$, $v_{acr}/i_{acr}$) are automatically provided as input to the Data Capture and Processing Subsystem 400 within the Metal-Fuel Card Discharging Subsystem 186. After sampling and capturing, these data signals are processed and converted into corresponding data elements and then written into an information structure 409 as shown, for example, in FIG. 4A13. Each information structure 409 comprises a set of data elements which are "time-stamped" and related (i.e. linked) to a unique metal-fuel card identifier 240 (240', 240"), associated with a particular metal-fuel card. The unique metal-fuel card identifier is determined by data reading head 260 (260', 260") shown in FIG. 4A6. Each time-stamped information structure is then recorded within the Metal-Fuel Database Management Subsystem 308 within the Metal-Fuel Card Discharging Subsystem 186, for maintenance, subsequent processing and/or access during future recharging and/or discharging operations.

As mentioned hereinabove, various types of information are sampled and collected by the Data Capture and Processing Subsystem 400 during the discharging mode. Such information types include, for example: (1) the amount of electrical current ($i_{acd}$) discharged across particular cathode-anode structures within particular discharge heads; (2) the voltage generated across each such cathode-anode structure; (3) the oxygen concentration ($pO_{2d}$) level in each subchamber within each discharging head; (4) the moisture level ($H_2O_d$) near each cathode-electrolyte interface within each discharging head; and (5) the temperature ($T_{acd}$) within each channel of each discharging head. From such collected information, the Data Capture and Processing Subsystem

400 can readily compute (i) the time ($\Delta T_d$) duration that electrical current was discharged across a particular cathode-anode structure within a particular discharge head.

The information structures produced by the Data Capture and Processing Subsystem 400 are stored within the Metal-Fuel Database Management Subsystem 308 within the Metal-Fuel Card Discharging Subsystem 186 on a real-time basis and can be used in a variety of ways during discharging operations.

For example, the above-described current ($i_{acd}$) and time ($\Delta T_d$) information is conventionally measured in Amperes and Hours, respectively. The product of these measures, denoted by "AH", provides an approximate measure of the electrical charge (−Q) that has been "discharged" from the metal-air fuel cell battery structures along the metal-fuel tape. Thus the computed "AH" product provides an accurate amount of metal-oxide that one can expect to have been formed on a particular track of an identified (i.e. labelled) metal-fuel card at a particular instant in time, during discharging operations.

When used with historical information about metal oxidation and reduction processes, the Metal-Fuel Database Management Subsystems 308 and 404 within the Metal-Fuel Card Discharging and Recharging Subsystems 186 and 191, respectively, can account for or determine how much metal-fuel (e.g. zinc) should be available for discharging (i.e. producing electrical power) from a particular zinc-fuel card, or how much metal-oxide is present for reducing therealong. Thus such information can be very useful in carrying out metal-fuel management functions including, for example, determination of metal-fuel amounts available along a particular metal-fuel zone.

In the illustrative embodiment, metal-fuel availability is managed within the Metal-Fuel Card Discharging Subsystem 186, using the method of metal-fuel availability management described hereinbelow.

Preferred Method of Metal-Fuel Availability Management During Discharging Operations In accordance with the principles of the present invention, the data reading head 260 (260', 260') automatically identifies each metal-fuel card as it is loaded within the discharging assembly 197 and produces card identification data indicative thereof which is supplied to the Data Capture and Processing Subsystem within the Metal-Fuel Card Discharging Subsystem 186. Upon receiving card identification data on the loaded metal-fuel card, the Data Capture and Processing Subsystem automatically creates an information structure (i.e. data file) on the card within the Metal-Fuel Database Management Subsystem. The function of the information structure, shown in FIG. 4A13, is to record current (up-to-date) information on sensed discharging parameters, the metal-fuel availability state, metal-oxide presence state, and the like. In the event that an information storage structure has been previously created for this particular metal-fuel card within the Metal-Fuel Database Management Subsystem, this information file is then accessed for updating. As shown in FIG. 4A13, for each identified metal-fuel card, an information structure 409 is maintained for each metal-fuel zone ($MFZ_j$), at each i-th sampled instant of time $t_i$.

Once an information structure has been created (or found) for a particular metal-fuel card 187, the initial state or condition of each metal-fuel zone thereon 195A through 195D must be determined and entered within the information structure maintained within the Metal-Fuel Database Management Subsystem 308 of the Metal-Fuel Card Discharging Subsystem 186.

Typically, the metal-fuel card loaded within the discharging head assembly 197 will be partially or fully charged, and thus containing a particular amount of metal-fuel along its support surface. For accurate metal-fuel management, these initial metal-fuel amounts (MFAs) in the loaded card must be determined and then information representative thereof stored with the Metal-Fuel Database Management Subsystems 308 and 404 of the Discharging and Recharging Subsystems 186 and 191, respectively. In general, initial states of information can be acquired in a number of different ways, including for example: by encoding such initialization information on the metal-fuel card prior to completing a discharging operation on a different FCB system; by prerecording such initialization information within the Metal-Fuel Database Management Subsystem 308 during the most recent discharging operation carried out in the same FCB system; by recording within the Metal-Fuel Database Management Subsystem 308 (at the factory), the amount of metal-fuel present on each track of a particular type metal-fuel card, and automatically initializing such information within a particular information structure upon reading a code on the metal-fuel card using data reading head 260 (260', 260"); by actually measuring the initial amount of metal-fuel on each metal-fuel track using the metal-oxide sensing assembly described above in conjunction with the cathode-anode output terminal configuration subsystem 205; or by any other suitable technique.

The actual measurement technique mentioned above can be carried out by configuring metal-oxide sensing ($v_{applied}/i_{response}$) drive circuitry (shown in FIG. 2A15) with the cathode-electrolyte output terminal configuration subsystem 205 and Data Capture and Processing Subsystem 400 within the Metal-Fuel Card Discharging Subsystem 186. Using this arrangement, the metal-oxide sensing heads can automatically acquire information on the "initial" state of each metal-fuel track on each identified metal-fuel card loaded within the discharging head assembly 197. Such information would include the initial amount of metal-oxide and metal-fuel present on each zone (195A through 195D) at the time of loading, denoted by "$t_0$".

In a manner similar to that described in connection with the FCB systems of FIGS. 1 and 4, such metal-fuel/metal-oxide measurements are carried out on each metal-fuel zone (MFZ) of the loaded card 187 by automatically applying a test voltage across a particular metal fuel zone 195A through 195D, and detecting the electrical which flows thereacross in response the applied electrical test voltage. The data signals representative of the applied test voltage ($v_{applied}$) and response current ($i_{response}$) at a particular sampling period are automatically detected by the Data Capture and Processing Subsystem 400 and processed to produce a data element representative of the ratio of the applied voltage to response current (i.e., $v_{applied}/(i_{response})$) with appropriate numerical scaling. This data element is automatically recorded within an information structure linked to the identified metal-fuel card maintained in the Metal-Fuel Data Management Subsystem 308. As this data element (v/i) provides a direct measure of electrical resistance across the metal-fuel zone under measurement, it can be accurately correlated to a measured amount of metal-oxide present on the identified metal-fuel zone.

Data Capture and Processing Subsystem 400 then quantifies the measured initial metal-oxide amount (available at initial time instant $t_0$), and designates it as $MOA_0$ for recording within the information structure (shown in FIG. 4A13). Then using a priori information about the maximum metal-fuel available on each track when fully (re)charged, the Data Capture and Processing Subsystem 400 computes an accurate measure of metal-fuel available on each track at time "$t_0$", for each fuel track, designates each measures as $MFA_0$ and records these initial metal-fuel measures $\{MFA_0\}$ for the identified fuel card within the Metal-Fuel Database Management Subsystems of both the Metal-Fuel Card Discharging and Recharging Subsystems 186 and 191, respectively. While this initialization procedure is simple to carry out, it is understood that in some applications it may be more desirable to empirically determine these initial metal-fuel measures using theoretically-based computations premised on the metal-fuel cards having been subjected to a known course of treatment (e.g. the Short Circuit Resistance Test described hereinabove).

After the initialization procedure is completed, the Metal-Fuel Card Discharging Subsystem 186 is ready to carry out its metal-fuel management functions along the lines to be described hereinbelow. In the illustrative embodiment, this method involves two basic steps that are carried out in a cyclical manner during discharging operations.

The first step of the procedure involves subtracting from the initial metal-fuel amount $MFA_0$, the computed metal-oxide estimate $MOE_{0-1}$ which corresponds to the amount of metal-oxide produced during discharging operations conducted between time interval $t_0$–$t_1$. The during the discharging operation, metal-oxide estimate $MOE_{0-1}$ is computed using the following discharging parameters collected—electrical discharge current $i_{acd}$ and time duration $\Delta T_d$.

The second step of the procedure involves adding to the computed measure ($MFA_0$–$MOE_{0-1}$), the metal-fuel estimate $MFE_{0-1}$ which corresponds to the amount of metal-fuel produced during any recharging operations that may have been conducted between time interval $t_0$–$t_1$. Notably, the metal-fuel estimate $MFE_{0-1}$ is computed using: the electrical recharge current $i_{acr}$; and time duration $\Delta T$, during the discharging operation. Notably, metal-fuel measure $MFE_{0-1}$ will have been previously computed and recorded within the Metal-Fuel Database Management Subsystem within the Metal-Fuel Card Recharging Subsystem 186 during the immediately previous recharging operation (if one such operation was carried out). Thus, it will be necessary to read this prerecorded information element from the database within the Recharging Subsystem 191 during current discharging operations.

The computed result of the above-described accounting procedure (i.e. $MFA_0$–$MOE_{1-1}$+$MFE_{0-1}$) is then posted within the Metal-Fuel Database Management Subsystem 400 within Metal-Fuel Card Discharging Subsystem 186 as the new current metal-fuel amount ($MFA_1$) which will be used in the next metal-fuel availability update procedure. During discharging operations, the above-described update procedure is carried out for every $t_i$–$t_{i+1}$ seconds for each metal-fuel track that is being discharged.

Such information maintained on each metal-fuel track can be used in a variety of ways, for example: manage the availability of metal-fuel to meet the electrical power demands of the electrical load connected to the FCB system; as well as setting the discharging parameters in an optimal manner during discharging operations. The details pertaining to this metal-fuel management techniques will be described in greater detail hereinbelow.

Uses For Metal-Fuel Availability Management during the Discharging Mode of Operation During discharging operations, the computed estimates of metal-fuel present over any particular metal-fuel zone 195A through 195D at time $t_2$ (i.e. $MFZ_{t1-t2}$), determined at the i-th discharging head, can be used to compute the availability of metal-fuel at the (j+1)th, (j+2)th, or (j+n)th discharging head downstream from the j-th discharging head. Using such computed measures, the system controller 203 within the Metal-Fuel Card Discharging Subsystem 186 can determine (i.e. anticipate) in real-time, which metal-fuel zone on a metal-fuel card contains metal-fuel (e.g. zinc) in quantities sufficient to satisfy instantaneous electrical-loading conditions imposed upon the Metal-Fuel Card Discharging Subsystem 186 during the discharging operations, and selectively switch-in the metal-fuel zones(s) across which metal-fuel is known to be present. Such track switching operations may involve the system controller 203 temporarily connecting the output terminals of the cathode-anode structures thereof to the input terminals of the cathode-anode output terminal configuration subsystem 205 so that zones supporting metal-fuel content (e.g. deposits) are made readily available for producing electrical power required by the electrical load 200.

Another advantage derived from such metal-fuel management capabilities is that the system controller 203 within the Metal-Fuel Card Discharging Subsystem 115 can control discharge parameters during discharging operations using information collected and recorded within the Metal-Fuel Database Management Subsystem 308 during the immediately prior recharging and discharging operations.

Means for Controlling Discharging Parameters during the Discharging Mode using Information Recorded during the Prior Modes of Operation In the FCB system of the second illustrative embodiment, the system controller 203 within the Metal-Fuel Card Discharging Subsystem 186 can automatically control discharge parameters using information collected during prior recharging and discharging operations and recorded within the Metal-Fuel Database Management Subsystems of the FCB system of FIG. 3.

As shown in FIG. 4B14, the subsystem architecture and buses provided within and between the Discharging and Recharging Subsystems 186 and 191 enable system controller 203 within the Metal-Fuel Card Discharging Subsystem 186 to access and use information recorded within the Metal-Fuel Database Management Subsystem 404 within the Metal-Fuel Card Recharging Subsystem 191. Similarly, the subsystem architecture and buses provided within and between the Discharging and Recharging Subsystems 186 and 191 enable system controller 103' within the Metal-Fuel Card Recharging Subsystem 191 to access and use information recorded within the Metal-Fuel Database Management Subsystem 308 within the Metal-Fuel Card Discharging Subsystem 186. The advantages of such information and sub-file sharing capabilities will be explained hereinbelow.

During the discharging operations, the system controller 203 can access various types of information stored within the Metal-Fuel Database Management Subsystems with the Discharging and Recharging Subsystems 186 and 191. One important information element will relate to the amount of metal-fuel currently available at each metal-fuel zone 195A through 195D along at a particular instant of time (i.e. $MFE_t$). Using this information, the system controller 203 can determine if there will be sufficient metal-fuel along a particular track to satisfy current electrical power demands. The metal-fuel along one or more or all of the fuel zones 195A through 195D along a metal-fuel card may be substantially consumed as a result of prior discharging operations, and not having been recharged since the last discharging operation. The system controller 203 can anticipate such metal-fuel conditions within the discharging heads. Depending on the metal-fuel condition of "upstream"

fuel cards, the system controller 203 may respond as follows: (i) connect the cathode-anode structures of metal-fuel "rich" tracks into the discharge power regulation subsystem 223 when high electrical loading conditions are detected at electrical load 200, and connect cathode-anode structures of metal-fuel "depleted" zones into this subsystem when low loading conditions are detected at electrical load 200; (ii) increase the amount of oxygen being injected within the corresponding cathode support structures when the metal-fuel is thinly present on identified metal-fuel zones, and decrease the amount of oxygen being injected within the corresponding cathode support structures when the metal-fuel is thickly present on identified metal-fuel zones, in order to maintain power produced from the discharging heads 197; (iii) control the temperature of the discharging heads 197 when the sensed temperature thereof exceeds predetermined thresholds; etc. It is understood that in alternative embodiments of the present invention, the system controller 203 may operate in different ways in response to the detected condition of a particular zone on a identified fuel card.

During The Recharging Mode

In the FCB system of the fifth illustrative embodiment shown in FIG. 3, means are provided for automatically managing the metal-oxide presence within the Metal-Fuel Card Recharging Subsystem 191 during recharging operations. Such system capabilities will be described in greater detail hereinbelow.

As shown in FIG. 4B14, data signals representative of recharge parameters (e.g., $i_{acr}$, $v_{acr}$, . . . , $pO_{2r}$, $H_2O_r$, $v_{acr}/i_{acr}$) are automatically provided as input to the Data Capture and Processing Subsystem 406 within the Metal-Fuel Card Recharging Subsystem 191. After sampling and capturing, these data signals are processed and converted into corresponding data elements and then written into an information structure 410 as shown, for example, in FIG. 4B13. As in the case of discharge parameter collection, each information structure 410 for recharging parameters comprises a set of data elements which are "time-stamped" and related (i.e. linked) to a unique metal-fuel card identifier 240 (240', 240"), associated with the metal-fuel card being recharged. The unique metal-fuel card identifier is determined by data reading head 270 (270', 270" respectively) shown in FIG. 4B6. Each time-stamped information structure is then recorded within the Metal-Fuel Database Management Subsystem 404 of the Metal-Fuel Card Recharging Subsystem 191, shown in FIG. 4B14, for maintenance, subsequent processing and/or access during future recharging and/or discharging operations.

As mentioned hereinabove, various types of information are sampled and collected by the Data Capture and Processing Subsystem 406 during the recharging mode. Such information types include, for example: (1) the recharging voltage applied across each such cathode-anode structure within each recharging head 197'; (2) the amount of electrical current ($i_{acr}$) supplied across each cathode-anode structures within each recharge head 197'; (3) the oxygen concentration ($pO_{2r}$) level in each subchamber within each recharging head; (4) the moisture level ($H_2O_r$) near each cathode-electrolyte interface within each recharging head; and (5) the temperature ($T_{acr}$) within each channel of each recharging head 197'. From such collected information, the Data Capture and Processing Subsystem 406 can readily compute various parameters of the system including, for example, the time duration ($\Delta t_r$) that electrical current was supplied to a particular cathode-anode structure within a particular recharging head.

The information structures produced and stored within the Metal-Fuel Database Management Subsystem 404 of the Metal-Fuel Card Recharging Subsystem 191 on a real-time basis can be used in a variety of ways during recharging operations. For example, the above-described current ($i_{acr}$) and time duration ($\Delta T_r$) information acquired during the recharging mode is conventionally measured in Amperes and Hours, respectively. The product of these measures (AH) provides an accurate measure of the electrical charge (–Q) supplied to the metal-air fuel cell battery structures along the metal-fuel tape during recharging operations. Thus the computed "AH" product provides an accurate amount of metal-fuel that one can expect to have been produced on the identified metal-fuel zone, at a particular instant in time, during recharging operations.

When used with historical information about metal oxidation and reduction processes, the Metal-Fuel Database Management Subsystems 318 and 404 within the Metal-Fuel Card Discharging and Recharging Subsystems 186 and 191, respectively, can be used to account for or determine how much metal-oxide (e.g. zinc-oxide) should be present for recharging (i.e. conversion back into zinc from zinc-oxide) along the zinc-fuel card. Thus such information can be very useful in carrying out metal-fuel management functions including, for example, determination of metal-oxide amounts present along each metal-fuel zone 195A through 195D during recharging operations.

In the illustrative embodiment, the metal-oxide presence process may be managed within the Metal-Fuel Card Recharging Subsystem 191 using the method described hereinbelow.

Preferred Method of Metal-Oxide Presence Management During Recharging Operations In accordance with the principles of the present invention, the data reading head 270 (270', 270') shown in FIG. 4B12 automatically identifies each metal-fuel card as it is loaded within the recharging assembly 197' and produces card identification data indicative thereof which is supplied to the Data Capture and Processing Subsystem within the Metal-Fuel Card Discharging Subsystem 191. Upon receiving card identification data on the loaded metal-fuel card, the Data Capture and Processing Subsystem automatically creates an information structure (i.e. data file) on the card within the Metal-Fuel Database Management Subsystem. The function of this information structure, shown in FIG. 4B13, is to record current (up-to-date) information on sensed recharging parameters, the metal-fuel availability state, metal-oxide presence state, and the like. In the event that an information storage structure (i.e. data file) has been previously created for this particular metal-fuel card within the Metal-Fuel Database Management Subsystem 404, this information file is accessed therefrom for updating. As shown in FIG. 4B13, for each identified metal-fuel card, an information structure 410 is maintained for each metal-fuel zone ($MFZ_j$) 195A through 195D, at each sampled instant of time $t_i$. Once an information structure has been created (or found) for a particular metal-fuel card, the initial state or condition of each metal-fuel zone thereon must be determined and entered within the information structure maintained within the Metal-Fuel Database Management Subsystems 308 and 404 of the Discharging and Recharging Subsystems 186 and 191, respectively.

Typically, the metal-fuel card loaded within the recharging head assembly 197 will be partially or fully discharged, and thus containing a particular amount of metal-oxide along its fuel zones for conversion back into its primary metal. For accurate metal-fuel management, these initial metal-oxide amounts (MOAs) in the loaded card(s) must be determined and then information representative thereof stored with the Metal-Fuel Database Management Subsystem of the Discharging and Recharging Subsystems 186 and 191, respectively. In general, initial states of information can be acquired in a number of different ways, including for example: by encoding such initialization information on the metal-fuel card prior to completing a discharging operation on a different FCB system; by prerecording such initialization information within the Metal-Fuel Database Management Subsystem 404 during the most recent recharging operation carried out in the same FCB system; by recording within the Metal-Fuel Database Management Subsystem 404 (at the factory), the amount of metal-oxide normally expected on each zone of a particular type metal-fuel card, and automatically initializing such information within a particular information structure upon reading a code on the metal-fuel card using data reading head 270 (270', 270"); by actually measuring the initial amount of metal-oxide on each metal-fuel zone using the metal-oxide sensing assembly described above in conjunction with the cathode-anode input terminal configuration subsystem 244; or by any other suitable technique.

The "actual" measurement technique mentioned above can be carried out by configuring metal-oxide sensing drive circuitry with the cathode-anode input terminal configuration subsystem 244 and Data Capture and Processing Subsystem 406 within the Recharging Subsystem 191. Using this arrangement, the metal-oxide sensing heads can automatically acquire information on the "initial" state of each metal-fuel track on each identified metal-fuel card loaded within the recharging head assembly 197'. Such information would include the initial amount of metal-oxide and metal-fuel present on each track at the time of loading, denoted by "$t_0$".

In a manner similar to that described in connection with the FCB system of FIGS. 1 and 3, such metal-full-metal-oxide measurements are carried out on each metal-fuel zone of the loaded card by automatically applying a test voltage across a particular zone of metal fuel, and detecting the electrical current which flows thereacross in response the applied test voltage. The data signals representative of the applied voltage ($v_{applied}$) and response current ($i_{response}$) at a particular sampling period are automatically detected by the Data Capture and Processing Subsystem 4C06 and processed to produce a data element representative of the ratio of the applied voltage to response current ($v_{applied}/i_{response}$) with appropriate numerical scaling. This data element is automatically recorded within an. information structure linked to the identified metal-fuel card maintained in the Metal-Fuel Data Management Subsystem 404. As this data element (v/i) provides a direct measure of electrical resistance across the metal-fuel zone under measurement, it can be accurately correlated to a measured "initial" amount of metal-oxide present on the identified metal-fuel zone.

Data Capture and Processing Subsystem 406 then quantifies the measured initial metal-oxide amount (available at initial time instant $t_0$), and designates it as $MOA_0$ for recording in the information structures maintained within the Metal-Fuel Database Management Subsystems 308 and 404 of both the Metal-Fuel Card Discharging and Recharging Subsystems 186 and 191, respectively. While this initialization procedure is simple to carry out, it is understood that in some applications it may be more desirable to empirically determine these initial metal-oxide measures using theoretically-based computations premised on the metal-fuel cards having been subjected to a known course of treatment (e.g. The Short-Circuit Resistance Test described hereinabove).

After completing the initialization procedure, the Metal-Fuel Card Recharging Subsystem 191 is ready to carry out its metal-fuel management functions along the lines to be described hereinbelow. In the illustrative embodiment, this method involves two basic steps that are carried out in a cyclical manner during discharging operations.

The first step of the procedure involves subtracting from the initial metal-oxide amount $MOA_0$, the computed metal-fuel estimate $MFE_{0-1}$ which corresponds to the amount of metal-fuel produced during recharging operations conducted between time interval $t_0$–$t_1$. During the recharging operation, metal-fuel estimate $MFE_{0-1}$ is computed using the following recharging parameters: electrical recharge current $i_{acr}$; and time duration $\Delta T$.

The second step of the procedure involves adding to the computed measure ($MOA_0$–$MFE_{0-1}$), the metal-oxide estimate $MOE_{0-1}$ which corresponds to the amount of metal-oxide produced during any discharging operations that may have been conducted between time interval $t_0$–t. Notably, the metal-oxide estimate $MOE_{0-1}$ is computed using the following discharging parameters collected—electrical recharge current $i_{acd}$ and time duration $\Delta T_{0-1}$, during the discharging operation. Notably, metal-oxide measure $MOE_{0-1}$ will have been previously computed and recorded within the Metal-Fuel Database Management Subsystem 308 within the Metal-Fuel Card Discharging Subsystem 186 during the immediately previous discharging operation (if one such operation carried out since $t_0$). Thus, it will be necessary to read this prerecorded information element from Database Management Subsystem 308 within the Discharging Subsystem 186 during the current recharging operations.

The computed result of the above-described accounting procedure (i.e. $MOA_0$–$MFE_{0-1}$+$MOE_{0-1}$) is then posted within the Metal-Fuel Database Management Subsystem 404 within Metal-Fuel Card Recharging Subsystem 191 as the new current metal-fuel amount ($MOA_1$) which will be used in the next metal-oxide presence update procedure. During recharging operations, the above-described update procedure is carried out every $t_i$–$t_{i+1}$ seconds for each metal-fuel zone that is being recharged.

Such information maintained on each metal-fuel zone can be used in a variety of ways, for example: manage the presence of metal-oxide formations along the zones of metal-fuel cards; as well as setting the recharging parameters in an optimal manner during recharging operations. The details pertaining to such metal-oxide presence management techniques will be described in greater detail hereinbelow.

Uses for Metal-Oxide Presence Management during the Recharging Mode of Operation During recharging operations, the computed amounts of metal-oxide present along any particular metal-fuel zone (i.e. MFZ), determined at the i-th recharging head 197', can be used to compute the presence of metal-oxide at the (i+1)th, (i+2)th, or (i+n)th recharging head downstream from the i-th recharging head 197'. Using such computed measures, the system controller 203' within the Metal-Fuel Card Recharging Subsystem 191 can determine (i.e. anticipate) in real-time, which metal-fuel tracks along a metal-fuel card contain metal-oxide (e.g. zinc-oxide) requiring recharging, and which contain metal-fuel not requiring recharging. For those metal-fuel zones requiring recharging, the system controller 203' can electronically switch-in the cathode-anode structures of those metal-fuel zones having significant metal-oxide content (e.g. deposits) for conversion into metal-fuel within the recharging head assembly 197'.

Another advantage derived from such metal-oxide management capabilities is that the system controller 203' within the Metal-Fuel Card Recharging Subsystem 191 can control recharge parameters during recharging operations using information collected and recorded within the Metal-Fuel Database Management Subsystem 404 during the immediately prior recharging and discharging operations.

During Recharging operations, information collected can be used to compute an accurate measure of the amount of metal-oxide that exists along each metal-fuel zone 195A through 195D at any instant in time. Such information, stored within information storage structures maintained within the Metal-Fuel Database Subsystem 404, can be accessed and used by the system controller 203' within the Metal-Fuel Card Discharging Subsystem 186 to control the amount of electrical current supplied across the cathode-electrolyte structures of each recharging head 197'. Ideally, the magnitude of electrical current will be selected to ensure complete conversion of the estimated amount of metal-oxide (e.g. zinc-oxide) along each such zone, into its primary source metal (e.g. zinc).

Means for Controlling Recharging Parameters during the Recharging Mode using Information Recorded during Prior Modes of Operation In the FCB system of the second illustrative embodiment, the system controller 203' within the Metal-Fuel Card Recharging Subsystem 191 can automatically control recharge parameters using information collected during prior discharging and recharging operations and recorded within the Metal-Fuel Database Management Subsystems 308 and 404 of the FCB system of FIG. 3.

During the recharging operations, the system controller 203' within, the Metal-Fuel Tape Recharging Subsystem 191 can access various types of information stored within the Metal-Fuel Database Management Subsystem 404. One important information element stored therein will relate to the amount of metal-oxide currently present along each metal-fuel zone at a particular instant of time (i.e. $MOA_t$). Using this information, the system controller 203' can determine on which zones significant metal-oxide deposits are present, and thus can connect the input terminal of the corresponding cathode-anode structures (within the recharging heads) to the recharging power control subsystem 245 by way of the cathode-anode input terminal configuration subsystem 244, to efficiently and quickly carry out recharging operations therealong. The system controller 203' can anticipate such metal-oxide conditions prior to conducting recharging operations. Depending on the metal-oxide condition of "upstream" fuel cards loaded within the discharging head assembly, the system controller 203' of the illustrative embodiment may respond as follows: (i) connect cathode-anode structures of metal-oxide "rich" zones into the recharging power regulation subsystem 245 for long recharging durations, and connect cathode-anode structures of metal-oxide "depleted" zones from this subsystem for relatively shorter recharging operations; (ii) increasing the rate of oxygen evacuation from the cathode support structures corresponding to zones having thickly formed metal-oxide formations therealong during recharging operations, and decreasing the rate of oxygen evacuation from the cathode support structures corresponding to zones having thinly formed metal-oxide formations therealong during recharging operations; (iii) controlling the temperature of the recharging heads 197' when the sensed temperature thereof exceeds predetermined thresholds; etc. It is understood that in alternative embodiments, the system controller 203' may operate in different ways in response to the detected condition of particular zones on an identified fuel card.

The Third Illustrative Embodiment of the Air-Metal FCB System of the Present Invention The third illustrative embodiment of the metal-air FCB system hereof is illustrated in FIGS. 5 through 5A. In this embodiment, the FCB system is provided with metal-fuel in the form of metal-fuel cards (or sheets) contained within a cassette cartridge-like device having a partitioned interior volume for storing (re)charged and discharged metal-fuel cards in separate storage compartments. A number of advantages are provided by this metal-fuel supply design, namely: the amount of physical space required for storing the (re) charged and discharged metal-fuel cards is substantially reduced; a new supply of pre-charged metal-fuel cards can be quickly supplied to the system by simply sliding a prefilled tray-like cartridge into the tray receiving port of the system housing; and an old supply of discharged cards can be quickly removed from the system by withdrawing a single cartridge tray from the housing and inserting a new one therein.

As shown in FIGS. 5 through 5A, this FCB system 500 comprises a number of subsystems, namely: a Metal-Fuel Card Discharging (i.e. Power Generation) Subsystem 186 for generating electrical power from recharged metal-fuel cards 187 during the Discharging Mode of operation; Metal-Fuel Card Recharging Subsystem 191 for electro-chemically recharging (i.e. reducing) sections of oxidized metal-fuel cards 187 during the Recharging Mode of operation; a Recharged Card Loading Subsystem 189' for automatically loading one or more charged (recharged) metal-fuel cards 187 from recharged card storage compartment 501A within cassette tray/cartridge 502, into the discharging bay of the Discharging Subsystem 186; Discharged Card Unloading Subsystem 190' for automatically unloading one or more discharged metal-fuel cards 187 from the discharging bay of Discharging Subsystem 186, into the discharged metal-fuel card storage compartment 501B, located above card storage compartment 501A and separated by platform 503 arranged within cartridge housing 504 to divide its interior volume into approximately equal subvolumes; Discharged Card Loading Subsystem 192' for automatically loading one or more discharged metal-fuel cards from the discharged metal-fuel card storage bin 501B, into the recharging bay of the Metal-Fuel Card Recharging Subsystem 191; and a Recharged Card Unloading Subsystem 193' for automatically unloading recharged metal-fuel cards from the recharging bay of the Recharging Subsystem into the recharged metal-fuel card storage compartment 501A.

The metal fuel consumed by this FCB System is provided in the form of metal fuel cards 187 which can be similar in construction to cards 112 used in the system of FIG. 1 or cards 187 used in the system of FIG. 3. In either case, the discharging and recharging heads will be designed and constructed to accommodate the physical placement of metal fuel on the card or sheet-like structure. Preferably, each metal-fuel card used in this FCB system will be "multi-zoned" or "multi-tracked" in order to enable the simultaneous production of multiple supply voltages (e.g. 1.2 Volts) from the "multi-zoned" or "multi-tracked" discharging heads. As described in detail hereinabove, this inventive feature enables the generation and delivery of a wide range of output voltages from the system, suitable to the requirements of the particular electrical load connected to the FCB system.

While the metal-fuel delivery mechanism of the above-described illustrative embodiment is different from the other described embodiments of the present invention, the Metal-Fuel Card Discharging Subsystem 186 and the Metal-Fuel Card Recharging Subsystem 191 can be substantially the same or modified as required to satisfy the requirements of any particular embodiment of this FCB system design.

The Fourth Illustrative Embodiment of the Air-Metal FCB System of the Present Invention The fourth illustrative embodiment of the metal-air FCB system hereof is illustrated in FIGS. 6 through 6A. In this embodiment, the FCB system is provided with a Metal-Fuel Card Discharging Subsystem, but not a Metal-Fuel Card recharging Subsystem, thereby providing a simpler design of metal-fuel in the form of metal-fuel cards (or sheets) contained within a cassette cartridge-like device having a partitioned interior volume for storing (re)charged and discharged metal-fuel cards in separate storage compartments. A number of advantages are provided by this metal-fuel supply design, namely: the amount of physical space required for storing the (re)charged and discharged metal-fuel cards is substantially reduced; a new supply of pre-charged metal-fuel cards can be quickly supplied to the system by simply sliding a prefilled tray-like cartridge into the tray receiving port of the system housing; and an old supply of discharged cards can be quickly removed from the system by withdrawing a single cartridge tray from the housing and inserting a new one therein.

As shown therein, this FCB system 600 comprises a number of subsystems, namely: a Metal-Fuel Card Discharging (i.e. Power Generation) Subsystem 186 for generating electrical power from recharged metal-fuel cards 187 during the Discharging Mode of operation; Metal-Fuel Card Recharging Subsystem 191 for electro-chemically recharging (i.e. reducing) sections of oxidized metal-fuel cards 187 during the Recharging Mode of operation; a Recharged Card Loading Subsystem 189' for automatically loading one or more charged (recharged) metal-fuel cards 187 from recharged card storage compartment 501A within cassette tray/cartridge 502, into the discharging bay of the Discharging Subsystem 186; Discharged Card Unloading Subsystem 190' for automatically unloading one or more discharged metal-fuel cards 187 from the discharging bay of Discharging Subsystem 186, into the discharged metal-fuel card storage compartment 501B, located above card storage compartment 501A and separated by platform 503 arranged within cartridge housing 504 to divide its interior volume into approximately equal subvolumes; Discharged Card Loading Subsystem 192' for automatically loading one or more discharged metal-fuel cards from the discharged metal-fuel card storage bin 501B, into the recharging bay of the Metal-Fuel Card Recharging Subsystem 191; and a Recharged Card Unloading Subsystem 193' for automatically unloading recharged metal-fuel cards from the recharging bay of the Recharging Subsystem into the recharged metal-fuel card storage compartment 501A.

The metal fuel consumed by this FCB System is provided in the form of metal fuel cards 187 which can be similar in construction to cards 112 used in the system of FIG. 1 or cards 187 used in the system of FIG. 3. In either case, the discharging and recharging heads will be designed and constructed to accommodate the physical placement of metal fuel on the card or sheet-like structure. Preferably, each metal-fuel card used in this FCB system will be "multi-zoned" or "multi-tracked" in order to enable The simultaneous production of multiple supply voltages (e.g. 1.2 Volts) from the "multi-zoned" or "multi-tracked" discharging heads. As described in detail hereinabove, this inventive feature enables the generation and delivery of a wide range of output voltages from the system, suitable to the requirements of the particular electrical load connected to the FCB system.

While the metal-fuel delivery mechanism of the above-described illustrative embodiment is different from the other described embodiments of the present invention, the Metal-Fuel Card Discharging Subsystem 186 and the Metal-Fuel Card Recharging Subsystem 191 can be substantially the same or modified as required to satisfy the requirements of any particular embodiment of this FCB system design.

Additional Embodiments of Metal-Air FCB Systems according to the Present Invention In the FCB systems described hereinabove, multiple discharging heads and multiple recharging heads have been provided for the noted advantages that such features provide. It is understood, however, that FCB systems of the present invention can be made with a single discharging head alone or in combination with one or more recharging heads, as well as with a single discharging head alone or in combination with one or more discharging heads.

In the FCB systems described hereinabove, the cathode structures of the discharging heads and the recharging heads are shown as being planar or substantially planar structures which are substantially stationary relative to the anode-contacting electrodes or elements, while the metal-fuel (i.e. the anode) material is either: (i) stationary relative to the cathode structures in the metal-fuel card embodiments of the present invention hereinabove; or (ii) moving relative to the cathode structures in the metal-fuel card embodiments of the present invention shown hereinabove.

It is understood, however, the metal-air FCB system designs of the present invention are not limited to the use of planar stationary cathode structures, but can be alternatively constructed using one or more cylindrically-shaped cathode structures adapted to rotate relative to, and come into ionic contact with metal-fuel cards during discharging and/or recharging operations, while carrying out all of the electro-chemical functions that cathode structures must enable in metal-air FCB systems. Notably, the same techniques that are used to construct planar stationary cathodes structures described hereinabove can be readily adapted to fashion cylindrically-shaped cathode structures realized about hollow, air-pervious support tubes driven by electric motors and bearing the same charge collecting substructure that the cathode structures typically are provided with, as taught in detail hereinabove.

The above-described FCB systems of the present invention can be used to power various types of electrical circuits, devices and systems, including, but not limited to, trans-portable computers, portable telephones, lawn mowers, stand-alone portable generators, vehicular systems, and the like.

Having described in detail the various aspects of the present invention described above, it is understood that modifications to the illustrative embodiments will readily occur to persons with ordinary skill in the art having had the benefit of the present disclosure. All such modifications and variations are deemed to be within the scope and spirit of the present invention as defined by the accompanying claims to Invention.

What is claimed is:

1. A metal-air fuel cell battery system, comprising:

a cassette storage device having one or more storage compartments for storing a supply of charged metal-fuel cards for discharging, each said charged metal-fuel card being physically disconnected from each other said charged metal-fuel card and movable in a manner independent from each other charged metal-fuel card; and a discharging device for discharging one or more of said charged metal-fuel cards supplied from said cassette storage device so as to produce one or more discharged metal-fuel cards and electrical power for supply to an electrical load, wherein each said charged metal-fuel card is maintained substantially stationary relative to said discharging device when said electrical power is being produced therefrom.

2. The metal-air fuel-cell battery system of claim 1, wherein said cassette storage device comprises a partitioned interior volume for storing charged and discharged metal-fuel cards in separate storage compartments formed within said cassette storage device.

3. The metal-air fuel-cell battery system of claim 1, wherein said system further comprises a housing for enclosing said discharging device, and wherein said cassette storage device is removable from said housing.

4. The metal-air fuel-cell battery system of claim 1, wherein said cassette storage device comprises a partitioned interior volume for storing charged and discharged metal-fuel cards in separate storage compartments formed within said cassette storage device.

5. A metal-air fuel cell battery system comprising:
a cassette storage device having one or more storage compartments for storing a supply of charged metal-fuel cards for discharging, each said charged metal-fuel card being physically disconnected from each other said metal-fuel card;
a discharging device for discharging one or more charged metal-air fuel cards so as to produce one or more discharged metal-fuel cards and electrical power for supply to an electrical load, wherein each said charged metal-fuel card is maintained substantially stationary relative to said discharging device when said electrical power is being produced therefrom; and
a first mechanism for automatically transporting one or more of said charged metal-fuel cards from said cassette storage device into said discharging device for producing electrical power for supply to said electrical load.

6. The metal-air fuel cell battery system of claim 5, which further comprises:
a second mechanism for automatically transporting one or more discharged metal-fuel cards from said discharging device, back into said cassette storage device.

7. The metal-air fuel cell battery system of claim 5, wherein said discharging device further comprises means for simultaneously discharging a plurality of said charged metal-fuel cards.

8. A metal-air fuel cell battery system comprising:
a cassette storage device having one or more storage compartments for storing a supply of discharged metal-fuel cards for recharging, each said discharged metal-fuel card being physically disconnected from each other said discharged metal-fuel card;
a recharging device for recharging one or more discharged metal-air fuel cards so as to produce one or more charged metal-fuel cards, wherein each said discharged metal-fuel card is maintained substantially stationary relative to said recharging device when electrical power is being supplied to said discharged metal-fuel card during recharging;
a first mechanism for automatically transporting one or more discharged metal-fuel cards from said cassette storage device, back into said recharging device; and
a second mechanism for automatically transporting one or more charged metal-fuel cards from said recharging device, back into said cassette storage device.

9. The metal-air fuel cell battery system of claim 8, wherein said cassette storage device comprises a partitioned interior volume for storing charged and discharged metal-fuel cards in separate storage compartments formed within said cassette storage device.

10. A metal-air fuel cell battery system comprising:
a cassette storage device having one or more storage compartments for storing a supply of charged metal-fuel cards for discharging, each said charged metal-fuel card being physically disconnected from each other said charged metal-fuel card;
a discharging device for discharging one or more of said charged metal-air fuel cards so as to produce one or more discharged metal-fuel cards and electrical power for supply to an electrical load, wherein each said charged metal-fuel card is maintained substantially stationary relative to said discharging device when said electrical power is being produced therefrom;
a recharging device for recharging one or more discharged metal-air fuel cards and producing one or more charged metal-fuel cards by supplying electrical power said one or more discharged metal-fuel cards, wherein each said discharged metal-fuel card is maintained substantially stationary relative to said recharging device when said electrical power is being supplied thereto;
a first mechanism for automatically transporting one or more charged metal-fuel cards from said cassette storage device into said discharging device;
a second mechanism for automatically transporting one or more discharged metal-fuel cards from said discharging device, back into said cassette storage device;
a third mechanism for automatically transporting one or more discharged metal-fuel cards from said cassette storage device into said recharging device; and
a fourth mechanism for automatically transporting one or more charged metal-fuel cards from said recharging device, back into said cassette storage device.

11. The metal-air fuel cell battery system of claim 10, wherein said cassette storage device comprises a partitioned interior volume for storing charged and discharged metal-fuel cards in separate storage compartments formed within said cassette storage device.

12. The metal-air fuel cell battery system of claim 10, wherein both said discharging device and said recharging device can be operated simultaneously under the management of a system controller.

13. The metal-air fuel cell battery system of claim 10, wherein said system controller is associated with a resultant system.

14. The metal-air fuel cell battery system of claim 13, wherein said resultant system is an electrical power management system.

15. A metal-air fuel cell battery system comprising:
a cassette storage device having one or more storage compartments for storing a supply of charged metal-fuel cards for discharging, each said charged metal-fuel card being physically disconnected from each other said charged metal-fuel card;

a discharging device for discharging one or more of said charged metal-air fuel cards so as to produce one or more discharged metal-fuel cards and electrical power for supply to an electrical load, wherein each said charged metal-fuel card is maintained substantially stationary relative to said discharging device when said electrical power is being produced therefrom;

a recharging device for recharging one or more discharged metal-air fuel cards and producing one or more charged metal-fuel cards by supplying electrical power to one or more discharged metal-fuel cards, wherein each said discharged metal-fuel card is maintained substantially stationary relative to said recharging device when said electrical power is being supplied thereto;

a first mechanism for automatically transporting one or more charged metal-fuel cards from said cassette storage device into said discharging device;

a second mechanism for automatically transporting one or more discharged metal-fuel cards from said discharging device, back into said cassette storage device;

a third mechanism for automatically transporting one or more discharged metal-fuel cards from said cassette storage device into said recharging device; and a fourth mechanism for automatically transporting one or more charged metal-fuel cards from said recharging device, back into said cassette storage device.

* * * * *